US012151470B2

(12) United States Patent
Landa et al.

(10) Patent No.: US 12,151,470 B2
(45) **Date of Patent: *Nov. 26, 2024**

(54) APPARATUS AND METHOD FOR CONTROL OR MONITORING A PRINTING SYSTEM

(71) Applicant: LANDA CORPORATION LTD., Rehovot (IL)

(72) Inventors: Benzion Landa, Nes Ziona (IL); Nir Zarmi, Be'erotayim (IL); Abraham Keren, Modi'in Maccabim Reut (IL); Alon Siman-Tov, Or Yehuda (IL)

(73) Assignee: LANDA CORPORATION LTD., Rehovot (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/207,180

(22) Filed: Jun. 8, 2023

(65) Prior Publication Data

US 2024/0131837 A1 Apr. 25, 2024
US 2024/0227386 A9 Jul. 11, 2024

Related U.S. Application Data

(63) Continuation of application No. 17/186,043, filed on Feb. 26, 2021, now Pat. No. 11,724,487, which is a (Continued)

(51) Int. Cl.
*B41J 2/005* (2006.01)

(52) U.S. Cl.
CPC .................................. *B41J 2/0057* (2013.01)

(58) Field of Classification Search
CPC ...................................................... B41J 2/0057

(Continued)

(56) References Cited

U.S. PATENT DOCUMENTS 6,151,040 A 11/2000 Takada et al.
7,313,352 B2 12/2007 Shinohara et al.

(Continued)

FOREIGN PATENT DOCUMENTS

JP H05212851 A 8/1993
JP H05301339 A 11/1993

(Continued)

OTHER PUBLICATIONS

Co-pending U.S. Appl. No. 18/492,815, filed Oct. 24, 2023.

(Continued)

*Primary Examiner* — Jason S Uhlenhake
*Assistant Examiner* — Alexander D Shenderov
(74) *Attorney, Agent, or Firm* — Momentum IP; Marc Van Dyke

(57) ABSTRACT

Embodiments of the present invention relate to control apparatus and methods of a printing system, for example, comprising an intermediate transfer member (ITM) and to user-related features of a printing system. Some embodiments relate to regulation of a velocity and/or tension and/or length of the ITM. Some embodiments relate to regulation of deposition of ink on the moving ITM. Some embodiments regulate to apparatus configured to alert a user of one or more events related to operation of the ITM. Some embodiments relate to a time-line GUI for visualizing and/or manipulating queued print jobs which may be employed. Some embodiments relate to a reversed augmented reality GUI for visualization and/or control of the printing system. In some embodiments, a display screen is mounted to a printer housing and/or able to control access to moving parts of a printing system.

10 Claims, 70 Drawing Sheets

Related U.S. Application Data continuation of application No. 16/677,732, filed on Nov. 8, 2019, now Pat. No. 10,981,377, which is a continuation of application No. 16/047,033, filed on Jul. 27, 2018, now Pat. No. 10,518,526, which is a continuation of application No. 15/818,010, filed on Nov. 20, 2017, now Pat. No. 10,065,411, which is a continuation of application No. 15/289,210, filed on Oct. 10, 2016, now Pat. No. 9,884,479, which is a continuation-in-part of application No. 14/860,776, filed on Sep. 22, 2015, now Pat. No. 9,498,946, which is a continuation-in-part of application No. 14/382, 880, filed as application No. PCT/IB2013/051727 on Mar. 5, 2013, now Pat. No. 9,186,884, said application No. 14/860,776 is a continuation-in-part of application No. 14/340,122, filed on Jul. 24, 2014, now Pat. No. 9,229,664, which is a continuation-in-part of application No. PCT/IB2013/050245, filed on Jan. 10, 2013, said application No. PCT/IB2013/051727 is a continuation-in-part of application No. PCT/IB2013/050245, filed on Jan. 10, 2013, which is a continuation-in-part of application No. PCT/IB2012/056100, filed on Nov. 1, 2012.

(60) Provisional application No. 61/719,894, filed on Oct. 29, 2012, provisional application No. 61/642,445, filed on May 3, 2012, provisional application No. 61/641,870, filed on May 2, 2012, provisional application No. 61/641,881, filed on May 2, 2012, provisional application No. 61/641,288, filed on May 1, 2012, provisional application No. 61/640,720, filed on Apr. 30, 2012, provisional application No. 61/624,896, filed on Apr. 16, 2012, provisional application No. 61/611,556, filed on Mar. 15, 2012, provisional application No. 61/611,568, filed on Mar. 15, 2012, provisional application No. 61/611,547, filed on Mar. 15, 2012, provisional application No. 61/606,913, filed on Mar. 5, 2012.

(58) Field of Classification Search
USPC .......................................................... 347/103
See application file for complete search history.

(56) References Cited

U.S. PATENT DOCUMENTS

| | | | |
|---|---|---|---|
| 7,583,920 | B2 | 9/2009 | Willemsens et al. |
| 11,724,487 | B2 | 8/2023 | Landa et al. |
| 11,890,879 | B2 | 2/2024 | Landa et al. |
| 11,921,454 | B2 | 3/2024 | Burkatovsky |
| 2006/0127617 | A1 | 6/2006 | Tanaka et al. |
| 2017/0275113 | A1 | 9/2017 | Rietbergen et al. |
| 2018/0178550 | A1 | 6/2018 | Kremers et al. |
| 2018/0335740 | A1 | 11/2018 | Kishi et al. |
| 2022/0357699 | A1 | 11/2022 | Burkatovsky |
| 2024/0176275 | A1 | 5/2024 | Burkatovsky |

FOREIGN PATENT DOCUMENTS

| | | | |
|---|---|---|---|
| JP | 2005266246 | A | 9/2005 |
| JP | 2006154289 | A | 6/2006 |
| JP | 2008248437 | A | 10/2008 |
| JP | 2013249548 | A | 12/2013 |
| JP | 2017072776 | A | 4/2017 |
| JP | 2017167498 | A | 9/2017 |
| JP | 2018084617 | A | 5/2018 |
| JP | 2018150660 | A | 9/2018 |
| JP | 2018194654 | A | 12/2018 |
| JP | 2019523719 | A | 8/2019 |
| JP | 2021529110 | A | 10/2021 |
| WO | 2017208144 | A1 | 12/2017 |
| WO | 2020035766 | A1 | 2/2020 |

OTHER PUBLICATIONS

JP2008248437A Machine Translation (by EPO and Google)—published Oct. 16, 2008; Seiren Co Ltd.
JP2018150660A Machine Translation (by EPO and Google)—published Sep. 27, 2018; Seiren Co Ltd.
JPH05212851A Machine Translation (by EPO and Google)—published Aug. 24, 1993; Kanebo Ltd et al.
OSRAM Opto Semiconductors GmbH, "SFH 206 K—Radial Sidelooker—Silicon PIN Photodiode", Datasheet, Jan. 7, 2020, Version 1.4, pp. 1-14.
Siemens Semiconductor Group, "Silizium-PIN-Fotodiode—SFH 206 K," Datasheet, Mar. 17, 1998, pp. 1-4.
Vishay Intertechnology, Inc., "Power SMD LED LCC-2 Plus", Datasheet, year 2017, pp. 1-9.
JP2005266246A Machine Translation (by EPO and Google)—published Sep. 29, 2005; Ricoh KK.
JP2006154289A Machine Translation (by EPO and Google)—published Jun. 15, 2006; Ricoh KK.
JP2013249548A Machine Translation (by EPO and Google)—published Dec. 12, 2013; Seiko Epson Corp.
JP2017072776A Machine Translation (by EPO and Google)—published Apr. 13, 2017; Oki Data KK.
JP2017167498A Machine Translation (by EPO and Google)—published Sep. 21, 2017; Ricoh Co Ltd.
JP2018084617A Machine Translation (by EPO and Google)—published May 31, 2018; Ricoh Co Ltd.
JP2018194654A Machine Translation (by EPO and Google)—published Dec. 6, 2018; Seiko Epson Corp.
JP2021529110A Machine Translation (by EPO and Google)—published Oct. 28, 2021; Randa Corporation Limited.
JPH05301339A Machine Translation (by EPO and Google)—published Nov. 16, 1993; Canon KK.

TIME = $t_1$

GUI MODE "A"

GUI FRAME 2

FRONT ACCESS BLOCKED

APPARATUS AND METHOD FOR CONTROL OR MONITORING A PRINTING SYSTEM

CROSS-REFERENCE TO RELATED APPLICATIONS

The present application claims priority to the following patent applications, all of which are hereby incorporated by reference herein in their entirety: U.S. application Ser. No. 17/186,043 filed on Feb. 26, 2021; U.S. application Ser. No. 16/677,732 filed on Nov. 8, 2019; U.S. application Ser. No. 16/047,033 filed on Jul. 27, 2018; U.S. application Ser. No. 15/818,010 filed on Nov. 20, 2017; U.S. application Ser. No. 15/289,210 filed on Oct. 10, 2016; U.S. application Ser. No. 14/860,776 filed on Sep. 22, 2015; U.S. application Ser. No. 14/340,122 filed on Jul. 24, 2014; PCT/IB2013/51727 filed on Mar. 5, 2013; U.S. Provisional Application No. 61/606,913 filed on Mar. 5, 2012; U.S Provisional Application No. U.S. 61/611,547 filed on Mar. 15, 2012; U.S. Provisional Application 61/624,896 filed on Apr. 16, 2012; U.S. Provisional Application 61/641,288 filed on May 1, 2012; U.S. Provisional Application 61/642,445 filed on May 3, 2012; PCT/IB2012/056100 filed on Nov. 1, 2012 and PCT/IB2013/050245 filed on Jan. 10, 2013.

FIELD OF THE INVENTION

The present invention relates to a control apparatus and methods for a digital printing system, methods and apparatus for monitoring a digital printing system and display devices. In particular, the present invention is suitable for indirect printing systems using an intermediate transfer member.

BACKGROUND

Digital printing techniques have been developed that allow a printer to receive instructions directly from a computer without the need to prepare printing plates. Amongst these are color laser printers that use the xerographic process. Color laser printers using dry toners are suitable for certain applications, but they do not produce images of a photographic quality acceptable for publications, such as magazines.

A process that is better suited for short run high quality digital printing is used in the HP-Indigo printer. In this process, an electrostatic image is produced on an electrically charged image bearing cylinder by exposure to laser light. The electrostatic charge attracts oil-based inks to form a color ink image on the image bearing cylinder. The ink image is then transferred by way of a blanket cylinder onto paper or any other substrate.

Inkjet and bubble jet processes are commonly used in home and office printers. In these processes droplets of ink are sprayed onto a final substrate in an image pattern. In general, the resolution of such processes is limited due to wicking by the inks into paper substrates. The substrate is therefore generally selected or tailored to suit the specific characteristics of the particular inkjet printing arrangement being used. Fibrous substrates, such as paper, generally require specific coatings engineered to absorb the liquid ink in a controlled fashion or to prevent its penetration below the surface of the substrate. Using specially coated substrates is, however, a costly option that is unsuitable for certain printing applications, especially for commercial printing. Furthermore, the use of coated substrates creates its own problems in that the surface of the substrate remains wet and additional costly and time consuming steps are needed to dry the ink, so that it is not later smeared as the substrate is being handled, for example stacked or wound into a roll.

Furthermore, excessive wetting of the substrate causes cockling and makes printing on both sides of the substrate (also termed perfecting or duplex printing) difficult, if not impossible.

Furthermore, inkjet printing directly onto porous paper, or other fibrous material, results in poor image quality because of variation of the distance between the print head and the surface of the substrate.

Using an indirect or offset printing technique overcomes many problems associated with inkjet printing directly onto the substrate. It allows the distance between the surface of the intermediate image transfer member and the inkjet print head to be maintained constant and reduces wetting of the substrate, as the ink can be dried on the intermediate image member before being applied to the substrate. Consequently, the final image quality on the substrate is less affected by the physical properties of the substrate.

Various printing devices have also previously been proposed that use an indirect inkjet printing process, this being a process in which an inkjet print head is used to print an image onto the surface of an intermediate transfer member, which is then used to transfer the image onto a substrate. The intermediate transfer member may be a rigid drum or a flexible belt (e.g. guided over rollers or mounted onto a rigid drum), also herein termed a blanket.

SUMMARY

The present disclosure relates to control methods and apparatus for a digital printing system, for example, a digital printing system having a moving intermediate transfer member (ITM)—for example, a flexible ITM (e.g. a blanket) mounted over a plurality of rollers (e.g. a belt) or mounted over a rigid drum (e.g. a drum-mounted blanket).

An ink image is formed on a surface of the moving ITM (e.g. by droplet deposition at an image forming station) and subsequently transferred to a substrate. To transfer the ink image to the substrate, substrate is pressed between at least one impression cylinder and a region of the moving ITM where the ink image is located, at which time the transfer station (also called an impression station) is said to be engaged.

For flexible ITMs mounted over a plurality of rollers, an impression station typically comprise in addition to the impression cylinder, a pressure cylinder or roller the outer surface of which may optionally be compressible. The flexible blanket or belt passes in between such two cylinders which can be selectively engaged or disengaged, typically when the distance between the two is reduced or increased. One of the two cylinders may be at a fixed location in space, the other one moving toward or apart of it (e.g., the pressure cylinder is movable or the impression cylinder is movable) or the two cylinders may each move toward or apart from the other. For rigid ITMs, the drum (upon which a blanket may optionally be mounted) constitutes the second cylinder engaging or disengaging from the impression cylinder.

For flexible ITMs, the motion of the ITM may be linear in segment in-between roller or rotational when passing over such rollers. For rigid ITMs having a drum shape or support, the motion of the ITM is rotational. In any event, the movement of an ink image from an image forming station to an impression station defines the printing direction. Unless the context clearly indicates otherwise, the terms upstream and downstream as may be used hereinafter relate to positions relative to the printing direction.

Some embodiments relate to a method of controlling the variation with time of the surface velocity of the ITM so as to: (i) maintain a constant intermediate transfer member surface velocity at locations aligned with the image formation station; and (ii) locally accelerate and decelerate only portions of the intermediate transfer member at locations spaced from the image forming station to obtain, at least part of the time, a varying velocity only at the locations spaced from the image forming station.

In one example, each of the ITM and the impression cylinder includes a respective circumferential discontinuity—for example, (i) the ITM may include a seam location where opposite ends of a flat and flexible elongated blanket strip are secured to each other to form an endless belt; and (ii) the impression cylinder may include a cylinder gap (e.g. to accommodate a gripper) which interrupts a circumference of the impression cylinder. In some embodiments, it is desirable to avoid a situation where the ITM is engaged to the impression cylinder when: (i) the seam location of the ITM is aligned with the impression cylinder and/or (ii) the gap in the impression cylinder is aligned with the ITM. Instead, it is preferred to operate so that (i) the seam location of the ITM is aligned with the impression cylinder gap and/or (ii) the gap in the impression cylinder is aligned with the ITM during the periods of disengagement.

Generally speaking, it is possible to achieve this result if the system is configured so that (i) a circumference of the ITM and (ii) a circumference of the impression cylinder to be fixed and equal to a positive integer. In printing systems where the impression cylinder can accommodate n sheets of a substrate, then the circumference of the ITM can be set to be a positive integer of 1/n the circumference of the impression cylinder.

Nevertheless, in certain situations, the circumference or “length” of the ITM may fluctuate in time—e.g. due to temperature variations or to material fatigue or for any other reason.

As noted above, in some embodiments, it is possible to locally accelerate and decelerate only portions of the intermediate transfer member at locations spaced from the image forming station to obtain, at least part of the time, a varying velocity only at the locations spaced from the image forming station. The local acceleration and deceleration to temporarily and locally modify a surface velocity of portions of the ITM may thus be carried out: (i) to correct for ITM circumference/length deviations from the desired or setpoint value (e.g. equal to a positive integer multiple of a circumference of the ITM) and/or (ii) to avoid alignment, during periods of engagement, of the seam of the ITM or gap of the impression cylinder with the nip between the ITM and the impression cylinder.

Such temporary and local modifications of the surface velocity of portions of the ITM are typically performed when the ITM is not engaged with the impression cylinder. Once the ITM re-engages to the impression cylinder, it is possible to resume operation so that the surface velocity of the ITM, once again, matches that of the rotating impression cylinder, at which time they may be said to move “in tandem”.

If the ITM includes a flexible belt mounted over a plurality of rollers, then temporarily increasing or decreasing a rotational speed of one or more of the roller(s) when the ITM is disengaged from the impression cylinder may accelerate (e.g. locally accelerate) or decelerate the ITM.

Alternatively or additionally, in some embodiments, powered tensioning rollers or dancers are deployed on opposite sides of the nip between the ITM and the impression cylinder. In the event that the temporary acceleration or deceleration of the rollers causes a slack to build up on one side of the nip and a tension builds up on the other side of the nip. It is possible to compensate for said slack by moving the dancers in opposite directions.

As noted above, in some embodiments, it is desirable for a circumference of the ITM to be an integral multiple of the circumference of the impression cylinder, so that the seam is aligned with a cylinder gap of the impression cylinder as the seam passes through the nip between the ITM and the impression cylinder during periods of disengagement between the ITM and the impression cylinder. If the circumference of the ITM increases or decreases, it is possible to maintain phase synchronization between the ITM seam and the cylinder gap by accelerating or decelerating the entire ITM or a portion thereof (e.g. a portion including the seam).

Alternatively or additionally, it may be possible stretch the ITM (e.g. including a flexible belt) or to cause the belt to contract—for example, by moving one or more rollers over which the ITM is mounted with respect to one another. Thus, some embodiments of the present invention relate to control methods and apparatus whereby (i) a circumference length of an ITM is not fixed but varies in time and (ii) this circumference length is regulated to a set-point length equal to an integral multiple of a circumference of the impression cylinder. The regulation of the ITM circumference length may be performed by increasing or decreasing a distance between any pair of rollers over which the ITM is mounted.

As noted above, some embodiments relate to digital printing systems where the ITM comprises a flexible belt. In some embodiments, the length of the flexible belt or of portions thereof may fluctuate in time, where the magnitude of the fluctuations may depend upon the physical structure of the flexible belt. In some embodiments, the stretching and contracting of the belt may be non-uniform.

It is now disclosed that in systems where an ink image is formed upon an ITM comprising a flexible belt by deposition of ink droplets thereon, it is advantageous to: (i) monitor temporal fluctuations of non-uniform stretching of an ITM comprising a flexible belt; and (ii) regulate a timing of the deposition of the ink droplets in accordance with the monitored temporal fluctuations.

It is now disclosed that non-uniform stretching of the ITM may distort ink images that are formed thereon. By measuring this phenomenon and compensating, it is possible to reduce or eliminate this image distortion.

It is now disclosed a method of operating a printing system wherein ink images are formed on a moving intermediate transfer member at an image forming station and are transferred from the intermediate transfer member to a substrate at an impression station, the method comprising: controlling the variation with time of the surface velocity of the intermediate transfer member so as to: (i) maintain a constant intermediate transfer member surface velocity at locations aligned with the image formation station; and (ii) locally accelerate and decelerate only portions of the intermediate transfer member at locations spaced from the image forming station to obtain, at least part of the time, a varying velocity only at the locations spaced from the image forming station.

In some embodiments, i. the moving intermediate transfer member is periodically engaged to and disengaged from a rotating impression cylinder at the impression station to transfer the ink images from the intermediate transfer member to a substrate; and ii. the accelerating and the decelerating is performed so as to (i) prevent a pre-determined section of the intermediate transfer member from being aligned with the impression cylinder during periods of engagement and/or (ii) improve a synchronization between a pre-determined section of the intermediate transfer member and a pre-determined location of the impression cylinder.

In some embodiments, the pre-determined section of the intermediate transfer member is a blanket seam and/or the pre-determined section of the impression cylinder is a gap in the impression cylinder accommodating a substrate gripper.

In some embodiments, the accelerating and the decelerating is carried out by means of upstream and downstream powered dancers arranged upstream and downstream of the impression station where the ink images are transferred.

In some embodiments, only portions of the intermediate transfer member in the region downstream of the upstream dancer and upstream of the downstream dancer are accelerated or decelerated.

In some embodiments, i. the moving intermediate transfer member comprises a flexible belt mounted (e.g. tightly mounted) over upstream and downstream rollers arranged upstream and downstream of the image forming station, the upstream and downstream rollers defining upper and lower runs of the flexible belt; ii. the lower run of the flexible belt includes one or more slack portion(s); and iii. torque applied to the belt by the rollers maintains the upper run taut so as to substantially isolate the upper run from mechanical vibrations in the lower run.

In some embodiments, i. the moving intermediate transfer member is periodically engaged to and disengaged from a rotating impression cylinder at the impression station to transfer the ink images from the intermediate transfer member to substrate; and ii. the surface velocity of the intermediate transfer member at the impression station matches a linear surface velocity of the rotating impression cylinder during the periods of engagement and the accelerating and decelerating of the intermediate transfer member is performed only during periods of disengagement.

In some embodiments, i. the moving intermediate transfer member is periodically engaged to and disengaged from a rotating impression cylinder at the impression station to transfer the ink images from the intermediate transfer member to substrate; and ii. the method further comprises monitoring a phase difference between a (i) locator-point affixed to the moving intermediate transfer member; and (ii) a phase of the rotating impression cylinder; and iii. local acceleration of only portions of the intermediate transfer member is carried out in response to the results of the phase difference monitoring.

In some embodiments, the locator-point corresponds to a location of a marker on the intermediate transfer member or to a lateral formation thereof.

It is now disclosed a printing system comprising: a. an intermediate transfer member; b. an image forming station configured to form ink images upon a surface of the intermediate transfer member as the intermediate transfer moves so that ink images are transported thereon to an impression station; c. a velocity controller configured to control the variation with time of the surface velocity of the intermediate transfer member so as to: (i) maintain a constant intermediate transfer member surface velocity at locations aligned with the image formation station; and (ii) locally accelerate and decelerate only portions of the intermediate transfer member at locations spaced from the image forming station to obtain, at least part of the time, a varying velocity only at the locations spaced from the image forming station.

In some embodiments, i. the moving intermediate transfer member is periodically engaged to and disengaged from a rotating impression cylinder at the impression station to transfer the ink images from the intermediate transfer member to a substrate; and ii. the velocity controller is configured to perform the accelerating and the decelerating so as to (i) prevent a pre-determined section of the intermediate transfer member from being aligned with the impression cylinder during periods of engagement and/or (ii) improve a synchronization between a pre-determined section of the intermediate transfer member and a pre-determined location of the impression cylinder.

In some embodiments, the pre-determined section of the intermediate transfer member is a blanket seam and/or the pre-determined section of the impression cylinder is a gap in the impression cylinder accommodating a substrate gripper.

In some embodiments, the accelerating and the decelerating is carried out by means of upstream and downstream powered dancers arranged upstream and downstream of the impression station where the ink images are transferred.

In some embodiments, only portions of the intermediate transfer member in the region downstream of the upstream dancer and upstream of the downstream dancer are accelerated or decelerated.

In some embodiments, i. the moving intermediate transfer member comprises a flexible belt mounted over (e.g. tightly mounted) upstream and downstream rollers arranged upstream and downstream of the image forming station, the upstream and downstream rollers defining upper and lower runs of the flexible belt; ii. the lower run of the flexible belt includes one or more slack portion(s); and iii. torque applied to the belt by the rollers maintains the upper run taut so as to substantially isolate the upper run from mechanical vibrations in the lower run.

In some embodiments, i. the moving intermediate transfer member is periodically engaged to and disengaged from a rotating impression cylinder at the impression station to transfer the ink images from the intermediate transfer member to substrate; and ii. the system and/or velocity controller further comprises electronic circuitry configured to monitor a phase difference between a (i) locator-point affixed to the moving intermediate transfer member; and (ii) a phase of the rotating impression cylinder; and iii. the velocity controller is configured to perform the local acceleration of only portions of the intermediate transfer member in response to the results of the phase difference monitoring. In some embodiments, the locator-point corresponds to a location of a marker on the intermediate transfer member or to a lateral formation thereof.

It is now disclosed a printing system comprising: a. an intermediate transfer member comprising a flexible belt (e.g. endless belt); b. an image forming station configured to form ink images upon a surface of the intermediate transfer member as the intermediate transfer moves so that ink images are transported thereon to an impression station; c. upstream and downstream rollers arranged upstream and downstream of the image forming station to define an upper run passing through the image forming station and a lower run passing through the impression station; and d. an impression cylinder at the impression station that is periodically engaged to and disengaged from the intermediate transfer member to transfer the ink images from the moving intermediate transfer member to a substrate passing between the intermediate transfer member and the impression cylinder, the system being configured such that: i. the periodic engagements induce mechanical vibrations within slack portions in the lower run of the belt; and ii. torque applied to the belt by the upstream and downstream rollers maintains the upper run taut so as to substantially isolate the upper run from the mechanical vibrations in the lower run.

In some embodiments, the downstream roller is configured to sustain a significantly stronger torque to the belt than the upstream roller.

It is now disclosed a method of operating a printing system having a moving intermediate transfer member that is periodically engaged to and disengaged from a rotating impression cylinder such that during periods of engagement ink images are transferred from a surface of the moving intermediate transfer member to a substrate located between the impression cylinder and the intermediate transfer member, the method comprising: a. during periods of engagement, moving the intermediate transfer member with the same surface velocity as the rotating impression cylinder; and b. during periods of disengagement, increasing or decreasing a surface velocity of the moving intermediate transfer member, or part thereof, so as to (i) prevent a pre-determined section of the intermediate transfer member from being aligned with the impression cylinder during periods of engagement and/or (ii) improve a synchronization between a pre-determined section of the intermediate transfer member and a pre-determined location of the impression cylinder.

In some embodiments, the pre-determined section of the intermediate transfer member is a blanket seam and/or the pre-determined section of the impression cylinder is a gap in the impression cylinder accommodating a substrate gripper.

In some embodiments, (i) the intermediate transfer member comprises a flexible belt mounted over a plurality of rollers; (ii) at least one of the rollers is a driver roller; and (iii) the acceleration or deceleration of the intermediate transfer member is performed by increasing or decreasing a rotational speed of one or more of the driver rollers during the periods of disengagement.

In some embodiments, a surface velocity of only a portion of the intermediate transfer member is increased or decreased during periods of disengagement.

In some embodiments, i. the intermediate transfer member comprises a flexible belt; and ii. the printing system includes upstream and downstream powered dancers arranged upstream and downstream of a nip between the belt and the impression cylinder; iii. during the periods of disengagement, movement of the upstream and downstream dancers locally accelerates and subsequently decelerates only a portion of the intermediate transfer member in the nip-including region that is downstream of the upstream dancer and upstream of the downstream dancer, thereby accelerating and decelerate the pre-predetermined section of the intermediate transfer member.

In some embodiments, a surface velocity of an entirety of the intermediate transfer member is increased or decreased during periods of disengagement.

In some embodiments, the method further comprises monitoring a phase difference between a (i) locator-point affixed to the moving intermediate transfer member; and (ii) a phase of the rotating impression cylinder, and wherein the increasing or decreasing of the surface velocity of the intermediate transfer member during periods of disengagement is carried out in response to the results of the phase difference monitoring.

In some embodiments, the locator-point corresponds to a location of a marker on the intermediate transfer member or to a lateral formation thereof.

In some embodiments, (i) the intermediate transfer member comprises a flexible belt; (ii) the method further comprises monitoring a fluctuating length of the flexible belt; and (iii) the increasing or decreasing of the velocity of the intermediate transfer member during periods of disengagement is carried out in response to the results of the length monitoring.

It is now disclosed a printing system comprising: a. an intermediate transfer member; b. an image forming station configured to form ink images upon a surface of the intermediate transfer member while the intermediate transfer member is in motion; c. a rotating impression cylinder configured to be periodically engaged to and disengaged from the rotating intermediate transfer member such that during periods of engagement the ink images are transferred from the surface of the rotating intermediate transfer member to a substrate located between the impression cylinder and the intermediate transfer member; and d. a controller configured to regulate the motion of the intermediate transfer member such that: i. during periods of engagement, the intermediate transfer member moves with the same surface velocity as the rotating impression cylinder; and ii. during periods of disengagement, the surface velocity of the intermediate transfer member, or part thereof, is increased or decreased so as to: A. prevent a pre-determined section of the intermediate transfer member from being aligned with the impression cylinder during periods of engagement; and/or B. improve a synchronization between a pre-determined section of the intermediate transfer member and a pre-determined location of the impression cylinder. In some embodiments, the pre-determined section of the intermediate transfer member is a blanket seam and/or the pre-determined section of the impression cylinder is a gap in the impression cylinder accommodating a substrate gripper.

In some embodiments, (i) the intermediate transfer member comprises a flexible belt mounted over a plurality of rollers; (ii) at least one of the rollers is a driver roller; and (iii) the controller is configured to accelerate or decelerate the intermediate transfer member by increasing or decreasing a rotational speed of one or more of the driver rollers during the periods of disengagement.

In some embodiments, the controller is configured to increase or decrease the surface velocity of only a portion of the intermediate transfer member during periods of disengagement.

In some embodiments, i. the intermediate transfer member comprises a flexible belt mounted over a plurality of rollers; ii. the printing system further comprises upstream and downstream powered dancers arranged upstream and downstream of a nip between the belt and the impression cylinder; and iii. the controller is associated with the dancers such that during the periods of disengagement, the upstream and downstream dancers are moved to locally accelerate and subsequently decelerate a portion of the belt including the pre-predetermined section.

In some embodiments, the controller is configured to increase or decrease the surface velocity of the entire intermediate transfer member during periods of disengagement.

In some embodiments, the system further comprises electronic circuitry configured to monitor a phase difference between (i) a moving locator-point affixed to the moving intermediate transfer member; and (ii) a phase of the rotating impression cylinder, and wherein the controller increases or decreases the surface velocity of the intermediate transfer member during periods of disengagement in response to the results of the phase difference monitoring.

In some embodiments, the locator-point corresponds to a location of a marker on the intermediate transfer member or to a lateral formation thereof.

In some embodiments, (i) the intermediate transfer member is a flexible belt; (ii) the system further comprises electronic circuitry configured to monitor a fluctuating length of the flexible belt; and (iii) the controller increases or decreases the surface velocity of the intermediate transfer member or of part thereof during periods of disengagement in response to the results of the length monitoring.

In some embodiments, the rotating impression cylinder is independently driven from the moving intermediate transfer member.

In some embodiments, ink images are formed by deposition of ink (e.g. ink droplets) onto a moving flexible blanket and subsequently transferred from the blanket to a substrate, the method comprising: a. monitoring temporal fluctuations of non-uniform stretching of the moving blanket; and b. in response to the results of the monitoring, regulating the deposition of the ink (e.g. ink droplets) onto the blanket so as to eliminate or reduce a severity of distortions, caused by the blanket non-uniform stretching, of the ink images formed on the moving blanket.

In some embodiments, a timing of the deposition of the ink (e.g. ink droplets) is regulated in response to the results of the monitoring.

In some embodiments, the flexible blanket is mounted over a plurality of rollers.

In some embodiments, the method further comprises c. predicting future non-uniform blanket stretching from historical stretching data acquired by the monitoring of the temporal fluctuations, wherein the regulating of the ink deposition (e.g. droplet deposition) is performed in response to the results of the predicting.

In some embodiments, A. operation of the printing system defines at least one of the following operating cycles: (i) a blanket rotation cycle; (ii) an impression cylinder rotation cycle; and (iii) a blanket-impression cylinder engagement cycle; and B. the non-uniform blanket stretching is predicted according to a mathematical model which assigns elevated weights to historical data describing blanket stretch at a cycle-corresponding historical times defined according to one of the operating cycles.

It is now disclosed a printing system comprising: a. a flexible blanket; b. an image forming station configured to form ink images onto a surface of the blanket while the blanket moves by deposition of ink droplets onto the blanket surface; c. a transfer station configured to transfer the ink images from the surface of the moving blanket to a substrate; and d. electronic circuitry configured to monitor temporal fluctuations of non-uniform stretching of the blanket and to regulate the deposition of the ink droplets onto the blanket in accordance with the results of the monitoring of the temporal fluctuations so as to eliminate or reduce a severity of distortions of the ink images formed on the moving blanket.

In some embodiments, a timing of the deposition of the ink (e.g. ink droplets) is regulated by the electronic circuitry in response to the results of the monitoring.

In some embodiments, the flexible blanket is mounted over a plurality of rollers.

In some embodiments, the electronic circuitry is operative to predict future non-uniform blanket stretching from historical stretching data acquired by the monitoring of the temporal fluctuations, and wherein the electronic circuitry performs the regulating of the ink droplet deposition in response to the results of the predicting.

In some embodiments, A. operation of the printing system defines at least one of the following operating cycles: (i) a blanket rotation cycle; (ii) an impression cylinder rotation cycle; and (iii) a blanket-impression cylinder engagement cycle; and B. the electronic circuitry is configured to predict the non-uniform blanket stretch according to a mathematical model using a mathematical model which assigns elevated weights to historical data describing blanket stretch at a cycle-corresponding historical times defined according to one of the operating cycles.

In some embodiments, the monitoring temporal fluctuations of non-uniform stretching of the blanket includes detecting the passage of one or more markers applied on the blanket or laterally formed thereon past print bars by marker-detectors mounted therein, thereon or thereto. It is now disclosed a printing system comprising: a. an intermediate transfer member having one or more of markers at different respective locations thereon; b. an image forming station including one or more print bars each print bar being configured to deposit ink on the intermediate transfer member while the intermediate transfer member rotates; and c. one or more marker-detectors positioned to detect the passage of the markers on the rotating intermediate transfer member, wherein each print bar is associated with a respective marker-detector that is disposed in a fixed position relative to the print bar and that is configured to detect movement of the marker(s).

In some embodiments, one or more of the marker(s) are applied on the blanket.

In some embodiments, one or more of the marker(s) are laterally formed on the blanket.

In some embodiments, (i) the image forming station comprises a plurality of print bars spaced from one another in a direction of motion of the intermediate transfer member, and (ii) the one or more marker-detectors comprises a plurality of marker detectors such that each print bar of the plurality of print bars is associated with a respective marker-detector that is disposed in a fixed position relative to the print bar.

In some embodiments, the marker detectors (i) are disposed adjacent to the associated respective print bars and/or (ii) are disposed underneath the associated respective print bars and/or (iii) are mounted within and/or on a housing of the associated respective print bars.

In some embodiments, the marker detectors include at least one of: (i) an optical detector; (ii) a magnetic detector; (iii) a capacitance sensor; and (iv) a mechanical detector.

It is now disclosed a method of operating a printing system having a moving intermediate transfer member of non-constant length in which the length of the moving intermediate transfer member is regulated to a set-point length.

In some embodiments, (i) images are transferred to a substrate at an impression station by engagement between the intermediate transfer member and a rotating impression cylinder; and (ii) the set-point length equals an integral multiple of a circumference of the impression cylinder.

In some embodiments, a ratio between the set-point length of the intermediate transfer member and the circumference of the impression cylinder is at least 2 or at least 3 or at least 5 or at least 7 and/or between 5 and 10.

In some embodiments, the regulation of the intermediate transfer member length includes operation of a linear actuator to increase or decrease a length of the moving intermediate transfer member.

In some embodiments, (i) the intermediate transfer member is guided over a plurality of rollers; and (ii) the regulation of the intermediate transfer member length includes modifying, for one or more pair of rollers, a inter-roller distance so as to stretch or contract the moving intermediate transfer member.

In some embodiments, movement of one or more intermediate transfer member-applied markers or of one or more formations from the intermediate transfer member is tracked by one or more detectors and the length of the intermediate transfer member is regulated in accordance with the results of the tracking.

It is now disclosed a printing system comprising: a. an intermediate transfer member of non-constant length; b. an image forming station configured to deposit ink on a surface of the intermediate transfer member while the intermediate transfer member moves so as to form ink images on the surface of the intermediate transfer member; c. a transfer station configured to transfer the ink images from the surface of the moving intermediate transfer member to a substrate passing in between the transfer member and an impression cylinder during a period of engagement; and d. electronic circuitry configured to regulate a length of the intermediate transfer member to a set-point length.

In some embodiments, the set-point length equals an integral multiple of a circumference of the impression cylinder.

In some embodiments, a ratio between the set-point length of the intermediate transfer member and the circumference of the impression cylinder is at least 2 or at least 3 or at least 5 or at least 7 and/or between 5 and 10.

In some embodiments, the regulation of the intermediate transfer member length includes operation of a linear actuator to increase or decrease a length of the moving intermediate transfer member.

In some embodiments: (i) the intermediate transfer member is guided over a plurality of rollers; and (ii) the regulation of the intermediate transfer member length includes modifying a inter-roller distance for one or more pairs of the rollers so as to stretch or contract the moving intermediate transfer member.

In some embodiments, movement of one or more intermediate transfer member-applied markers or of one or more formations from the intermediate transfer member is tracked by one or more detectors and the length of the intermediate transfer member is regulated in accordance with the results of the tracking.

It is now disclosed a method of monitoring performance of a printing system where ink images are formed by deposition of ink on a moving variable-length intermediate transfer member and subsequently transferred from the moving intermediate transfer member to a substrate, the method comprising: a. monitoring an indication of a length of the moving variable-length intermediate transfer member; and b. generating an alarm or alert signal contingent upon the intermediate transfer member length deviating from a set point value by more than a threshold tolerance.

In some embodiments, the threshold tolerance is between 0.1% and 1%.

It is now disclosed a method of monitoring performance of a printing system where ink images are formed by deposition of ink on a moving blanket mounted over one or more rollers, the method comprising: a. measuring an indication of blanket slip on one or more of the guide rollers; and b. in response to the blanket slip measurement, (i) generating an alarm or alert signal contingent upon a magnitude of blanket slip exceeding a threshold value and/or (ii) displaying an indication of a magnitude of blanket slip on a display device.

In some embodiments, the indication of blanket slip is a rotational velocity difference between rotational velocities of two of the guide rollers over which the blanket is guided.

It is now disclosed a method of monitoring performance of a printing system where ink images are formed by deposition of ink on a moving intermediate transfer member having a seam and subsequently transferred from the moving intermediate transfer member to substrate by repeated engagement between the intermediate transfer member and an impression cylinder: i. predicting an indication of a likelihood of an seam-aligned engagement between the intermediate transfer member and the impression cylinder at a time when the intermediate transfer member seam is aligned with the impression cylinder;

and ii. in accordance with the results of the predicting, generating an alert or alarm signal if the prediction indicates an elevated likelihood of seam-aligned engagement between the intermediate transfer member and the impression cylinder.

It is now disclosed a method of monitoring performance of a printing system where ink images are formed by deposition of ink on a moving variable-length intermediate transfer member and subsequently transferred from the moving intermediate transfer member to substrate, the method comprising: a. monitoring an indication of a length of the intermediate transfer member; and b. indicating a predicted remaining lifespan of the intermediate transfer member in accordance with a deviation of the intermediate transfer member length from a pre-determined intermediate transfer member length.

In some embodiments, the alert or alarm signal is provided by at least one of the following: i. sending an email message; ii. generating an audio signal; iii. generating a visual signal on a display screen; and iv. sending an SMS message to a telephone.

In some embodiments, the alarm or alert signal is provided instantly.

In some embodiments, the alarm or alert signal is provided after a time delay.

It is now disclosed a printing system comprising: a. an intermediate transfer member of non-constant length; b. an image forming station configured to deposit ink on a surface of the intermediate transfer member while the intermediate transfer member moves so as to form ink images on the surface of the intermediate transfer member; c. a transfer station configured to transfer the ink images from the surface of the moving intermediate transfer member to a substrate; and d. electronic circuitry configured to (i) monitor an indication of a length of the rotating variable-length intermediate transfer member; and (ii) generate an alarm or alert signal contingent upon the intermediate transfer member length deviating from a setpoint value by more than a threshold tolerance.

In some embodiments, the threshold tolerance is between 0.1% and 1%.

It is now disclosed a printing system comprising: a. a blanket mounted over one or more guide roller(s); b. an image forming station configured to deposit ink on a surface of the blanket while the blanket moves so as to form ink images on the surface of the blanket; c. a transfer station configured to transfer the ink images from the surface of the moving blanket to a substrate; and d. electronic circuitry configured to (i) measuring an indication of blanket slip on one or more of the guide rollers; and (ii) in response to the blanket slip measurement, performed at least one of: (A) generate an alarm or alert signal contingent upon a magnitude of blanket slip exceeding a threshold value and/or (B) display an indication of a magnitude of blanket slip on a display device.

In some embodiments, the indication of blanket slip is a rotational velocity difference between rotational velocities of two of the guide rollers.

It is now disclosed a printing system comprising: a. a blanket including a seam; b. an image forming station configured to deposit ink on a surface of the blanket while the blanket moves so as to form ink images on the surface of the blanket; c. a transfer station configured to transfer the ink images from the surface of the moving blanket to a substrate passing between the blanket and an impression cylinder during a period of engagement; and d. electronic circuitry configured to (i) predict an indication of a likelihood of an seam-aligned engagement between the blanket and the impression cylinder at a time when the blanket seam is aligned with the impression cylinder; and (ii) in accordance with the results of the predicting, generate an alert or alarm signal if the prediction indicates an elevated likelihood of seam-aligned engagement between the blanket and the impression cylinder.

It is now disclosed a printing system comprising: a. a blanket of non-constant length; b. an image forming station configured to deposit ink on a surface of the blanket while the blanket moves so as to form ink images on the surface of the blanket; c. a transfer station configured to transfer the ink images from the surface of the moving blanket to a substrate; and d. electronic circuitry configured to (i) monitor an indication of a length of the blanket; (ii) indicating a predicted remaining lifespan of the blanket in accordance with a deviation of the blanket length from a pre-determined blanket length.

In some embodiments, the alert or alarm signal is provided by at least one of the following: i. sending an email message; ii. generating an audio signal; iii. generating a visual signal on a display screen; and iv. sending an SMS message to a telephone.

It is further disclosed a printing system comprising: a). an intermediate transfer member; b). an image forming system for forming ink images on the intermediate transfer member, c). a sheet or web substrate transport system including at least one impression cylinder that selectively presses a substrate against a region of the intermediate transfer member spaced from the image forming system for the ink images to be impressed thereon at an image transfer location; and d). an electronic display screen operative to display information about operation of the printing system, the display screen being mounted to a housing of the printing system so as to be movable and/or rotatable relative to at least the substrate transport system, the display screen positioned and dimensioned to span at least one of: i). a majority of the horizontal range of the substrate transport system; and ii). a majority of the horizontal range of the intermediate transfer member, wherein the printing system is arranged so that: A. when the mounted display screen has a first position/orientation, the display screen obstructs front access to the substrate transport system or to the image transfer location thereof; and B. translation and/or rotational motion of the mounted display screen from the first position/orientation to a second position/orientation permits front access to the substrate transport system or to the image transfer location thereof.

In some embodiments, the system is configured so that at least one or at least two or at least three or at least four of the following conditions are true, i). a ratio between a width of the electronic display screen and a height thereof is at least about 1 or at least about 1.25 or at least about 1.5 and/or at most about 10 or at most about 5; ii). a width and/or a height of the mounted display screen is at least 1 meter or at least 1.5 meters or at least 2 meters; iii). a width of the mounted display screen is at least 25% or at least 50% of a circumference of the intermediate transfer member; and iv). the display screen is positioned and dimensioned to span at least the majority of the horizontal range of the intermediate transfer member.

In some embodiments, the intermediate transfer member is a rigid drum or a blanket mounted thereon.

In some embodiments, the intermediate transfer member is a flexible blanket guided over rollers.

In some embodiments, the information about operation of the printing system includes at least one of: i). information about one or more print jobs that are queued to the printing system; and ii). information about past, current or future operation of the substrate transport system and/or intermediate transfer member and/or image forming system and/or at the image transfer location.

In some embodiments, the system further comprises one or more additional display screen(s) operative to display information about operation of the printing system, one or more of the additional display screens being situated adjacent to the housing of the printing system or remotely therefrom.

In some embodiments, at least one of the additional screens is oriented substantially perpendicular to a substrate flow direction defined by the substrate transport system.

It is now disclosed a method of monitoring the operation state of a printing system comprising (i) a real-world image forming apparatus configured to form ink image(s) on a real-world rotating intermediate transfer member according to contents of an image database, (ii) a real-world substrate transport system defining a substrate path and interacting with the intermediate transfer member at a real-world image transfer location where the formed ink images located on and rotating with the intermediate transfer member are transferred to a substrate, the method comprising: a). retrieving digital image representations from the image database; b). displaying simultaneously on a display device: i). a graphical representation of the real-world rotating intermediate transfer member; ii). a graphical representation of the substrate transport system including a graphical representation of the real-world image transfer location; and iii. a graphical animation of the database-retrieved images in motion on the surface of the representation of the intermediate transfer member; c). operating a camera to acquire a video stream of the real-world substrate bearing ink image (s) moving along the substrate path; and d). simultaneous with the displaying of the graphical representations of the intermediate transfer member and of the substrate transport system, displaying on the display screen the camera-acquired video stream of the real-world substrate moving along the substrate path, wherein the video stream is superimposed over the graphical representation of the substrate transport system in a location that corresponds to its real-world counterpart.

In some embodiments, (i) the method further comprises monitoring operation of the printing system to assess which images are substantially-current images that are currently resident on the rotating intermediate transfer member or are queued for formation on the rotating intermediate transfer member in the near future; and (ii) the digital image representations that are retrieved from the database and animated on the surface of the representation of the intermediate transfer member are the substantially-current images.

In some embodiments, (i) the method further comprises monitoring an image print queue of the printing system and (ii) the digital image representations that are retrieved from the database and animated on the surface of the representation of the intermediate transfer member are those in the image print queue of the printing system.

In some embodiments, one or more mechanical or magnetic or optical or thermal sensors monitor one or more operating parameter(s) of the printing system and wherein the animation is carried out in accordance with the results of the monitoring of the operating parameter(s).

In some embodiments, the animation is contingent upon detected rotational motion of the intermediate transfer member.

In some embodiments, the superimposed video stream is re-oriented and/or re-scaled so as to match an orientation and/or scale of the graphical representation of the substrate transport system.

In some embodiments, a plurality of cameras acquire a respective plurality of video streams of the real-world substrate bearing ink image(s) in motion along the substrate path, each camera acquiring images of the real-world substrate when located at a different respective location along the substrate path, each video stream being displayed in a respective location and orientation that correspond to their respective real-world counterparts.

In some embodiments, the animation of the in-motion images is synchronizing with the video stream ink images residing on the real-world substrate of the video stream.

In some embodiments, at least one image displayed in the graphical animation is subjected to a curvature-modifying geometric mapping so that the curvature of the image matches a local curvature of the intermediate transfer member.

In some embodiments, a curvature of the animated image changes as it travels between locations on the intermediate transfer member having different surface curvatures.

In some embodiments, the graphical representation of the substrate transport system includes a graphical representation of one or more cylinder(s) thereof, the displayed cylinder(s) being animated to illustrate rotation thereof.

In some embodiments, the animated images that are displayed in motion match the real-world images on the real-world intermediate transfer member and are mirror-images of the real-world ink images on the real-world substrate.

In some embodiments, the monitoring of the operation state of the printing system is further displayed on one or more additional display device(s) each independently operative to display at least part of the monitored operation of the system, the one or more additional devices being situated adjacent to the housing of the printing system or remotely therefrom.

It is now disclosed a printing system operative with a display device, the printing system comprising: a). a real-world image forming apparatus configured to form ink image(s) on a real-world rotating intermediate transfer member according to contents of an image database; b). a real-world substrate transport system defining a substrate path and interacting with the intermediate transfer member at a real-world image transfer location where the formed ink images located on and rotating with the intermediate transfer member are transferred to a real-world substrate; c). a camera being aimed at a real-world field-of-view within the substrate transport system along the substrate path to acquire a video stream of the real-world substrate bearing ink image(s) moving through the field-of-view; and d). electronic circuitry operative to (i) retrieve digital image representations from the image database; and (ii) cause the display device to simultaneously display: A. a graphical representation of the real-world rotating intermediate transfer member and; B. a graphical representation of the substrate transport system including a graphic representation of the real-world image transfer location; C. a graphical animation of the database-retrieved images in motion on the surface of the representation of the intermediate transfer member; and D. the camera-acquired video stream of the real-world substrate bearing ink image(s) moving along the substrate path through the field-of-view, the video stream being superimposed over the graphical representation of the substrate transport system so that a location of the video stream corresponds to its real-world counterpart.

In some embodiments, the animated digital images are selected and retrieved from the image database in accordance with an image print queue of the printing system and/or in a manner that synchronizes with the video stream ink images residing on the real-world substrate of the video stream.

It is now disclosed a method of monitoring operation of a printing system that includes a target set of one or more printing device(s) to which a plurality of print-jobs are queued for execution, the method comprising: a). for each print job of the plurality of queued print-jobs, computing or receiving a respective estimated job-completion time, each job-completion time describing a respective predicted job duration for executing the corresponding print job by the printing system; b). displaying to a user on a display device, a sectioned timeline that is sectioned in accordance with the estimated job completion times for the print-jobs such that: i). each section of the timeline is associated with a different respective print-job of the plurality of print jobs; and ii). a section length of each timeline section corresponds to a magnitude of the job-completion time of its associated print-job; and c). for each of the timeline sections of the sectioned timeline, displaying, for the associated print-job of the timeline section, respective job summary data describing respective print substrate and/or ink combination requirements for the associated print-job, the respective job summary data being visually associated with its corresponding timeline section.

In some embodiments, the job summary data is visually presented as job cards.

In some embodiments, for first and second print jobs having different respective print substrate and/or ink combination requirements and/or being queued to different printing devices of the target set, the visually-associated job-summary data for the first print job differs from that for the second print job.

In some embodiments, the job-queue is for a single printing device of the printing system.

In some embodiments, the job-queue is a unified job-queue for multiple printing devices of the printing system.

In some embodiments, the method further comprises: a) monitoring operation of the printing system and/or changes in the job-queue of the printing system; and b) in response to the results of the monitoring, re-sectioning the sectioned timeline to change relative visual magnitudes of time section (s) to reflect the change in the job-queue.

In some embodiments, the method further comprises in response to a user GUI dragging of one or more of the job-summaries, modifying the job-queue to modify operation of at least one of the printing devices of the printing system.

In some embodiments, the job-queue modification includes at least one of: (i) changing a job-queue order to promote or demote the print job corresponding to the GUI-dragged job summary; and (ii) deleting the print job corresponding to the GUI-dragged job summary.

In some embodiments, at least one of the printing devices of the printing system is a digital press or an offset printer or a laser printer or an ink-jet printer or a dot matrix printer.

It is now disclosed an apparatus for monitoring operation of a printing system that includes one or more printing devices to which a plurality of print-jobs are queued for execution, the apparatus comprising: a). a display device; and b). an electronic circuitry operative to: i). for each print job of the plurality of queued print-jobs, computing or receiving a respective estimated job-completion time, each job completion time describing a respective predicted job duration for executing the corresponding print job by the printing device(s); ii). displaying to a user on the display device, a sectioned timeline that is sectioned in accordance with the estimated job completion times for the print-jobs such that: A. each section of the timeline is associated with a different respective print-job of the plurality of print jobs; and B. a section length of each timeline section corresponds to a magnitude of the job-completion time of its associated print-job; and iii). for each of the timeline sections of the sectioned timeline, displaying, for the associated print-job of the timeline section, a respective job summary data describing respective print substrate and/or ink combination requirements and/or printing system for the associated print-job, the respective job summary data being visually associated with its corresponding timeline section.

It is now disclosed a display system for generating a visual image corresponding to received electrical image signals, having a display screen and a control unit for sending image signals to the display screen to convey information to a viewer, all the image signals generated by the control unit comprising data elements disposed within a central region of the display screen and surrounded by a contrasting background image that extends to the borders of the display screen, wherein a front panel of greater area than the display screen and having a front face and a rear face is mounted to overlie and surround the borders of the display screen and is supported on the display screen by a mounting bracket bonded to the rear face of the front panel, and wherein the front panel has an opaque border obscuring from view the mounting bracket and the borders of the display screen and a transparent region through which the display screen may be viewed, the appearance of the opaque border being selected to merge into the background image displayed on the display screen.

In some embodiments, a transition region from the opaque border to the transparent region of the front panel is gradual.

In some embodiments, the opaque region is formed by means of a mask adhered or painted onto the rear surface of the front panel between the rear surface and the support bracket.

In some embodiments, the mask is dithered in the transition region, to allow a gradually increasing proportion of the background image to be viewed through the front panel.

In some embodiments, the opaque border is formed by tinting the glass, the tinting shade being sufficient for support bracket not to be discernable when the front face of the front panel is viewed.

In some embodiments, the tinting is arranged to fade gradually into the clear transparent region of the front panel.

In some embodiments, the front panel is provided with at least one transparent electrode to enable the front panel to function as a touch panel.

It is now disclosed a printing system comprising: a). an image transfer member; b). an image forming system for forming ink images on the image transfer member, c). a sheet or web substrate transport system including at least one impression cylinder for enabling substrate to be pressed against a region of the blanket spaced from the image forming system for ink images to be impressed thereon, and d). an electronic display screen operative to display information about operation of the printing system, the display screen being mounted to a housing of the printing system so as to be vertically slidable relative to at least the substrate transport system, the display screen positioned and dimensioned to span at least one of: (i) a majority of the horizontal range of a cylinder assembly of the substrate transport system; and (ii) a majority of the horizontal range of the image transfer member, a ratio between a width of the electronic display screen and a height thereof being between about 1.5 and about 5, wherein the printer is arranged so that: i). when the mounted display screen is situated at a lower position, the display screen blocks front access to the substrate transport system; and ii). upward motion of the mounted display screen from the lower position to an upper position opens front access to the substrate transport system.

It is now disclosed a printing system comprising: a). an image transfer member; b). an image forming system for forming ink images on the image transfer member, c). a sheet or web substrate transport system including at least one impression cylinder for enabling substrate to be pressed against a region of the blanket spaced from the image forming system for ink images to be impressed thereon, and d). an electronic display screen operative to display information about operation of the printing system, the display screen being mounted to a housing of the printing system so as to be horizontally slidable relative to at least the substrate transport system, the display screen positioned and dimensioned to span at least one of: (i) a majority of the horizontal range of a cylinder assembly of the substrate transport system; and (ii) a majority of the horizontal range of the image transfer member, a ratio between a width of the electronic display screen and a height thereof being between 1.5 and 5, wherein the printer is arranged so that: i). when the mounted display screen is situated at a first position, the display screen blocks front access to the substrate transport system; and ii). horizontal motion of the mounted display screen from the first position to a second position opens front access to the substrate transport system.

It is now disclosed a method of monitoring the operation state of a printing system comprising (i) a real-world image forming apparatus configured to form ink image(s) on a real-world rotating intermediate transfer member according to contents of an image database, (ii) a real-world substrate transport system defining a substrate path and interacting with the intermediate transfer member at a real-world image transfer location where the formed ink images located on and rotating with the intermediate transfer member are transferred to substrate, the method comprising: a). displaying simultaneously on a display device: i). a graphical representation of the real-world rotating intermediate transfer member and; and ii). a graphical representation of the substrate transport system including a graphic representation of the real-world image transfer location; b). operating a camera to acquire a video stream of real-world substrate bearing ink image(s) moving along the substrate path; c). simultaneous with the displaying of the graphical representations of the intermediate transfer member and the substrate transport system, displaying on the display screen the camera-acquired video stream of the real-world substrate moving along the substrate path, wherein the video stream is superimposed over the graphical representation of the substrate transport system in a location that corresponds to its real-world counterpart.

It is now disclosed a method of visualizing operation of a printing system comprising (i) a real-world image forming apparatus configured to form ink image(s) on a real-world rotating intermediate transfer member according to contents of an image database, (ii) a real-world substrate transport system defining a substrate path and interacting with the intermediate transfer member at a real-world image transfer location where the formed ink images located on and rotating with the intermediate transfer member are transferred to substrate, and (iii) a first camera being aimed at a real-world field-of-view within the substrate transport system along the substrate path to acquire a video stream of real-world substrate bearing ink image(s) moving through the field-of-view and (iv) a second camera aimed at a surface of the real-world rotating intermediate transfer member to acquire an image of ink images thereon, the method comprising: a). displaying simultaneously on a display device: i). a graphical representation of the real-world rotating intermediate transfer member and; ii). a graphical representation of the substrate transport system including the real-world image transfer location; b). simultaneous with the displaying of step (a), displaying, on the display device, a graphical animation of the ink-image acquired by the second camera moving on the surface of the representation of the intermediate transfer member; and c). simultaneous with the displaying of the graphical animation, displaying the camera-acquired video stream of the real-world substrate bearing ink image(s) moving through the field-of-view, the video stream being displayed at a location on the display device relative to the graphical representation of the substrate transport system that corresponds to its real-world counterpart.

It is now disclosed a method of monitoring operation of a set of print device(s) to which a plurality of print-jobs are queued for execution, the method comprising: a). for each print job of the plurality of queued print-jobs, computing or receiving a respective estimated job-completion time, each job-completion time describing a respective predicted job duration for executing the corresponding print job by the printer device(s); b). displaying to a user on a display device, a sectioned timeline that is sectioned in accordance with the estimated job completion times such that: i). each section of the timeline is associated with a different respective print-job of the plurality of print jobs; and ii). a section length of each timeline section corresponds to a magnitude of the job-completion time of its associated print-job; c). for each of the queued print-jobs, displaying respective job summary data describing respective print substrate and/or ink combination requirements and/or printing device for the job, wherein the job summary data for each job is visually associated with its corresponding timeline section.

It is now disclosed a printing system operative with a display device, the printing system comprising: a). a real-world image forming apparatus configured to form ink image(s) on a real-world rotating intermediate transfer member according to contents of an image database, b). a real-world substrate transport system defining a substrate path and interacting with the intermediate transfer member at a real-world image transfer location where the formed ink images located on and rotating with the intermediate transfer member are transferred to substrate, c). a first camera being aimed at a real-world field-of-view within the substrate transport system along the substrate path to acquire a video stream of real-world substrate bearing ink image(s) moving through the field-of-view; d). a second camera aimed at a surface of the real-world rotating intermediate transfer member to acquire an image of ink images thereon; e). an electronic circuitry operative to cause a display device to simultaneously displaying: A. a graphical representation of the real-world rotating intermediate transfer member and; B. a graphical representation of the substrate transport system including the real-world image transfer location; C. a graphical animation of the ink-image acquired by the second camera moving on the surface of the representation of the intermediate transfer member; and D. the camera-acquired video stream of the real-world substrate bearing ink image(s) moving through the field-of-view, the video stream being displayed at a location on the display device relative to the graphical representation of the substrate transport system that corresponds to its real world counterpart.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings.

DETAILED DESCRIPTION OF THE ILLUSTRATED EMBODIMENTS

Figure 1A:
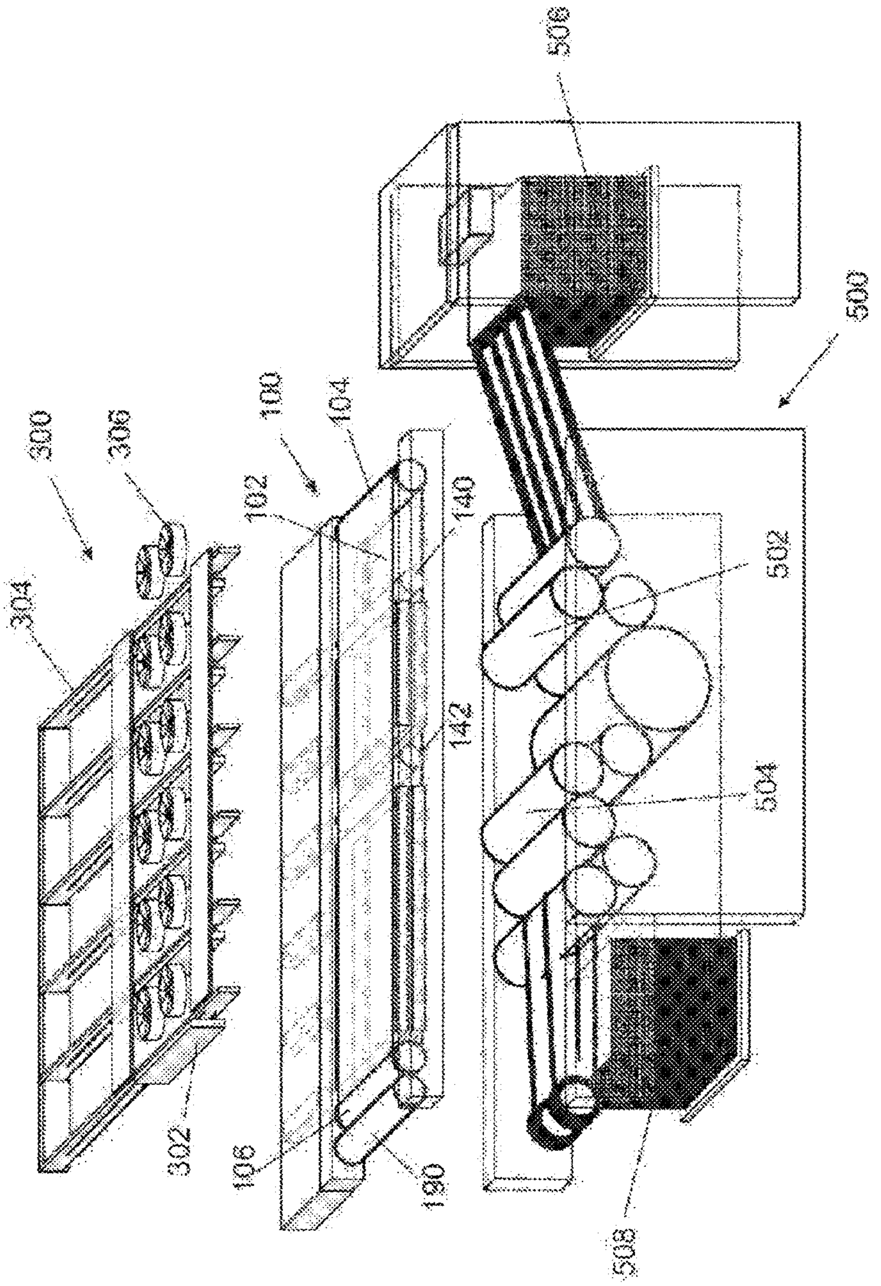
FIGS. 1A-1B are schematic perspective and vertical section views of a digital printer including a flexible blanket.

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage. For the present disclosure "electronic circuitry" is intended broadly to describe any combination of hardware, software and/or firmware.

Electronic circuitry may include any executable code module (i.e. stored on a computer-readable medium) and/or firmware and/or hardware element(s) including but not limited to field programmable logic array (FPLA) element(s), hard-wired logic element(s), field programmable gate array (FPGA) element(s), and application-specific integrated circuit (ASIC) element(s). Any instruction set architecture may be used including but not limited to reduced instruction set computer (RISC) architecture and/or complex instruction set computer (CISC) architecture. Electronic circuitry may be located in a single location or distributed among a plurality of locations where various circuitry elements may be in wired or wireless electronic communication with each other.

In various embodiments, an ink image is first deposited on a surface of an intermediate transfer member (ITM), and transferred from the surface of the intermediate transfer member to a substrate (i.e. sheet substrate or web substrate). For the present disclosure, the terms "intermediate transfer member", "image transfer member" and "ITM" are synonymous, and may be used interchangeably. The location at which the ink is deposited on the ITM is referred to as the "image forming station".

For the present disclosure, the terms "substrate transport system" and "substrate handling system" are used synonymously, and refer to the mechanical systems for moving a substrate from an input stack or roll to an output stack or roll.

"Indirect" printing systems or indirect printers include an intermediate transfer member. One example of an indirect printer is a digital press. Another example is an offset printer.

The location at which the ink image is transferred to substrate is defined as the "image transfer location" or "image transfer station", terms also referred as the "impression station" or "transfer station". It is appreciated that for some printing systems, there may be a plurality of "image transfer locations." In some embodiments of the invention, the image transfer member comprises a belt comprising a reinforcement or support layer coated with a release layer. The reinforcement layer may be of a fabric that is fiber-reinforced so as to be substantially inextensible lengthwise. By "substantially inextensible", it is meant that during any cycle of the belt, the distance between any two fixed points on the belt will not vary to an extent that will affect the image quality. The length of the belt may however vary with temperature or, over longer periods of time, with ageing or fatigue. In its width ways direction, the belt may have a small degree of elasticity to assist it in remaining taut and flat as it is pulled through the image forming station. A suitable fabric may, for example, have glass fibers in its longitudinal direction woven, stitched or otherwise held with cotton fibers in the perpendicular direction.

"Improving synchronization" is defined as to decrease a phase difference and/or to mitigate an increase thereof.

For an endless intermediate transfer member, the "length" of an ITM/blanket/belt is the defined as the circumference of the ITM/blanket/belt.

A "blanket marker" or "ITM marker" or "marker" is a detectable feature of the ITM or blanket indicating a longitudinal location thereof. Typically, a longitudinal thickness or length of a marker is much less (e.g. at most a few percent of or at most 1% of or at most 0.5% of) than a circumference of the blanket or ITM. A marker may be applied to blanket or ITM (e.g. applied to an outer surface thereof), or may be a lateral formation of the blanket or ITM. A "marker detector" can detect a presence of absence of a "marker" as the marker passes by a particular space-fixed location.

A spaced-fixed location is a location in the inertial reference frame rather than the moving reference frame of the ITM or blanket.

For the present disclosure, an "impression station" and a "transfer station" are synonymous.

In some embodiments, an ITM or belt or blanket intermittently or repeatedly "engages" an impression cylinder. When the (i) ITM or belt or blanket and the (ii) impression cylinder are "engaged", the nip therebetween is subjected pressed between the ITM or belt or blanket and the impression cylinder. For example, if substrate is present in the nip then when the ITM or belt or blanket is "engaged" to the impression cylinder, the substrate is pressed between at least one impression cylinder and a region of the rotating ITM. "Engagement" is to bring about an engagement between the ITM or belt or blanket and the impression cylinder. "Disengagement" is to cease an engagement between the ITM or belt or blanket and the impression cylinder.

There is no limitation in how "engagement" is carried out. In one example, a region of the ITM or belt or blanket may be moved (e.g. by a pressure cylinder) towards the impression cylinder. In these embodiments, there is no requirement for an entirety of the ITM or belt or blanket to be moved towards the impression cylinder—either a portion of an entirety may be moved towards the impression cylinder. Alternatively or additionally, impression cylinder may be moved towards a region of the ITM or belt or blanket to that the nip is pressed between the impression cylinder and the ITM or belt or blanket.

General Overview

The printer shown in FIGS. 1A and 1B essentially comprises three separate and mutually interacting systems, namely a blanket system 100, an image forming system 300 above the blanket system 100 and a substrate transport system 500 below the blanket system 100.

The blanket system 100 comprises an endless belt or blanket 102 that acts as an ITM and is guided over two rollers 104, 106. An image made up of dots of an ink is applied by image forming system 300 to an upper run of blanket 102 at a location referred herein as the image forming station. A lower run selectively interacts at two impression or image transfer stations with two impression cylinders 502 and 504 of the substrate transport system 500 to impress an image onto a substrate compressed between the blanket 102 and the respective pressure roller 140, 142 during period of engagement. As will be explained below, the purpose of there being two impression cylinders 502, 504 is to permit duplex printing. In the case of a simplex printer, only one image transfer station would be needed. The printer shown in FIGS. 1A and 1B can print single sided prints at twice the speed of printing double sided prints. In addition, mixed lots of single and double sided prints can also be printed.

In operation, ink images, each of which is a mirror image of an image to be impressed on a final substrate, are printed by the image forming system 300 onto an upper run of blanket 102. In this context, the term "run" is used to mean a length or segment of the blanket between any two given rollers over which the blanket is guided. While being transported by the blanket 102, the ink is heated to dry it by evaporation of most, if not all, of the liquid carrier. The ink image is furthermore heated to render tacky the film of ink solids remaining after evaporation of the liquid carrier, this film being referred to as a residue film, to distinguish it from the liquid film formed by flattening of each ink droplet. At the impression cylinders 502, 504 the image is impressed onto individual sheets 501 of a substrate which are conveyed by the substrate transport system 500 from an input stack 506 to an output stack 508 via the impression cylinders 502, 504.

Though not shown in the figures, the blanket system may further comprise a cleaning station which may be used periodically to "refresh" the blanket during or in between printing jobs. In some embodiments, the control system and apparatus according to the invention further synchronize the cleaning of the ITM with any desired step involved in the operation of the printing system.

Image Forming System

Figure 3:
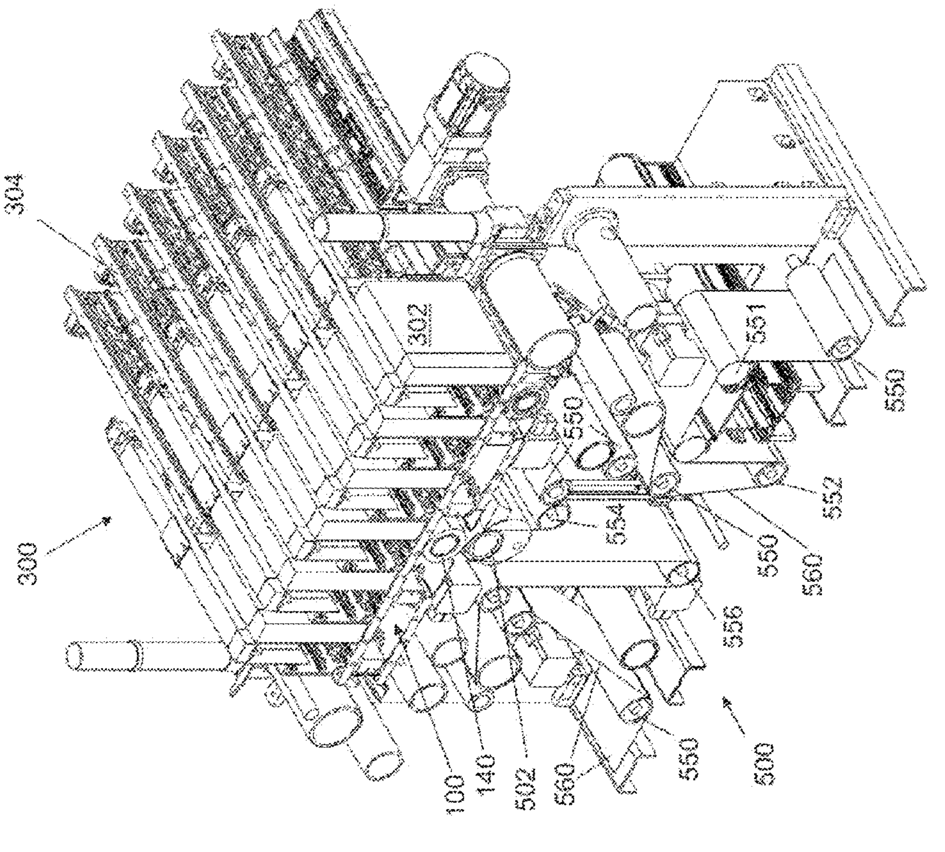
FIG. 3 is a schematic view of a digital printing system wherein the substrate is a web.

As best shown in FIG. 3, the image forming system 300 comprises print bars 302 each slidably mounted on a frame 304 positioned at a fixed height above the surface of the blanket 102. Each print bar 302 may comprise a strip of print heads as wide as the printing area on the blanket 102 and comprises individually controllable print nozzles. The image forming system can have any number of bars 302, each of which may contain an ink of a different color.

As some print bars may not be required during a particular printing job, the heads can be moved between an operative position, in which they overlie blanket 102 and an inoperative position. A mechanism is provided for moving print bars 302 between their operative and inoperative positions but the mechanism is not illustrated and need not be described herein as it is not relevant to the printing process. It should be noted that the bars remain stationary during printing.

When moved to their inoperative position, the print bars are covered for protection and to prevent the nozzles of the print bar from drying or clogging. In an embodiment of the invention, the print bars are parked above a liquid bath (not shown) that assists in this task. In another embodiment, the print heads are cleaned, for example by removing residual ink deposit that may form surrounding the nozzle rims. Such maintenance of the print heads can be achieved by any suitable method from contact wiping of the nozzle plate to distant spraying of a cleaning solution toward the nozzles and elimination of the cleansed ink deposits by positive or negative air pressure. Print bars that are in the inoperative position can be changed and accessed readily for maintenance, even while a printing job is in progress using other print bars. In some embodiments, the control system and apparatus according to the invention further synchronize the cleaning of the print heads of the image forming station with any desired step involved in the operation of the printing system.

Within each print bar, the ink may be constantly recirculated, filtered, degased and maintained at a desired temperature and pressure. As the design of the print bars may be conventional, or at least similar to print bars used in other inkjet printing applications, their construction and operation will be clear to the person skilled in the art without the need for more detailed description.

As different print bars 302 are spaced from one another along the length of the blanket, it is of course essential for their operation to be correctly synchronized with the movement of blanket 102.

As illustrated in FIG. 4, it is possible to provide a blower following each print bar 302 to blow a slow stream of a hot gas, preferably air, over the ITM to commence the drying of the ink droplets deposited by the print bar 302. This assists in fixing the droplets deposited by each print bar 302, that is to say resisting their contraction and preventing their movement on the ITM, and also in preventing them from merging into droplets deposited subsequently by other print bars 302.

Blanket and Blanket Support System

The blanket 102, in one embodiment of the invention, is seamed. In particular, the blanket is formed of an initially flat strip of which the ends are fastened to one another, releasably or permanently, to form a continuous loop. A releasable fastening may be a zip fastener or a hook and loop fastener that lies substantially parallel to the axes of rollers 104 and 106 over which the blanket is guided. A permanent fastening may be achieved by the use of an adhesive or a tape.

In order to avoid a sudden change in the tension of the blanket as the seam passes over these rollers, it is desirable to make the seam, as nearly as possible, of the same thickness as the remainder of the blanket. It is also possible to incline the seam relative to the axis of the rollers but this would be at the expense of enlarging the non-printable image area.

The primary purpose of the blanket is to receive an ink image from the image forming system and to transfer that image dried but undisturbed to the impression stations. To allow easy transfer of the ink image at each impression station, the blanket has a thin upper release layer that is hydrophobic. The outer surface of the transfer member upon which the ink can be applied may comprise a silicone material. Under suitable conditions, a silanol-, sylyl- or silane-modified or terminated polydialkylsiloxane material and amino silicones have been found to work well. Suitably, the materials forming the release layer allow it to be not absorbent.

The strength of the blanket can be derived from a support or reinforcement layer. In one embodiment, the reinforcement layer is formed of a fabric. If the fabric is woven, the warp and weft threads of the fabric may have a different composition or physical structure so that the blanket should have, for reasons to be discussed below, greater elasticity in its width ways direction (parallel to the axes of the rollers 104 and 106) than in its lengthways direction.

The blanket may comprise additional layers between the reinforcement layer and the release layer, for example to provide conformability and compressibility of the release layer to the surface of the substrate. Other layers provided on the blanket may act as a thermal reservoir or a thermal partial barrier and/or to allow an electrostatic charge to the applied to the release layer. An inner layer may further be provided to control the frictional drag on the blanket as it is rotated over its support structure. Other layers may be included to adhere or connect the afore-mentioned layers one with another or to prevent migration of molecules there-between.

Figure 2A:
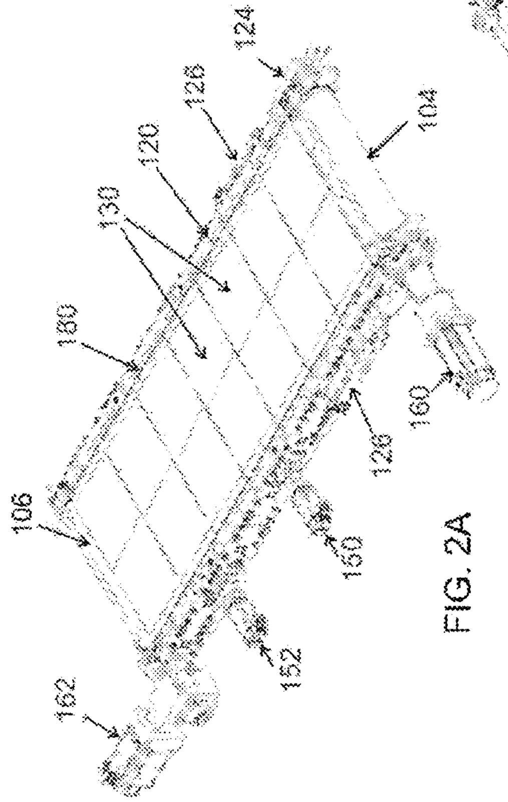
FIGS. 2A-2B are perspective views of a blanket support system, in accordance with an embodiment of the invention, with the blanket removed and with one side removed to illustrate internal components.
Figure 2B:
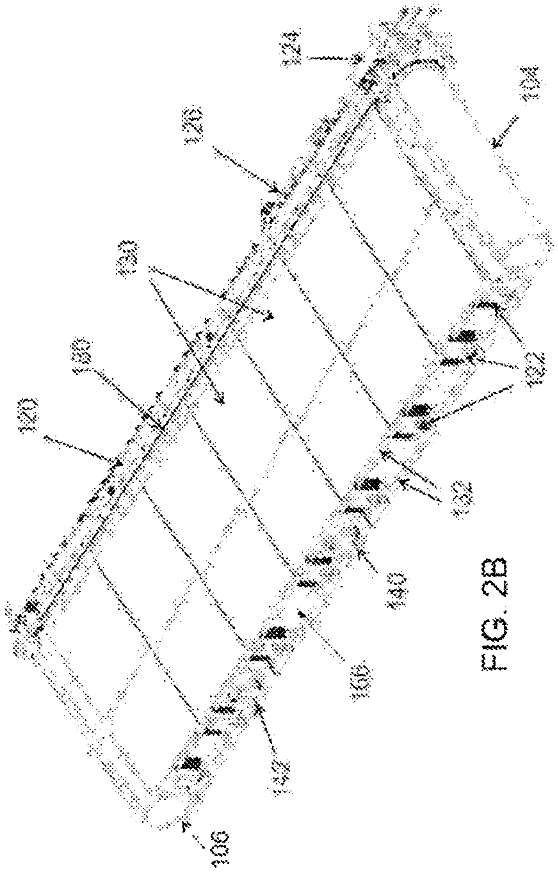

The structure supporting the blanket in the embodiment of FIG. 1A is shown in FIGS. 2A and 2B. Two elongate outriggers 120 are interconnected by a plurality of cross beams 122 to form a horizontal ladder-like frame on which the remaining components are mounted.

The roller 106 is journalled in bearings that are directly mounted on outriggers 120. At the opposite end, however, roller 104 is journalled in pillow blocks 124 that are guided for sliding movement relative to outriggers 120. Motors 126, for example electric motors, which may be stepper motors, act through suitable gearboxes to move the pillow blocks 124, so as to alter the distance between the axes of rollers 104 and 106, while maintaining them parallel to one another.

Thermally conductive support plates 130 are mounted on cross beams 122 to form a continuous flat support surface both on the top side and bottom side of the support frame. The junctions between the individual support plates 130 are intentionally offset from each other (e.g., zigzagged) in order to avoid creating a line running parallel to the length of the blanket 102. Electrical heating elements 132 are inserted into transverse holes in plates 130 to apply heat to the plates 130 and through plates 130 to the upper run of blanket 102. Other means for heating the upper run will occur to the person of skill in the art and may include heating from below, above, or within the blanket itself. The heating plates may also serve to heat the lower run of the blanket at least until transfer takes place.

Also mounted on the blanket support frame are two pressure or nip rollers 140, 142. The pressure rollers are located on the underside of the support frame in gaps between the support plates 130 covering the underside of the frame. The pressure rollers 140, 142 are aligned respectively with the impression cylinders 502, 504 of the substrate transport system, as shown most clearly in FIGS. 1B and 3. Each impression cylinder and corresponding pressure roller, when engaged as described below, form an image transfer station.

Each of the pressure rollers 140, 142 is preferably mounted so that it can be raised and lowered from the lower run of the blanket. In one embodiment each pressure roller is mounted on an eccentric that is rotatable by a respective actuator 150, 152. When it is raised by its actuator to an upper position within the support frame, each pressure roller is spaced from the opposing impression cylinder, allowing the blanket to pass by the impression cylinder while making contact with neither the impression cylinder itself nor with a substrate carried by the impression cylinder. On the other hand, when moved downwards by its actuator, each pressure roller 140, 142 projects downwards beyond the plane of the adjacent support plates 130 and deflects part of the blanket 102, forcing it against the opposing impression cylinder 502, 504. In this lower position, it presses the lower run of the blanket against a final substrate being carried on the impression cylinder (or the web of substrate in the embodiment of FIG. 3).

The rollers 104 and 106 are connected to respective electric motors 160, 162. The motor 160 is more powerful and serves to drive the blanket clockwise as viewed in FIGS. 2A and 2B. The motor 162 provides a torque reaction and can be used to regulate the tension in the upper run of the blanket. The motors may operate at the same speed in an embodiment in which the same tension is maintained in the upper and lower runs of the blanket.

In an alternative embodiment of the invention, the motors 160 and 162 are operated in such a manner as to maintain a higher tension in the upper run of the blanket where the ink image is formed and a lower tension in the lower run of the blanket. The lower tension in the lower run may assist in absorbing sudden perturbations caused by the abrupt engagement and disengagement of the blanket 102 with the impression cylinders 502 and 504. Further details are provided below with reference to FIGS. 20A-20B.

It should be understood that in an embodiment of the invention, pressure rollers 140 and 142 can be independently lowered and raised such that both, either or only one of the rollers is in the lower position engaging with its respective impression cylinder and the blanket passing therebetween.

In an embodiment of the invention, a fan or air blower (not shown) is mounted on the frame to maintain a sub-atmospheric pressure in the volume 166 bounded by the blanket and its support frame. The negative pressure serves to maintain the blanket flat against the support plates 130 on both the upper and the lower side of the frame, in order to achieve good thermal contact. If the lower run of the blanket is set to be relatively slack, the negative pressure would also assist in maintaining the blanket out of contact with the impression cylinders when the pressure rollers 140, 142 are not actuated.

In an embodiment of the invention, each of the outriggers 120 also supports a continuous track 180, which engages formations on the side edges of the blanket to maintain the blanket taut in its width ways direction. The formations may be spaced projections, such as the teeth of one half of a zip fastener sewn or otherwise attached to the side edge of the blanket. Alternatively, the formations may be a continuous flexible bead of greater thickness than the blanket. The lateral track guide channel may have any cross-section suitable to receive and retain the blanket lateral formations and maintain it taut. To reduce friction, the guide channel may have rolling bearing elements to retain the projections or the beads within the channel.

To mount a blanket on its support frame, according to one embodiment of the invention, entry points are provided along tracks 180. One end of the blanket is stretched laterally and the formations on its edges are inserted into tracks 180 through the entry points. Using a suitable implement that engages the formations on the edges of the blanket, the blanket is advanced along tracks 180 until it encircles the support frame. The ends of the blanket are then fastened to one another to form an endless loop or belt. Rollers 104 and 106 can then be moved apart to tension the blanket and stretch it to the desired length. Sections of tracks 180 are telescopically collapsible to permit the length of the track to vary as the distance between rollers 104 and 106 is varied.

In one embodiment, the ends of the blanket elongated strip are advantageously shaped to facilitate guiding of the blanket through the lateral tracks or channels during installation. Initial guiding of the blanket into position may be done for instance by securing the leading edge of the blanket strip introduced first in between the lateral channels 180 to a cable which can be manually or automatically moved to install the belt. For example, one or both lateral ends of the blanket leading edge can be releasably attached to a cable residing within each channel. Advancing the cable(s) advances the blanket along the channel path. Alternatively or additionally, the edge of the belt in the area ultimately forming the seam when both edges are secured one to the other can have lower flexibility than in the areas other than the seam. This local "rigidity" may ease the insertion of the lateral projections of the blanket into their respective channels.

Following installation, the blanket strip may be adhered edge to edge to form a continuous belt loop by soldering, gluing, taping (e.g. using Kapton® tape, RTV liquid adhesives or PTFE thermoplastic adhesives with a connective strip overlapping both edges of the strip), or any other method commonly known. Any method of joining the ends of the belt may cause a discontinuity, referred to herein as a seam, and it is desirable to avoid an increase in the thickness or discontinuity of chemical and/or mechanical properties of the belt at the seam.

Further details on exemplary blanket formations and guiding thereof, that can serve to implement control according to the present teachings, are disclosed in co-pending PCT application No. PCT/IB2013/051719 (Agent's reference LIP 7/005 PCT).

In order for the image to be properly formed on the blanket and transferred to the final substrate and for the alignment of the front and back images in duplex printing to be achieved, a number of different elements of the system must be properly synchronized. In order to position the images on the blanket properly, the position and speed of the blanket must be both known and controlled. In an embodiment of the invention, the blanket is marked at or near its edge with one or more markings spaced in the direction of motion of the blanket. One or more sensors 107 sense the timing of these markings as they pass the sensor. The speed of the blanket and the speed of the surface of the impression rollers should be the same, for proper transfer of the images to the substrate from the transfer blanket. Signals from the sensor(s) 107 are sent to a controller 109 which also receives an indication of the speed of rotation and angular position of the impression rollers, for example from encoders on the axis of one or both of the impression rollers (not shown). Sensor 107, or another sensor (not shown) also determines the time at which the seam of the blanket passes the sensor. For maximum utility of the usable length of the blanket, it is desirable that the images on the blanket start as close to the seam as feasible.

The controller controls the electric motors 160 and 162 to ensure that the linear speed of the blanket is the same as the speed of the surface of the impression rollers.

Because the blanket contains an unusable area resulting from the seam, it is important to ensure that this area always remain in the same position relative to the printed images in consecutive cycles of the blanket. Also, it is preferable to ensure that whenever the seam passes the impression cylinder, it should always coincides with a time when a discontinuity in the surface of the impression cylinder (accommodating the substrate grippers to be described below) faces the blanket.

Preferably, the length of the blanket is set to be a whole number multiple of the circumference of the impression cylinders 502, 504. Since the length of the blanket 102 may change with time, the position of the seam relative to the impression rollers is preferably changed, by momentarily changing the speed of the blanket. When synchronism is again achieved, the speed of the blanket is again adjusted to match that of the impression rollers, when it is not engaged with the impression cylinders 502, 504. The length of the blanket can be determined from a shaft encoder measuring the rotation of one of rollers 104, 106 during one sensed complete revolution of the blanket.

The controller also controls the timing of the flow of data to the print bars.

This control of speed, position and data flow ensures synchronization between image forming system 300, substrate transport system 500 and blanket system 100 and ensures that the images are formed at the correct position on the blanket for proper positioning on the final substrate. The position of the blanket is monitored by means of markings on the surface of the blanket that are detected by multiple sensors 107 mounted at different positions along the length of the blanket. The output signals of these sensors are used to indicate the position of the image transfer surface to the print bars. Analysis of the output signals of the sensors 107 is further used to control the speed of the motors 160 and 162 to match that to the impression cylinders 502, 504.

As its length is a factor in synchronization, in some embodiments, the blanket may be configured to resist substantial elongation and creep. In the transverse direction, on the other hand, it is only required to maintain the blanket flat taut without creating excessive drag due to friction with the support plates 130. It is for this reason that, in an embodiment of the invention, the stretchabilty of the blanket is intentionally made anisotropic.

Blanket Pre-Treatment

FIG. 1A shows schematically a roller 190 positioned externally to the blanket immediately before roller 106, according to an embodiment of the invention. Such a roller 190 may be used optionally to apply a thin film of pre-treatment solution containing a chemical agent, for example a dilute solution of a charged polymer, to the surface of the blanket. Though not shown in the figure, a series of rollers may be used for this purpose, one for instance receiving a first layer of such a conditioning solution, transferring it to one or more subsequent rollers, the ultimate one contacting the ITM in engaged position if needed. The film is preferably, totally dried by the time it reaches the print bars of the image forming system, to leave behind a very thin layer on the surface of the blanket that assists the ink droplets to retain their film-like shape after they have impacted the surface of the blanket.

While one or more rollers can be used to apply an even film, in an alternative embodiment the pre-treatment or conditioning material is sprayed or otherwise applied onto the surface of the blanket and spread more evenly, for example by the application of a jet from an air knife, a drizzle from sprinkles or undulations creating intermittent contact with the solution through a pressure or vibration operated fountain. Independently of the method used to apply the optional conditioning solution, if needed, the location at which such pre-print treatment can be performed may be referred herein as the conditioning station, which as explained can be either engaged or disengaged.

In some embodiments, the applied chemical agent counteracts the effect of the surface tension of an aqueous ink upon contact with the hydrophobic release layer of the blanket. In one embodiment, the conditioning agent is a polymer containing amine nitrogen atoms (e.g. primary, secondary, tertiary amines or quaternary ammonium salts) having relatively high charge density and MW (e.g. above 10,000).

In some embodiments, the control system and apparatus according to the invention further synchronize the conditioning of the ITM with any desired step involved in the operation of the printing system. In one embodiment, application of the conditioning solution is set to occur following transfer of an ink image at an image transfer station and/or before/after optional cooling of the ITM and/or before deposition of an ink image on the ITM at the image forming station.

Ink Image Heating

132 inserted into the support plates 130 are used to heat the blanket to a temperature that is appropriate for the rapid evaporation of the ink carrier and compatible with the composition of the blanket. In various examples, the blanket may be heated to within a range from 70° C. to 250° C., depending on various factors such as the composition of the inks and/or of the blanket and/or of the conditioning solutions if needed.

Blankets comprising amino silicones may generally be heated to temperatures between 70° C. and 130° C. When using the previously illustrated beneath heating of the transfer member, it is desirable for the blanket to have relatively high thermal capacity and low thermal conductivity, so that the temperature of the body of the blanket 102 will not change significantly as it moves between the optional pre-treatment or conditioning station, the image forming station and the image transfer station(s). To apply heat at different rates to the ink image carried by the transfer surface, external heaters or energy sources (not shown) may be used to apply additional energy locally, for example prior to reaching the impression stations to render the ink residue tacky, prior to the image forming station to dry the conditioning agent if necessary and at the image forming station to start evaporating the carrier from the ink droplets as soon as possible after they impact the surface of the blanket.

The external heaters may be, for example, hot gas or air blowers 306 (as represented schematically in FIG. 1A) or radiant heaters focusing, for example, infra red radiation onto the surface of the blanket, which may attain temperatures in excess of 175° C., 190° C., 200° C., 210° C., or even 220° C.

If the ink contains components sensitive to ultraviolet light then an ultraviolet source may be used to help cure the ink as it is being transported by the blanket.

In some embodiments, the control system and apparatus according to the invention further monitor and control the heating of the ITM at the various stations of the printing system and are capable of taking corrective steps (e.g. decreasing or increasing the applied temperature) in response to the monitored temperature.

Substrate Transport Systems

Figure 1B:
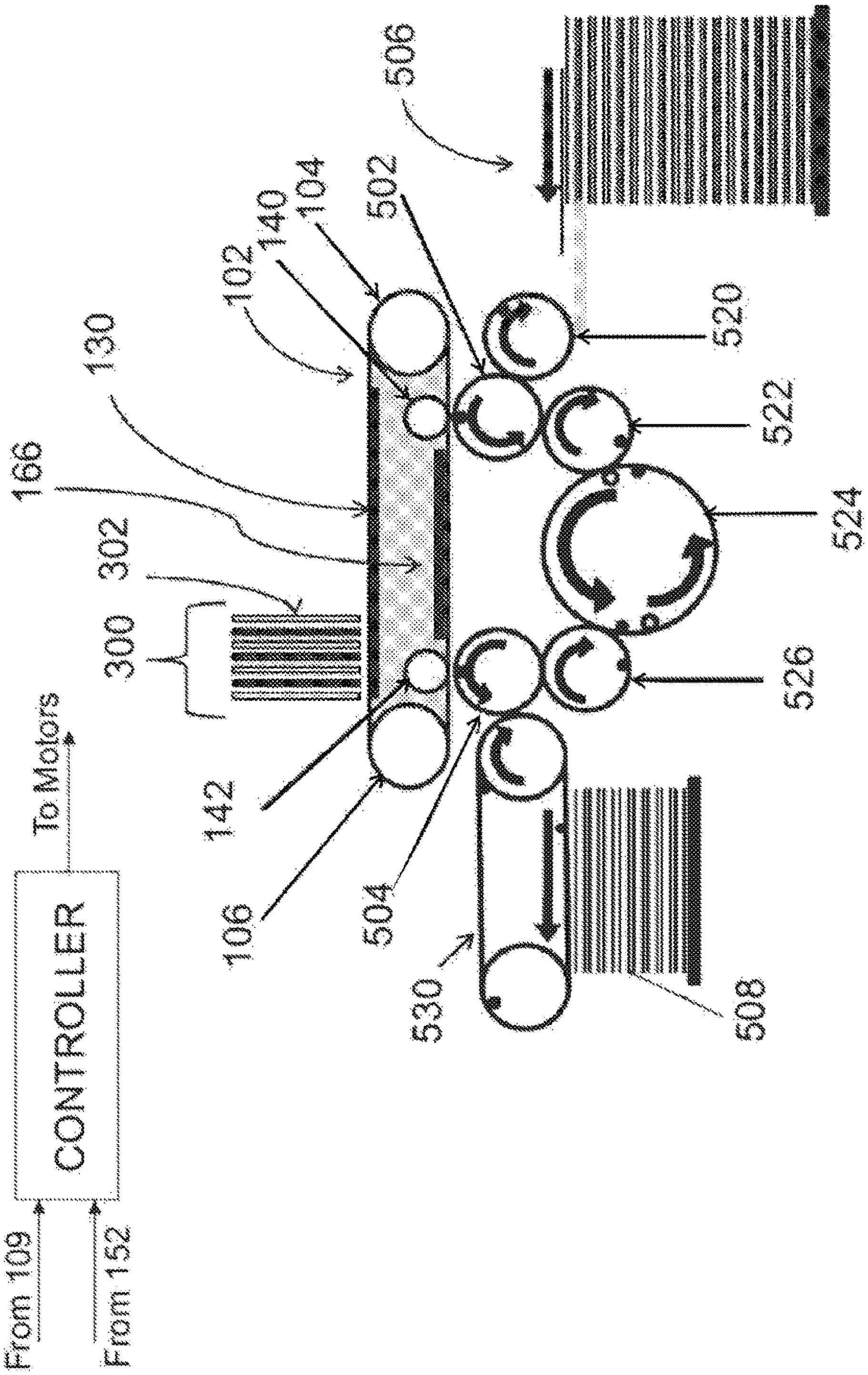

The substrate transport may be designed as in the case of the embodiment of FIGS. 1A-1B to transport individual sheets of substrate to the impression stations or, as is shown in FIG. 3, to transport a continuous web of the substrate.

In the case of FIGS. 1A-1B, individual sheets are advanced, for example by a reciprocating arm, from the top of an input stack 506 to a first transport roller 520 that feeds the sheet to the first impression cylinder 502.

Though not shown in the drawings, but known per se, the various transport rollers and impression cylinders may incorporate grippers that are cam operated to open and close at appropriate times in synchronism with their rotation so as to clamp the leading edge of each sheet of substrate. In an embodiment of the invention, the tips of the grippers at least of impression cylinders 502 and 504 are designed not to project beyond the outer surface of the cylinders to avoid damaging blanket 102. In some embodiments, the control system and apparatus according to the invention further synchronize the gripping of the substrate.

After an image has been impressed onto one side of a substrate sheet during passage between impression cylinder 502 and blanket 102 applied thereupon by pressure roller 140, the sheet is fed by a transport roller 522 to a perfecting cylinder 524 that has a circumference that is twice as large as the impression cylinders 502, 504. The leading edge of the sheet is transported by the perfecting cylinder past a transport roller 526, of which the grippers are timed to catch the trailing edge of the sheet carried by the perfecting cylinder and to feed the sheet to second impression cylinder 504 to have a second image impressed onto its reverse side.

The sheet, which has now had images printed onto both its sides, can be advanced by a belt conveyor 530 from second impression cylinder 504 to the output stack 508.

In further embodiments not illustrated in the figures, the printed sheets are subjected to one or more finishing steps either before being delivered to the output stack (inline finishing) or subsequent to such output delivery (offline finishing) or in combination when two or more finishing steps are performed. Such finishing steps include, but are not limited to laminating, gluing, sheeting, folding, glittering, foiling, protective and decorative coating, cutting, trimming, punching, embossing, debossing, perforating, creasing, stitching and binding of the printed sheets and two or more may be combined. As the finishing steps may be performed using suitable conventional equipment, or at least similar principles, their integration in the process and of the respective finishing stations in the systems of the invention will be clear to the person skilled in the art without the need for more detailed description. In some embodiments, the control system and apparatus according to the invention further synchronize the finishing steps with any desired step involved in the operation of the printing system, typically following the transfer of the image to the substrate.

As the images printed on the blanket are always spaced from one another by a distance corresponding to the circumference of the impression cylinders, the distance between the two impression cylinders 502 and 504 should also to be equal to the circumference of the impression cylinders 502, 504 or a multiple of this distance. The length of the individual images on the blanket is of course dependent on the size of the substrate not on the size of the impression cylinder.

In the embodiment shown in FIG. 3, a web 560 of the substrate is drawn from a supply roll (not shown) and passes over a number of guide rollers 550 with fixed axes and stationary cylinders 551 that guide the web past the single impression cylinder 502.

Some of the rollers over which the web 560 passes do not have fixed axes. In particular, on the in-feed side of the web 560, a roller 552 is provided that can move vertically. By virtue of its weight alone, or if desired with the assistance of a spring acting on its axle, roller 552 serves to maintain a constant tension in web 560. If, for any reason, the supply roller offers temporary resistance, roller 552 will rise and conversely roller 552 will move down automatically to take up slack in the web drawn from the supply roll. In some embodiments, the control system and apparatus according to the invention further monitor and control the tensioning of a web substrate.

At the impression cylinder, the web 560 is required to move at the same speed as the surface of the blanket. Unlike the embodiment described above, in which the position of the substrate sheets is fixed by the impression rollers, which assures that every sheet is printed when it reaches the impression rollers, if the web 560 were to be permanently engaged with blanket 102 at the impression cylinder 502, then much of the substrate lying between printed images would need to be wasted.

To mitigate this problem, there are provided, straddling the impression cylinder 502, two powered dancers 554 and 556 that are motorized and can be moved in different directions—for example, in synchronism with one another. After an image has been impressed on the web, pressure roller 140 is disengaged to allow the web 560 and the blanket to move relative to one another Immediately after disengagement, the dancer 554 is moved downwards at the same time as the dancer 556 is moved up. Though the remainder of the web continues to move forward at its normal speed, the movement of the dancers 554 and 556 has the effect of moving a short length of the web 560 backwards through the gap between the impression cylinder 502 and the blanket 102 from which it is disengaged. This is done by taking up slack from the run of the web following impression cylinder 502 and transferring it to the run preceding the impression cylinder. The motion of the dancers is then reversed to return them to their illustrated position so that the section of the web at the impression cylinder is again accelerated up to the speed of the blanket. Pressure roller 140 can now be re-engaged to impress the next image on the web but without leaving large blank areas between the images printed on the web. In some embodiments, the control system and apparatus further monitor and control taking of slacks of a web substrate to reduce blank areas between printed images.

FIG. 3 shows a printer having only a single impression roller, for printing on only one side of a web. To print on both sides a tandem system can be provided, with two impression rollers and a web inverter mechanism may be provided between the impression rollers to allow turning over of the web for double sided printing. Alternatively, if the width of the blanket exceeds twice the width of the web, it is possible to use the two halves of the same blanket and impression cylinder to print on the opposite sides of different sections of the web at the same time.

Alternate Embodiment of a Printing System

Figure 4A:
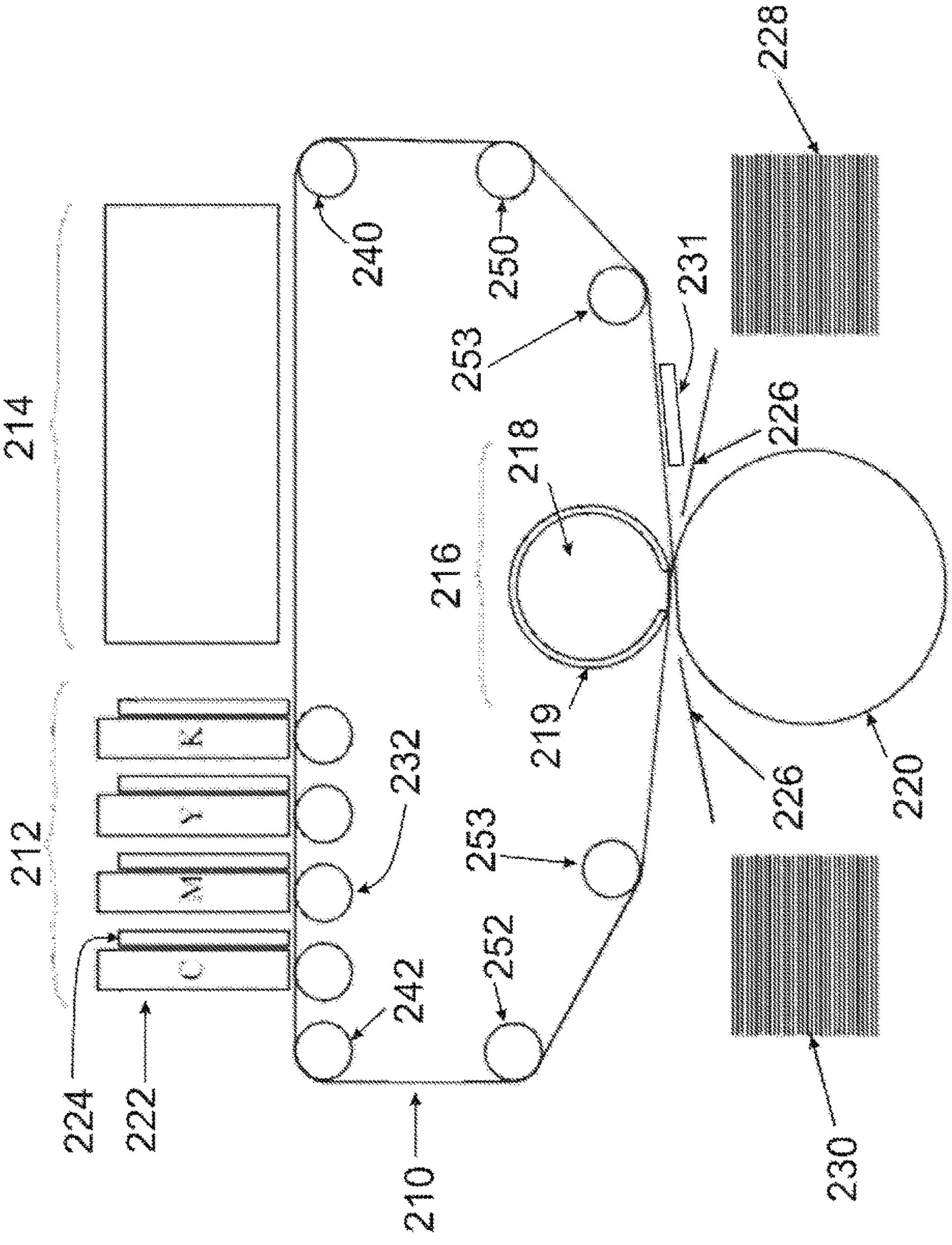
FIG. 4A is a schematic view of a digital printing system including a substantially inextensible belt and a blanket cylinder carrying a compressible blanket for urging the belt against the impression cylinder.

A printing system operating on the same principle as that FIG. 1A but adopting an alternative architecture is shown in FIG. 4A. The printing system of FIG. 4A comprises an endless belt 210 that cycles through an image forming station 212, a drying station 214, and a transfer station 216. The image forming station 212 of FIG. 4A is similar to the previously described image forming system 300, illustrated for example in FIG. 1A.

In the image forming station 212 four separate print bars 222 incorporating one or more print heads, that use for example inkjet technology, deposit aqueous ink droplets of different colors onto the surface of the belt 210. Though the illustrated embodiment has four print bars each able to deposit one of the typical four different colors (namely Cyan (C), Magenta (M), Yellow (Y) and Black (K)), it is possible for the image forming station to have a different number of print bars and for the print bars to deposit different shades of the same color (e.g. various shades of grey including black) or for two print bars or more to deposit the same color (e.g. black). In a further embodiment, the print bar can be used for pigmentless liquids (e.g. decorative or protective varnishes) and/or for specialty colors (e.g. achieving visual effect, such as metallic, sparkling, glowing or glittering look or even scented effect). Some embodiments relate to the control of the deposition of such inks and other printing liquids upon the ITM. Following each print bar 222 in the image forming station, an intermediate drying system 224 is provided to blow hot gas (usually air) onto the surface of the belt 210 to dry the ink droplets partially. This hot gas flow assists in preventing blockage of the inkjet nozzles and also prevents the droplets of different color inks on the belt 210 from merging into one another. In the drying station 214, the ink droplets on the belt 210 are exposed to radiation and/or hot gas in order to dry the ink more thoroughly, driving off most, if not all, of the liquid carrier and leaving behind only a layer of resin and coloring agent which is heated to the point of being rendered tacky.

In the transfer station 216, the belt 210 passes between an impression cylinder 220 and a blanket cylinder 218 that carries a compressible blanket 219. The length of the blanket is equal to or greater than the maximum length of a sheet 226 of substrate on which printing is to take place. The impression cylinder 220 has twice the diameter of the blanket cylinder 218 and can support two sheets 226 of substrate at the same time. Sheets 226 of substrate are carried by a suitable transport mechanism (not shown in FIG. 4A) from a supply stack 228 and passed through the nip between the impression cylinder 220 and the blanket cylinder 218. Within the nip, the surface of the belt 220 carrying the tacky ink image is pressed firmly by the blanket on the blanket cylinder 218 against the substrate so that the ink image is impressed onto the substrate and separated neatly from the surface of the belt. The substrate is then transported to an output stack 230. In some embodiments, a heater 231 may be provided shortly prior to the nip between the two cylinders 218 and 220 of the image transfer station to assist in rendering the ink film tacky, so as to facilitate transfer to the substrate.

In the example of FIG. 4A, the belt 210 moves in the clockwise direction. The direction of belt movement defines upstream and downstream directions. Rollers 242, 240 are respectively positioned upstream and downstream of the image forming station 212—thus, roller 242 may be referred to as a "upstream roller" while roller 240 may be referred to as a "downstream roller". In the example of FIG. 1B, rollers 106 and 104 are respectively disposed upstream and downstream relative to the image forming station 300.

Referring once again to FIG. 4A, it is noted that due to the clockwise movement direction of belt 210, dancers 250 and 252 are respectively positioned upstream and downstream of transfer station 216—thus, dancer 250 may be referred to as an "upstream dancer" while dancers 252 may be referred to as a "downstream dancer".

The above description of the embodiment of FIG. 4A is simplified and provided only for the purpose of enabling an understanding of the present invention. In various embodiments, the physical and chemical properties of the inks, the chemical composition and possible treatment of the release surface of the belt 210 and the various stations of the printing system may each play important roles.

In order for the ink to separate neatly from the surface of the belt 210 the latter surface may include a hydrophobic release layer. In the embodiment of FIG. 1A, this hydrophobic release layer is formed as part of a thick blanket that also includes a compressible conformability layer which is necessary to ensure proper contact between the release layer and the substrate at the transfer station. The resulting blanket is a very heavy and costly item that needs to be replaced in the event a failure of any of the many functions that it fulfills.

In the embodiment of FIG. 4A, a release layer forms part of a separate element from the thick blanket 219 that is needed to press it against the substrate sheets 226. In FIG. 4A, the release layer is formed on the flexible thin inextensible belt 210 that is preferably fiber reinforced for increased tensile strength in its lengthwise dimension.

Figure 4D:
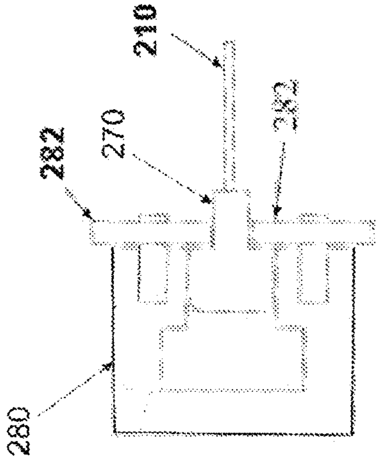
FIG. 4D is a section through a guide channel within which the lateral formation attached to the belt shown in FIG. 4C can be received.
Figure 4B:
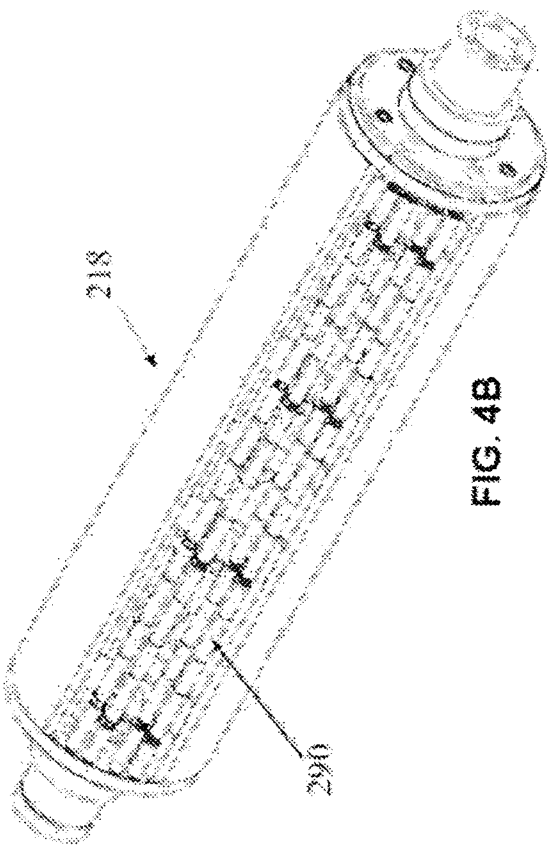
FIG. 4B is a perspective view of a blanket cylinder as used in the embodiment of FIG. 4A. having rollers within the discontinuity between the ends of the blanket.
Figure 4C:
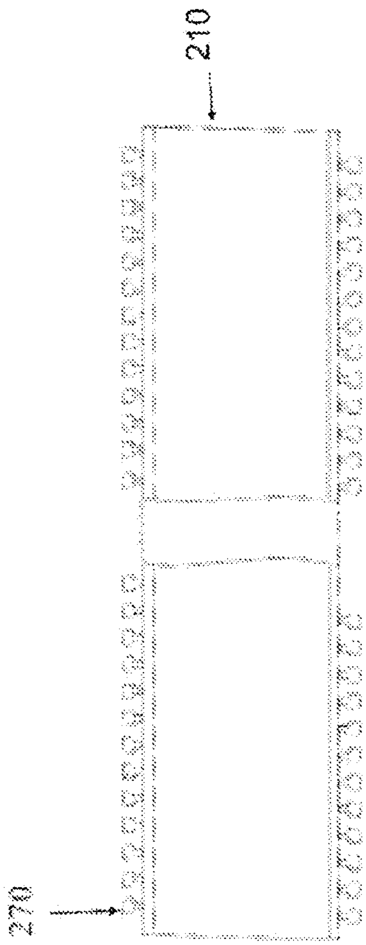
FIG. 4C is a plan view of a strip from which a belt is formed, the strip having lateral formations along its edges to assist in guiding the belt.

As shown schematically in FIGS. 4C-4D, the lateral edges of the belt 210 are provided in some embodiments of the invention with spaced lateral formations or projections 270 which on each side are received in a respective guide channel 280 (shown in section in FIG. 4D and as track 180 in FIGS. 2A-2B) in order to maintain the belt taut in its width ways dimension. The projections 270 may be the teeth of one half of a zip fastener that is sewn or otherwise secured to the lateral edge of the belt. As an alternative to spaced projections, a continuous flexible bead of greater thickness than the belt 210 may be provided along each side. The projections need not be the same on both sides of the belt. To reduce friction, the guide channel 280 may, as shown in FIG. 4D, have rolling bearing elements 282 to retain the projections 270 or the beads within the channel 280.

The projections may be made of any material able to sustain the operating conditions of the printing system, including the rapid motion of the belt. Suitable materials can resist elevated temperatures in the range of about 50° C. to 250° C. Advantageously, such materials are also friction resistant and do not yield debris of size and/or amount that would negatively affect the movement of the belt during its operative lifespan. For example, the lateral projections can be made of polyamide reinforced with molybdenum disulfide.

Guide channels in the image forming station ensure accurate placement of the ink droplets on the belt 210. In other areas, such as within the drying station 214 and the transfer station 216, lateral guide channels are desirable but less important. In regions where the belt 210 has slack, no guide channels are present.

All the steps taken to guide the belt 210 are equally applicable to the guiding of the blanket 102 in the embodiments of FIGS. 1-3 where the guide channel 280 was also referred to as track 180.

In some embodiments, it may be important for the belt 210 to move with constant speed through the image forming station 212 as any hesitation or vibration will affect the registration of the ink droplets of different colors. To assist in guiding the belt smoothly, friction is reduced by passing the belt over rollers 232 adjacent each print bar 222 instead of sliding the belt over stationary guide plates. The rollers 232 need not be precisely aligned with their respective print bars. They may be located slightly (e.g. few millimeters) downstream of the print head jetting location. The frictional forces maintain the belt taut and substantially parallel to print bars. The underside of the belt may therefore have high frictional properties as it is only ever in rolling contact with all the surfaces on which it is guided. The lateral tension applied by the guide channels need only be sufficient to maintain the belt 210 flat and in contact with rollers 232 as it passes beneath the print bars 222. Aside from the inextensible reinforcement/support layer, the hydrophobic release surface layer and high friction underside, the belt 210 is not required to serve any other function. It may therefore be a thin light inexpensive belt that is easy to remove and replace, should it become worn.

In some embodiments, the control system and apparatus according to the invention further monitor and control the lateral tension applied by the guide channels.

To achieve intimate contact between the release layer and the substrate, the belt 210 passes through the transfer station 216 which comprises the impression and blanket cylinders 220 and 218. The replaceable blanket 219 releasably clamped onto the outer surface of the blanket cylinder 218 provides the conformability required to urge the release layer of the belt 210 into contact with the substrate sheets 226. Rollers 253 on each side of the transfer station ensure that the belt is maintained in a desired orientation as it passes through the nip between the cylinders 218 and 220 of the transfer station 216.

As explained above, temperature control is of paramount importance to the printing system if printed images of high quality are to be achieved. This is considerably simplified in the embodiment of FIG. 4A in that the thermal capacity of the belt may be lower, or much lower, than that of the blanket 102 in the embodiments of FIGS. 1-3.

It has also been proposed above in relation to the embodiment using a thick blanket 102 to include additional layers affecting the thermal capacity of the blanket in view of the blanket being heated from beneath. The separation of the belt 210 from the blanket 219 in the embodiment of FIG. 4A allows the temperature of the ink droplets to be dried and heated to the softening temperature of the resin using much less energy in the drying section 214. Furthermore, the belt may cool down before it returns to the image forming station which reduces or avoids problems caused by trying to spray ink droplets on a hot surface running very close to the inkjet nozzles. Alternatively and additionally, a cooling station may be added to the printing system to reduce the temperature of the belt to a desired value before the belt enters the image forming station. Cooling may be effected by passing the belt 210 over a roller of which the lower half is immersed in a coolant, which may be water or a cleaning/treatment solution, by spraying a coolant onto the belt of by passing the belt 210 over a coolant fountain. In some embodiments, the control system and apparatus according to the invention further monitor and control the cooling of the ITM.

In some embodiments of the invention, the release layer of the belt 210 has hydrophobic properties to ensure that the tacky ink residue image peels away from it cleanly in the transfer station. Control apparatus and methods according to the teachings herein can apply to any type of ITM, independently of the kind of release layer and/or compatible ink. In addition, they can apply to any moving member of a system requiring similar alignments or lack thereof between the moving member and any other part of such systems.

It is possible for the belt 210 to be seamless, that is it to say without discontinuities anywhere along its length. Such a belt would considerably simplify the control of the printing system as it may be operated at all times to run at the same surface velocity as the circumferential velocity of the two cylinders 218 and 220 of the image transfer station. Any stretching of the belt with ageing would not affect the performance of the printing system and would merely require the taking up of more slack by tensioning rollers 250 and 252, detailed below.

It is however less costly to form the belt as an initially flat strip of which the opposite ends are secured to one another, for example by a zip fastener or possibly by a strip of hook and loop tape or possibly by soldering the edges together or possibly by using tape (e.g. Kapton® tape, RTV liquid adhesives or PTFE thermoplastic adhesives with a connective strip overlapping both edges of the strip). In such a construction of the belt, it may be advantageous to ensure that printing does not take place on the seam nor in its immediate surrounding area (the "non-printing area") and that the seam is not flattened against the substrate 226 in the transfer station 216.

The impression and blanket cylinders 218 and 220 of the transfer station 216 may be constructed in the same manner as the blanket and impression cylinders of a conventional offset litho press. In such cylinders, there is a circumferential discontinuity in the surface of the blanket cylinder 218 in the region where the two ends of the blanket 219 are clamped. There are also discontinuities (i.e. a "cylinder gap") in the surface of the impression cylinder which accommodate grippers that serve to grip the substrate sheets to help transport them through the nip. In the illustrated embodiments of the invention, the impression cylinder circumference is twice that of the blanket cylinder and the impression cylinder has two sets of grippers, so that the discontinuities line up twice every cycle for the impression cylinder.

If the belt 210 has a seam, then it may be useful to ensure that the seam always coincides in time with the gap between the cylinders of the transfer station 216. For this reason, it is desirable for the length of the belt 210 to be equal to a whole number multiple of the circumference of the blanket cylinder 218.

However, even if the belt has such a length when new, its length may change during use, for example with fatigue or temperature, and should that occur the phase of the seam during its passage through the nip will change every cycle.

To compensate for such change in the length of the belt 210, it may be driven at a slightly different speed from the cylinders of the transfer station 216. The belt 210 is driven by two separately powered rollers 240 and 242. By applying different torques through the rollers 240 and 242 driving the belt, the run of the belt passing through the image forming station is maintained under controlled tension. The speed of the two rollers 240 and 242 can be set to be different from the surface velocity of the cylinders 218 and 220 of the transfer station 216.

Two powered tensioning rollers, or dancers, 250 and 252 are provided one on each side of the nip between the cylinders of the transfer station. These two dancers 250, 252 are used to control the length of slack in the belt 210 before and after the nip and their movement is schematically represented by double sided arrows adjacent the respective dancers. In some embodiments, control apparatus monitors and controls the movement of the dancers.

If the belt 210 is slightly longer than a whole number multiple of the circumference of the blanket cylinder then if in one cycle the seam does align with the enlarged gap between the cylinders 218 and 220 of the transfer station then in the next cycle the seam will have moved to the right, as viewed in FIG. 4A. To compensate for this, the belt is driven faster by the rollers 240 and 242 so that slack builds up to the right of the nip and tension builds up to the left of the nip. To maintain the belt 210 at the correct tension, upstream 250 and downstream 252 powered dancers may be simultaneously moved in different (e.g. opposite) directions. When the discontinuities of the cylinders of the transfer station face one another and a gap is created between them, the dancer 252 is moved down and the dancer 250 is moved up to accelerate the run of the belt passing through the nip and bring the seam into the gap.

Even though the velocity of ITM and/or belt and/or blanket at the locations away from the image forming station may fluctuate (e.g. so the seam passes through the gap during times when ITM is disengaged from impression cylinder 220), it is possible to operate the system so that the velocity in ITM velocity at locations aligned (see 398 of FIG. 20B) with the image forming station 212 is maintained substantially constant without temporal or spatial fluctuations. This constant velocity in the aligned locations 398 may be important to avoid image distortions caused by velocity fluctuations at these locations.

Thus, some embodiments relate to a method of operating a printing system wherein ink images are formed on a moving intermediate transfer member at an image forming station and are transferred from the intermediate transfer member to a substrate at an impression station. The method comprises controlling the variation with time of the surface velocity of the intermediate transfer member so as to: (i) maintain a constant intermediate transfer member surface velocity at locations aligned with the image formation station; and (ii) locally accelerate and decelerate only portions of the intermediate transfer member at locations spaced from the image forming station to obtain, at least part of the time, a varying velocity only at the locations spaced from the image forming station.

To reduce the drag on the belt 210 as it is accelerated through the nip, the blanket cylinder 218 may, as shown in FIG. 3, be provided with rollers 290 within the discontinuity region between the ends of the blanket.

The need to correct the phase of the belt in this manner may be sensed either by measuring the length of the belt 210 or by monitoring the phase of one or more markers on the belt relative to the phase of the cylinders of the transfer station. The marker(s) may for example be applied to the surface of the belt that may be sensed magnetically or optically by a suitable detector. Alternatively, a marker may take the form of an irregularity in the lateral projections that are used to tension the belt and maintain it under tension, for example a missing tooth, hence serving as a mechanical position indicator.

Marker Detectors

For the present disclosure, the terms "markers" and "markings" are interchangeable and have the same meaning.

Figure 5:
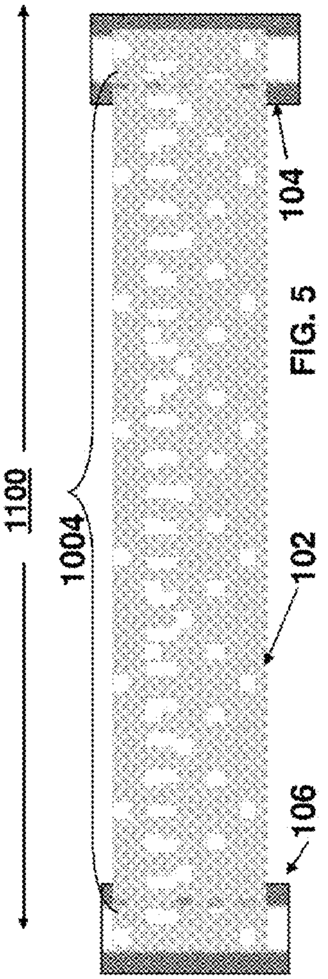
FIG. 5 illustrates an intermediate transfer member (ITM) including a plurality of markers.

As illustrated in FIG. 5, in some embodiments, ITM 102 (e.g. a blanket or belt) may include a one or more marking(s) 1004 thereon—e.g. in a direction 1110 defined by the ITM motion). As will be discussed below, multiple markings each positioned at a different location may be useful when it is desired to reduce or eliminate image distortion due to non-uniform blanket stretch.

The properties of the markings typically differ from the properties of the adjacent unmarked locations. For example, the color of the marking(s) may differ from that of adjacent locations. Other optical properties of the markings may be in the non-visible range.

In some embodiments, the markings are in a large number N so that at least 50, or at least 100, or at least 250, or at least 500 distinct markings are on the ITM, a situation also referred as the markers being "dense on the ITM". In one non-limiting example, there are about 500 evenly-spaced markings on an ITM having a length between 5 and 10 meters so that an average separation distance between markings is at most 5 cm or at most 3 cm or at most 2 cm or at most 1 cm for an ITM having a circumference length of at least 1 meter or at least 2 meters or at least 3 meters.

An ITM with a relatively high "marker density" may be useful for a number of purposes—for example, to track local ITM velocity or local ITM stretch at various locations on the ITM.

Figure 6A:
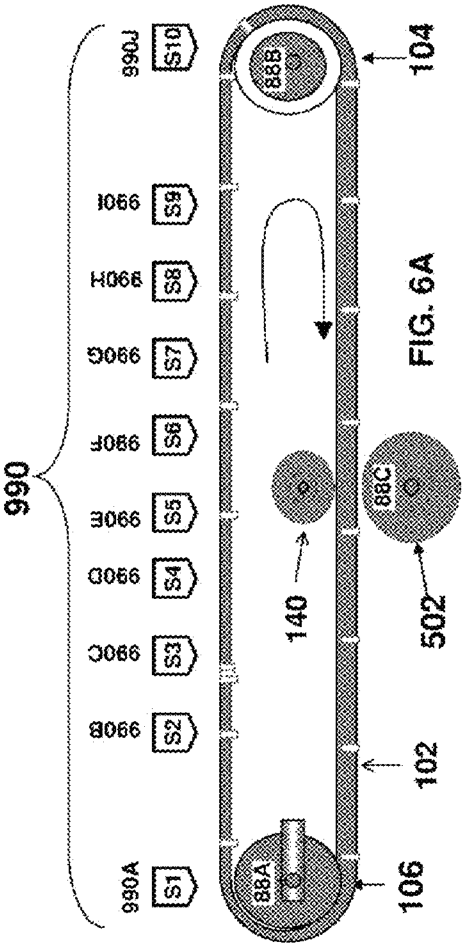
FIGS. 6A-6B and 7 illustrate an ITM mounted over guide rollers where marker(s) are detected by one or more marker-detector(s) or sensor(s).
Figure 6B:
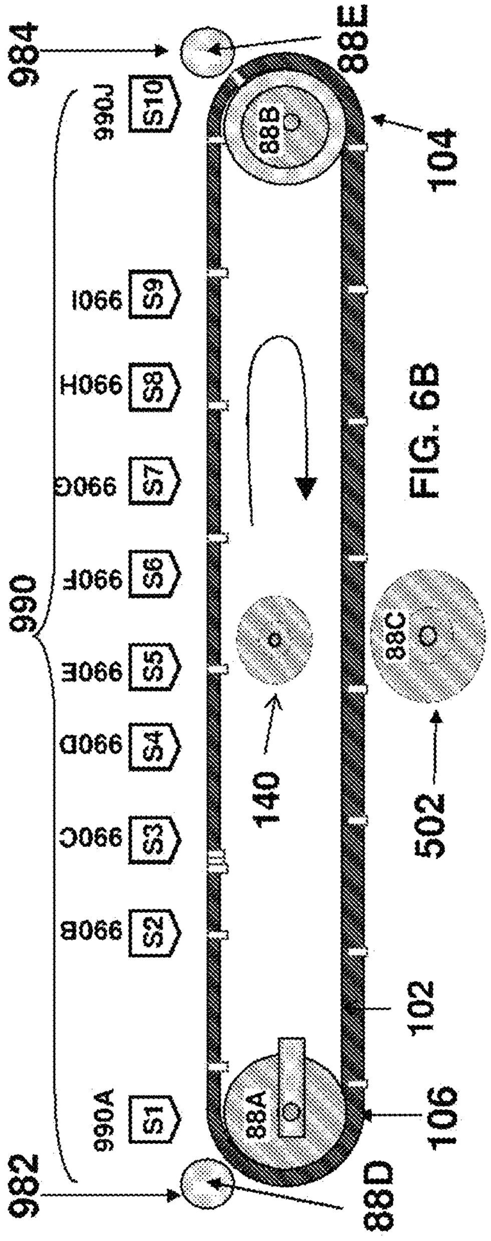
Figure 7:
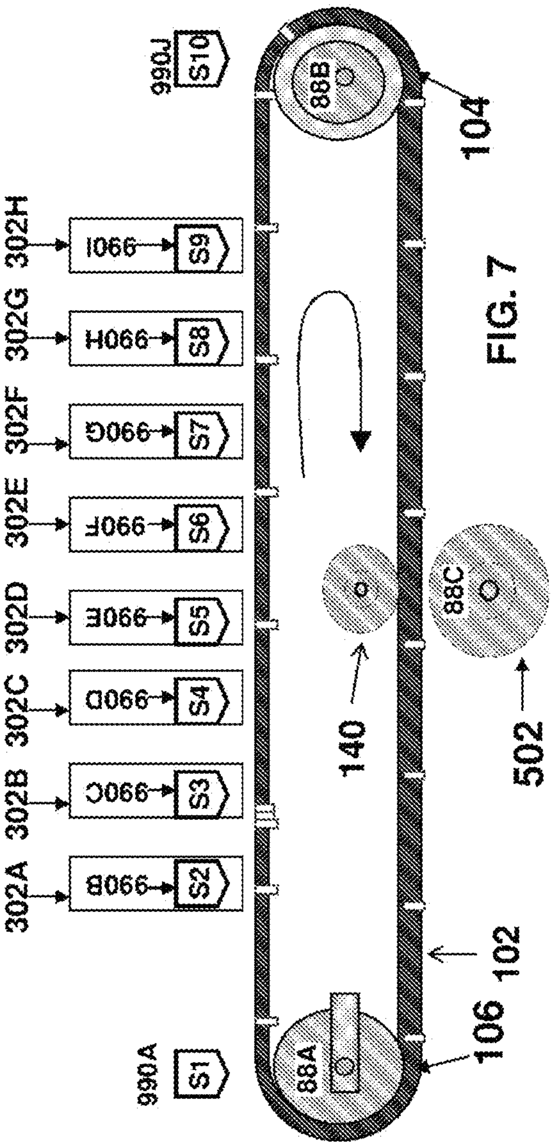

In the example of FIGS. 6A-6B and 7, a plurality of optical sensors 990, configured to detect a presence of markers, are spaced from each other along a direction of motion of the rotating ITM. These optical sensors are thus one example of "marker detectors." Each of the optical sensors is aimed onto a surface of the ITM and configured to read ITM markings 1004 thereon as they pass.

N different markers may have a width along the direction 1100 of motion that is at most 1 cm or at most 5 mm and/or at most 5% or at most 2.5% or at most 1% or at most 0.5% or at most 0.1% of a length of ITM 102.

For an endless ITM, the "length" of the ITM is the defined as the circumference of the ITM.

In some embodiments, a larger number of markers are distributed throughout the ITM so that no location within a substantial majority (i.e. at least 75%, by area of) or significantly all of (i.e. at least 90% by area of) the surface of ITM 102 is displaced, along the direction 1100 of rotational motion, from one of the N different ITM markers by more than 10% of an ITM length or by more than 5% of an ITM length or by more than 2.5% of an ITM length or more than 1% of an ITM length or by more than 0.5% of an ITM length. In some embodiments, the markings are located on one or two lateral edges of the ITM at locations that do not significantly affect the printing area as dictated by the length of the print bars and the length of the ITM, outside the seam area for seamed belt. The markings need not be the same on both edges of the blanket.

In the example of FIG. 5, the markers are visible to the naked eye. This is not a limitation. In some embodiments, the markers may be distinguished from the rest of the blanket based upon any optical property including but not limited to the visible spectrum or other wavelengths or optical radiation or any other kind of electromagnetic radiation. Additionally and alternatively, the lateral projections of the belt may be spaced unevenly in a fashion that may serve as mechanical marking. In some embodiments, the ITM may comprise markings having distinct type of signals. For instance, different suitable detectors may be used to monitor a combination of optical signals, mechanical signals and magnetic signals.

Figure 8A:
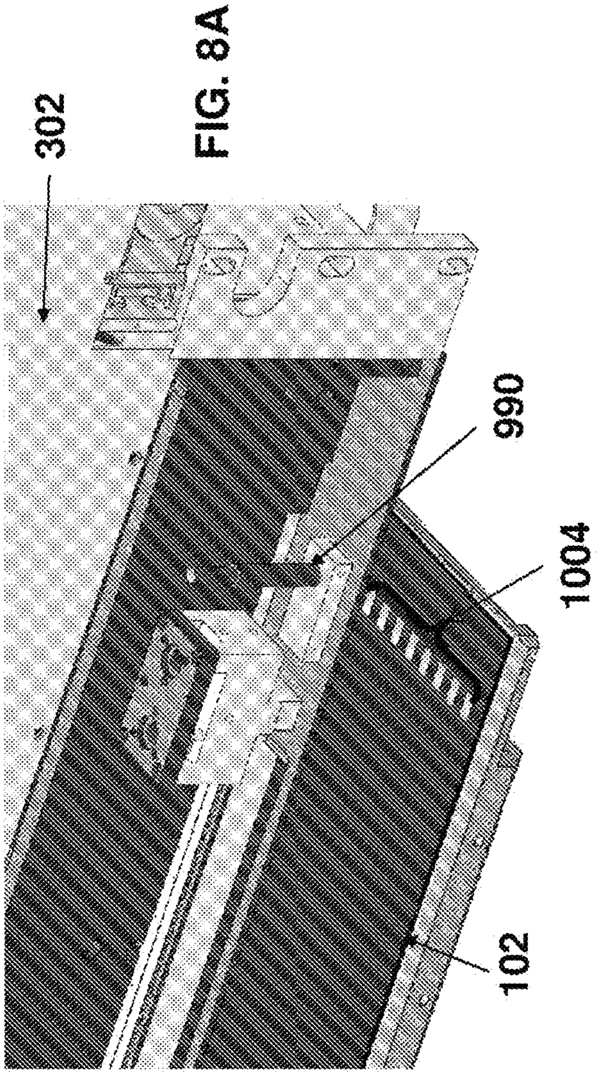
FIG. 8A illustrate marker-detectors mounted on a print bar.

FIGS. 6A-6B illustrate intermediate transfer member 102 guided over a plurality of rollers 104, 106. A plurality of optical sensors 990 are aimed at the ITM. In one non-limiting example, the optical sensors are used to detect markers 1004 on the rotating ITM. For example, the optical sensors 990 may be able to detect a presence or absence of a marker 1004 at a location aligned with the optical sensor 990. In the example of FIG. 8A, the sensors 990A-990J are downwardly oriented and thus the space-fixed location that is a "aligned" with optical sensor 990 is directly below the sensor. However, the optical sensors may be aimed in a different orientation and the location "aligned with" optical sensor 990 is not required to be directly below sensor 990.

For the present disclosure, the terms "sensor" and "detector" are used interchangeably. Sensors able to detect optical, magnetic or mechanical markers, or any other suitable type of signal, are known and their description need not be detailed.

For the present disclosure, a "space-fixed" location is a location that is fixed in space. This is in contract to an "intermediate transfer member-fixed" or "blanket-fixed" location that is affixed to the ITM and rotates therewith.

As noted above, the markings on intermediate transfer member 102 are not required to be visible to the naked eye or even optically detectable. As such, optical sensors 990 may be operative to detect light signal of any wavelength. Alternatively, marker detectors 990 are not required to be optical sensors—any "marker detector" operative to detect a presence or absence of an ITM marker may be employed. Examples of "marker detectors" 990 include but are not limited to magnetic detectors, optical detectors and capacitive sensors.

In the non-limiting example of FIGS. 6A-6B, some "roller-aimed" marker-detectors 990 individually illustrated as 990A to 990J are each aimed at a space-fixed location over the upper run of the blanket as mounted over rollers 104, 106. As will be discussed below with reference to FIG. 10, the roller-aimed marker-detector 990 may be used to detect presence or absence of slip between the ITM 102 and any of the rollers 104, 106 or may be used to measure a "slip velocity."

In some embodiments, an optical sensor or other marker detector 990 may be used to measure a local velocity of the ITM 102 at a space-fixed location to which marker detector 990 is aimed. In the example of FIGS. 6A-6B, a number of marker-detectors 990B-9901 are spaced from each other along the direction 1100 of ITM upper run surface velocity, the upper run being defined as the section of ITM located directly below the image forming station, between rollers 104, 106. In the non-limiting example of the figure a total of eight marker-detectors are thus deployed—however, this is not a limitation and any number of marker-detectors may be used.

In some embodiments, a local ITM velocity may vary as a function of position on the ITM (i.e. in the blanket reference frame rotating along with the blanket) and/or position in the "inertial reference frame" or "space-fixed reference frame" "space-fixed reference frame". For example, closer to rollers 104, 106 the ITM velocity may be very close to equal to that of the driving roller(s) due to a "no-slip" condition of the ITM over the roller(s). However, further away from the rollers 104, 106 the ITM velocity may deviate from that of the rollers as a function of location (e.g. as a function of distance away from one of the driving rollers). As will be discussed below, the ITM markers 1004 and marker-detectors 990 may be used to detect a local velocity of an ITM at a space-fixed location through which an intermediate transfer member-marker would pass.

Thus, in one example, the local ITM velocity at a location to which detector 990B is aimed may be different from the local ITM velocity at a location to which any of detectors 990C-9901 is aimed, etc. In some embodiments, spacing a number of marker detectors may allow one to "profile" the local ITM velocity for a number of space-fixed locations by monitoring specific local ITM velocities at each marker.

Also illustrated in FIGS. 6A-6B are a plurality of rotary encoders 88A-88C which measure an angular displacement of any of rollers 104, 106 or impression cylinder 502. The presence of rotary encoders is not mandatory. Some embodiments may be devoid of such encoders.

Alternatively or additionally, as illustrated in FIG. 6B one or more 'in-tandem rollers 982 or 984 may rotate with the same surface velocity as rollers 104, 106 and may be equipped with a rotary encoder to measure a rotation of rollers 104 or 106.

The rotary encoders may be used to measure rotational displacement(s) or rotational velocity(ies) of any roller(s).

FIGS. 7 and 8 relate to embodiments where for each print bar 302 of a one or more of print bars 302 (e.g. two or more "neighboring" print bars, or three or more print bars or three or more "neighboring print bars"), a different respective marker detector 990 is arranged: (i) on or within a print bar housing and/or of each print bar 302 and/or (ii) on a track upon which print bar 302 may slide (e.g. in a direction parallel to a local surface of blanket 102 but perpendicular to surface velocity direction 1100; and/or (iii) in between print bar 302 and blanket 102; and/or (iv) adjacent to print bar 302 (i.e. closer to a given print bar 302 than to any neighboring print bar—thus marker-detector 990C is adjacent to print bar 320B and thus closer thereto than to either of the neighboring print bars 320A, 320C).

In the example of FIG. 7, the "neighbors" of print bar 320B are 320A and 320C, the "neighbors" of print bar 320C are 320B and 320D, and so on.

In one non-limiting example relating to ink image registrations (e.g. when "printing" an ink image of blanket 102 by depositing droplets of ink thereon), the marker detectors 990 are used to detect a local velocity at the specific location beneath the marker detector 990 in the "space-fixed reference frame" (i.e. as opposed to the blanket reference frame which rotates therewith).

In some embodiments, a rate at which ink droplets are deposited onto the ITM 102 by the print bar 302 (e.g. a variable rate which varies in time) may be determined in accordance with a "local intermediate transfer member velocity" of the ITM beneath print bar 302 in order to minimize and/or eliminate image distortion caused by determining the droplet deposition rate according to the deviation from desired local velocity beneath a given print bar 302. Since the marker-detectors may be used to measure a local velocity, it may be useful to arrange a marker detector (i) on or within a print bar housing and/or of each print bar 302 and/or (ii) on a track upon which print bar 302 may slide (e.g. in a direction parallel to a local surface of ITM 102 but perpendicular to surface velocity direction 1100; and/or (iii) in between print bar 302 and ITM 102; and/or (iv) adjacent to print bar 302 (i.e. closer to a given print bar 302 than to any neighboring print bar—thus marker-detector 990C is adjacent to print bar 320B and thus closer thereto than to either of the neighboring print bars 320A, 320C)—for example, in order to accurately measure local ITM velocity at the space-fixed location of a given print bar. As noted above and as discussed below in greater detail, the local ITM velocity may be different at different space-fixed location, and it may be desirable to measure a local ITM velocity as close as possible to the location (e.g. a print bar location) where droplets are deposited on rotating ITM 102.

Measuring Intermediate Transfer Member Local Velocity

In some embodiments in order to measure a local ITM velocity it is possible to measure the amount of time required for an ITM marker 1004, the marker being of known width in the plane of motion, to cross a "perpendicular plane" (not shown) that is perpendicular to a direction of rotational motion 1100. For example, marker detector 990 is aimed at ITM 102 within the "perpendicular plane."

In this case, the local velocity may be inversely proportional to the amount of time required for a marker to cross the "perpendicular plane" and directly proportional to the marker width.

Figure 8B:
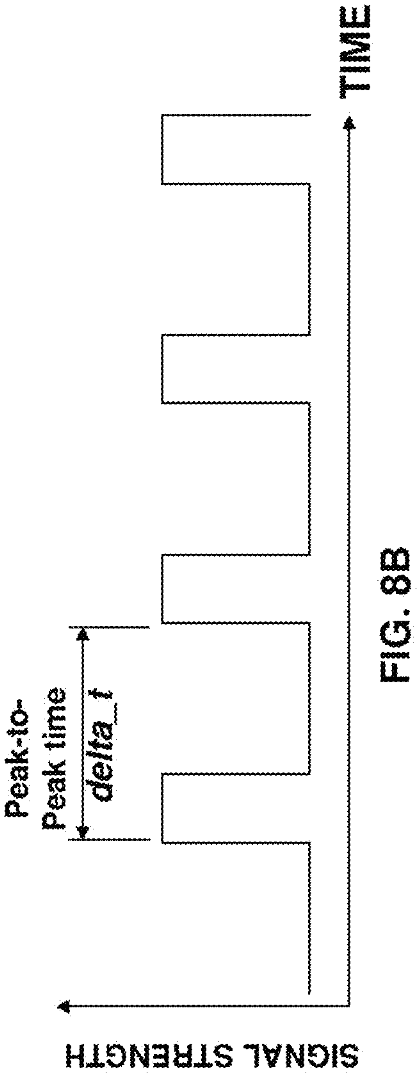
FIG. 8B illustrates a peak-to-peak time for detecting a marker property.

In another example, it is possible to measure a local ITM velocity by measuring, for neighboring ITM markers, $MARKER_{FIRST}$ and $MARKER_{SECOND}$,, a time difference TIME_DIFF(FIRST, SECOND) between (i) a first time $TIME_{FIRST}$ when a leading edge of $MARKER_{FIRST}$ crosses the "perpendicular plane" and (ii) a second time $TIME_{SECOND}$ when a leading edge of $MARKER_{SECOND}$ crosses the "perpendicular plane" where the "leading edge" is defined according to the direction of ITM rotation. For the non-limiting example of a light marker(s) on a dark ITM, this time difference TIME_DIFF(FIRST,SECOND) may be a "peak-to-peak" time delta_t as illustrated in FIG. 8B.

Measuring Slip Velocity

As noted above, in some embodiments, rotary encoders may measure angular displacement of any of the roller(s). For example, a relatively large number of markings (e.g. at least 500 or at least 1,000 or at least 5,000 or at least 10,000 or at least 50,000 or at least 100,000) within any roller 104, 106 (or cylinder 982, 984 rotating in tandem thereto) may be present to measure relatively small angular displacement and/or any angular displacement to a relative high accuracy. In one non-limiting example, it is also possible to measure an angular velocity of roller 104, 106 using rotary encoders—for example, by measuring the amount of time required for the roller to rotate by a pre-determined angle.

As mentioned above, in some embodiments, the ITM velocity at the location of a roller (104 or 106) may be determined by that of the roller due to a "no-slip" condition of the ITM around the roller.

Nevertheless, there may be some situations where the "no-slip" condition is violated—e.g. when the ITM has "stretched" beyond an initial length and is "too long" for the runs defined by the roller(s). In this case, the ITM which is guided around rollers 104, 106 may exhibit some sort of "slip velocity" at one or more roller(s).

A routine for measuring an ITM slip velocity is described in FIG. 9A—i.e. a velocity difference between (i) a local ITM velocity at a guide or driving roller and (ii) a roller velocity of said roller is now described. The routine comprises three successive steps: Steps 8811, 8815, and 8819 respectively, wherein 8811 is the first step, 8815 is the second step and S819 is the third step.

In step S811 an ITM velocity is detected at a contact location where the ITM 102 contacts a roller. For example, the local ITM velocity may be detected using any marker detector 990—for example, marker detector 990A for roller 106 or marker detector 990J for roller 104, as illustrated in FIG. 7.

In step S815, a roller rotational velocity is detected, and in step S819 it is possible to (i) compare the roller rotational velocity to the ITM local velocity and/or (ii) compute a difference therebetween in order to compute a slip velocity.

Measuring an Indication Intermediate Transfer Member Length

As noted above, for an endless ITM, the "length" of the ITM is the defined as the circumference of the ITM.

In some embodiments (e.g. a continuous loop belt), the length of an endless ITM may vary in time during operation of the printing system as the ITM 102 rotates.

Figure 9A:
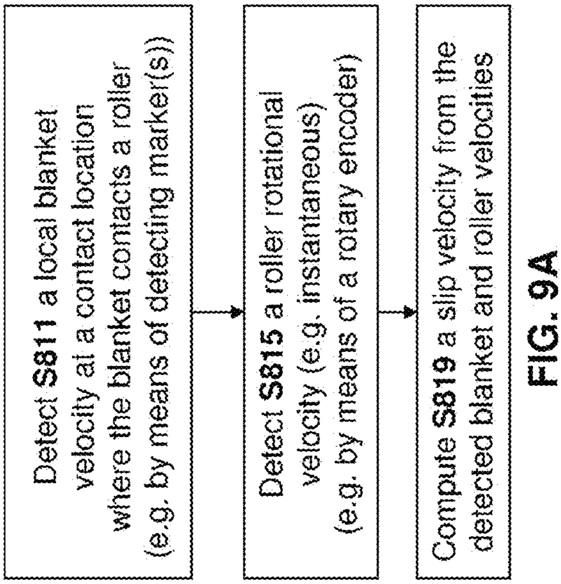
FIGS. 9A-9B are flow charts of routines for measuring slip velocity and blanket length.
Figure 9B:
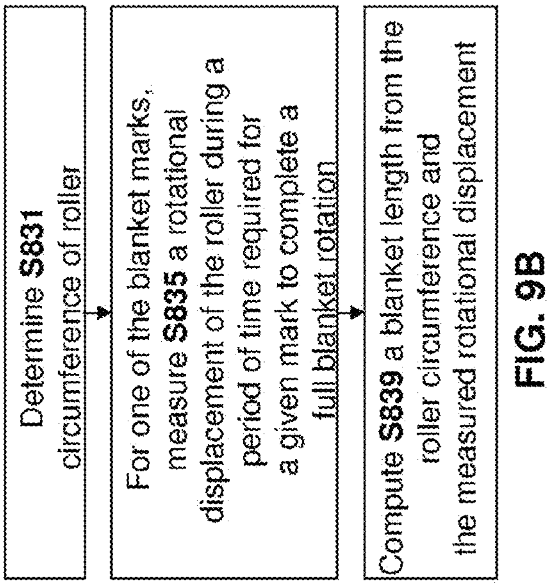

FIG. 9B is a flow chart of a routine for measuring a length of intermediate transfer member 102 while the ITM rotates. The routine comprises three successive steps: Steps S831, S835, and S839 respectively, wherein S831 is the first step, S835 is the second step and S839 is the third step.

In step S831 the circumference ROLLER_CIRC of roller (104 or 106) is determined. This may be a predetermined value. In some embodiments, it is possible to incorporate small fluctuations in roller circumference—e.g. due to a temperature dependence thereof such as resulting from thermal expansion. In some embodiments, a look-up table may be provided.

In some embodiments, the ITM includes N ITM markers $\{MARKER_1, MARKER_2, \ldots MARKER_N\}$ thereon, where N is a positive integer (e.g. at least 10 or least 50 or at least 100).

In step S835, for a given one of the ITM markers $MARKER_I$ (where I is a positive integer having a value of at most N), it is possible to determine when the given marker $MARKER_I$ begins and completes a full rotation—(e.g. by using any one of the marker detectors). This "marker rotation measurement" may be carried out relative to a space-fixed location (i.e. a location to which one of the marker-detectors 990 is aimed). Because the velocity of the ITM may slightly fluctuate in time and vary according to location on the ITM (e.g. due to stretching and contraction of an ITM as it rotates), the "marker rotation measurement" may be repeated for a plurality of ITM markers (i.e. not only for a single $MARKER_I$) and/or at a plurality of "measurement locations" (i.e. a first measurement may be carried out for a location to which sensor 990A is aimed, a second measurement may be carried out for a location to which sensor 990B is aimed, and so on).

For each marker, the "commencement" and "completion" of a full rotation defines a time interval. It is possible to measure a rotational displacement (e.g. in radians or degrees or in any angle unit) of a roller (i.e. having a circumference ROLLER_CIRC) for this time interval—this describes how much the roller rotates by during the time interval.

In step S831 it is possible to determine the length or circumference of the ITM based upon (i) the rotational displacement of roller 104 (or 106) during a complete rotation of an ITM marker and (ii) a circumference of the roller. For example, if a roller having ROLLER_CIRC rotates by 900 degrees during the time required for ITM marker $MARKER_I$ to complete a full rotation, then the length of the ITM may be estimated as 2.5 times ROLLER_CIRC.

This measurement may be repeated for multiple ITM markers and averaged.

Some Features Related to a Seamed Intermediate Transfer Member

Although not a requirement, it was noted above that in some embodiments the endless ITM 102 may be a seamed ITM. For example, the ITM 102 may include a releasable fastening which may be a zip fastener or a hook and loop fastener or a permanent fastening which may be achieved by adhesion of the blanket ends, such seam lying substantially parallel to the axes of rollers 104 and 106 over which the ITM is guided.

Although the following description refers to one seam, presently disclosed teachings may apply to an ITM having a plurality of seams.

Figure 10:
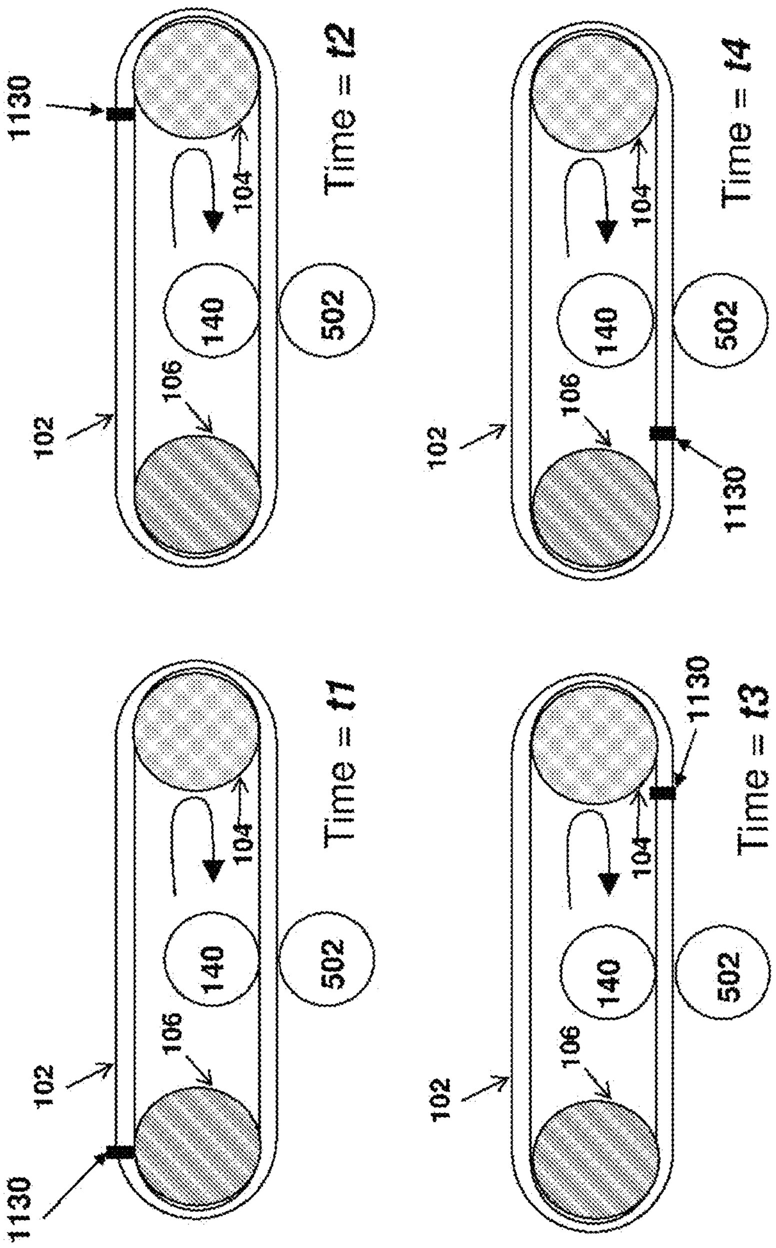
FIG. 10 illustrates rotation of an ITM including a seam.

In some embodiments, it may be desirable to directly or indirectly track a location of a seam 1130 during ITM rotation. FIG. 10 illustrates four frames (i.e at times $t_1$, $t_2$, $t_3$, and $t_4$) of rotational motion of the seam 1130 for the non-limiting example of clockwise ITM rotation.

In some embodiments, it is useful to track a relative phase difference (or lack thereof) between the seam 1130 and a pre-determined location 1134 of rotating impression cylinder 502.

Figure 13:
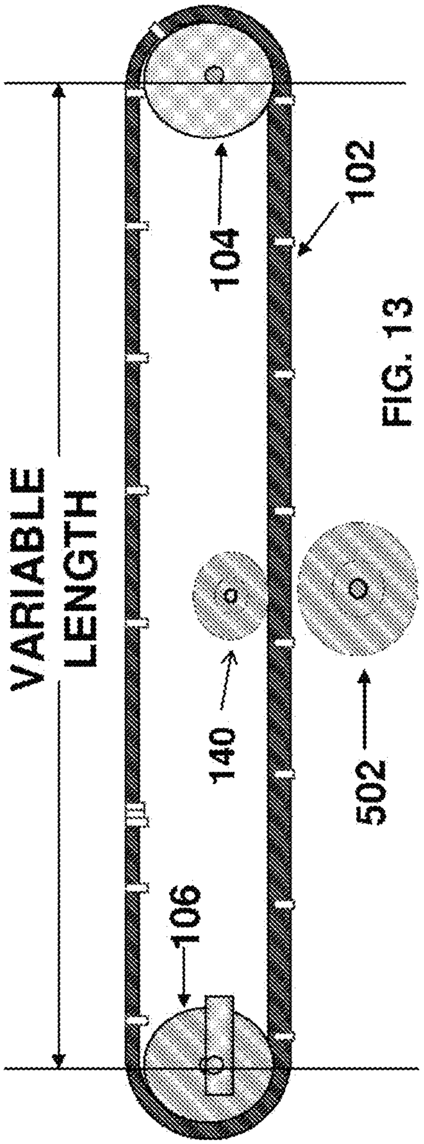
FIG. 13 illustrates a blanket mounted over guide-rollers having a variable distance between the guide rollers.

In the non-limiting example of FIG. 13 (i.e. relating to the specific case of sheet substrate), there are an integral number of ink images (i.e. each of which is identified as a "page image" 1302) on an ITM 102. No ink image is present on the seam 1130. In this example, no ink image is formed by deposition of droplets on the location of seam 1130.

In some embodiments, the ITM may repeatedly engage to and disengage from impression cylinder 502 by motion (e.g. downward motion) of at least a portion of ITM 102 towards cylinder 502 and/or by motion (e.g. upwards motion) of cylinder 502 towards at least a portion of ITM 102 or in any other manner.

Figure 12A:
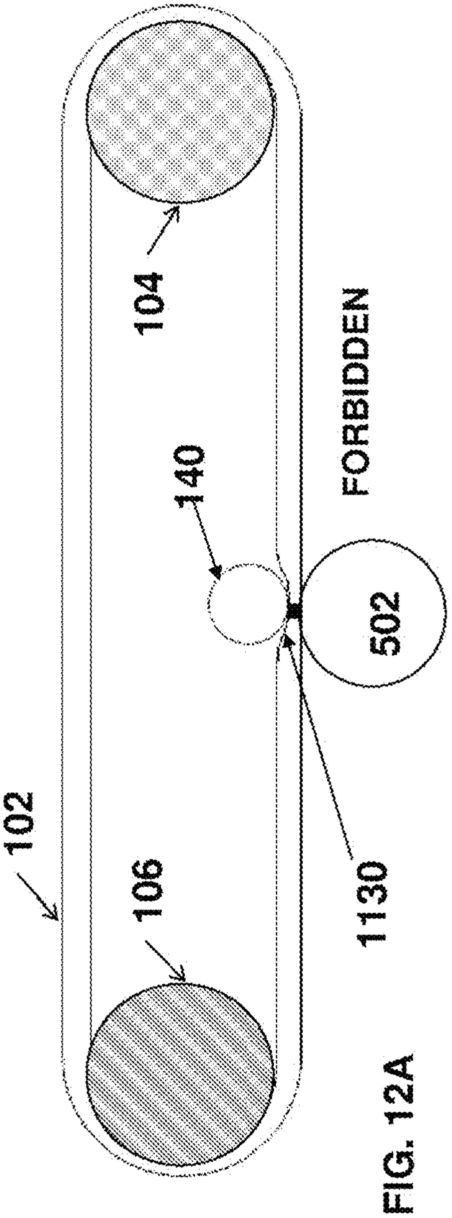
FIGS. 12A and 12B respectively illustrate engagement and disengagement of an ITM to an impression cylinder when a seam of the ITM is aligned with the pressure cylinder.
Figure 12B:
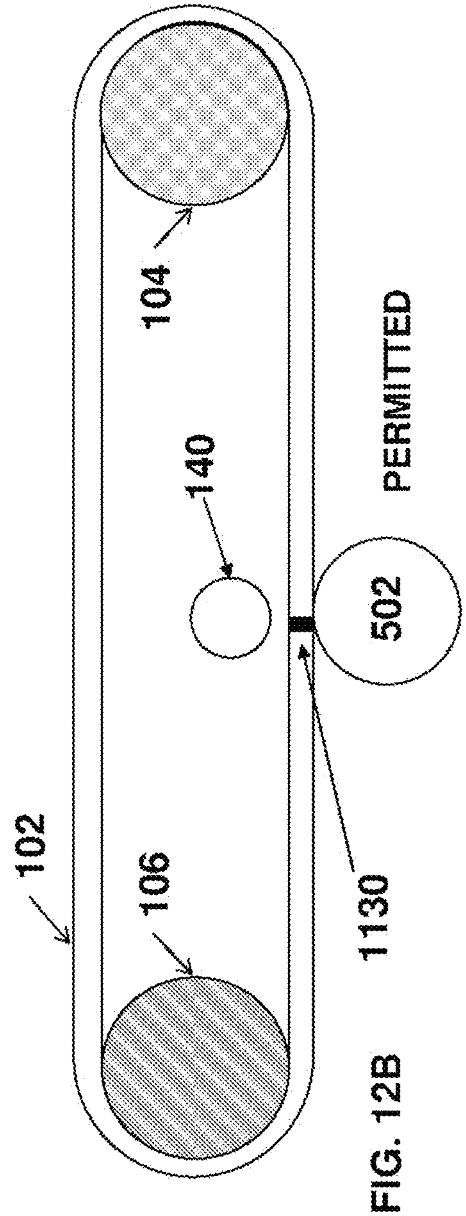

As illustrated in FIGS. 12A-12B, in some embodiments, it may be desirable to operate the printing system so as to avoid engaging the ITM 102 to the impression cylinder 502 (e.g. by pressure roller 140 or in any other manner) at a time when the seam 1130 is aligned with impression cylinder 502 as illustrated in FIG. 12A. Instead, as illustrated in FIG. 12B, it may be desired to allow seam 1130 to pass by impression roller 502 during the "disengage portion" of the ITM-impression cylinder engagement cycle.

In some embodiments, this may be accomplished by: (i) regulating a length of the ITM to an appropriate set-point length and/or (ii) by temporarily modifying a velocity of at least a portion of the ITM (e.g. where the seam is located).

In some embodiments, it may be useful to employ an endless ITM having a length that is an integral multiple of a circumference of impression cylinder 502. For the example of FIG. 13, there are eight pages of printing areas, each of which is associated with a different respective page image having a height that (i) matches that of the substrate sheets to which the page images are transferred and/or (ii) is equal to a circumference of impression cylinder 502 cylinder.

Figure 11:
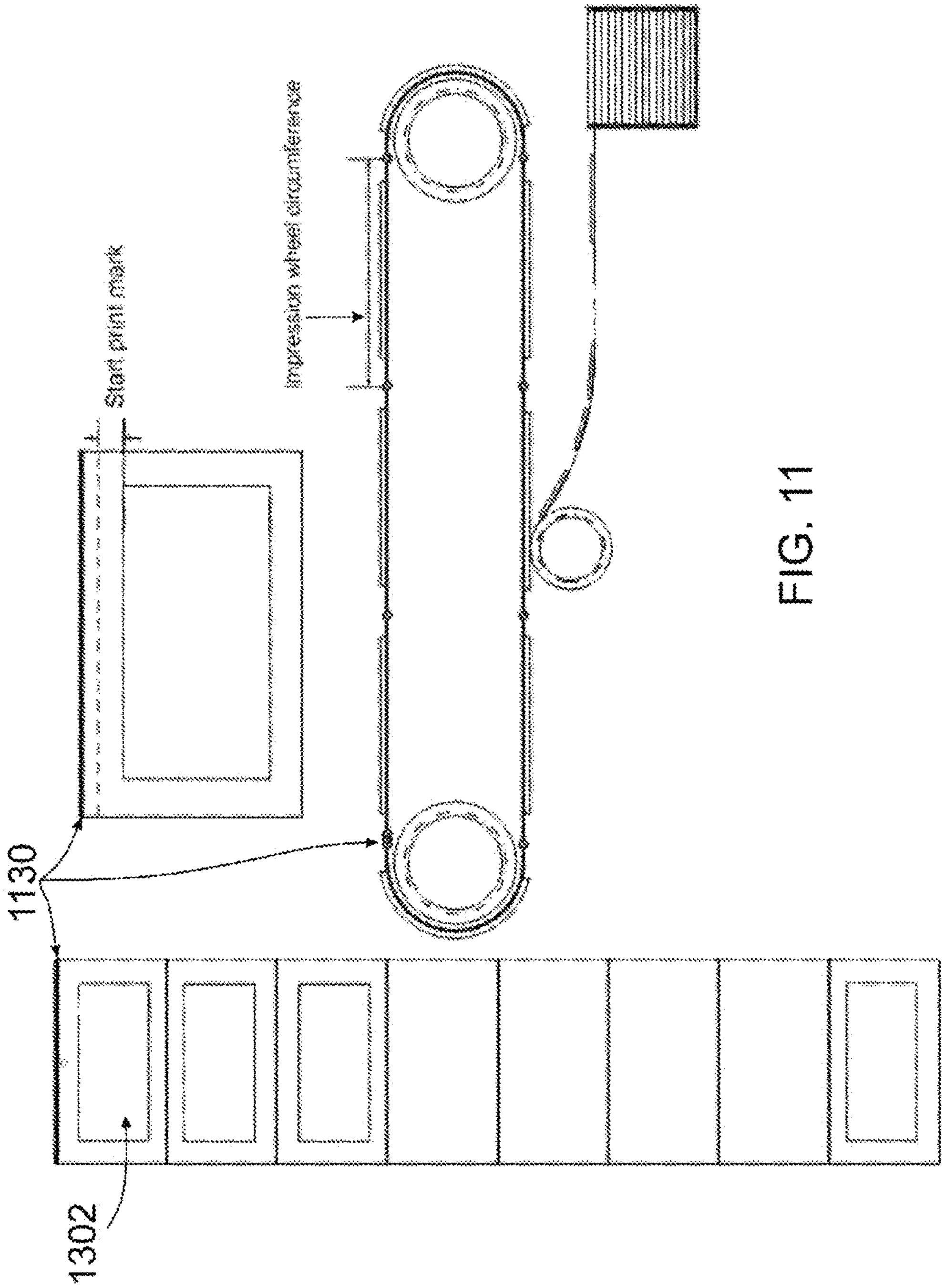
FIG. 11 illustrates images on a blanket.

In the non-limiting example of FIG. 11, a length of ITM 102 is equal to eight times a circumference of impression cylinder 502.

A First Routine for Operating a Printing System where an ITM Length is Non-Constant In some embodiments, a length of the ITM 102 may fluctuate or "slightly fluctuate" in time (e.g. by at most 2% or at most 1% or at most 0.5%).

Figure 14:
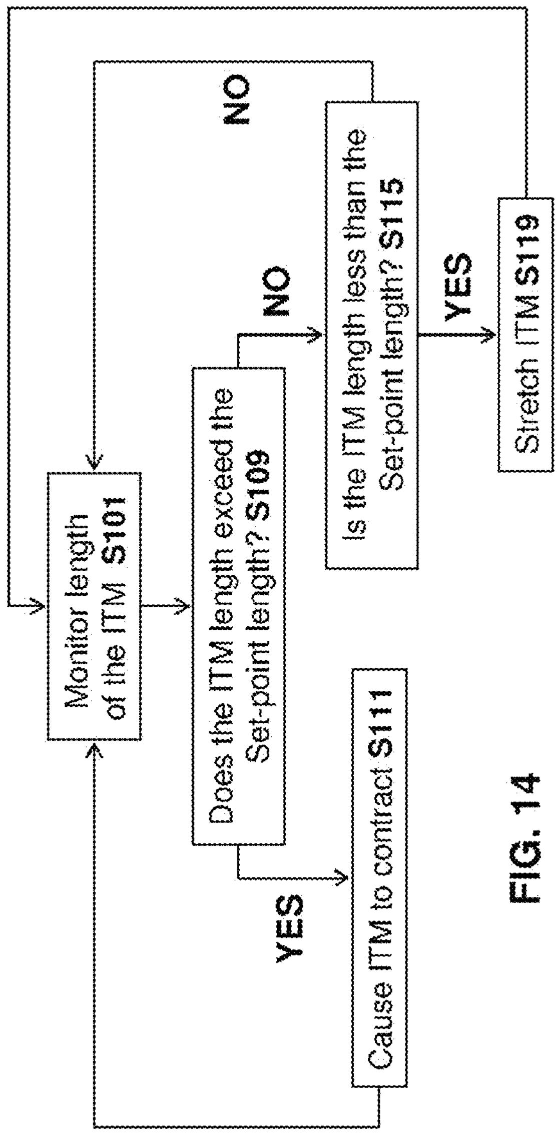
FIG. 14 is a flow chart of a routine for modifying the ITM length.

FIGS. 13-14 relate to an apparatus and method for operating a printing system having an ITM having a non-constant length that fluctuates in time. In one non-limiting example, the ITM 102 may be subjected to mechanical noise caused by the repeated engagements to the rotating impression cylinder 502. In yet another example, over the life of the ITM, the ITM may become "stretched out" by use. In yet another example, fluctuations of temperature or any other operational or environmental parameter may cause the ITM to stretch or contract.

In some embodiments (see step S101), it may be useful to monitor a length indicator of ITM 102 to detect length fluctuations—for example, by actually measuring the ITM length or by monitoring an ITM-length-indicative parameter without actually measuring the ITM length. One example of the ITM-length-indicative parameter is the "rotational displacement" during a time period required for one of the ITM markers to complete a full revolution.

In the event that the monitored length is less than the "target" or "set-point" length (e.g. a target equal to an integral multiple of a circumference of impression cylinder 502), then this may increase the risk pressing the seam 1130 to the impression cylinder or may be associated with any other set of adverse consequence(s). In this case, it may be advantageous to either (i) stretch the ITM 102 (see, for example, the apparatus of FIG. 13 or the routines of FIG. 14) and/or (ii) decelerate the ITM 102 (e.g. when the ITM 102 is disengaged from an impression cylinder 502. In some situations, during times of disengagement, a surface velocity of the ITM 102 differs from that of impression cylinder 502.

It is not required to accelerate or decelerate an entirety of the ITM 102. For example (see FIG. 4A), it is possible to locally accelerate or decelerate a portion of the ITM 102 spanned by upstream 250 and downstream 252 by powered dancers.

Reference is made to FIGS. 13 and 14. In FIG. 14, instead of the length between rollers 104, 106 being fixed, the length therebetween is variable and controllable. For example, a motor (not shown) and/or any linear actuator may increase or decrease a distance between the rollers 104, 106. In some embodiments, the motor for modifying the distance between guide rollers is different than a motor employed to cause rotation of ITM 102. Various routines are illustrated in FIG. 14.

Reference is made to FIG. 14. This figure provides one example of monitoring and adjusting ITM characteristics, such as length or velocity. There is constant monitoring of the length of the ITM (S101). In one example, the length of the ITM is compared to the maximal allowable setpoint length (S109). An example of a setpoint length may be an integral multiple of the impression cylinder circumference or, (2*n−1) multiplied by the circumference of the pressure cylinder where n is an integer. The setpoint length may have an upper and lower tolerance level. If the length of the ITM exceeds the setpoint length, then it may be possible to cause the ITM to contract (S111). In one example, in order to contract the ITM length, it may be possible to reduce the distance between rollers 104 and 106. If the length of the ITM does not exceed the setpoint length, then the length may be compared to the minimal setpoint length (S115). In the event that the monitored length is less than the value to which it is compared, the length of the ITM may be increased (S119). In one non-limiting example, the length may be increased by distancing rollers 104 and 106. Steps S111 and S119 may be carried out in any other manner A Second Routine for Operating a Printer where an Intermediate Transfer Member Length is Non-Constant In the previous section, a routine of responding to ITM length deviations by modifying an ITM length was described.

Figure 16A:
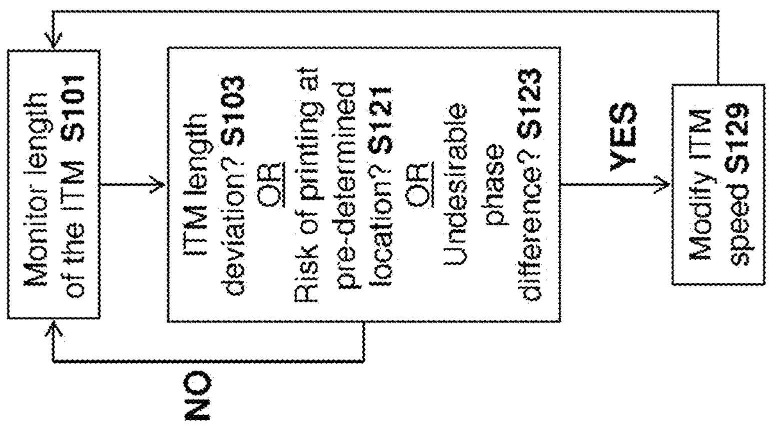
FIGS. 16A-16B are flow charts of routines for modifying ITM surface velocity.
Figure 16B:
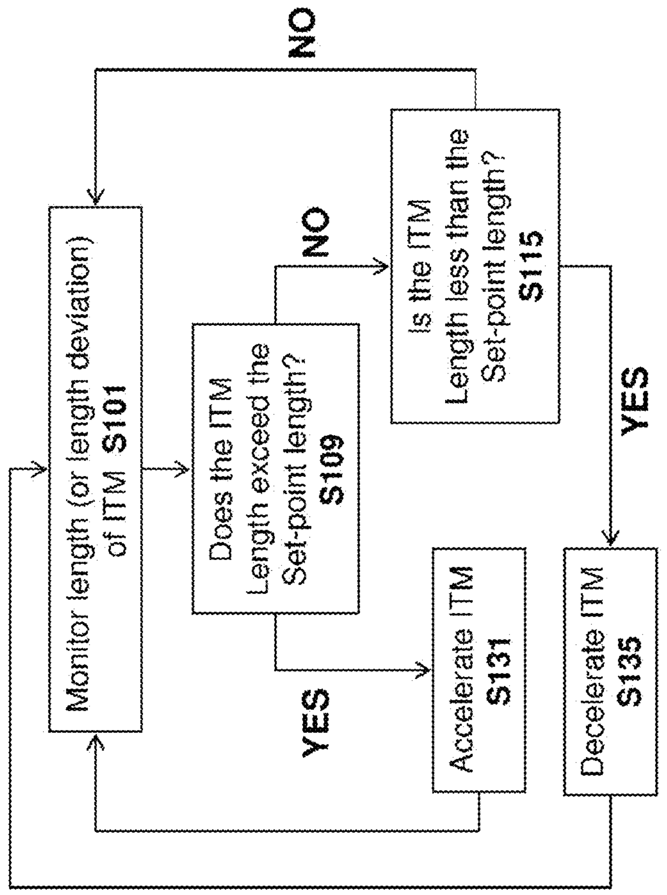

Alternatively or additionally, as noted above, it may be possible to respond by accelerating or decelerating at least a portion of the ITM 102 as it moves during a "disengagement portion" of the ITM-impression cylinder engagement cycle—see FIGS. 16A-16B.

In some embodiments, there may be a fixed relationship between timing parameters (e.g. periodicities) of (i) ITM-impression cylinder engagement cycle; and the (ii) the ITM rotation cycle or the amount of time required for a pre-determined location (e.g. seam 1130) to complete a full ITM rotation (i.e. at a location aligned with impression cylinder 502). In this case, it may be said that the ITM rotation cycle is "synchronized" to the ITM-impression cylinder engagement cycle.

When the two cycles are synchronized, it is possible to operate the printing system so that the seam 1130 (or any other pre-determined location on ITM 102) passes by the impression cylinder at the same time within respective cycles of the ITM-impression cylinder engagement cycle. Thus, it may be arranged that the seam 1130 always passes by impression cylinder 502 during a "disengage" portion of the ITM-impression cylinder engagement cycle.

In the event that the impression cylinder 502 rotates at a periodicity that is an integral multiple to that of ITM-impression cylinder engagement cycle, this means that every time the seam 1130 (or any other pre-determined location on ITM 102) passes by impression cylinder 502, the seam 1130 is aligned with a pre-determined location 1134 of the rotating impression cylinder (e.g. a location of impression cylinder gap 1138—see FIGS. 15C-15D)—see FIG. 12 where seam 1130 always passes by the rotating impression cylinder at a time where location 1134 (i.e. a circumferential discontinuity) of the rotating impression cylinder 502 faces directly toward the ITM 102.

However, in the event of an increase or decrease of ITM rotational velocity, or in the event of an increase or decrease of an ITM length which would modify a linear velocity of locations on the ITM 102 (e.g. seam 1130) for a fixed rotational velocity, this might cause the ITM to rotate in an "out-of-phase" manner relative to the ITM-impression cylinder engagement cycle. Unlike the situation of the previous paragraph where for example the seam 1130 passes by the impression cylinder at the same time within respective cycles of the ITM-impression cylinder engagement cycle, this might cause the seam 1130 to pass by the impression cylinder 502 at different portions of the ITM-impression cylinder engagement cycle. Even if seam 1130 passes by impression cylinder 502 during a "disengagement portion" of the cycle during a "first pass," during subsequent passes by impression cylinder 502 is liable to pass by impression cylinder 502 during an "engagement portion" of the impression cycle.

Figures 15A, 15B, 15C, 15D:
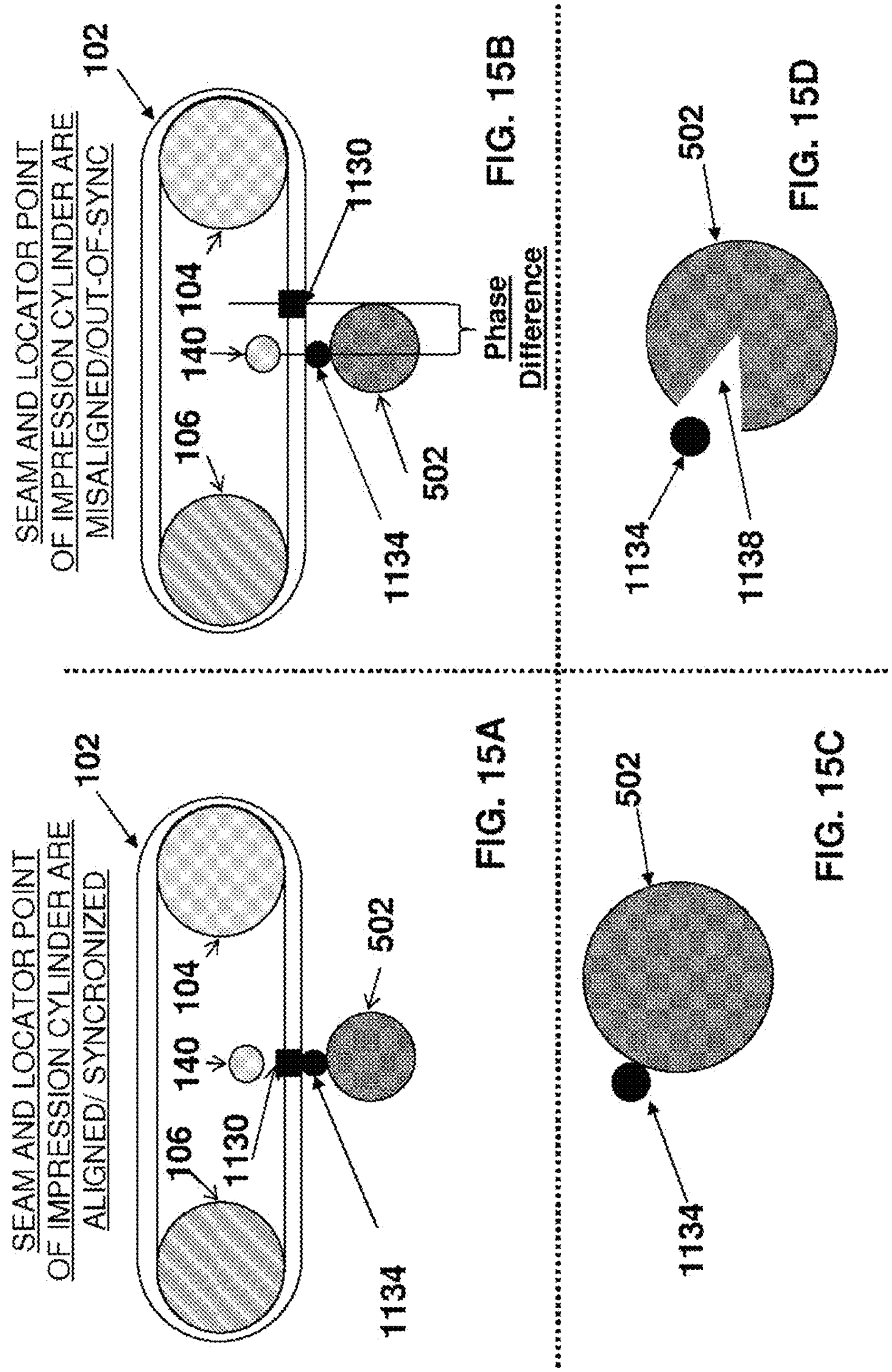
FIGS. 15A and 15B illustrate an impression cylinder having a pre-determined location (e.g. cylinder gap) that is respectively in-phase and out of phase with a seam of an ITM.
FIGS. 15C-15D illustrate a pre-determined location of an impression cylinder (e.g. a cylinder gap).

In the event that (i) a rotation cycle of impression cylinder 502 is synchronized to ITM-impression cylinder engagement cycle and (ii) a rotation cycle of ITM 102 is not synchronized thereto (e.g. because the length of ITM 102 has deviated from a setpoint length), this may create the situation of FIG. 15D. In contrast to FIG. 15C where the seam 1130 always passes by rotating impression cylinder at a time where location 1134 of the rotating impression cylinder 502 faces directly toward the ITM 102, in FIG. 15D the seam may "drift" relative to being aligned with location 1134. This drift may be indicative of an ITM that rotates "out of synch" with the ITM-impression cylinder engagement cycle and/or a situation where there is an elevated risk of engaging ITM 102 to cylinder 502 at a time where seam 1130 is aligned therebetween.

Reference is now made to FIG. 16A. In this figure, it is possible to detect a length deviation (S103) or a risk of printing at a pre-determined location on the ITM 102 (e.g. the seam location 1130) (S121) and/or an undesirable phase difference (S123) between an ITM rotation cycle and (i) the ITM-impression cylinder engagement cycle and/or the (ii) impression cylinder rotation cycle.

In order to bring the ITM rotation cycle back into phase with (i) the ITM-impression cylinder engagement cycle and/or the (ii) impression cylinder rotation cycle, it is possible to accelerate or decelerate the ITM 102 (i.e. an entirety of the intermediate transfer or a portion thereof) at a time when the ITM is disengaged from impression cylinder 502 (S129).

In some embodiments, the approach of FIG. 16A-16B may be useful but may cause other problems—e.g. it may distort one or more of the ink images. As such, it may be preferable to modify an ITM length and only after reasonable options of modifying ITM length are exhausted, resort to accelerating or decelerating a rotational velocity of ITM 102.

Figure 17:
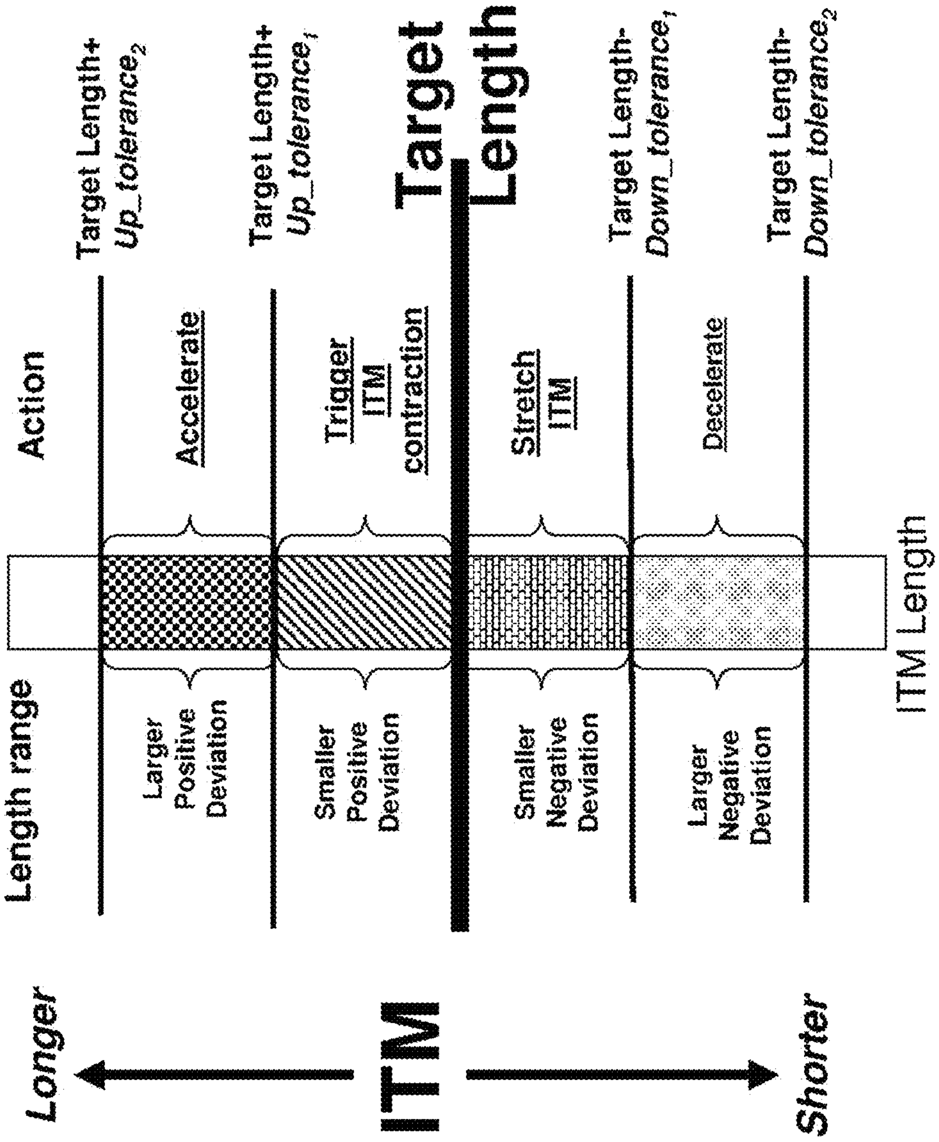
FIG. 17 illustrates various blanket lengths.

As illustrated in FIG. 17, in the event of a "smaller positive length deviation" from the target length, the ITM contraction or stretching approach (see FIG. 16) may be preferred. For example, if the ITM 102 is stretched beyond a certain length, this may cause or increase a risk of "intermediate transfer member slip" over roller(s) 104 and/or 106).

Thus, in some embodiments, the ITM acceleration or deceleration may be contingent upon the ITM length deviating from a target length beyond a certain threshold—only then is this approach resorted to. Alternatively or additionally, the ITM acceleration or deceleration may be contingent upon detected or predicted slip between the ITM 102 and the roller(s) 104 and/or 106.

Figure 18B:
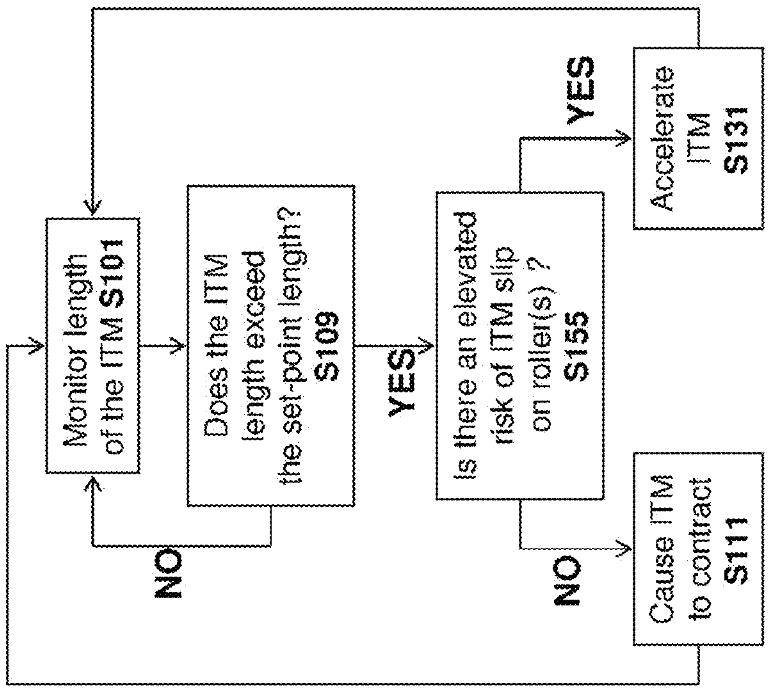
FIGS. 18A-18B are flow charts of routines for determining whether to change ITM length or surface velocity.
Figure 18A:
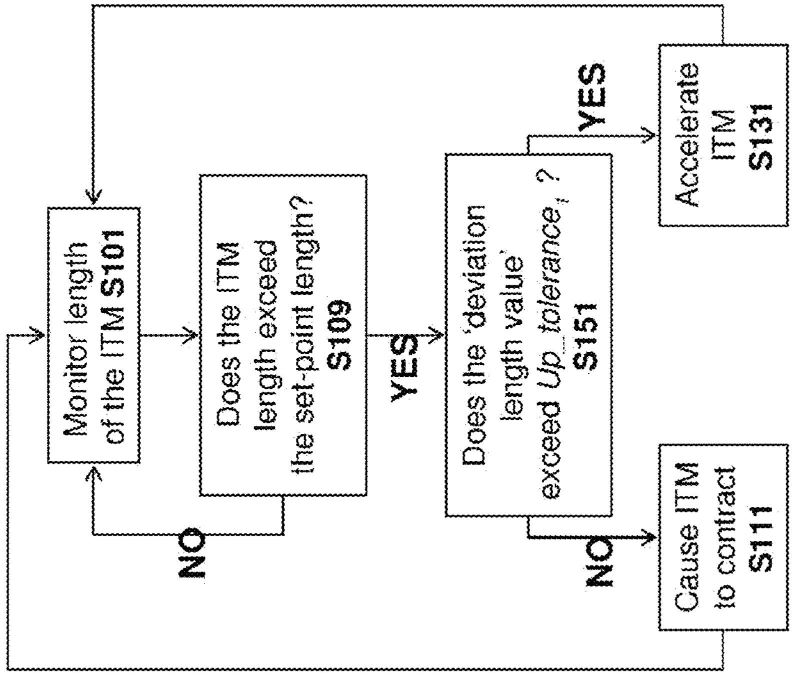
Figure 19:
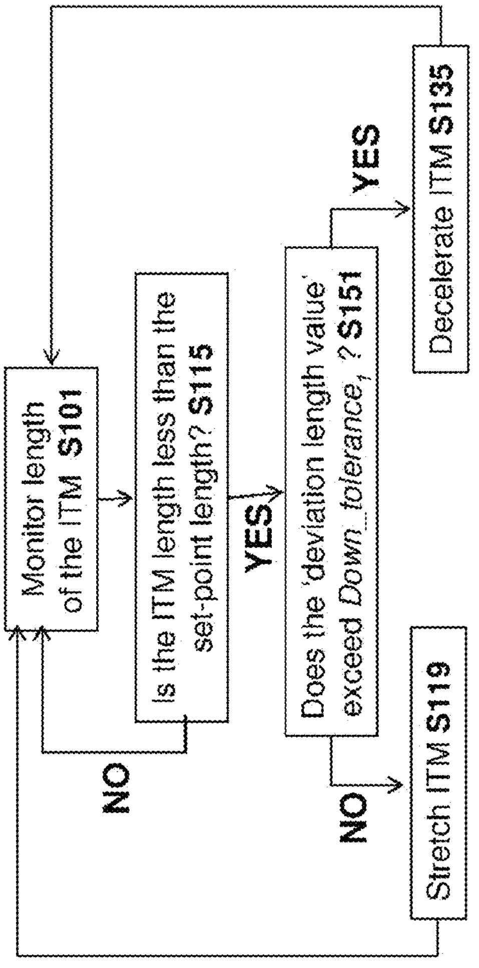
FIG. 19 is a flow chart of a routine for determining whether to change ITM length or surface velocity.

The skilled artisan is directed to FIGS. 18-19.

Reference is made to FIG. 18A. In step S101 a length of the ITM is monitored. In step S109 it is determined if the length exceeds a set point length. If yes, then in step S151 it is determined if a deviation length exceeds $Up\_tolerance_1$. If it does exceed, the ITM is caused to contract in step S111—otherwise, the ITM is accelerated in step S131.

Reference is made to FIG. 18B. In step S101 a length of the ITM is monitored. In step S109 it is determined if the length exceeds a set point length. If yes, then in step S151 it is determined there is an elevated risk of ITM slip on the roller(s). If it does exceed, the ITM is caused to contract in step S111—otherwise, the ITM is accelerated in step S131.

Reference is made to FIG. 19. In step S101 a length of the ITM is monitored. In step S115 it is determined if the length is less than a set point length. If yes, then in step S151 it is determined if a deviation length exceeds $Down\_tolerance_1$. If it does exceed, the ITM is stretched in step S119—otherwise, the ITM is decelerated in step S135.

A First Technique for Reducing or Eliminating Image Distortion

Figure 20A:
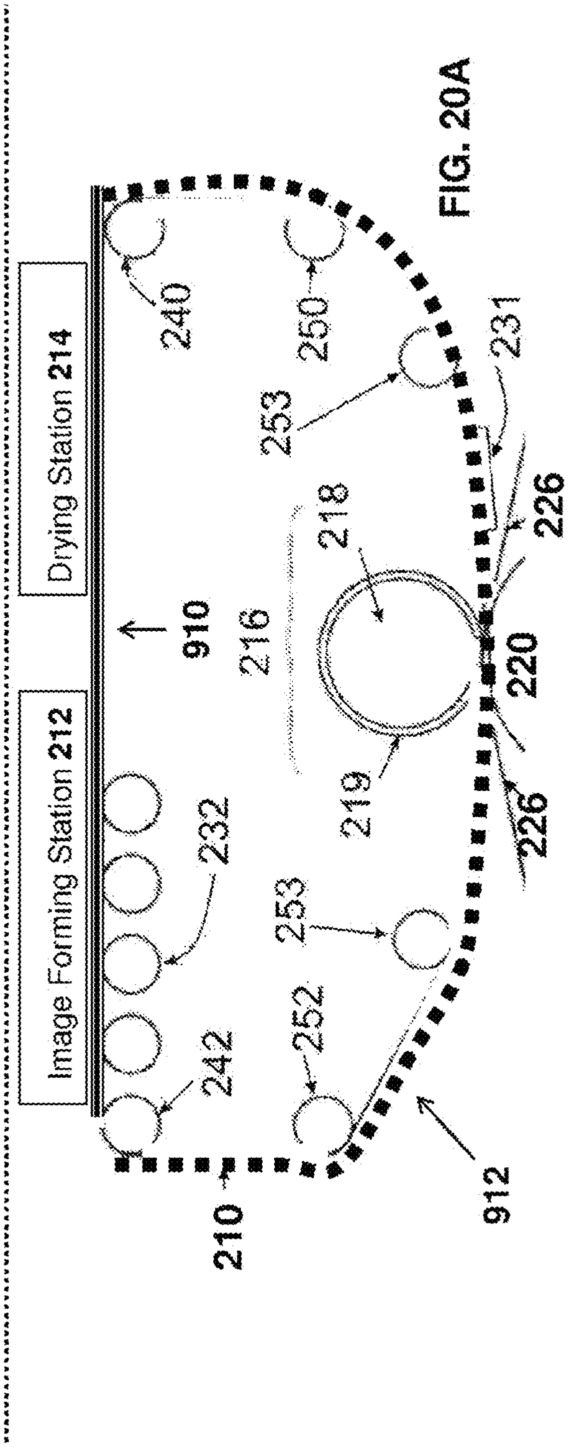
FIGS. 20A-20B illustrate a blanket mounted over rollers where a tension in an upper run thereof exceeds that in the lower run.
Figure 20B:
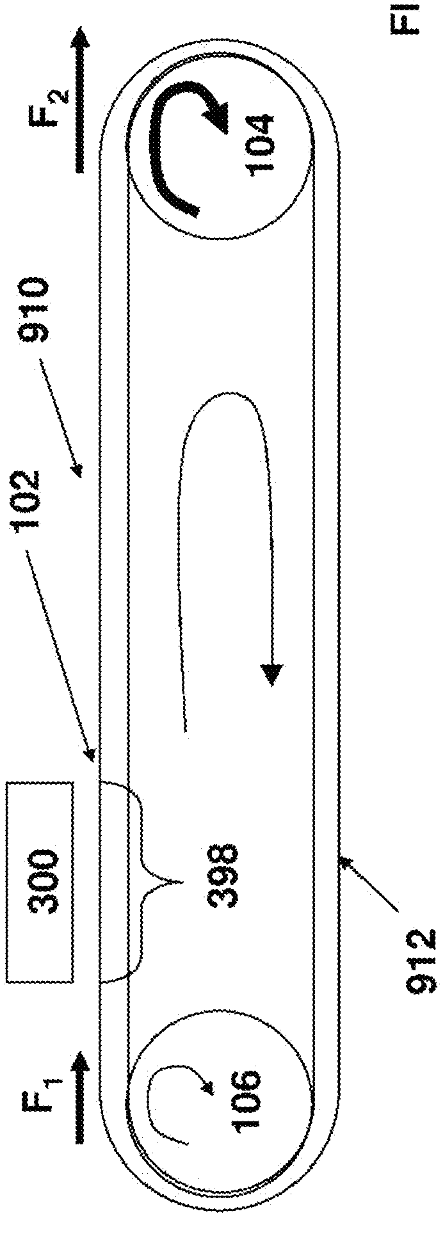

FIGS. 20A-20B illustrate a ITM or blanket mounted over upstream and downstream rollers where a tension in an upper run 910 thereof exceeds that in the lower run 912.

The system of FIG. 20A is the same as that of FIG. 4A where the upper 910 and lower 912 runs are illustrated and defined by upstream 242 and downstream 240 roller. FIG. 20B is somewhat more schematic, and can apply to the system of FIG. 4A, to the system of FIG. 1A or any other system—in FIG. 20B, the nomenclature of FIG. 1A is adopted, and the upstream and downstream rollers are respectively labeled as 106 and 104.

As illustrated in FIG. 20B, a torque apply by downstream roller 106 significantly exceeds that of upstream roller 104. When the torque sustained by downstream roller 104 exceeds that applied by upstream roller 106, this can maintain upper run 910 of belt 102 at a higher tension than that of lower run 912. In the example of FIGS. 20A-20B, the torque of downstream roller 104 applies a horizontal force $F_2$ on an upper run 912 of belt 102 that exceeds the horizontal force $F_1$ applied by upstream roller 106 on the upper run 912 of belt 102. As such, rollers 104, 106 may be said to subject the upper run 912 to stretching to maintain the upper run taut.

In different embodiments, a ratio between torques applied by downstream roller to that of upstream roller, and/or a ratio between magnitudes of horizontal forces applied by downstream roller 106 and that applied by the upstream roller 104 is at least 1.1 or at least 1.2 or at least 1.3 or at least 1.5 or at least 2 or at least 2.5 or at least 3.

As noted above, in some embodiments, impression cylinder 210 at the impression station 216 is periodically engaged to and disengaged from the intermediate transfer member 210 to transfer the ink images from the moving intermediate transfer member to a 226 substrate passing between the intermediate transfer member and the impression cylinder. This repeated or intermittent engaging may induce mechanical vibrations within slack portions in the lower run 912 of the belt.

By maintaining the upper run 910 taut, it is possible to substantially isolate the upper run 912 from the mechanical vibrations in the lower run 912. In one non-limiting example, upper run 910 is maintained taut as described above, however, this should not be construed as limiting.

A Second Technique for Reducing or Eliminating Image Distortion

In the previous section, a technique of reducing or distortion was described whereby the upper run 910 was maintained taut and substantially isolated from mechanical vibrations of the lower run 912. These mechanical vibrations may subject belt 102 to non-uniform stretching. If these mechanical vibrations are allowed to propagate to a portion 398 (see FIG. 20B) of the belt 102 that is aligned with image forming station 300, the mechanical vibrations and their resulting non-uniform stretching of belt 102 may cause image distortion of the ink image formed on the outer surface of belt 102 at image forming station 300.

Therefore, instead of, or in addition to, taking measures which prevent (or reduce a magnitude of) non-uniform stretching at the portion 398 (see FIG. 20B) of the belt 102 that is aligned with image forming station 300, it is possible to counteract or eliminate image distortion by (i) measuring a magnitude of the non-uniform stretching and (ii) regulating a timing of ink-drop deposition on the rotating blanket according to measured non-uniform blanket stretch and/or shape fluctuations of the blanket.

In order to explain concepts relating to non-uniform stretch of a rotating blanket in greater detail, it is useful to explain the concepts of "space-fixed" and "blanket-fixed" locations.

Figure 21:
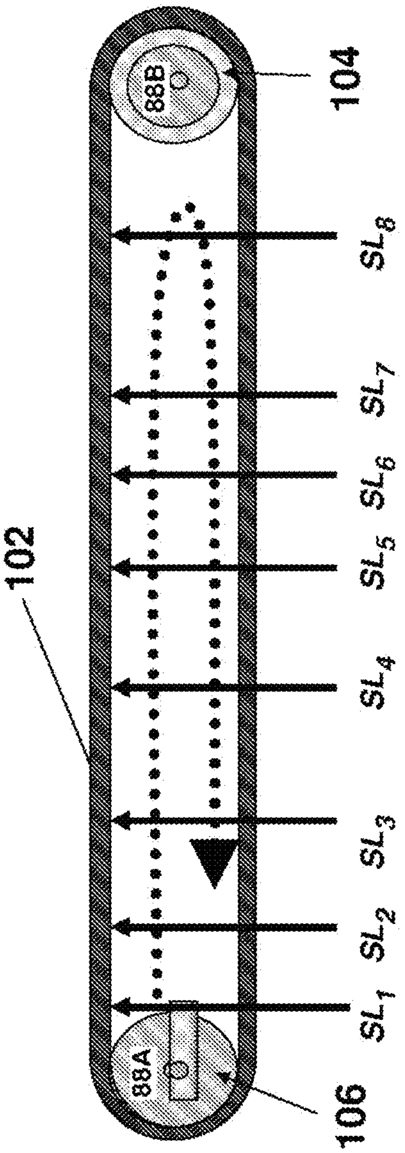
FIG. 21 illustrates space-fixed locations in a printing system.
Figure 22A:
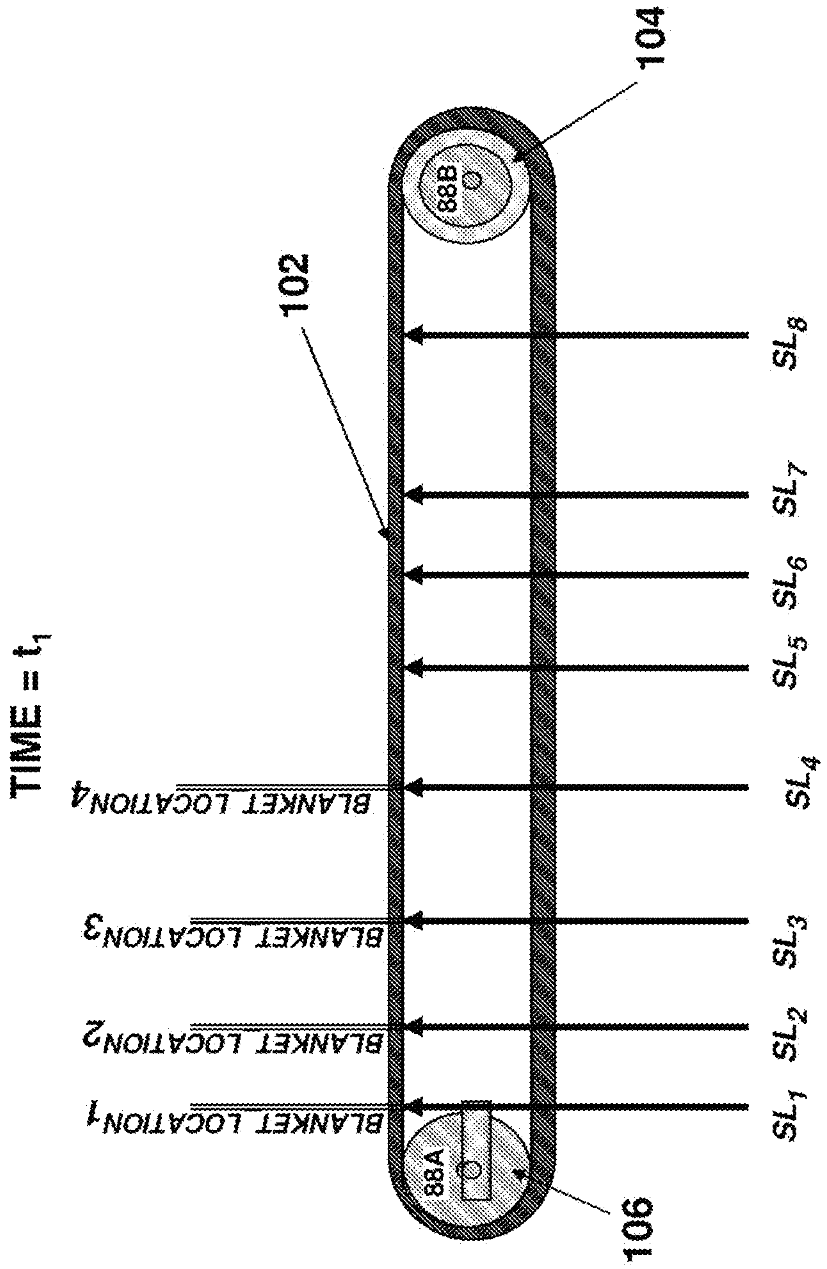
FIGS. 22A-22B, 23A-23B, and 24A-24B illustrate non-uniform blanket stretch.
Figure 22B:
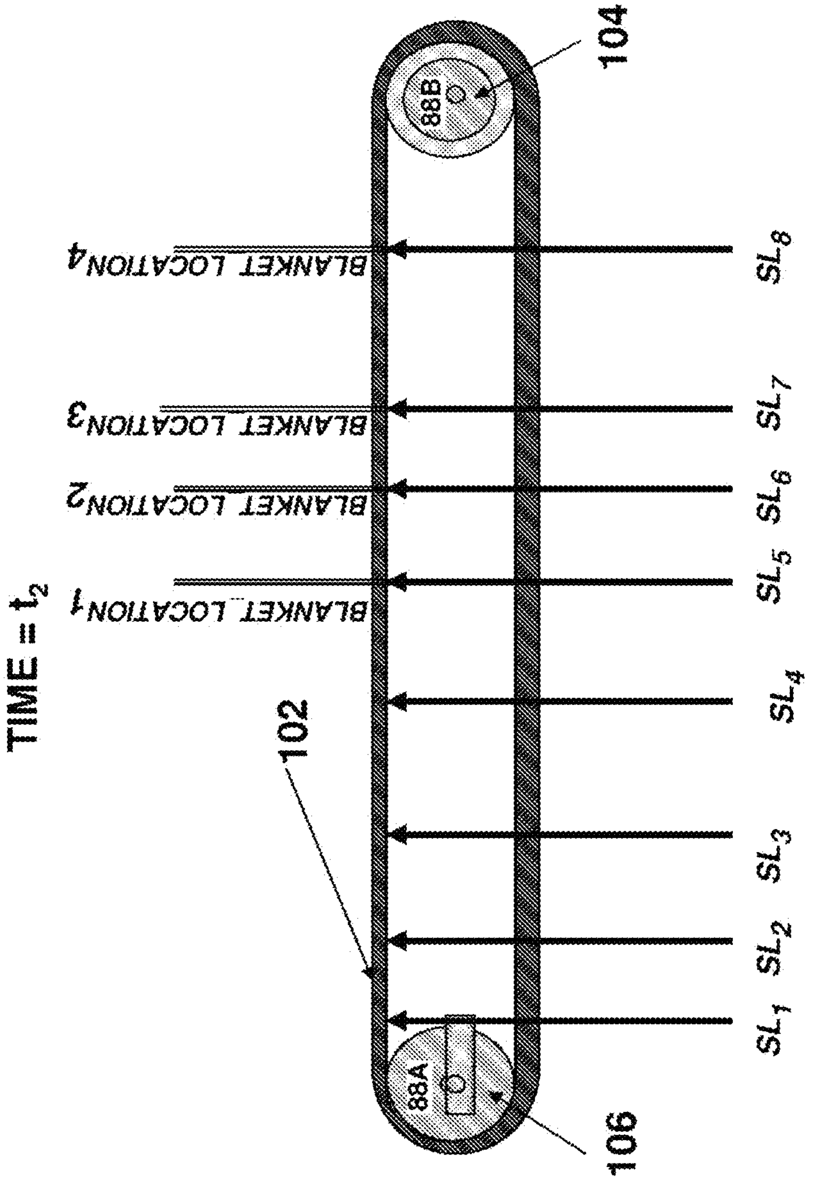

In the example of FIG. 21 a number of "space-fixed" locations (i.e. for example, in a stationary or non-rotating reference frame—as opposed to ITM fixed locations which rotate with the ITM) $SL_1$-$SL_8$ are illustrated. They are not evenly spaced.

In the example of FIGS. 22A-22B, 23A-23B, and 24A-24B, in addition to the space-fixed locations $SL_1$-$SL_8$, a number of blanket-fixed locations BLANKET_LOCATION$_1$-BLANKET_LOCATION$_4$ (not evenly spaced) which rotate along with the blanket or ITM are illustrated. In FIGS. 22A-22B, 23A-23B, and 24A-24B blanket-fixed location BLANKET_LOCATION$_i$ (i is a positive integer between 1 and 4) is situated at the space-fixed location $SL_i$ at time t1 and at the space-fixed location $SL_{i+4}$ at later time t2—for example, the ITM rotates in a clockwise direction.

In some embodiments, each blanket location BLANKET_LOCATION$_i$ corresponds to the $i^{th}$ blanket marker of the ITM markers 1004 (see FIG. 8A).

In some embodiments, the ITM 102 is at least lengthwise stretchable. Some embodiments of the present invention relate to temporal fluctuations in distances between blanket-fixed locations. The "distance" between two locations on the ITM surface refers to the distance between along the ITM surface along the direction of surface velocity of the ITM.

Figure 23A:
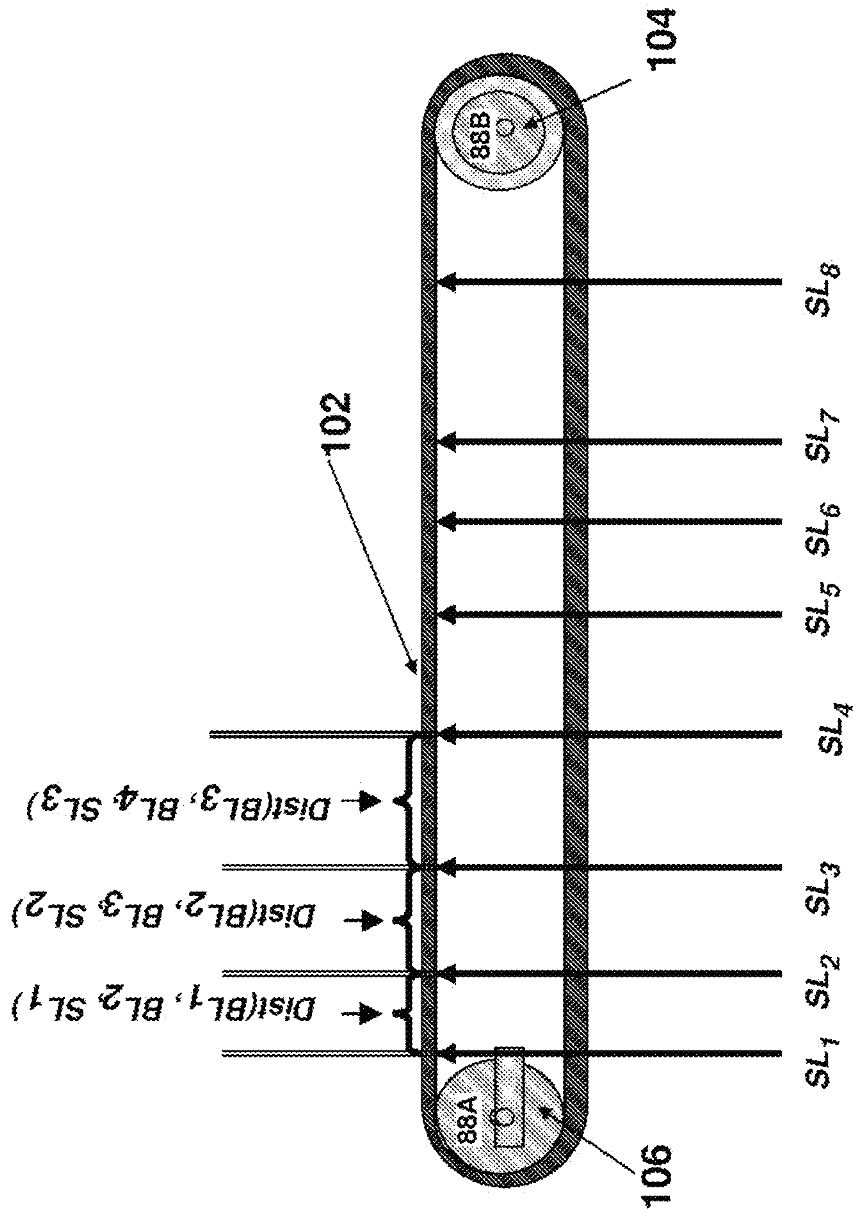
Figure 23B:
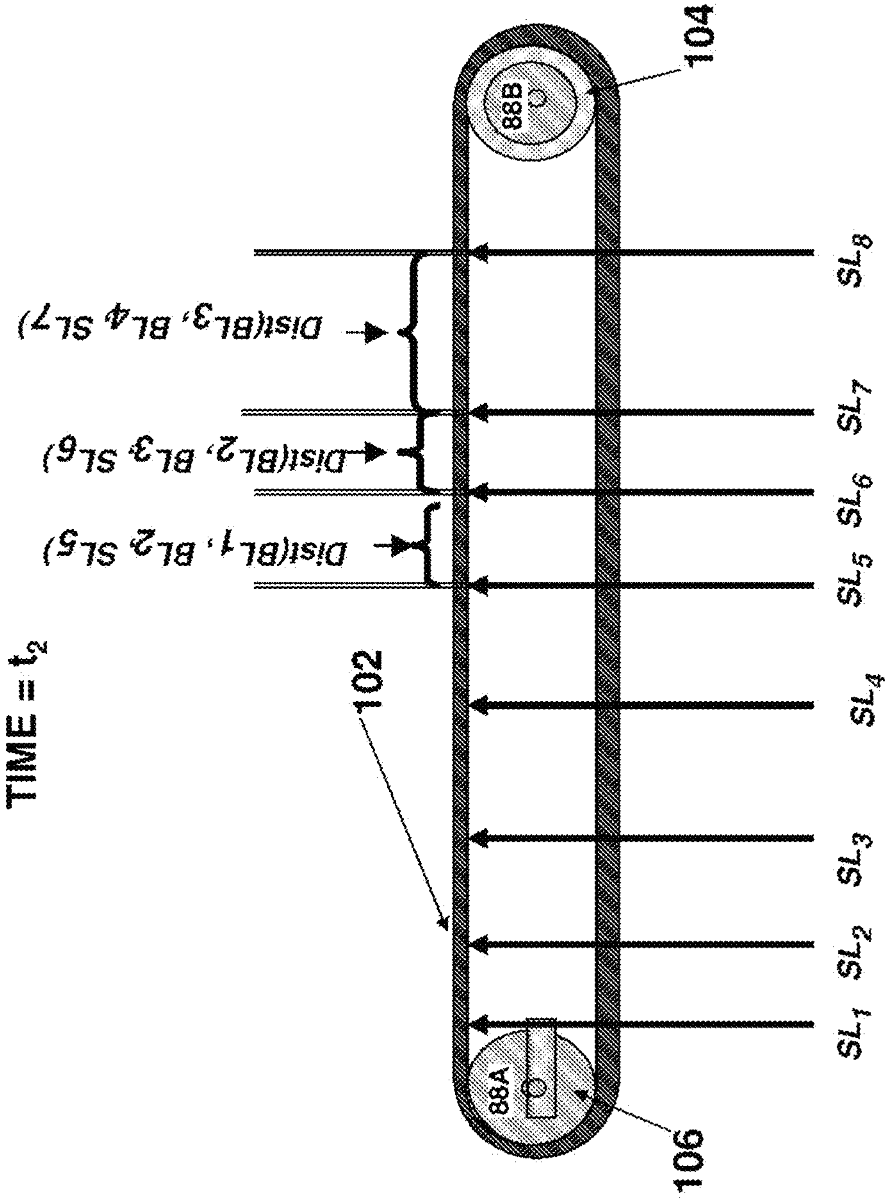

In situations there the ITM is completely rigid, the "distance between" ITM fixed locations remains fixed. However, for flexible and/or stretchable blankets, the distance between the locations may fluctuate (e.g. slightly fluctuate). This is illustrated in FIGS. 22A-22B, 23A-23B, and 24A-24B where the distance between adjacent blanket locations fluctuates in time—e.g. as a function of space-fixed location. Thus, when BLANKET_LOCATION$_1$ is situated at $SL_1$ (see FIG. 23A) a distance between BLANKET_LOCATION$_1$ and BLANKET_LOCATION$_2$ is a first value (see FIG. 23A) DIST($BL_1$, $BL_2$, $SL_1$) When BLANKET_LOCATION$_1$ is situated at $SL_5$ (see FIG. 23B), a distance between BLANKET_LOCATION$_1$ and BLANKET_LOCATION$_2$ is a second value (see FIG. 23B) DIST($BL_1$, $BL_2$, $SL_5$) which in FIG. 23B is larger than DIST($BL_1$, $BL_2$, $SL_1$) of FIG. 23A.

When BLANKET_LOCATION$_2$ is situated at $SL_2$ (see FIG. 23A) a distance between BLANKET_LOCATION$_2$ and BLANKET_LOCATION$_3$ is a first value (see FIG. 23A) DIST($BL_2$, $BL_3$, $SL_2$). When BLANKET_LOCATION$_2$ is situated at $SL_6$ (see FIG. 23B), a distance between BLANKET_LOCATION$_2$ and BLANKET_LOCATION$_3$ is a second value (see FIG. 23B) DIST($BL_2$, $BL_3$, $SL_6$) which in FIG. 23B is smaller than DIST($BL_2$, $BL_3$, $SL_2$) of FIG. 23A.

In some embodiments, the blanket 102 is stretched over rollers 104, 106 or a rotating drum (not shown). As the blanket rotates, the stretching forces thereon may be non-uniform—for example, due to the presence of mechanical noise (e.g. from the repeated engagement and disengagement between the pressure roller and the ITM). As such, the blanket may stretch non-uniformly where the non-uniform stretching of the blanket varies and/or fluctuates in time and/or in blanket-position and/or in space-fixed position. In one example related to the latter case, the stretching forces on the blanket may vary with location—for example, in upper run of blanket 102, there may be more tension in the blanket 102 closer to rollers 104, 106 than in the central portion further away from rollers.

In the previous paragraph it was noted that non-uniform stretching forces may cause non-uniform stretching of blanket 102 and variations in distances between space-fixed locations.

Alternatively or additionally, in some embodiments, the material properties (e.g. related to material elasticity) and/or the mechanical stretching forces applied to blanket 102 (or any other ITM property) may vary as a function of location on the ITM. For example, as blanket 102 may be a seamed blanket, the elasticity or rigidity or thickness or any other physical or chemical property may not be the same close to the seam 1130 or away from it.

It is noted that if the separation distance between neighboring ITM-fixed locations varies as a function of time and/or space-fixed location (see FIGS. 23A-23B), the local surface velocity of ITM-fixed locations also may vary. For example, during the time period between t1 and t2, the average velocity of the blanket at BLANKET_LOCATION$_2$ exceeds that of BLANKET_LOCATION$_3$ causing the distance therebetween to decrease (compare FIG. 23A to FIG. 23B).

Clearly, as evidenced in FIGS. 22A-22B, 23A-23B, and 24A-24B, as the ITM (e.g. flexible and/or lengthwise-extensible) rotates it may deform.

Thus, in some embodiments, velocity of the ITM at different locations differs from an average velocity as the ITM deforms.

Figure 24A:
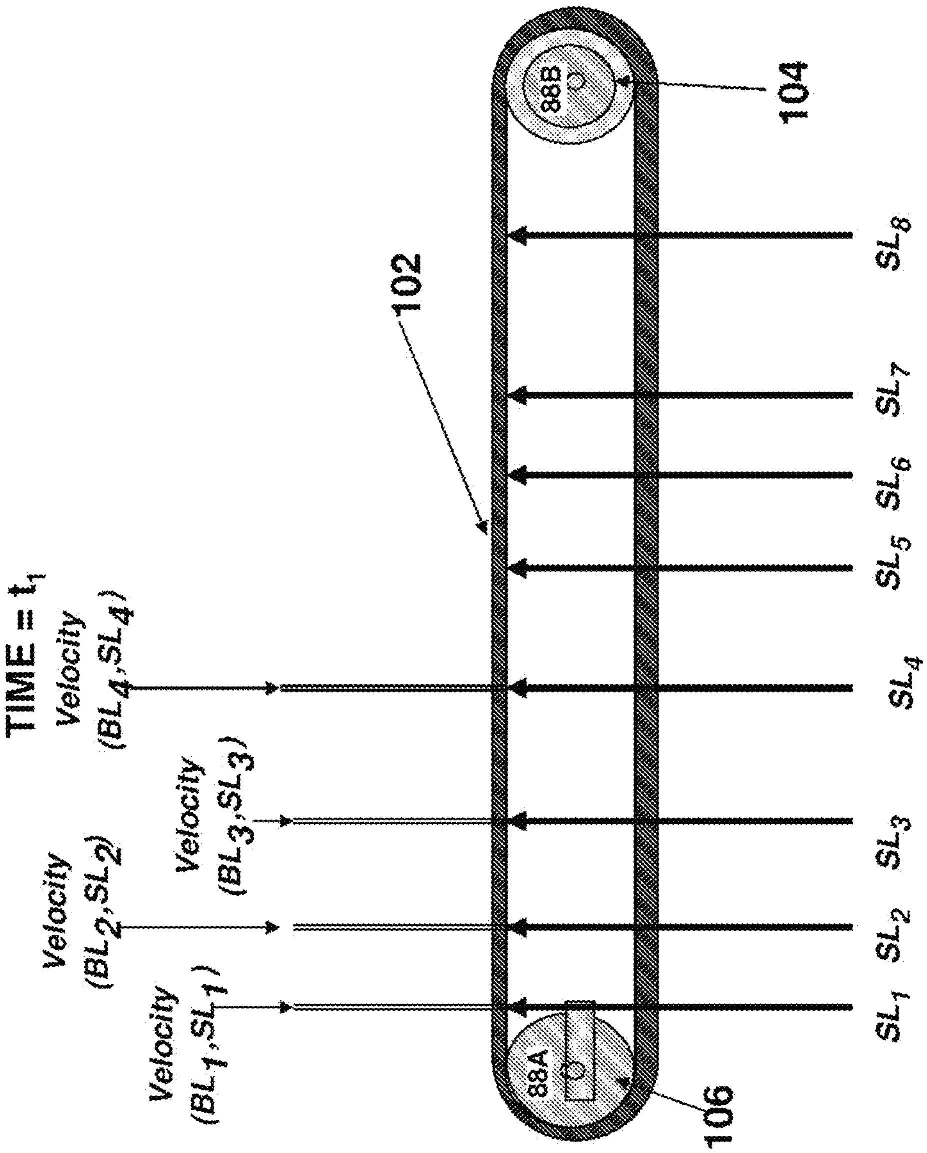
Figure 24B:
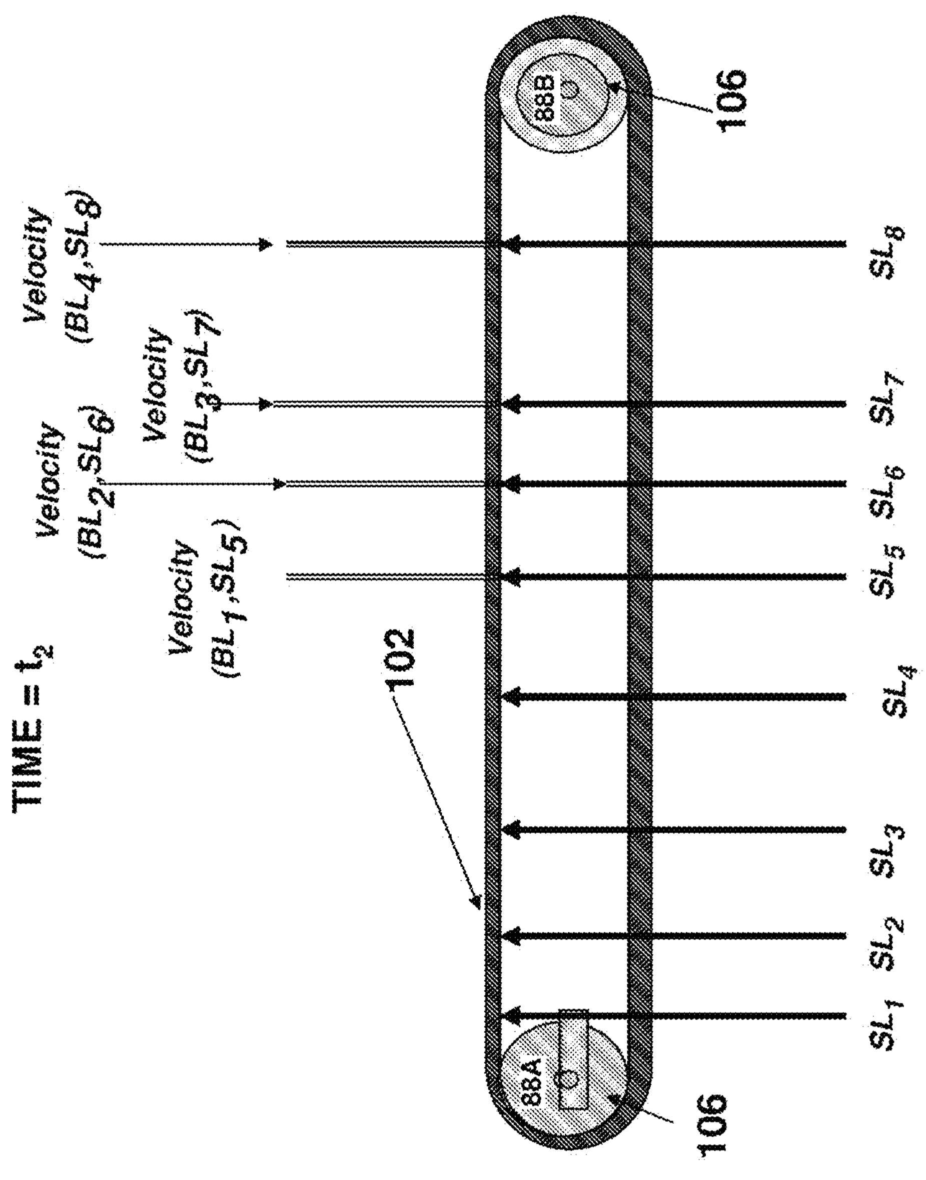

In FIGS. 24A-24B local velocities are illustrated—the velocity DIST($BL_i$, $SL_j$) is the location of the $i^{th}$ blanket-fixed location when it is disposed at the $j^{th}$ space-fixed location.

Figure 25:
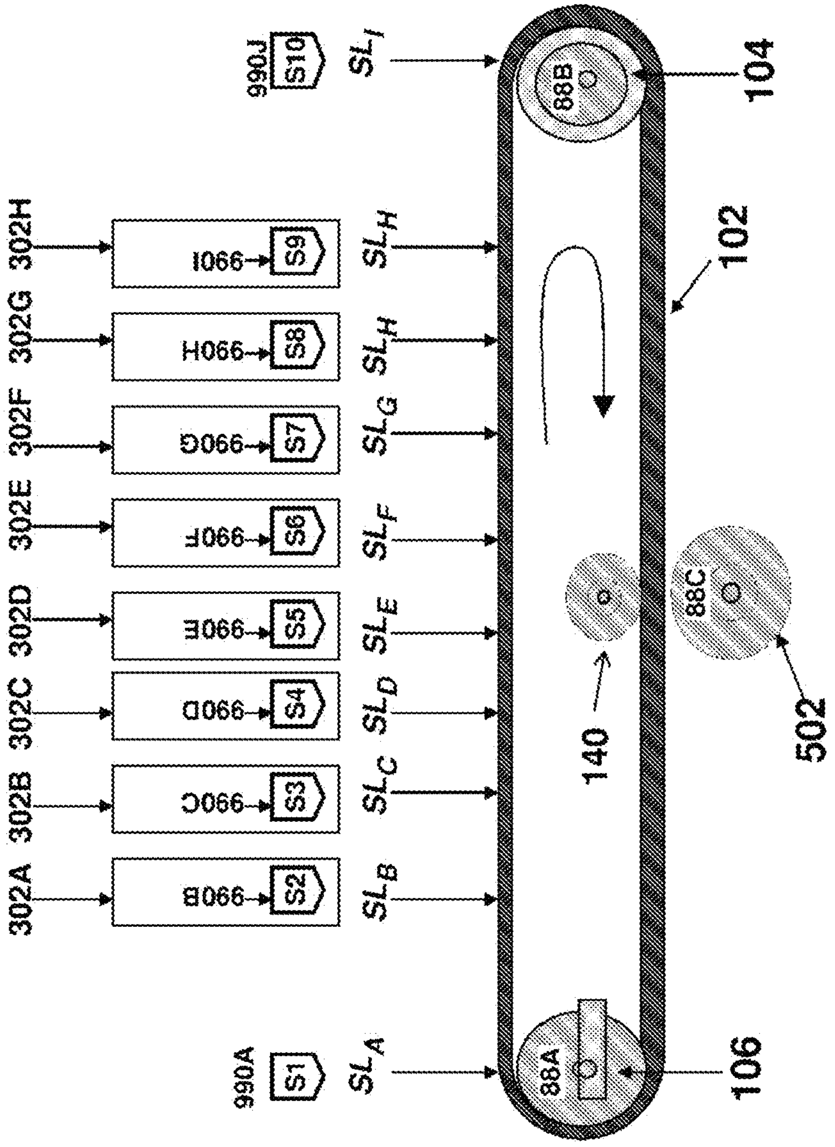
FIG. 25 illustrates an ITM mounted over guide rollers where marker(s) are detected by one or more marker-detector(s).

A Discussion of FIG. 25

In some embodiments, ink droplets are deposited on the ITM 102 at locations underneath and/or aligned with and/or proximate to the print bars 302. Since the rate at which ink droplets are deposited on the ITM 102 may be dependent on the local velocity of the ITM 102 at the "deposition location" (i.e. where the ink droplets are deposited), and since the velocity even of blanket-fixed locations may fluctuate as the ITM 102 rotates, in order to accurately measure the local ITM velocity at the "deposition location" it may be useful to deploy a respective marker-detector (e.g. including an optical detector) at every print bar 302.

It is thus possible to measure the local velocity under each print bar.

As noted above, in some embodiments, to form a given image on the ITM 102, the rate at which droplets need to be deposited is a function of velocity as well as the desired dot pattern of the image to be produced on the rotating ITM. In the event that the velocity is constant, there is no need to consider velocity fluctuation.

However, in some embodiments, the local velocity at a given blanket-fixed location BL or a given space-fixed location SL (e.g. corresponding to a location below one of the rollers as in $SL_A$ or $SL_I$ of FIG. 25 or a location of another of the print bars as in $SL_B$-$SL_H$ of FIG. 25) may fluctuate in accordance with at least one of (i) shape fluctuations of the ITM due to non-uniform in space or non-constant in time stretching or deformation (ii) temporal increases or decreases in distances between locations (e.g. neighboring locations separated by less than a few cm) and/or (iii) mechanical noise—e.g. due to the ITM-impression cylinder impression cycles; and/or (iv) due to non-uniform tension forces on the ITM 102 which may fluctuate in time or space.

Figure 26A:
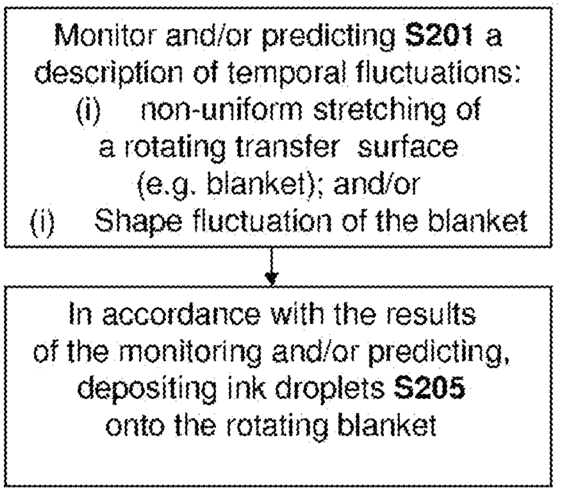
FIGS. 26A-26B, 27 and 28 are flow charts of routine for regulating ink deposition on the ITM.
Figure 26B:
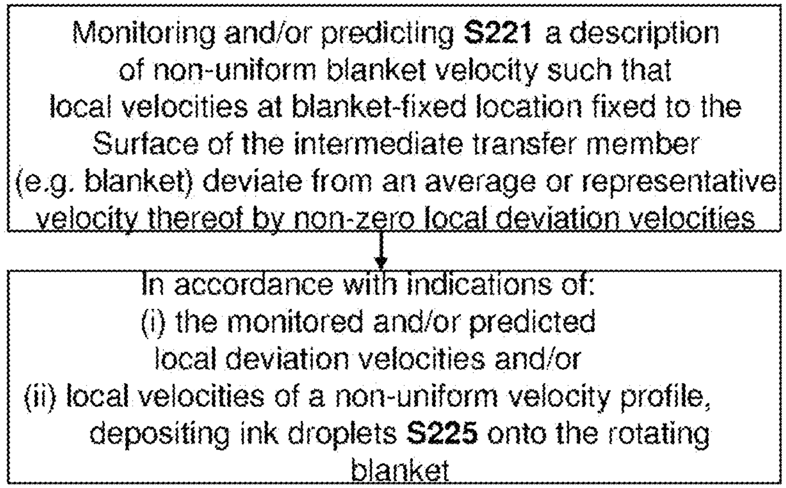

FIGS. 26A-26B illustrate methods for depositing ink droplets on a rotating blanket 102. Referring to FIG. 26A, it is noted that in step S201, a local-velocity-related (or indicative)-property related—e.g. temporal fluctuations of non-uniform stretching and/or temporal fluctuations in a shape of blanket 102 is monitored—e.g. a property indicative of velocity fluctuations therefrom. In step S205, ink droplets are deposited on the rotating blanket in accordance with monitored parameter indicative of velocity fluctuations.

Reference is made to FIG. 26B. Step S221 includes monitoring and/or predicting a description of non-uniform blanket velocity such that local velocities of at individual fixed to the surface of the intermediate transfer member (e.g. blanket) deviate from an average or representative velocity thereof by non-zero local deviation velocity. The ink image is formed in step S225 on the rotating blanket 102 by depositing ink droplets thereon in a manner which is determined in accordance with the monitored—e.g. so determined.

Figure 27:
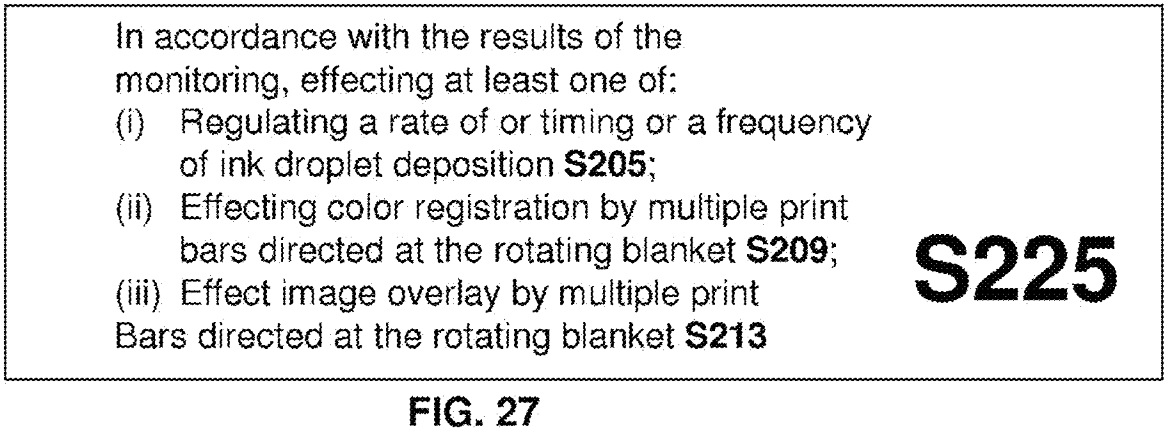

Some examples of implementations of steps S225 are illustrated in FIG. 27—see steps S205, S209 and S213. In particular, some examples of implementing step S225 are: (i) regulating a rate of or timing or frequency of ink deposition; (ii) effecting color registration by multiple print bars directed at the ITM; (iii) effecting image overly by multiple print bars directed at the ITM.

Figure 28:
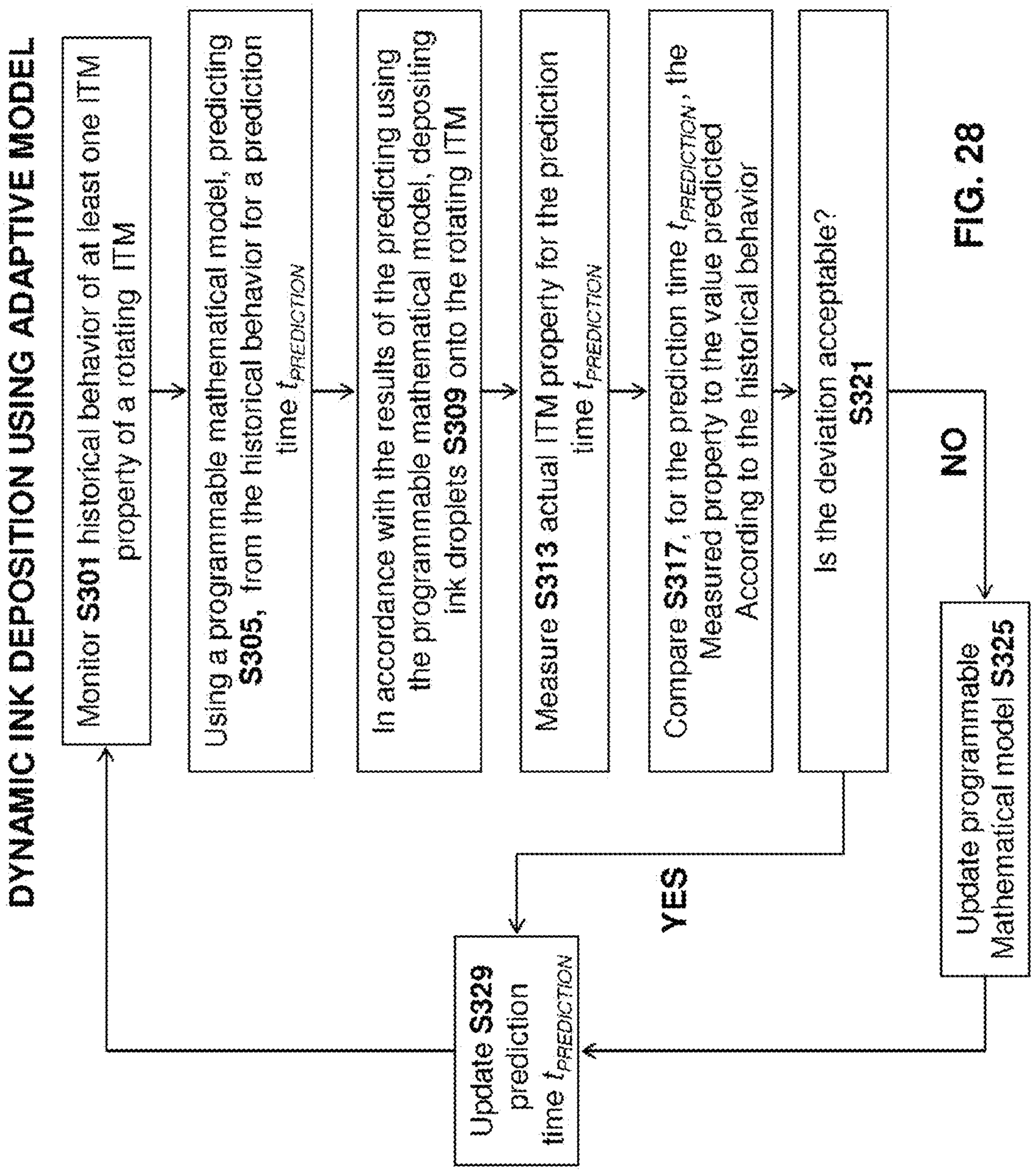

Referring to FIG. 28, it is noted that the mathematical model used to predict non-ITM stretch and/or used to regulate deposition of ink on the rotating ITM may be a "programmable" mathematical model which is repeatedly updated—see steps S301, S305, S309, S313, S317, S321, S325 and S329.

Figure 29:
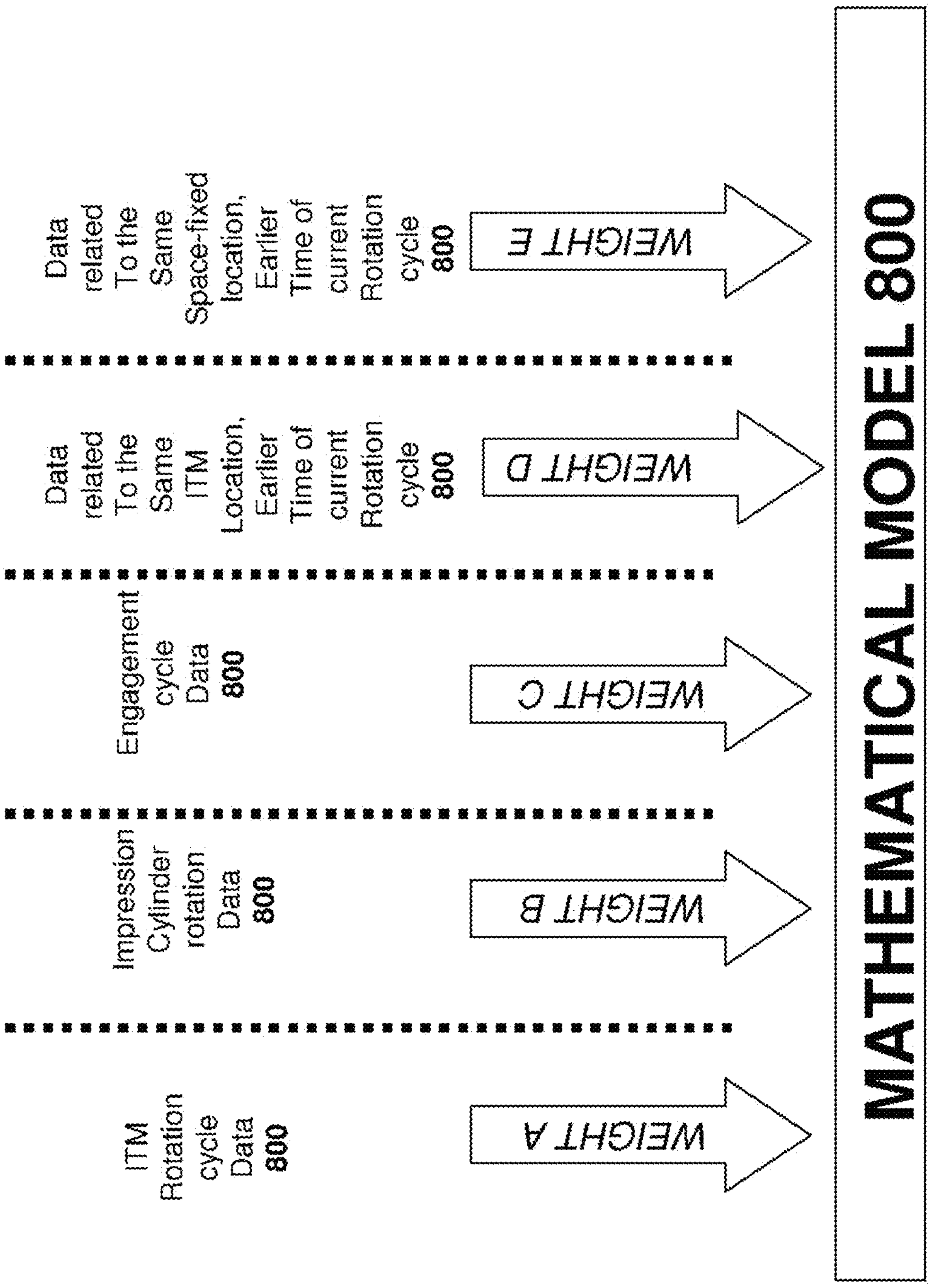
FIG. 29 is a graphical representation of input for a mathematical model.

As illustrated in FIG. 29, the mathematical model may incorporate data about operating cycles of the printing system—e.g. by assigning historical data at cycle-corresponding earlier times greater weight than would be assigned otherwise.

Embodiments of the present invention relate to techniques for regulating a rate or timing or frequency at which ink droplets are deposited on the rotating ITM in accordance with monitored fluctuations in local velocity at location(s) on the ITM and/or in accordance with monitored fluctuations in ITM shape and/or in accordance with monitored non-uniform ITM stretch. By monitoring and compensating for fluctuations in ITM property(ies), it is possible to mitigate or eliminating distortions in the ink image resulting therefrom.

One example of an ITM is a rotatable drum—for example, circular in shape. Another example of an ITM is a flexible blanket or belt—for example mounted to a drum or guided over a plurality of guide rollers. For example, the blanket or belt may follow a path defined by drive and guide rollers mounted on a support frame, and nip rollers may be arranged on the support frame opposite the impression cylinders, the nip rollers being selectively movable relative to the support frame to compress a substrate between the blanket or belt and the impression cylinders.

In one non-limiting example related to fluctuating rotational velocity, n external source of mechanical noise (e.g. due to an "ITM-impression cylinder cycle" discussed below or due to any other cause(s)) influences an ITM surface velocity. When superimposed upon an otherwise uniform, constant surface velocity, the mechanical noise may give rise to "jerky surface motion" of the rotating ITM rather than "smooth motion" which would be observed in the hypothetical absence of the mechanical noise. In one non-limiting example related to ITM shape fluctuations, the ITM may locally and alternately stretch and contract as it progresses—for example, so the distance between two neighbouring points on the ITM alternately (e.g. slightly and/or rapidly) increases and decreases. The local shape of the ITM may fluctuate differently at different locations on the ITM—for example, the distance may between neighboring blanket-fixed points A and B in a first ITM locale may fluctuate differently than the distance between neighboring blanket-fixed points C and D in a second ITM locale.

Embodiments of the present invention relate to apparatus and methods whereby the aforementioned ITM velocity fluctuations (i.e. temporal and/or location-dependent) and/or ITM shape fluctuations are monitored and/or are quantified and/or are mathematically modelled.

ITM may be determined in accordance with (i) the contents of the image to be formed on the transfer surface and (ii) the velocity of the ITM.

Consider a "featureless" image to be formed, by droplet deposition, on the ITM which consists only of uniformly-spaced dots. In conventional systems, in order to form by droplet deposition the "featureless image" on the ITM, ink droplets may be deposited at a constant rate on the rotating ITM. This constant ink droplet deposition rate may be a function only of the constant surface velocity of the rotating ITM and the desired uniform distance between dots.

In contrast to the "featureless image", when employing a conventional system to form, on the ITM, by droplet deposition, an image that has features and dot patterns that are not uniform (i.e. along the direction of rotation of the ITM), the droplet deposition rate may fluctuate in accordance with features of the image to be printed.

Once again, consider the aforementioned "featureless" image. In contrast to the conventional systems, in order to form the featureless image by droplet deposition on the ITM, it may be useful to consider fluctuations in surface velocity of the ITM (e.g. relatively rapid and/or slight fluctuations) when determining a rate (e.g. a rate which itself fluctuates—for example, rapidly) at which droplets are to be deposited on the rotating ITM in order to print an image thereon. In accordance with some embodiments of the present invention, when printing the aforementioned featureless image consisting only of uniformly spaced dots, the rate at which ink droplets are deposited on the rotating ITM is non-constant, and fluctuates in accordance with surface velocity fluctuations of the ITM.

It is also disclosed, in accordance with some embodiments, that the need to compensate for and/or incorporate fluctuations in the local surface velocity of the ITM is not limited to the specific case of the image consisting of uniformly-spaced dots. Thus, the rate at which ink droplets are deposited onto the ITM to form the ink image thereon may fluctuate according to both (i) image features and (ii) fluctuations in local velocity of the ITM.

In some embodiments, "rapid" shape or velocity fluctuation occurs over a time scale that is at most a few seconds or at most one second or at most half of a second or at most a few tenths of a second and/or at most the time required for the ITM to complete a single full rotation or at most the time required to complete 50% of a full rotation or at most the time required to complete 25% of a full rotation or at most the time required to complete 10% of a full rotation. For the present disclosure, when a velocity fluctuation is "slight", the local velocity deviates from the ITM-representative or average velocity by at most 5% or at most a few percent or at most 1% or at most one-half of one percent or at most a few tenths of a percent. When an ITM is subject to "slight" shape fluctuations, distances between pre-determined blanket-fixed locations on the ITM may fluctuate by at most 5% or at most a few percent or at most one-half of one percent or at most a few tenths of a percent.

In some embodiments, the printing system has multiple print bars separated from each other along a direction of ITM surface velocity. An ink image may be formed on the rotating ITM as follows: (i) first a relatively "low" resolution ink image (or portion thereof) is formed on the rotating ITM beneath the first print when ink droplets are deposited on ITM to form "dots" of the image thereon; and (ii) subsequently, the resolution of the low-resolution ink image on the rotating ITM may be increase by overlaying the low-resolution ink image on the ITM with additional image dots. The additional image dots are added to the ink image on the rotating ITM by ink droplet deposition beneath the second print bar at a location "downstream" from the first print bar along the direction of ITM rotation. In this case, the droplets may be deposited on the ink ITM beneath the second print bar (i.e. to increase the image resolution of the ink image on the rotating ITM) in a manner determined in accordance with the results of the monitoring and/or quantifying and/or modelling.

For example, time delays between (i) a time when image dots at a given location within the ink image are formed by droplet deposition by the first print bar; and (ii) a time when image dots at substantially the same given location within the ink image are formed by droplet deposition by the second print bar to increase an image resolution, may be regulated in accordance with the results of the monitoring and/or quantifying and/or modelling.

In some embodiments, ink droplets of a first color are deposited at the first print bar and ink droplets of a second color are deposited at the second print bar to effect a "color registration" operation. In some embodiments, the color registration operation may be carried out in accordance with the results of the monitoring and/or quantifying and/or modelling. For example, time delays between (i) a time when image dots at a given location within the ink image are formed by droplet deposition by the first print bar; and (ii) a time when image dots at substantially the same given location within the ink image are formed by droplet deposition by the second print bar to effect color registration, may be regulated in accordance with the results of the monitoring and/or quantifying and/or modelling.

As noted above, embodiments of the present invention relate to image transfer surfaces of ITMs where the ITM velocity and/or shape fluctuate in time. As such, the local velocity at different locations on the ITM may deviate from an average or representative ITM velocity. Ink droplets may be deposited in accordance with a magnitude of the velocity deviation between the local velocity and the average velocity. In non-limiting examples, the velocity and/or shape fluctuations of the ITM may be associated with one or more (i.e. any combination of) of a number of causes. In one example, the ITM may repeatedly engage to and disengage from an impression cylinder at which ink images are transferred to substrate to define an "ITM-impression cylinder engagement cycle." This "blanket-impression cylinder engagement cycle" may generate mechanical noise which is transmitted away from the engagement cylinder to different locations on the ITM. This mechanical noise may be superimposed upon a general uniform and constant velocity to cause the ITM to undergo some sort of "jerky" motion. If the blanket is flexible and/or stretchable, this mechanical noise may influence the local shape of different ITM locations differently.

Alternatively or additionally, in another non-limiting example, the mechanical or material properties of the blanket may vary at different locations on the ITM. For example, if the endless blanket is a so-called seamed blanket where two ends are joined together at a seam (e.g. for example, by a zipper) to form an endless belt, the ITM may be more elastic at locations away from the seam than at locations closer to the seam. Alternatively or additionally, the local mechanical properties of the ITM may be influenced by apparatus outside of the ITM—e.g. having a fixed location in the "space-fixed" reference frame (e.g. as opposed to the "blanket-fixed" rotating reference frame which is taken to rotate along with the blanket). For example, a belt may be guided or driven along by suitable rollers. At locations close to a driving roller, the local ITM velocity may be strongly influenced by a "no-slip" condition at the interface of the ITM with the roller—i.e. requiring the ITM to have a local velocity identical to that of the driving roller. Farther away from the driving roller, this no-slip condition may have less influence on ITM local velocity, which may exhibit a greater deviation from the velocity that would have been dictated by the roller. In yet another example, mechanical noise (e.g. from the engagement cycle with the impression cylinder) may have a greater influence on local ITM velocity at locations closer to the impression cylinder than at locations further away.

It is further possible to incorporate into the belt an electronic circuit, for example a microchip similar to those to be found in "chip and pin" credit cards, in which data may be stored. The microchip may comprise only read only memory, in which case it may be used by the manufacturer to record such data as where and when the belt was manufactured and details of the physical or chemical properties of the belt. The data may relate to a catalog number, a batch number, and any other identifier allowing providing information of relevance to the use of the belt and/or to its user. This data may be read by the controller of the printing system during installation or during operation and used, for example, to determine calibration parameters. Alternatively, or additionally, the chip may include random access memory to enable data to be recorded by the controller of the printing system on the microchip. In this case, the data may include information such as the number of pages or length of web that have been printed using the belt or previously measured belt parameters such as belt length, to assist in recalibrating the printing system when commencing a new print run. Reading and writing on the microchip may be achieved by making direct electrical contact with terminals of the microchip, in which case contact conductors may be provided on the surface of the belt. Alternatively, data may be read from the microchip using radio signals, in which case the microchip may be powered by an inductive loop printed on the surface of the belt.

The present invention and embodiments thereof can be used inter alia in connection with printing systems described in co-pending PCT applications of the Applicant Nos. PCT/IB2013/051716 (Agent's reference LIP 5/001 PCT), PCT/IB2013/051717 (Agent's reference LIP 5/003 PCT) and PCT/IB2013/051718 (Agent's reference LIP 5/006 PCT), which are included by reference as if fully set forth herein.

Discussion Related to Monitoring Operating of a Printing System

Embodiments of the present invention relate to apparatus and methods for monitoring operation of a printing system such as a digital printing system having an intermediate transfer member (e.g. a drum or a blanket guided over rollers, or mounted onto a rigid drum). In some embodiments, 'user-facing' features are disclosed herein—for example, printing system-related GUIs, alerting or alarm functionality related to printing system operation, a printing system having a multi-function movable display screen, and novel display screen features.

Figure 30:
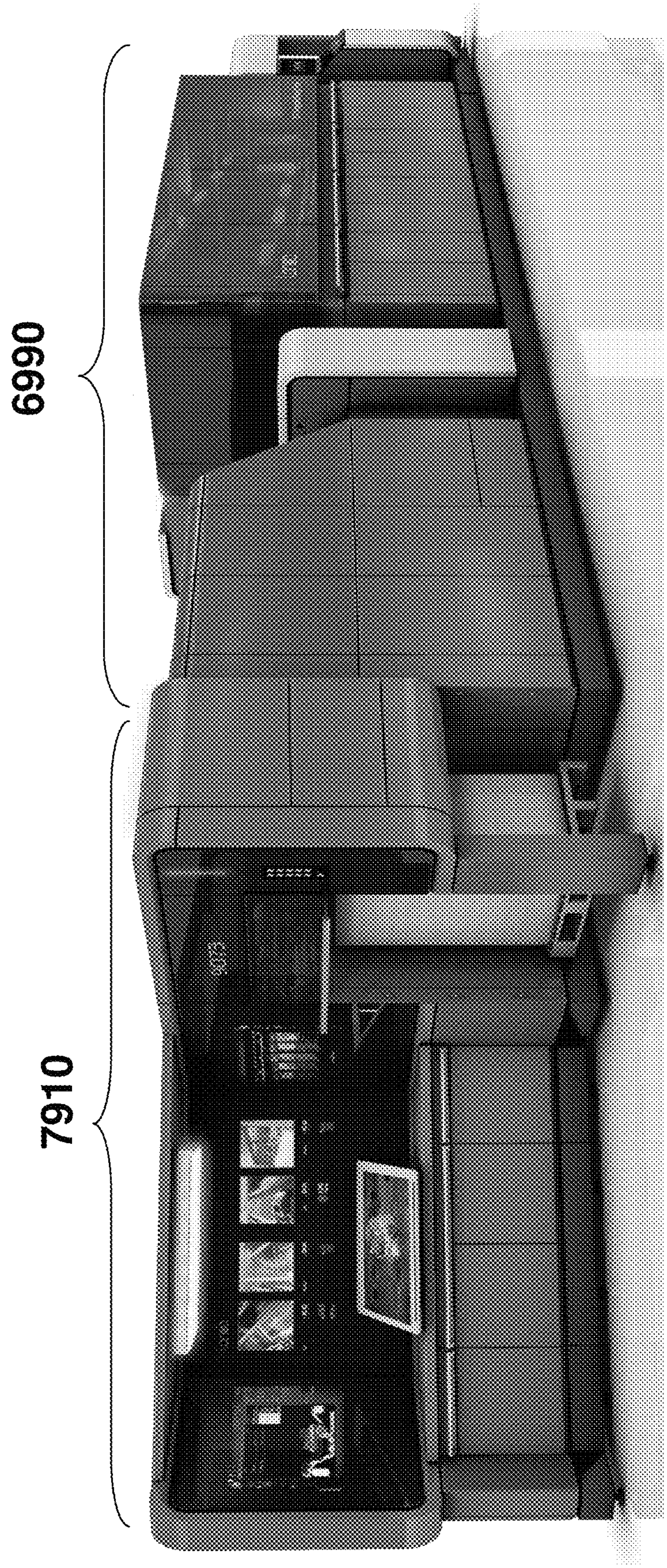
FIG. 30 illustrates a digital printing system including a monitoring station for presenting information about a printing system.
Figure 31A:
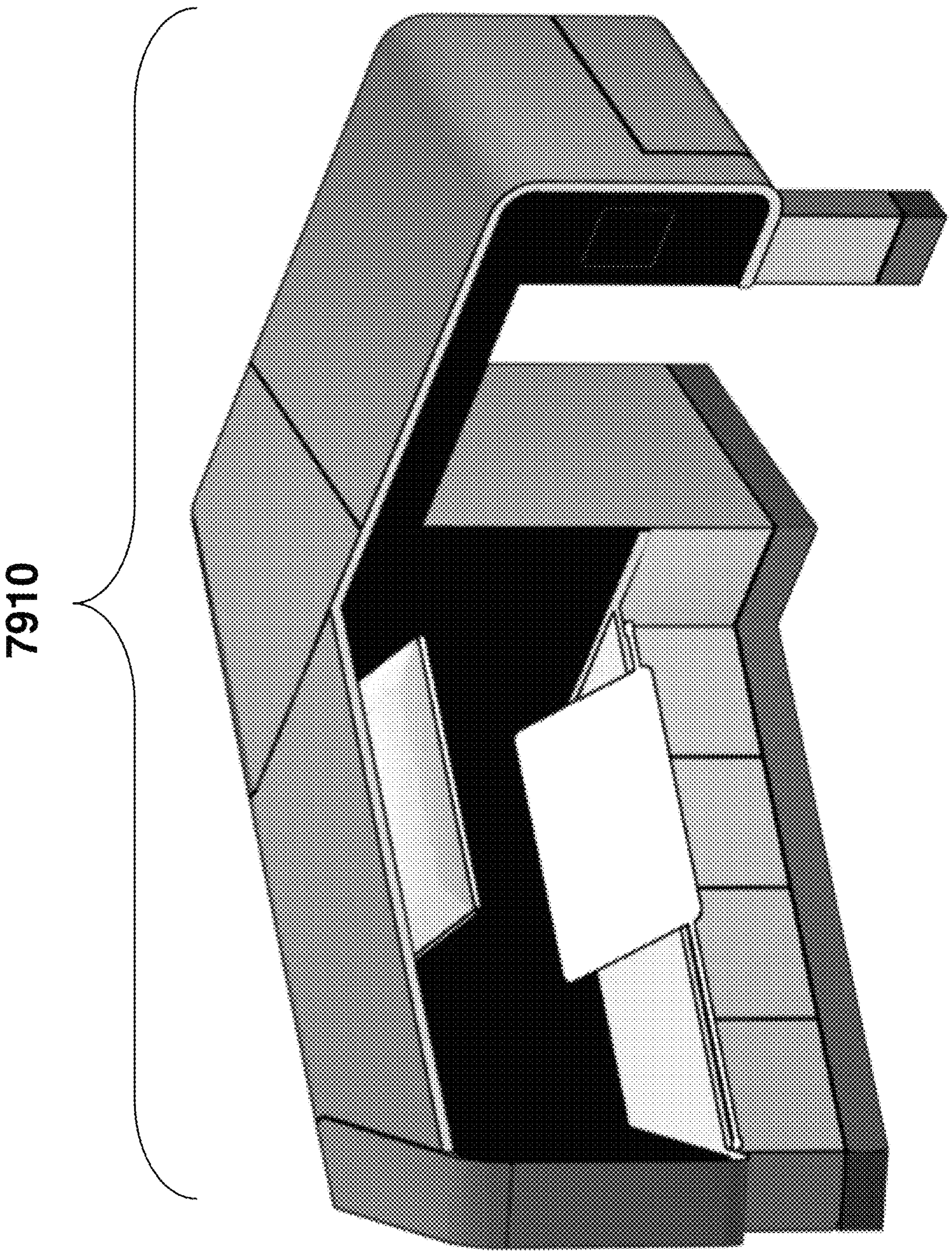
FIGS. 31A-31B and 32 illustrate the monitoring station.
Figure 31B:
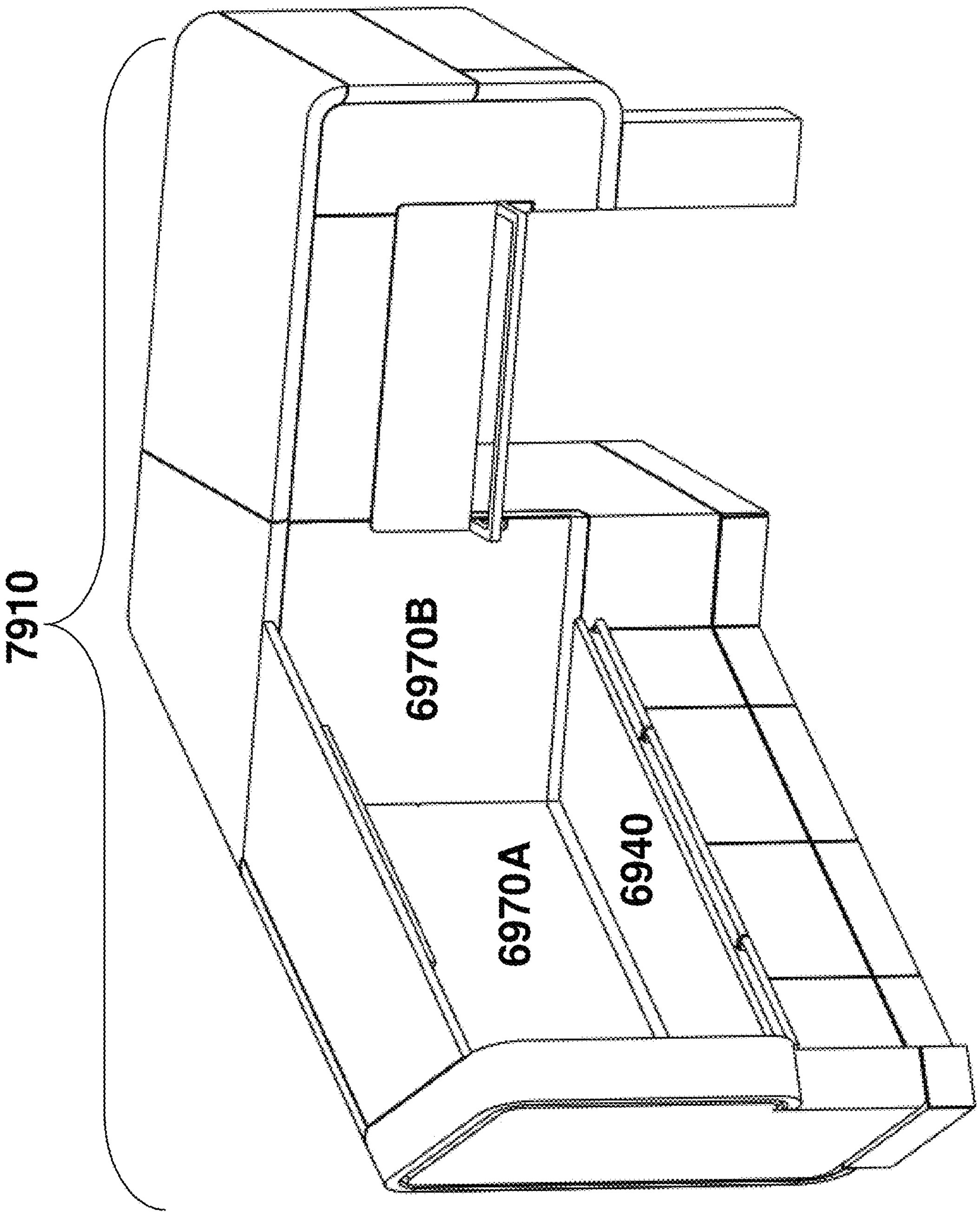

FIG. 30 illustrates a digital printing system 6990 including a monitoring station 61910 for presenting information about printing system 6990. As shown in FIGS. 31A-31B, monitoring station 7910 includes inspection table 6940 and a plurality of display screens 6970A-6970B.

Figure 32:
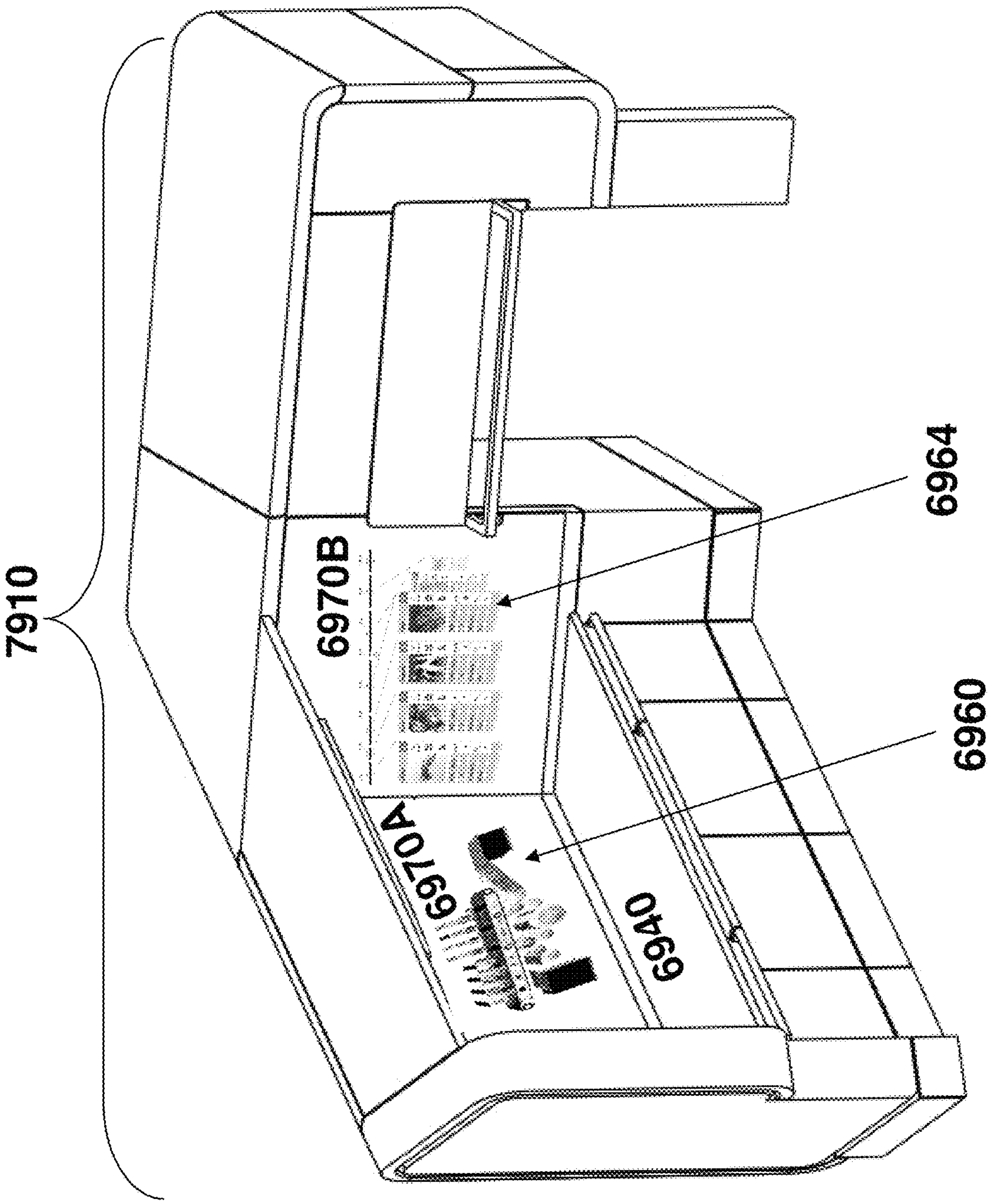
Figure 33:
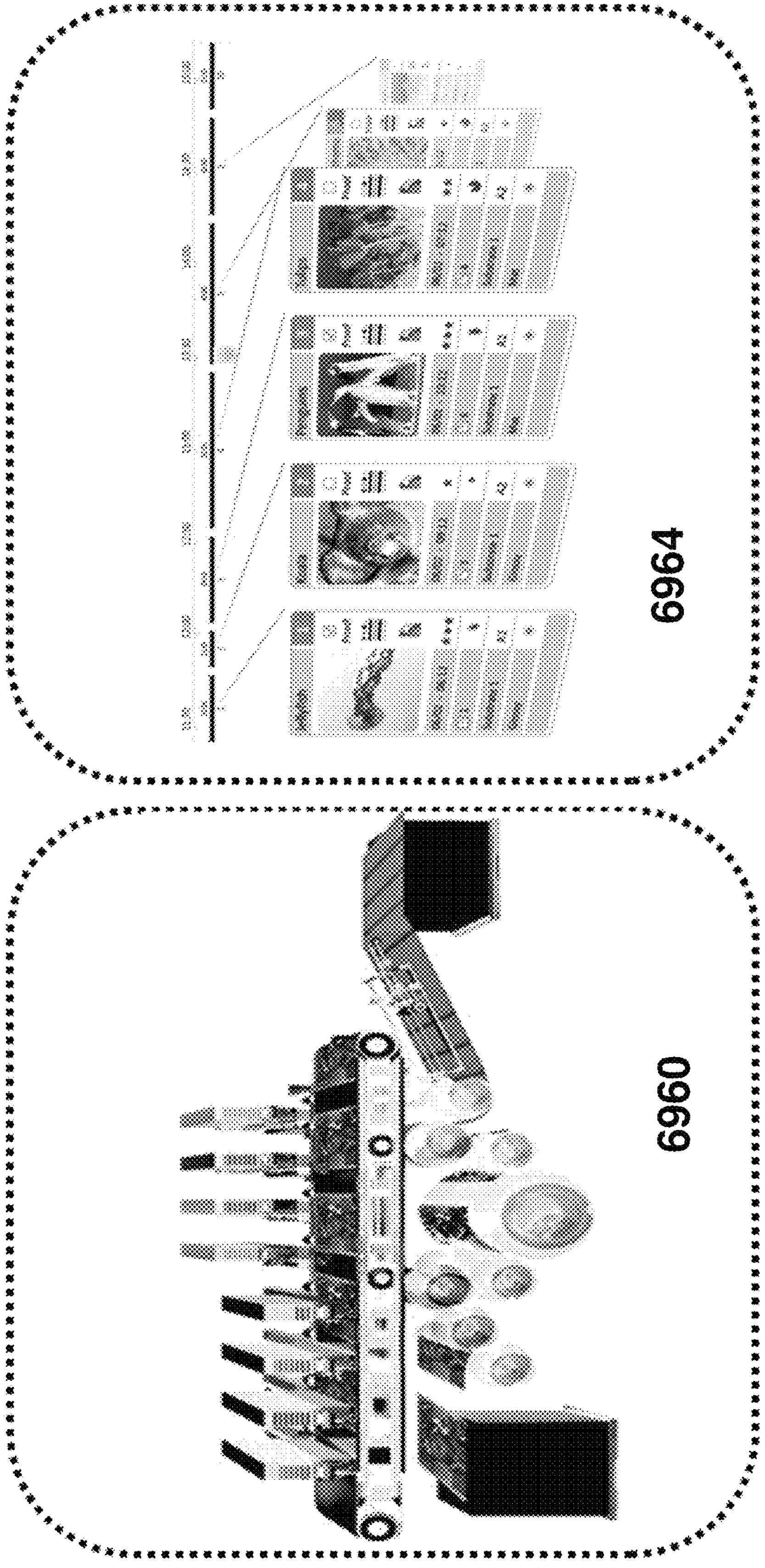
FIG. 33 illustrates various GUIs (graphic user interfaces) describing operation of a printing system.

In the example of FIGS. 32-33, a plurality of GUIs describing past, present and/or future operation of printing system 6990 are displayed on display screens 6970A-6970B. On display screen 6970A is a machine-oriented GUI 6960 described below with reference to FIGS. 39-44, while on display screen 6970B is a timeline GUI 6964 described below with reference to FIGS. 36-37.

Although not a requirement, some embodiments are discussed in the context of a digital printing system where the intermediate transfer member is a flexible blanket. FIGS. 34-38 describe sheet fed and web fed examples of such a printing system.

FIGS. 32-33 and 39-45B relate to a machine-oriented GUI 6960 for visualizing operation of the printing system. As discussed below, various 'reversed augmented reality' features may be provided for visualization and control of the digital printing system. Alternatively or additionally, as illustrated in FIGS. 32-33, 46A-46B and 47B, a time-line-based GUI 6964 describing queued print jobs may be provided.

FIGS. 47 and FIGS. 50-52 relate to a large display screen 6970 configured to display information about the printing system 6990 (e.g. having or lacking an intermediate transfer member). The example of FIGS. 47A-47B and FIGS. 50-52 illustrate an alternate configuration that differs from the configuration illustrated in FIGS. 30-32.

Figure 50:
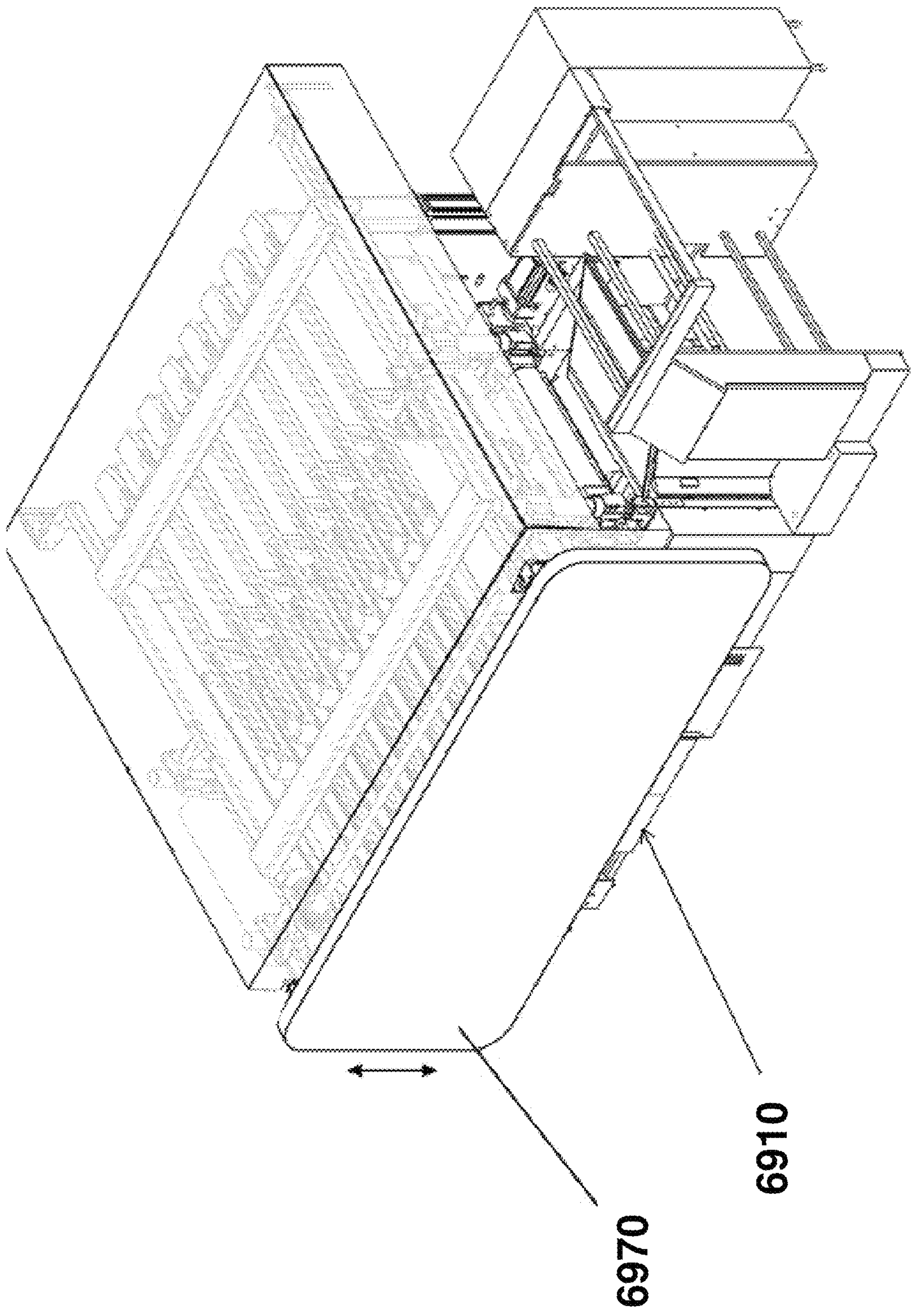
FIGS. 50 and 52 illustrate a printing system in a configuration where a large screen thereof is disposed so as to block access to the substrate transport system and/or to the intermediate transfer member.
Figure 51A:
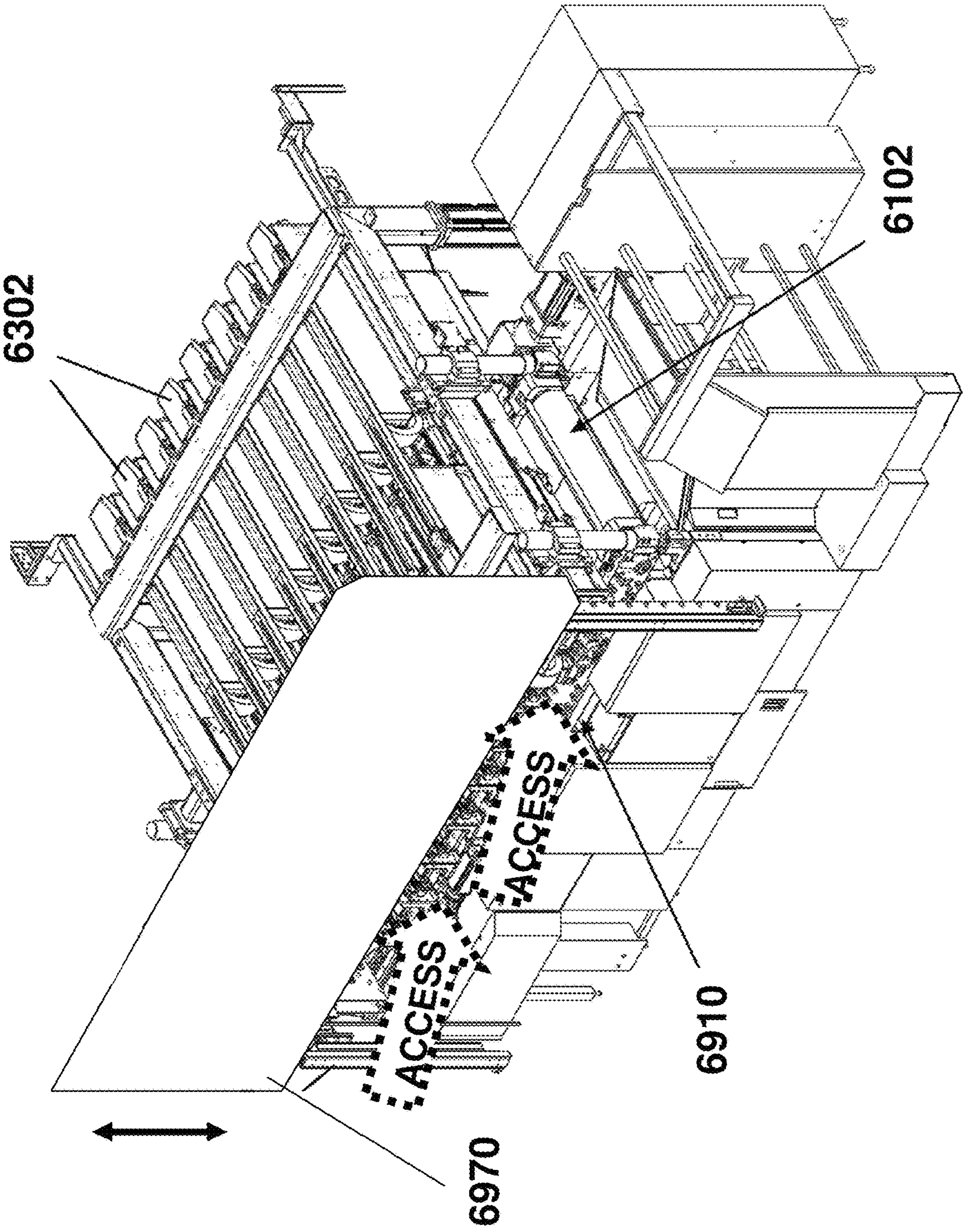
FIGS. 51A and 51B illustrate a printing system in a configuration where a large screen thereof is disposed so as to allow access to the substrate transport system and/or to the intermediate transfer member.
Figure 51B:
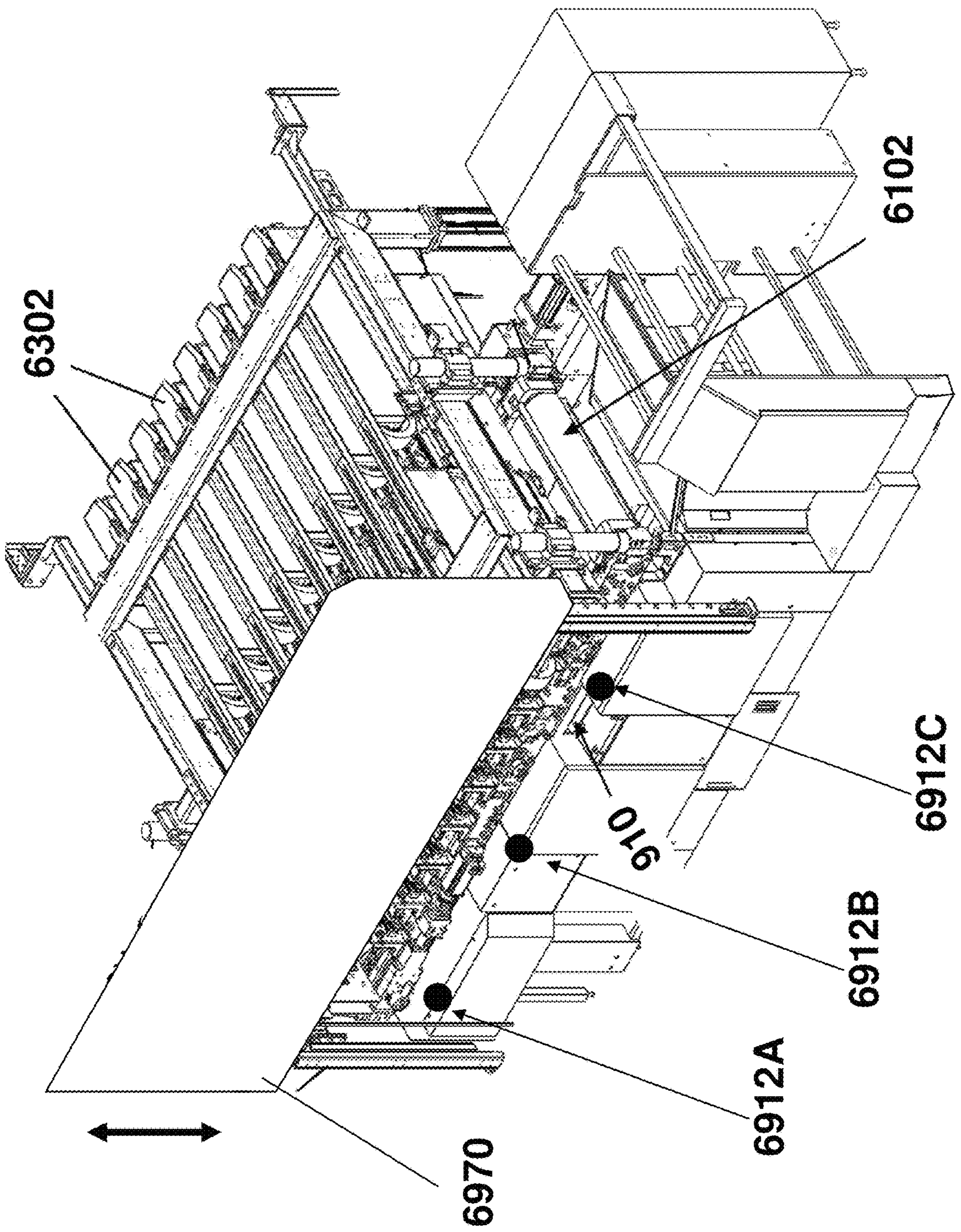
Figure 52:
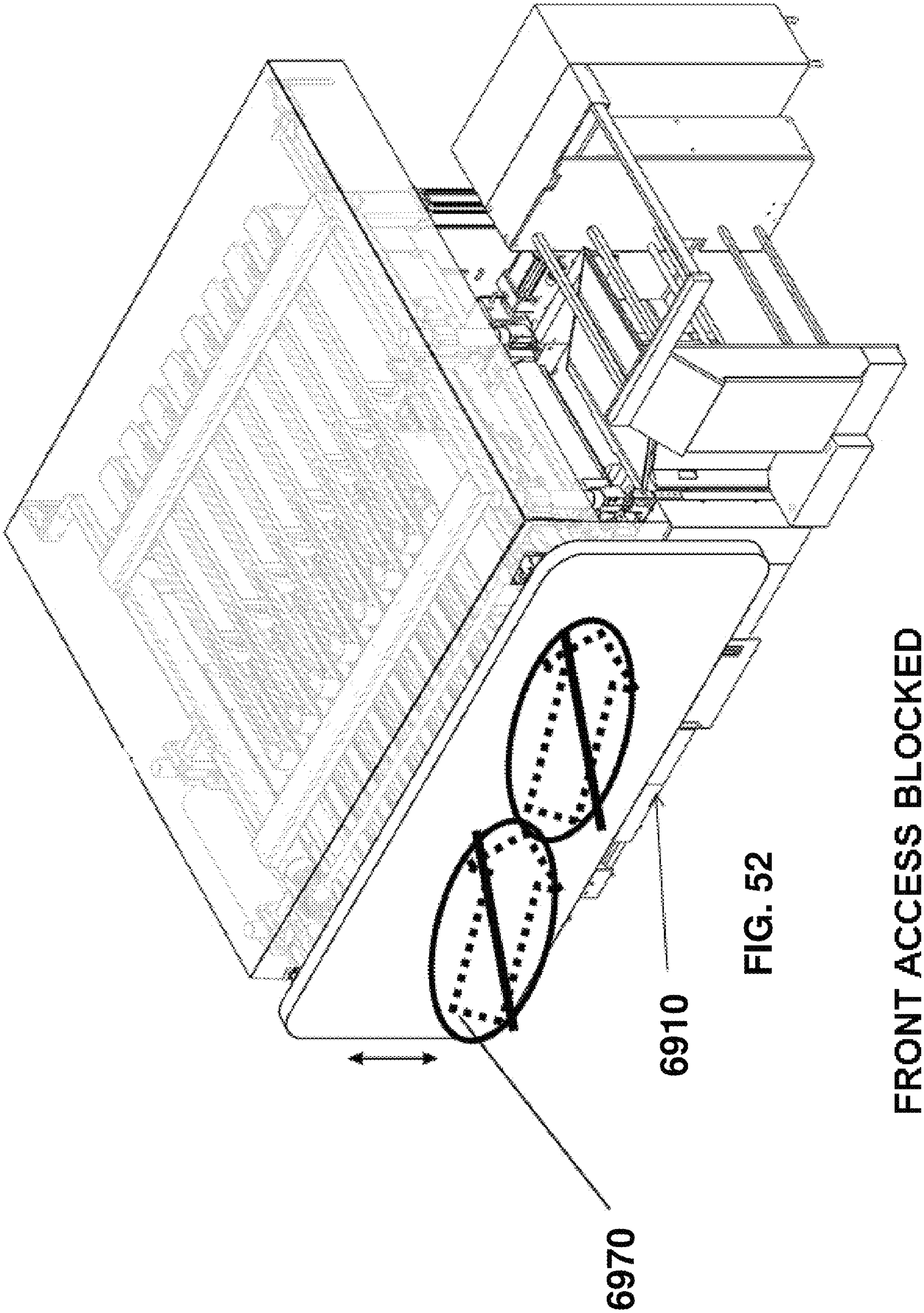

In some embodiments, as illustrated in FIGS. 50-52, the display screen 6970 may be movable so that: (i) when the display screen 6970 is in a first position/orientation (see FIG. 50), the screen blocks front access to a substrate transport system or an image transfer location thereof; (ii) translational and/or rotational movement of the display screen 6970 from the first position/orientation to a second position/orientation (see FIG. 51) opens front access to the substrate transport system or to the image transfer location thereof.

In some embodiments, as discussed below with reference to FIGS. 53-55, the display screen may include one or more features for achieving the illusion of a display system having a front panel with no obvious means of support. Although the display screen providing this illusion is discussed in the context of printing system-mounted display screens, the skilled artisan would appreciate that this is not a limitation.

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage. For the present disclosure 'electronic circuitry' is intended broadly to describe any combination of hardware, software and/or firmware.

Electronic circuitry may include any executable code module (i.e. stored on a computer-readable medium) and/or firmware and/or hardware element(s) including but not limited to field programmable logic array (FPLA) element(s), hard-wired logic element(s), field programmable gate array (FPGA) element(s), and application-specific integrated circuit (ASIC) element(s). Any instruction set architecture may be used including but not limited to reduced instruction set computer (RISC) architecture and/or complex instruction set computer (CISC) architecture. Electronic circuitry may be located in a single location or distributed among a plurality of locations where various circuitry elements may be in wired or wireless electronic communication with each other.

In various embodiments, an ink image is first deposited on a surface of an intermediate transfer member, and transferred from the surface of the intermediate transfer member to a substrate (i.e. sheet substrate or web substrate). For the present disclosure, the terms 'intermediate transfer member' and 'image transfer member' are synonymous, and may be used interchangeably.

For the present disclosure, the terms 'substrate transport system' and 'substrate handling system' are used synonymous, and refer to the mechanical systems for moving substrate.

'Indirect' printing systems or indirect printers include an intermediate transfer member. One example of an indirect printer is a digital press. Another example is an offset printer.

The location at which the ink image is transferred to substrate is defined as the 'image transfer location.' It is appreciated that for some printing devices, there may be a plurality of 'image transfer locations.'

A Discussion of FIGS. 34-38: Description of One Example of an Indirect Printing System The printing system shown in FIGS. 34-35 essentially comprises three main components or subsystems, namely a blanket conveyer system 6100, an image forming station 6300 above the blanket conveyer system 6100 and a substrate transport system 6500 below the blanket conveyer system 6100. Some portions of the image forming station and substrate transport system are shown in more detail in FIG. 38. It is appreciated that the indirect printing system of FIGS. 34-38 is just an example, and in other examples the intermediate transfer member may be a rigid drum or a blanket mounted thereon.

In the non-limiting examples of FIGS. 34-38, blanket conveyer system 6100 comprises an endless belt or blanket 6102 that acts as an intermediate transfer member and is guided over two rollers 6104, 6106. An image made up of dots of an ink is applied by image forming station 6300 to an upper run of blanket 6102. A lower run selectively interacts at two impression stations with two impression cylinders 6502 and 6504 of the substrate transport system 6500 to impress an image onto a substrate compressed between the blanket 6102 and the respective impression cylinder 6502, 6504. As will be explained below, the purpose of there being two impression cylinders 6502, 6504 is to permit duplex printing. The printing system in FIGS. 34-35 can produce double sided prints, images being impressed on opposite sides of the substrate at the two impression cylinders, and it can also produce single sided prints at twice the speed of duplex printing. In the non-limiting example of FIGS. 34-35, duplex printing is carried out by multiple impression cylinders. Alternatively, duplex printing may be performed by a single impression cylinder. In operation, ink images, each of which is a mirror image of an image to be impressed on a final substrate, are printed by an image forming station 6300 onto the upper run of blanket 6102. In this context, the term 'run' is used to mean a length or segment of the blanket between any two given rollers over which is the blanket is guided. While being transported by the blanket 6102, the ink is heated to dry it by evaporation of most, if not all, of the liquid carrier. The ink image is furthermore heated to render tacky the film of ink solids remaining after evaporation of the liquid carrier, this film being referred to as a residue film, to distinguish it from the liquid film formed by flattening of each ink droplet. At the impression cylinders 6502, 6504 the image is impressed onto individual sheets of a substrate which are conveyed by substrate transport system 6500 from an input stack 6506 to an output stack 6508 via the impression cylinders 6502, 6504. In the alternative embodiment of FIG. 38, the substrate is a continuous web.

Image Forming Station

In an embodiment of the invention, the image forming station 6300 comprises print bars 6302 each slidably mounted on a frame 6304 positioned at a fixed height above the surface of the blanket 6102. Each print bar 6302 may comprise a strip of print heads as wide as the printing area on the blanket 6102 and comprises individually controllable print nozzles. The image forming station can have any number of bars 6302, each of which may contain an ink of a different color.

Blanket and Blanket Support System

The blanket 6102, in one embodiment of the invention, is seamed. In particular, the blanket is formed of an initially flat strip of which the ends are fastened to one another to form a continuous loop, optionally in a releasable manner. In some embodiments, the releasable fastening may be a zip fastener or a hook and loop fastener that lies substantially parallel to the axes of rollers 6104 and 6106 over which the blanket is guided. In order to avoid a sudden change in the tension of the blanket as the seam passes over these rollers, it may be possible to incline the fastener relative to the axis of the roller but this would be at the expense of enlarging the non-printable image area.

The primary purpose of the blanket is to receive an ink image from the image forming station and to transfer that image dried but undisturbed to the impression stations. To allow easy transfer of the ink image at each impression station, the blanket may have a release layer upon which the ink is to be deposited. The selection of a suitable release layer depends on the inks to be used and on certain operating parameters of the printing system. The release layer may be optionally further treated, for example to increase its ability to receive an ink image and/or to facilitate the transfer of the dried image therefrom.

The strength of the blanket can be derived from a reinforcement layer. In one embodiment, the reinforcement layer is formed of a fabric. If the fabric is woven, the warp and weft threads of the fabric may have a different composition or physical structure so that the blanket should have, for reasons to be discussed below, greater elasticity in its widthways direction (parallel to the axes of the rollers 6104 and 6106) than in its lengthways direction.

The blanket may comprise additional layers between the reinforcement layer and the release layer, for example to provide conformability of the release layer to the surface of the substrate, to act as a thermal reservoir or a thermal partial barrier and/or to allow an electrostatic charge to the applied to the release layer. An inner layer may further be provided to control the frictional drag on the blanket as it is rotated over its support structure. Additional layers may be used to connect or adhere between the release and reinforcement layers and any other layer the blanket may comprise.

Figure 36:
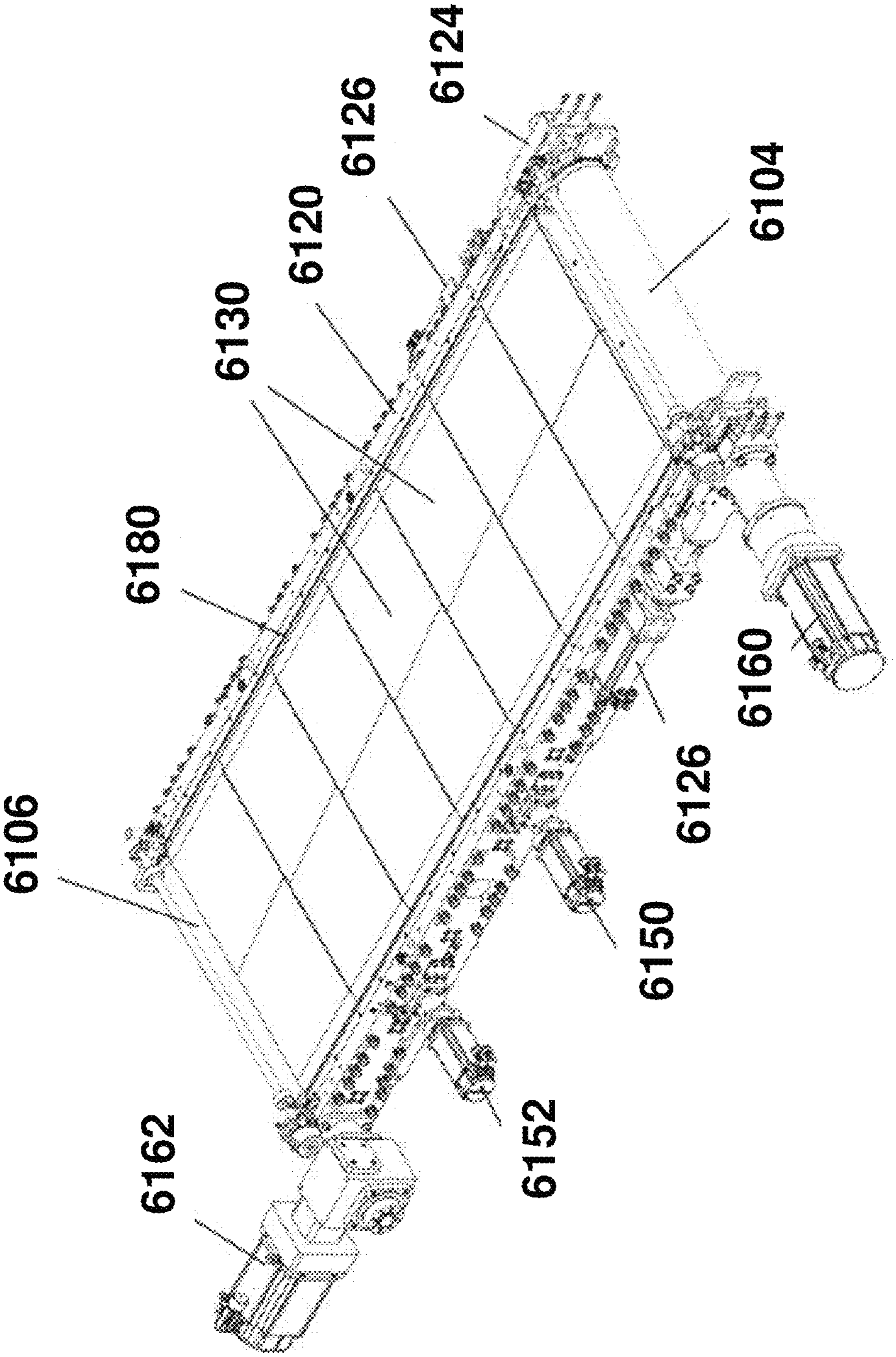
FIGS. 36-37 illustrate an exemplary support system for a blanket conveyer.
Figure 37:
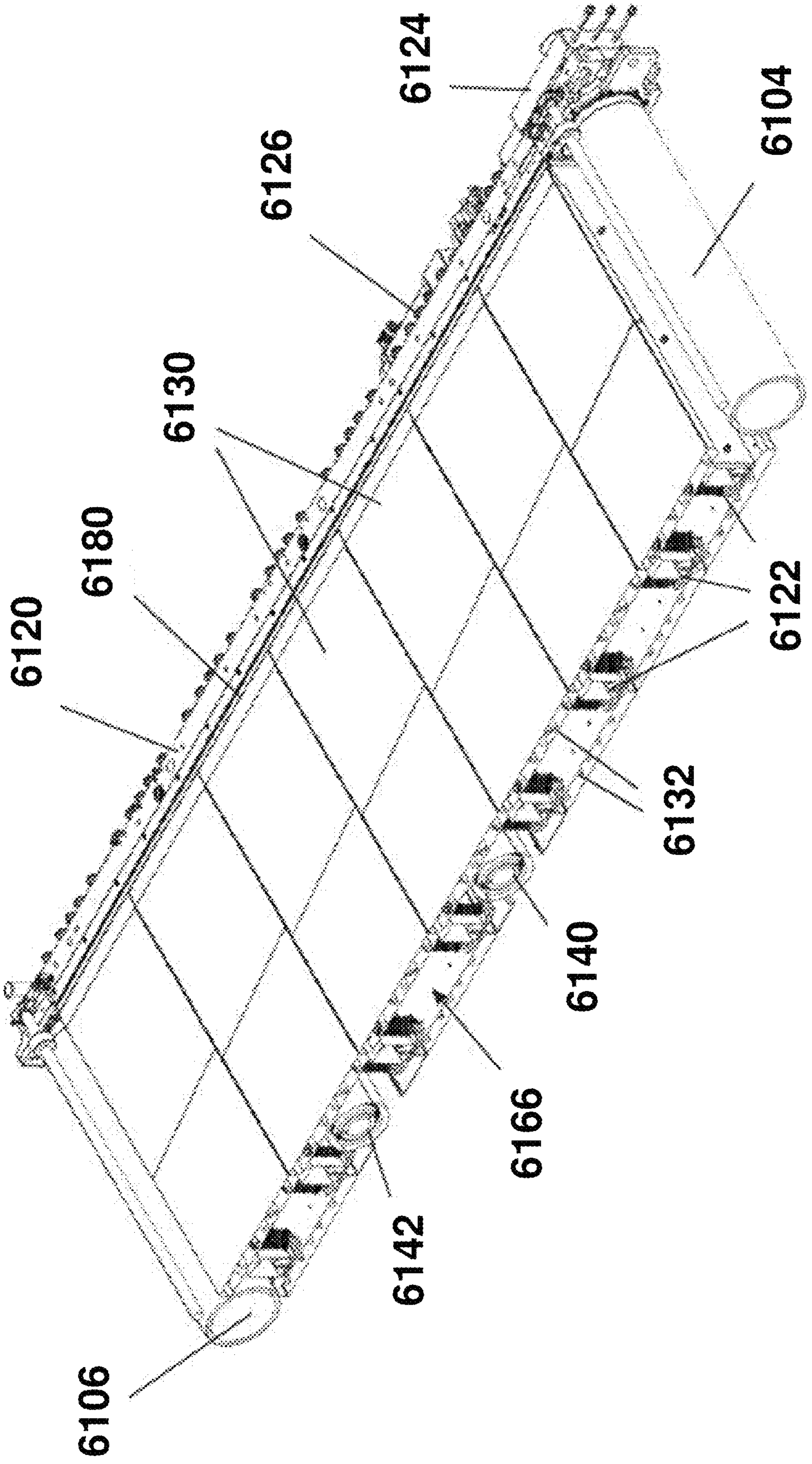

The structure supporting the blanket is shown in FIGS. 36-37. Two elongate outriggers 6120 are interconnected by a plurality of cross beams 6122 to form a horizontal ladder-like frame on which the remaining components are mounted.

The roller 6106 is journalled in bearings that are directly mounted on outriggers 6120. At the opposite end, however, roller 6104 is journalled in pillow blocks 6124 that are guided for sliding movement relative to outriggers 6120. Motors 6126, for example electric motors, which may be stepper motors, act through suitable gearboxes to move pillow blocks 6124, so as to alter the distance between the axii of rollers 6104 and 6106, while maintaining them parallel to one another.

Thermally conductive support plates 6130 are mounted on cross beams 6122 to form a continuous flat support surface both on the top and bottom sides of the support frame. The junctions between the individual support plates 6130 are intentionally offset from each other (e.g. zigzagged) in order not to create a line running parallel to the length of the blanket 6102. Electrical heating elements 6132 are inserted into transverse holes in plates 6130 to apply heat to the plates 6130 and through plates 6130 to the upper run of blanket 6102. Other means for heating the upper run will occur to the person of skill in the art and may include heating from below, above of within the blanket itself.

Also mounted on the blanket support frame are two pressure or nip rollers 6140, 6142. The pressure rollers are located on the underside of the support frame in gaps between the support plates 6130 covering the underside of the frame. Pressure rollers 6140, 6142 are aligned respectively with impression cylinders 6502, 6504 of the substrate transport system, as shown most clearly in FIG. 35.

Each of the pressure rollers 6140, 6142 is preferably mounted so that it can be raised and lowered from the lower run of the blanket. In one embodiment each pressure roller is mounted on an eccentric that is rotatable by a respective actuator 6150, 6152. When it is raised by its actuator to an upper position within the support frame, each pressure roller is spaced from the opposing impression cylinder, allowing the blanket to pass by the impression cylinder without making contact with neither the impression cylinder itself nor with a substrate carried by the impression cylinder. On the other hand, when moved downwards by its actuator, each pressure roller 6140, 6142 projects downwards beyond the plane of the adjacent support plates 6130 and deflects the blanket 6102, forcing it against the opposing impression cylinder 6502, 6504. In this lower position, it presses the lower run of the blanket against a substrate being carried on the impression roller (or the web of substrate in the embodiment of FIG. 38). An alternative configuration is described in PCT Publication No. WO 2013/132420 of the same Applicant, incorporated herein by reference in its entirety.

Figure 35:
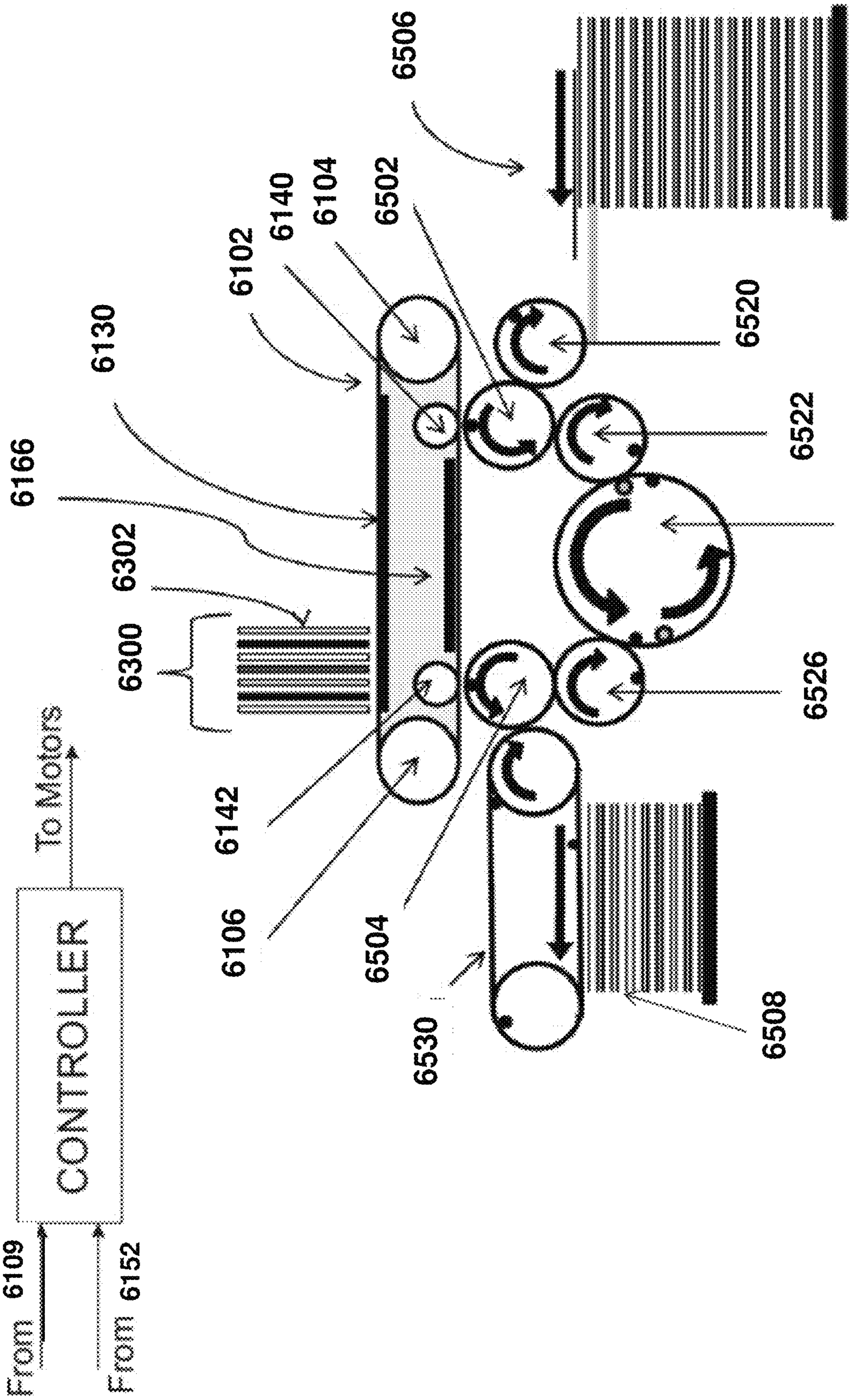
FIG. 35 is a schematic vertical section through the printing system of FIG. 4.

Rollers 6104 and/or 6106 may be connected to respective electric motors 6160, 6162 as viewed in FIG. 36, to drive the blanket clockwise as illustrated in FIG. 35.

It should be understood that in an embodiment of the invention, pressure rollers 6104 and 6106 can be independently lowered and raised such that either both or only one of the rollers is in the lower position.

In an embodiment of the invention, a fan or air blower (not shown) is mounted on the frame to maintain a sub-atmospheric pressure in the volume 6166 bounded by the blanket and its support frame. The negative pressure serves to maintain the blanket flat against the support plates 6130 on both the upper and the lower side of the frame, in order to achieve good thermal contact. If the lower run of the blanket is set to be relatively slack, the negative pressure would also assist in and maintaining the blanket out of contact with the impression cylinders when the pressure rollers 6140, 6142 are not actuated.

In an embodiment of the invention, each of the outriggers 6120 also supports a continuous track 6180, which engages formations on the side edges of the blanket to maintain the blanket taut in its widthways direction. The formations may be the teeth of one half of a zip fastener attached to the side edge of the blanket and the track may be of a cross-section suitable to receive the teeth.

In order for the image to be properly formed on the blanket and transferred to the final substrate and for the alignment of the front and back images in duplex printing to be achieved, a number of different elements of the system must be properly synchronized. In order to properly position the images on the blanket, the position and speed of the blanket must be both known and controlled. In an embodiment of the invention, the blanket is marked at or near its edge with one or more marking(s) spaced in the direction of motion of the blanket. One or more sensors 6107, shown schematically on FIG. 35, senses the timing of these markings as they pass the sensor. The speed of the blanket and the speed of the surface of the impression rollers should be the same, for proper transfer of the images to the substrate from the transfer blanket. Signals from sensor 6107 are sent to a controller 6109 which also receives an indication of the speed of rotation and angular position of the impression rollers, for example from encoders on the axis of one or both of the impression rollers (not shown). Sensor 6107, or another sensor (not shown), also determines the time at which the seam of the blanket passes the sensor. For maximum utility of the usable length of the blanket, it is desirable that the images on the blanket start as close to the seam as feasible.

The controller controls the electric motors 6160 and 6162 to ensure that linear speed of the blanket is the same as the speed of the surface of the impression rollers.

Because the blanket contains an unusable area at the seam, it is important to ensure that this area always remain in the same position relative to the printed images in consecutive cycles of the blanket. Also, it is preferable to ensure that whenever the seam passes the impression cylinder, it should always coincide with a time when an interruption in the surface of the impression cylinder (accommodating the substrate grippers to be described below) faces a pressure cylinder.

In order to achieve this, the length of the blanket should be set to a whole number multiple of the circumference of the impression cylinders 6502, 6504. Since the length of the blanket changes with time, the position of the seam relative to the impression rollers may be changed by momentarily changing the speed of the blanket. When synchronism is again achieved, the speed of the blanket is again adjusted to match that of the impression rollers, when it is not engaged with the impression cylinders 6502, 6504. The length of the blanket can be determined from a shaft encoder measuring the rotation of one of rollers 6104, 6106 during one sensed complete revolution of the blanket.

The controller also controls the timing of the flow of data to the print bars.

This control of speed, position and data flow ensures synchronization between image forming station 6300, substrate transport system 6500 and blanket conveyer system 6100 ensures that the images are formed at the correct position on the blanket for proper positioning on the final substrate. The position of the blanket is monitored by means of one or more markings on the surface of the blanket that are detected by one or more sensors mounted at different positions along the length of the blanket. The output signals of these sensors are used to indicate the position of the image transfer surface to the print bars. Analysis of the output signals of the sensors is further used to control the speed of the motors 6160 and 6162 to match that to the impression cylinders 6502, 6504.

As its length is a factor in synchronization, the blanket may be constructed so as to resist stretching and creep. In the transverse direction, on the other hand, the blanket may be constructed so as to maintain the blanket flat taut without creating excessive drag due to friction with the support plates 6130.

Ink Image Heating

The heaters 6132 inserted into the support plates 6130 are used to heat the blanket to a temperature that may vary depending on various factors such as the composition of the inks and of the release layer. In one non-limiting example, this temperature may be between 50° C. and 180° C. The temperature of the body of blankets 6102 having relatively high thermal capacity and low thermal conductivity, will not change significantly as it moves between the image forming station and the impression station(s). To apply heat at different rates to the ink image carried by the transfer surface, external heaters or energy sources (not shown) may be used to apply additional energy locally, for example prior to reaching the impression stations to render the ink residue tacky, prior to the image forming station to dry the wetting agent and at the image forming station to start evaporating the carrier from the ink droplets as soon as possible after they impact the surface of the blanket.

Substrate Transport Systems

Figure 34:
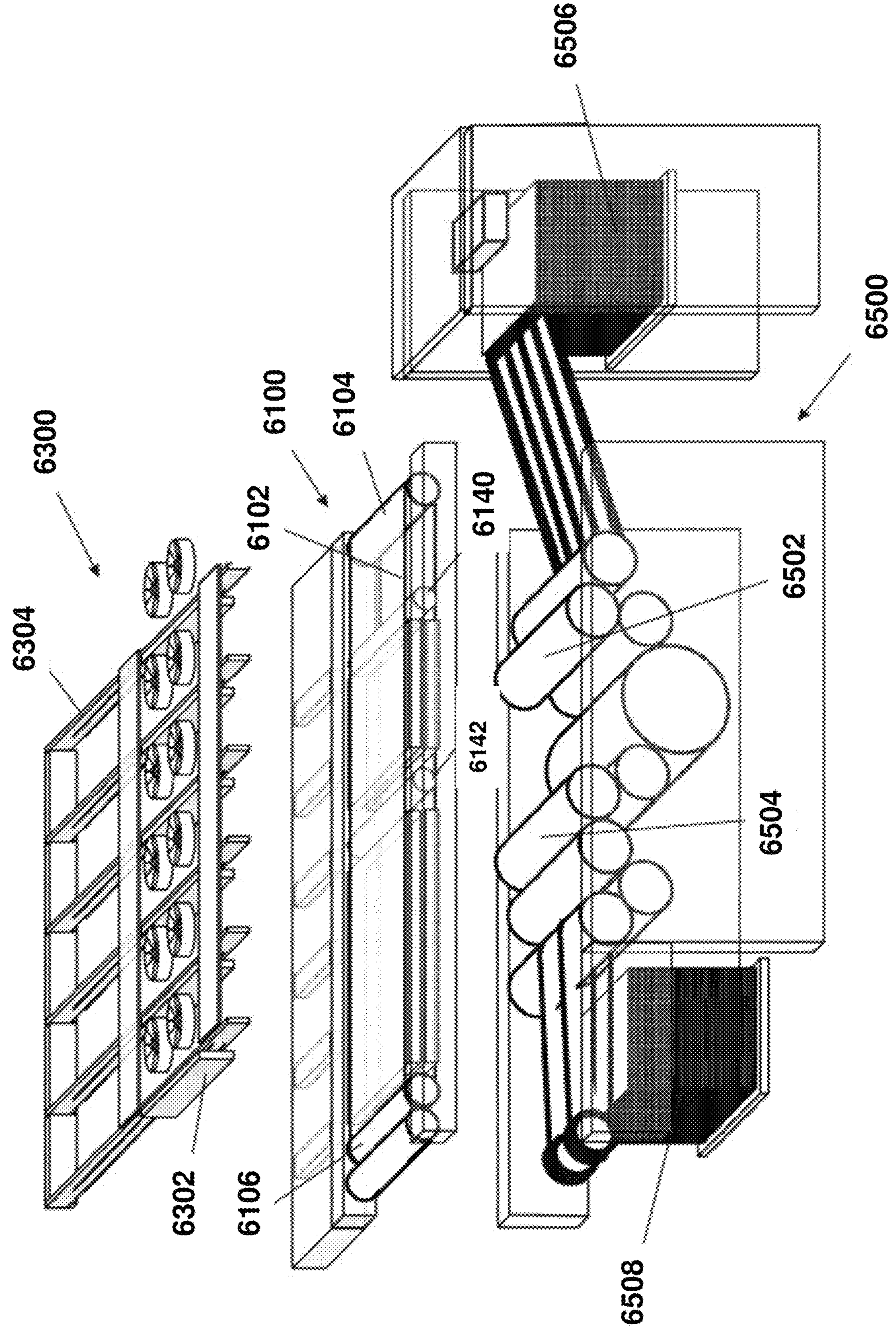
FIG. 34 is an exploded schematic perspective view of a printing system.
Figure 38:
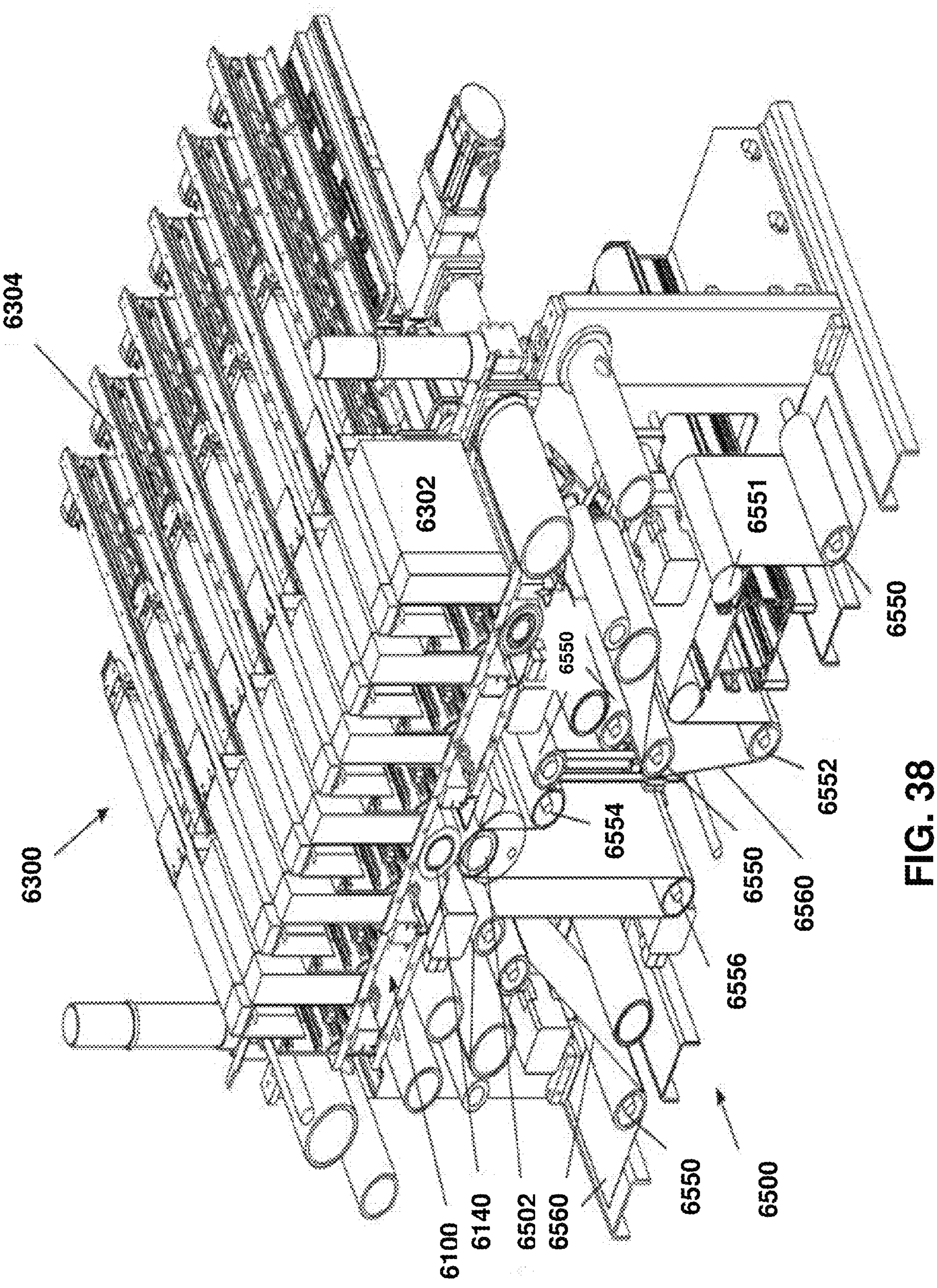
FIG. 38 illustrates an exemplary web-based printing system.

The substrate transport may be designed as in the case of the embodiment shown in FIGS. 34-35 to transport individual sheets of substrate to the impression stations or, as is shown in FIG. 38, to transport a continuous web of the substrate.

In the case of FIGS. 34-35, individual sheets are advanced, for example by a reciprocating arm, from the top of an input stack 6506 to a first transport roller 6520 that feeds the sheet to the first impression cylinder 6502.

Though not shown in the drawings, but known per se, the various transport rollers and impression cylinders may incorporate grippers that are cam operated to open and close at appropriate times in synchronism with their rotation so as to clamp the leading edge of each sheet of substrate. In an embodiment of the invention, the tips of the grippers at least of impression cylinders 6502 and 6504 are designed not to project beyond the outer surface of the cylinders to avoid damaging blanket 6102.

After an image has been impressed onto one side of a substrate sheet during passage between impression cylinder 6502 and blanket 6102, the sheet is fed by a transport roller 6522 to a perfecting cylinder 6524 that has a circumference that is twice as large as the impression cylinders 6502, 6504. The leading edge of the sheet is transported by the perfecting cylinder past a transport roller 6526, of which the grippers are timed to catch the trailing edge of the sheet carried by the perfecting cylinder and to feed the sheet to second impression cylinder 6504 to have a second image impressed onto its reverse side. The sheet, which has now had images printed onto both its sides, is advanced by a belt conveyor 6530 from second impression cylinder 6504 to output stack 6508.

As the images printed on the blanket are always spaced from one another by a distance corresponding to the circumference of the impression cylinders, in embodiments of the present invention the distance between the two impression cylinders 6502 and 6504 is also set to be equal to the circumference of the impression cylinders 6502, 6504 or a multiple of this distance. The length of the individual images on the blanket is of course dependent on the size of the substrate not on the size of the impression cylinder.

In the embodiment shown in FIG. 38, a web 6560 of the substrate is drawn from a supply roll (not shown) and passes over a number of guide rollers 6550 with fixed axes and stationary cylinders 6551 that guide the web past the single impression cylinder 6502.

Some of the rollers over which the web 6560 passes do not have fixed axes. In particular, on the in-feed side of the web 6560, a roller 6552 is provided that can move vertically. By virtue of its weight alone, or if desired with the assistance of a spring acting on its axle, roller 6552 serves to maintain a constant tension in web 6560. If, for any reason, the supply roller offers temporary resistance, roller 6552 will rise and conversely roller 6552 will move down automatically to take up slack in the web drawn from the supply roll.

At the impression cylinders, web 6560 is required to move at the same speed as the surface of the blanket. Unlike the embodiment described above, in which the position of the substrate sheets is fixed by the impression rollers, which assures that every sheet is printed when it reaches the impression rollers, if the web 6560 were to be permanently engaged with blanket 6102 at the impression cylinder 6502, then much of the substrate lying between printed images would need to be wasted.

To mitigate this problem, there are provided, straddling impression cylinder 6502, two dancers 6554 and 6556 that are motorized and are moved up and down in opposite directions in synchronism with one another. After an image has been impressed on the web, pressure roller 6140 is disengaged to allow the web 6560 and the blanket to move relative to one another Immediately after disengagement, dancer 6554 is moved downwards at the same time as the dancer 6556 is moved up. Though the remainder of the web continues to move forward at its normal speed, the movement of dancers 6554 and 6556 has the effect of moving a short length of the web 6560 backwards through the gap between impression cylinder 6502 and blanket 6102 from which it is disengaged. This is done by taking up slack from the run of web following impression cylinder 6502 and transferring it to the run preceding the impression cylinder. The motion of the dancers is then reversed to return them to their illustrated position so that the section of web at the impression cylinder is again accelerated up to the speed of the blanket. Pressure roller 6140 can now be re-engaged to impress the next image on the web but without leaving large blank areas between the images printed on the web.

FIG. 38 shows a printing system having only a single impression roller, for printing on only one side of a web. To print on both sides a tandem system can be provided, with two impression rollers and a web inverter mechanism in between the impression rollers to allow turning over the web for double sided printing. Alternatively, if the width of the blanket exceeds twice the width of the web, it is possible to use the two halves of the same blanket and impression cylinder to print on the opposite sides of different sections of the web at the same time.

A Discussion of FIGS. 39-45B: A Description of Reverse Augmented Reality GUI 6960 Describing Operation of a Printing System Having an Intermediate Transfer Member Embodiments of the present invention relate to computer-simulation or virtual-reality-like tools and techniques for visualizing information about operation of a real-world printing system where real-world ink images are (i) first formed on a rotating intermediate transfer member 6102 (e.g. a rigid drum or a blanket mounted thereto or a blanket guided over a plurality of guide rollers—for example, a flexible blanket or belt) and (ii) subsequently transferred therefrom to a substrate (e.g. sheet substrate or web substrate). The real-world printing system may include a substrate transport system 6500 (e.g. for sheet or web substrate) having multiple cylinders and configured for cooperating with the intermediate transfer member in order to transfer real-world ink images resident on the real-world intermediate transfer member from the real-world intermediate transfer member to the real-world substrate.

The real-world ink image as it appears on the rotating intermediate transfer member 6102 is a mirror-image of the real-world ink image after it is transferred from the transfer member to the substrate.

As will be explained below, the term ‘real world’ refers to physical mechanical parts of the printing system or to physical ink images as opposed to their ‘virtual counterparts’ which either relate to stored computer data or to a computer-graphics description of a real world item visually displayed (e.g. on a display screen).

In some embodiments, computer graphics representations of (i) the real-world rotating intermediate transfer member 6102 and (ii) the substrate transport system 6500 may be displayed to a user on a display screen 6970. It is possible to superimpose on the aforementioned computer graphics representations (i.e. on display screen) (i) live video feeds from camera(s) aimed at locations within substrate transport system and (ii) an animation of images in motion along the rotating intermediate transfer member 6102.

In this sense, the presently-disclosed interface may, in some embodiments, be considered a ‘reverse augmented reality’ or hybrid display interface combining a virtual-world-like description of printing system operation (i.e. including the graphics representations and the computer animation) with real-world video superimposed thereon.

As discussed below with reference to FIGS. 41A-43D, in some embodiments the real-world video may be acquired by one or more cameras 6993 directed at relevant locations relative to the printing system. Each camera generates a different respective video feed of events in a real world location and this video feed, within the machine-oriented GUI 6960 is displayed in a position and orientation that matches its real-world counterpart.

Thus, in some embodiments the presently disclosed user interface allows the user to view a live description of vital press functions including but not limited to substrate feeding, image transfer, substrate delivery, and image formation on a rotating ‘blanket’ or intermediate transfer element. This may be used for any purpose including but not limited to quality control and service related tasks.

Figure 39:
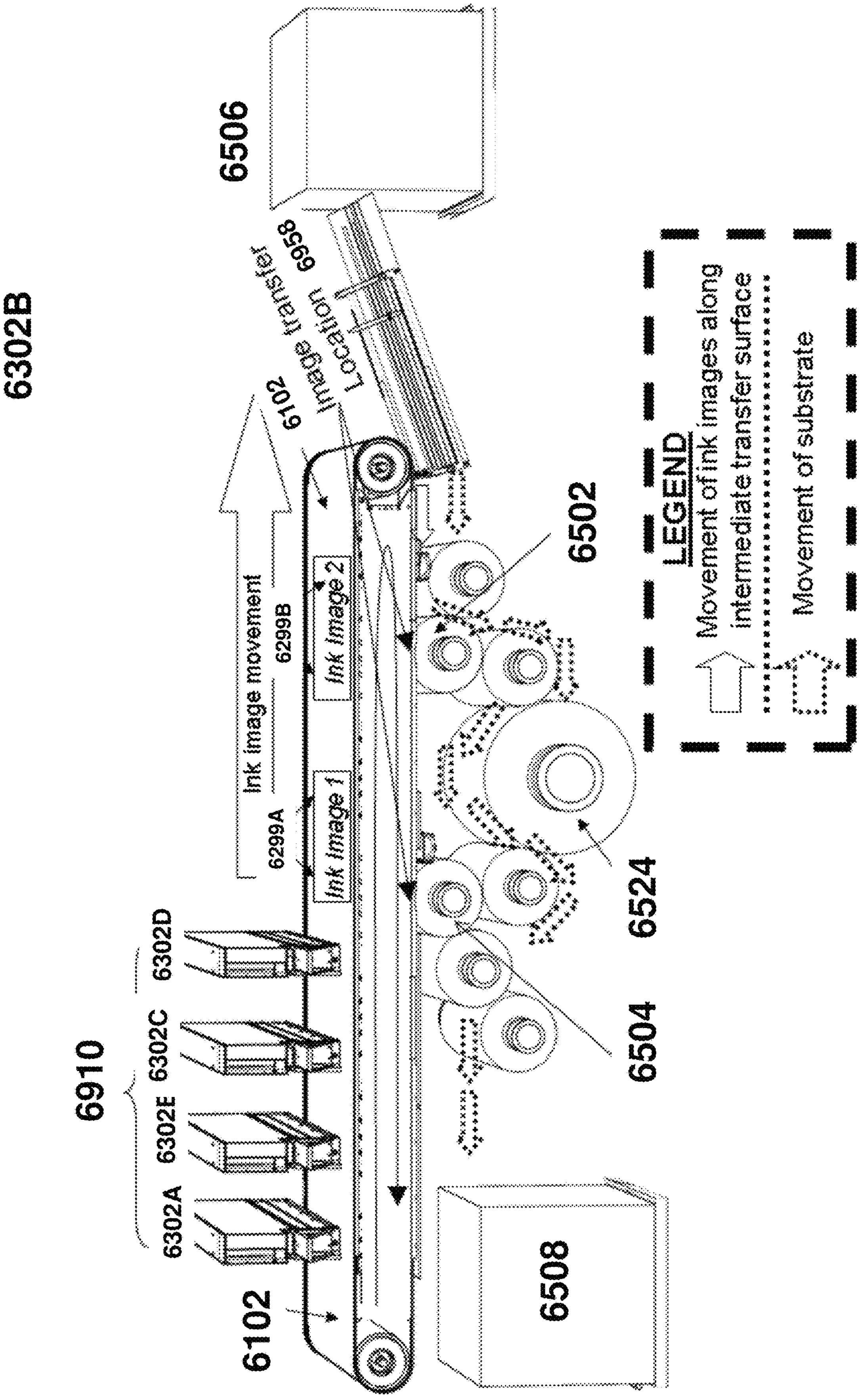
FIG. 39 illustrates a movement of ink images and a movement of substrate in an indirect printing system.

FIG. 39 is a drawing of a real-world printing system where ink images 6299 formed at a real-world image-forming station move along the surface of the rotating intermediate transfer member 6102 to a real-world image transfer location 6958 which is determined by a location of a real-world impression cylinder 6502. Also illustrated in FIG. 39 is a path of movement of a substrate defined by the broken arrows.

Figure 40:
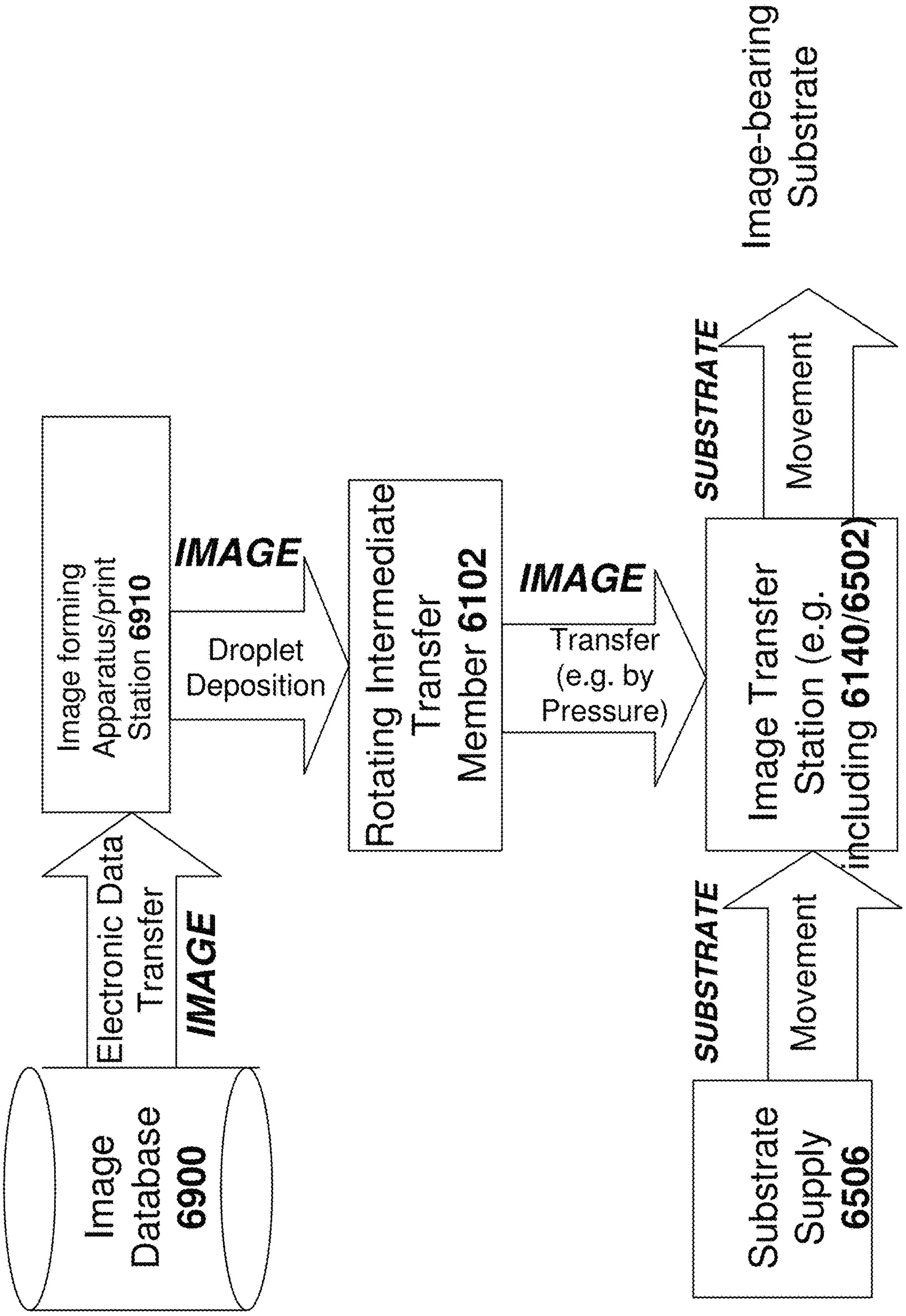
FIG. 40 is a block diagram of an indirect printing system.

FIG. 40 illustrates a flow chart of how digital images initially resident in image database 6900 (e.g. implemented using any combination of volatile and/or non-volatile memory or storage—the term ‘database’ is defined broadly) end up on physical substrate to form a physical-image-bearing physical substrate. Thus, real-world image-forming apparatus or print station 6300 (e.g. comprising real-world print bars 6302) deposits ink droplets onto a moving (e.g. rotating) intermediate transfer member 6102 according to contents of the image database 6900 in order to form an ink image whose content matches the electronic image data resident within image database 6900. This physical ink image on the physical transfer member 6102 is eventually transferred to a physical substrate (e.g. web or sheet) fed from substrate supply 6506 at a physical image transfer station 6958. The substrate then moves away from the image transfer station according to a substrate path (e.g. see the dotted arrows of FIG. 39)—e.g. to an output stack 6508.

In some embodiments, the digital image of the image database may be associated with a 'digital image queue' (e.g. displayed using time-line interface 6964)—in the order in which the images are to be printed. For example, when printing a book, the images may be printed in forward or reserve order of the pages. Every time an image is printed it is removed from the print queue. Every time a request or command to print another image is generated, one or more images may be added to the print queue. Therefore the print queue is dynamic and has a 'state' at any given moment of time Images in the database 6900 that are 'currently' in the print queue are designated for future printing.

For the present disclosure, a 'substantially current image' is an image that is either (i) an image that is currently being printed and resides on the rotating intermediate transfer member 6102 or on a substrate traveling within substrate transport system 6500; or (ii) an image 'queued' for printing in the near future—i.e. within the next 5 minutes or 1 minute or seconds or 10 seconds or 1 second. In some embodiments, the set of 'substantially current images' include images that have been recently printed (i.e. within the last 5 minutes or 1 minute or 30 seconds or 10 seconds or 1 second).

Embodiments of the present invention relate to 'hybrid' user interfaces for visualizing one or more of the aforementioned processes and/or any other aspect of printing system operation. In some embodiments, it is possible to: (i) display an illustration or computer graphic of the printing system or system(s) thereof (e.g. substrate transport system 6500 or intermediate transfer member 6102)—e.g. rather than a photograph thereof; (ii) to augment this 'virtual' representation with moving images of an animation of images (i.e. photographed ink images or images from database 900) along a surface of the intermediate transfer member 6102.

Figure 41A:
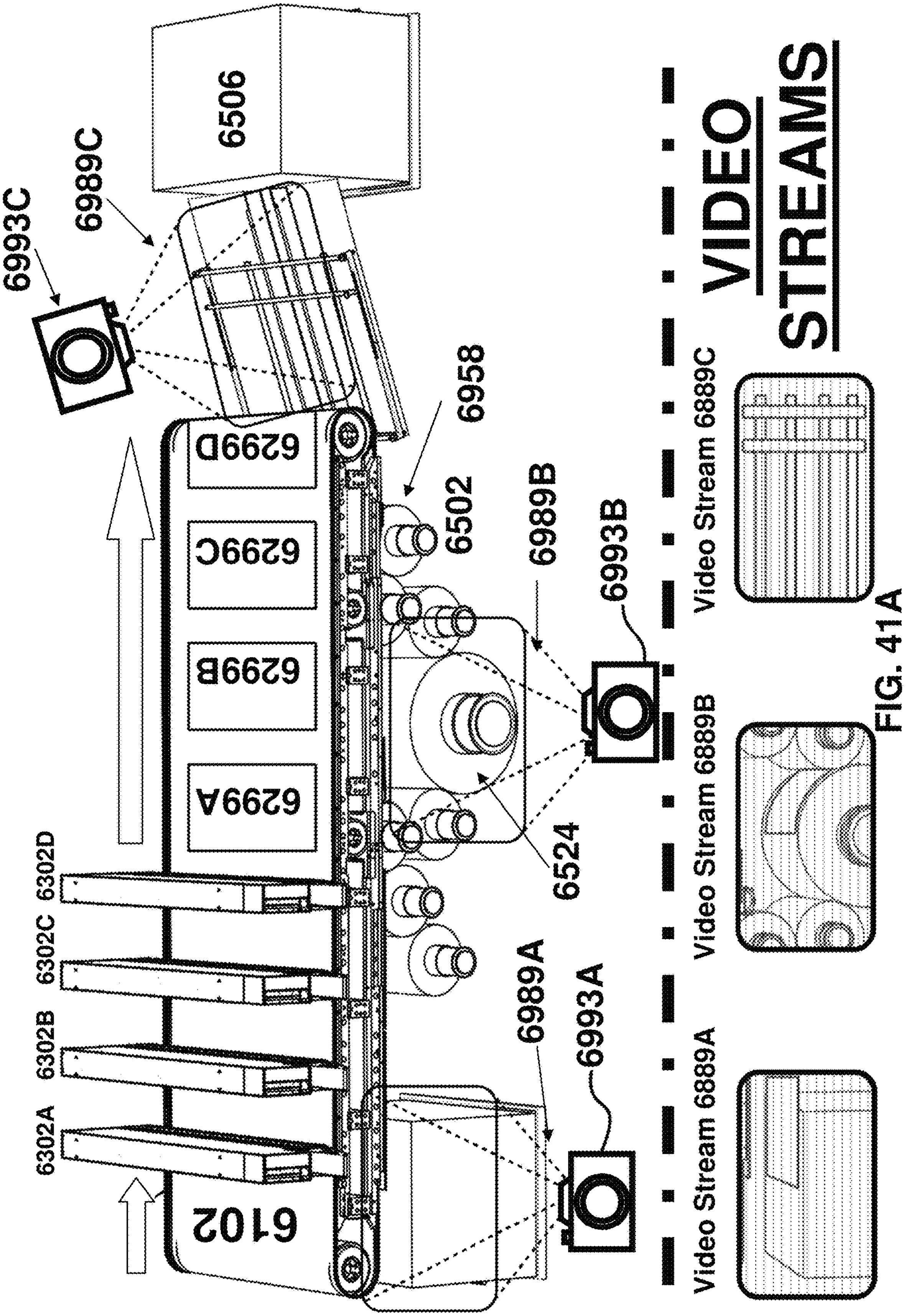
FIGS. 41A-42B illustrate an indirect printing system including mounted cameras.
Figure 41B:
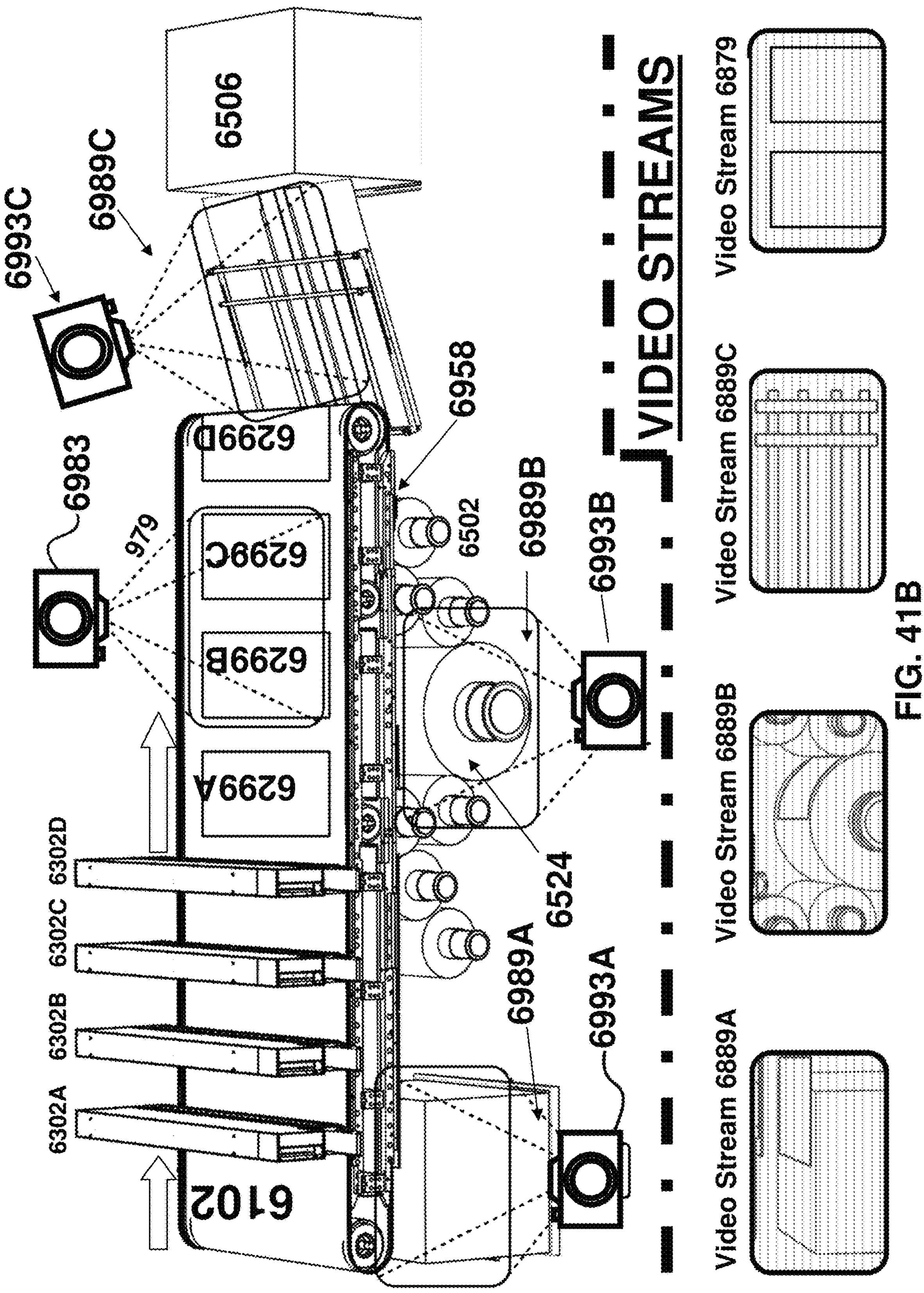

The graphic representation of the moving images on the intermediate transfer member 6102 of the animation may be taken from image database 6900 or may be taken from a photograph (e.g. still photograph or video feed). In the example of FIG. 41B a camera 6983 aimed upon intermediate transfer member 6102 in a field of view 6979 may acquire a video image of a physical ink image on the physical intermediate transfer member 6102. In the example of FIG. 41A, there is no such camera and a digital image from database 6900 may be animated (see FIGS. 42-43).

FIGS. 41A-41B illustrate printing system machines where a plurality of video cameras 6993 are aimed at locations/fields of view 6989 at or near a physical substrate path (e.g. defined in FIG. 39 by the broken arrows). In the example of FIG. 41A, (i) camera 6993A is aimed at field of view 6989A so as to generate video stream 6889A; (ii) camera 6993A is aimed at field of view 6989B so as to generate video stream 6889B; and (iii) camera 6993C is aimed at field of view 6989C so as to generate video stream 6889C. In FIG. 41B, an additional camera 6983 is present for acquiring video images of real-world ink images 6299 in motion on the surface of the intermediate transfer member 6102.

Figure 42A:
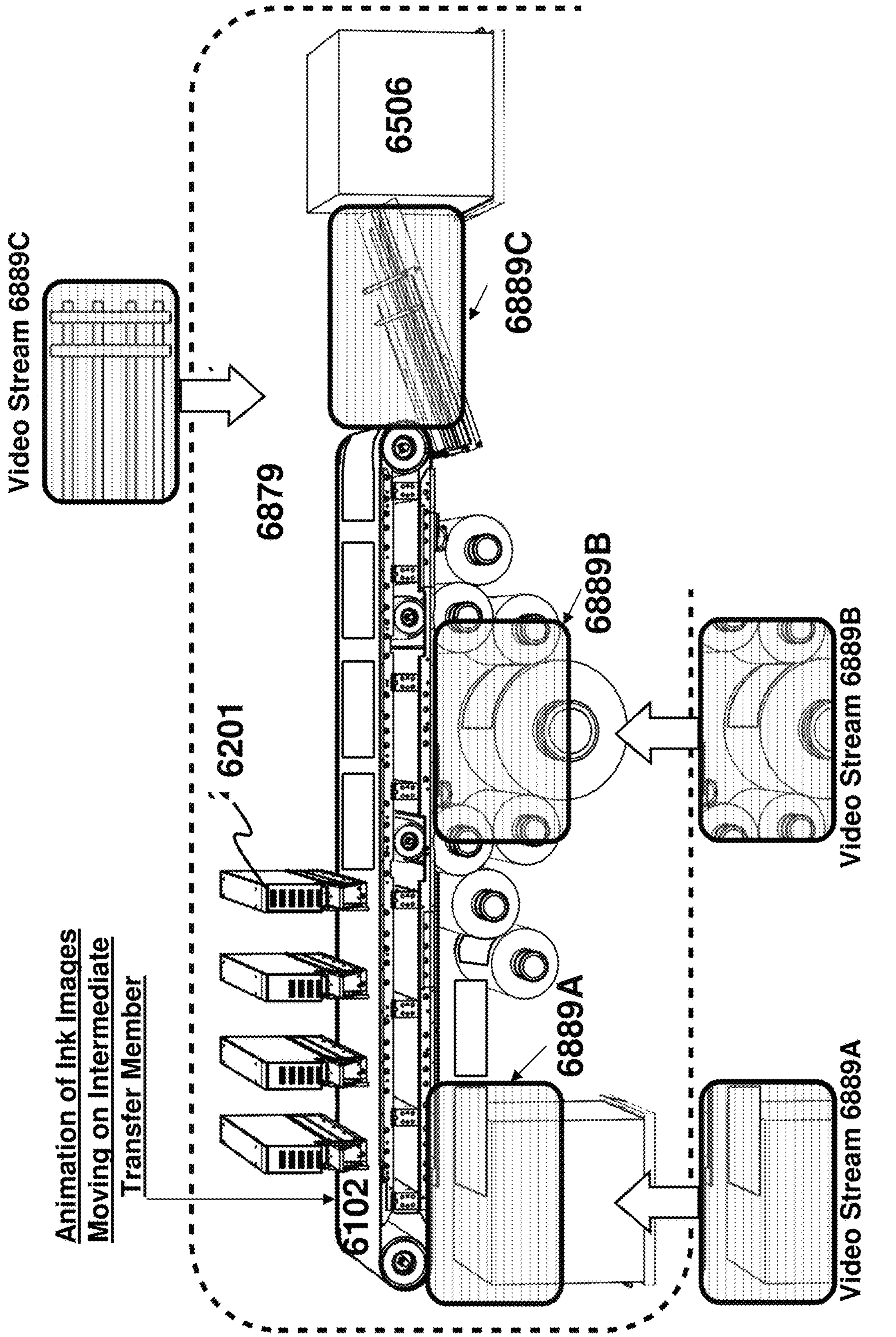
Figure 42B:
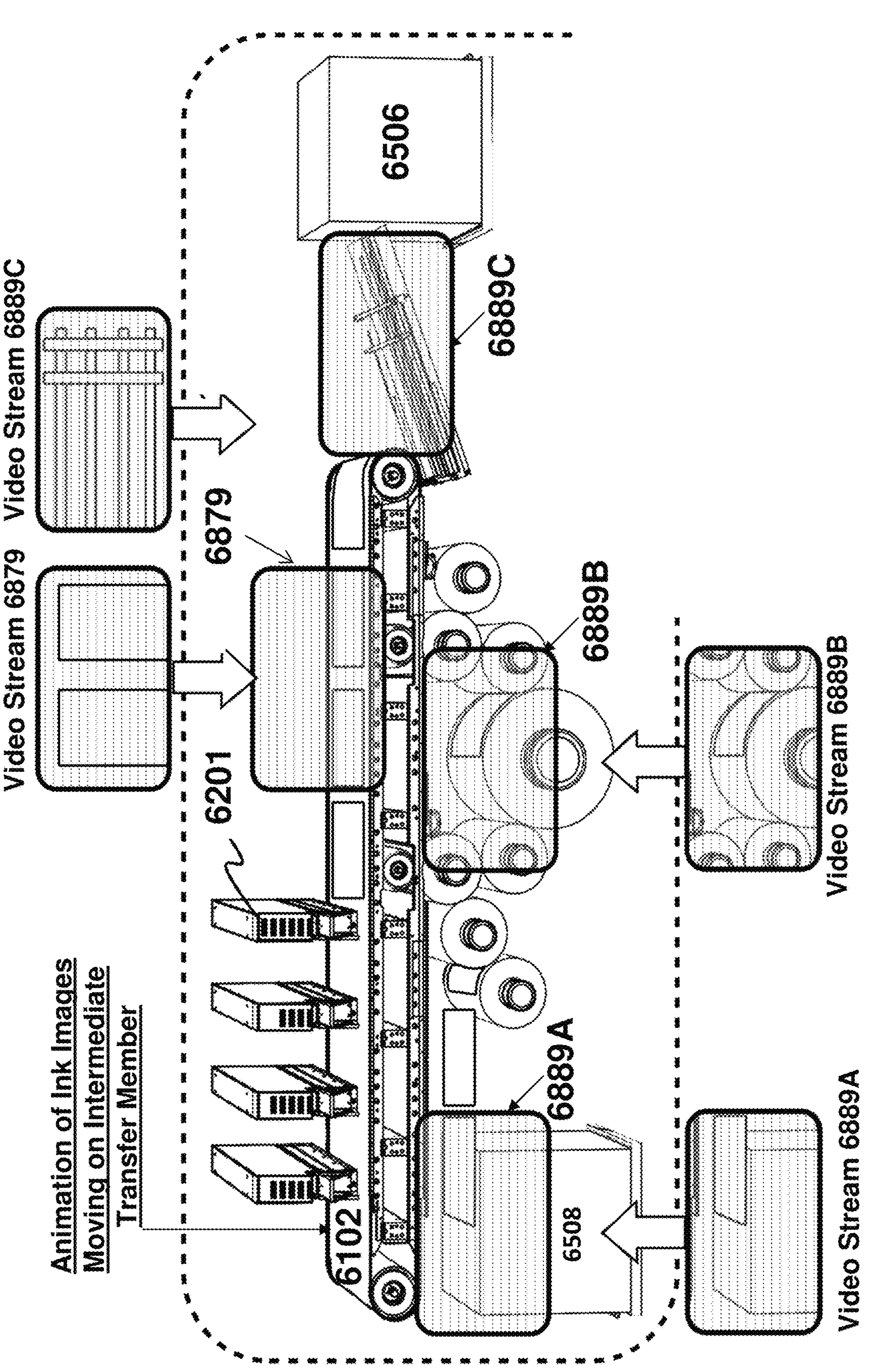

FIG. 42A represents the reverse augmented reality GUI 6960 resulting from the physical arrangement of FIG. 41A. In FIG. 42A video stream 6889A corresponding to the real world location 6989A above physical output stack 6508 is displayed in the matching location above a graphical representation of the output stack 6508—i.e. the video steam 6889A displayed GUI 6960 is located relative to the graphical representation of the substrate handling system that corresponds to its real-world counterpart. This is also true for video streams 6889B and 6889C. FIG. 42B represents the reverse augmented reality GUI 6960 resulting from the physical arrangement of FIG. 41B. In the example of FIG. 42B, the video stream 6879 is displayed on the virtual surface of the graphical representation of intermediate transfer member 6102 so as to correspond to its real-world counterpart location 6979.

Figure 43A:
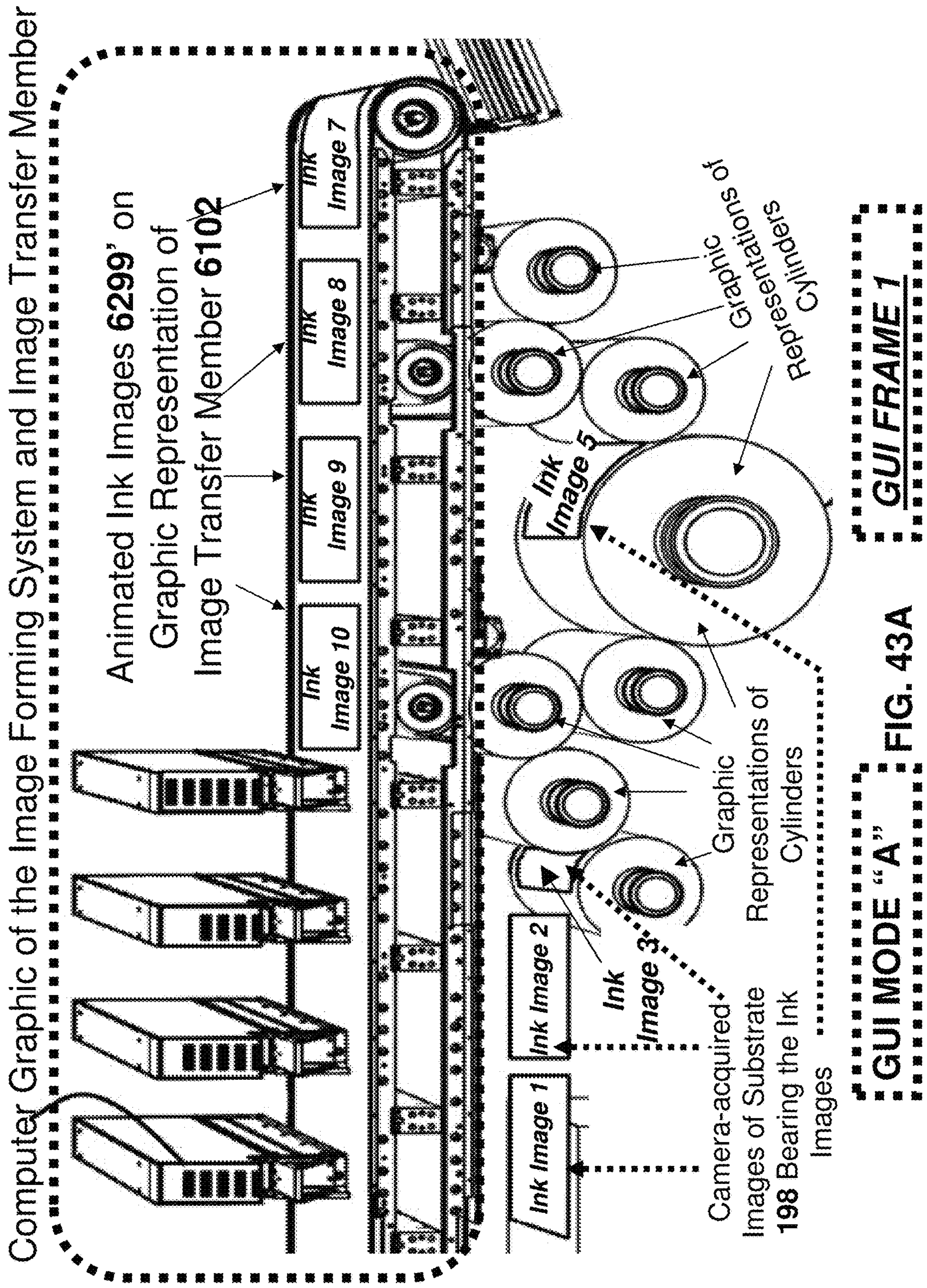
FIGS. 43A-44 illustrate a GUI for monitoring operation of an indirect printing system.
Figure 43B:
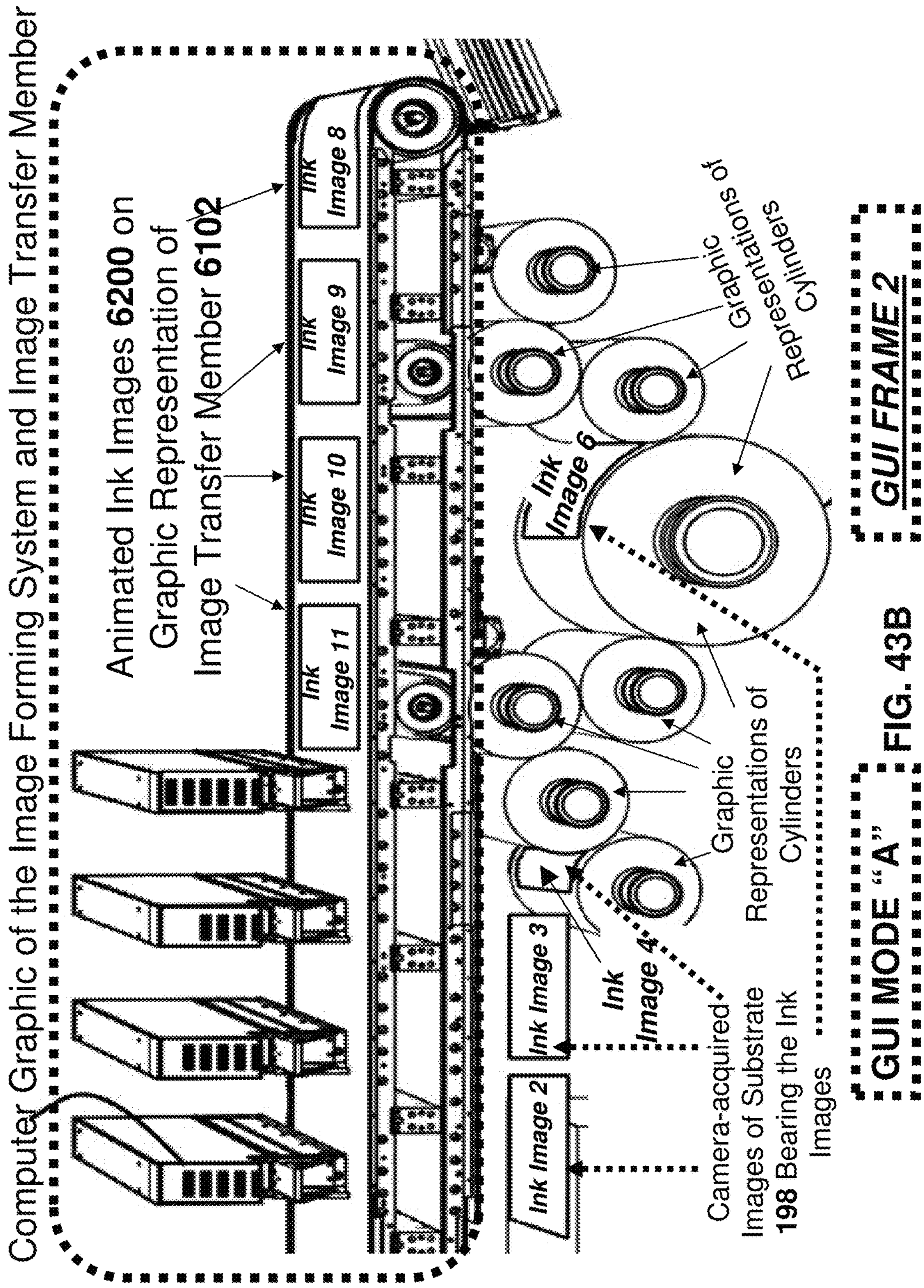
Figure 43C:
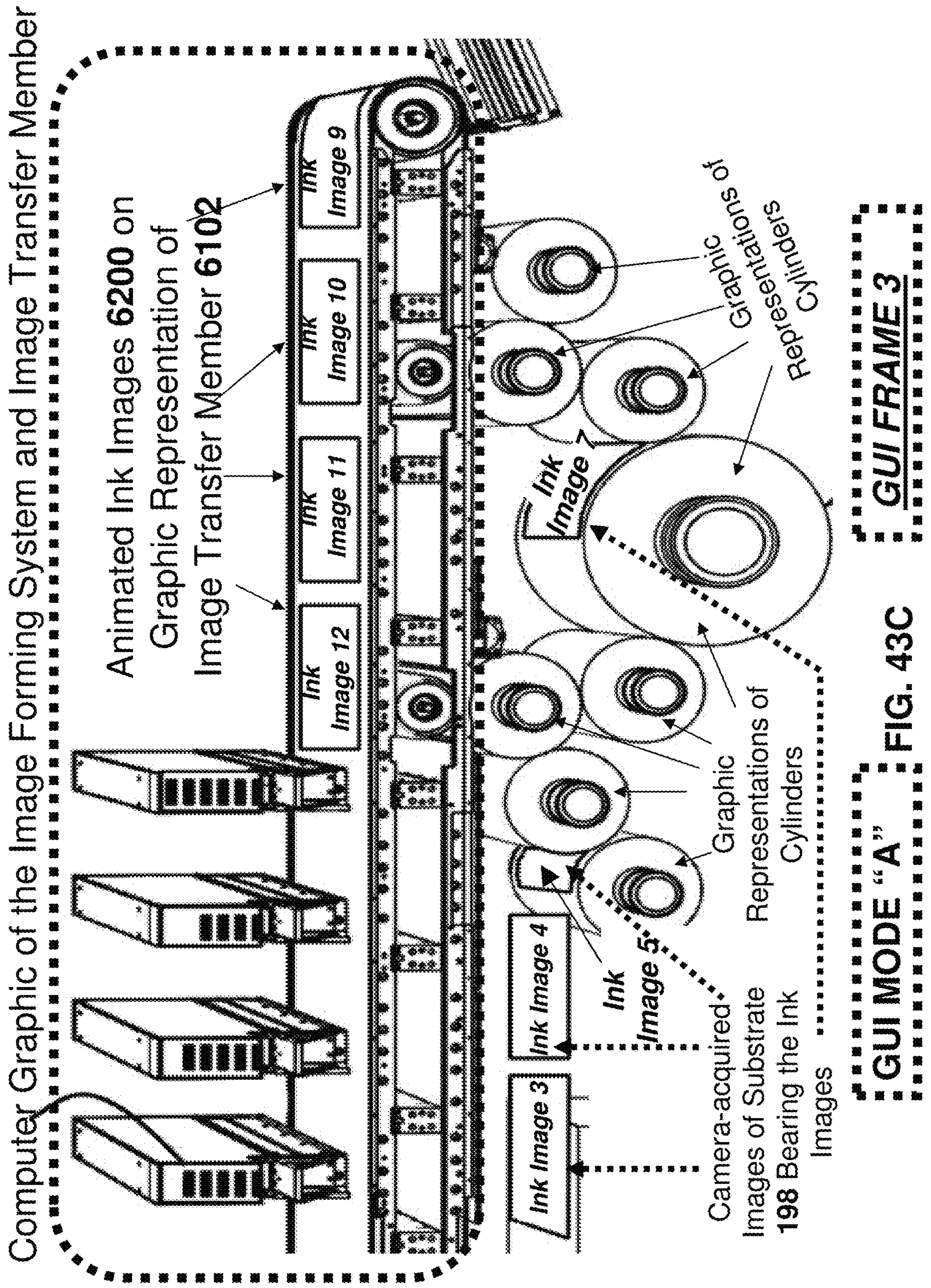
Figure 43D:
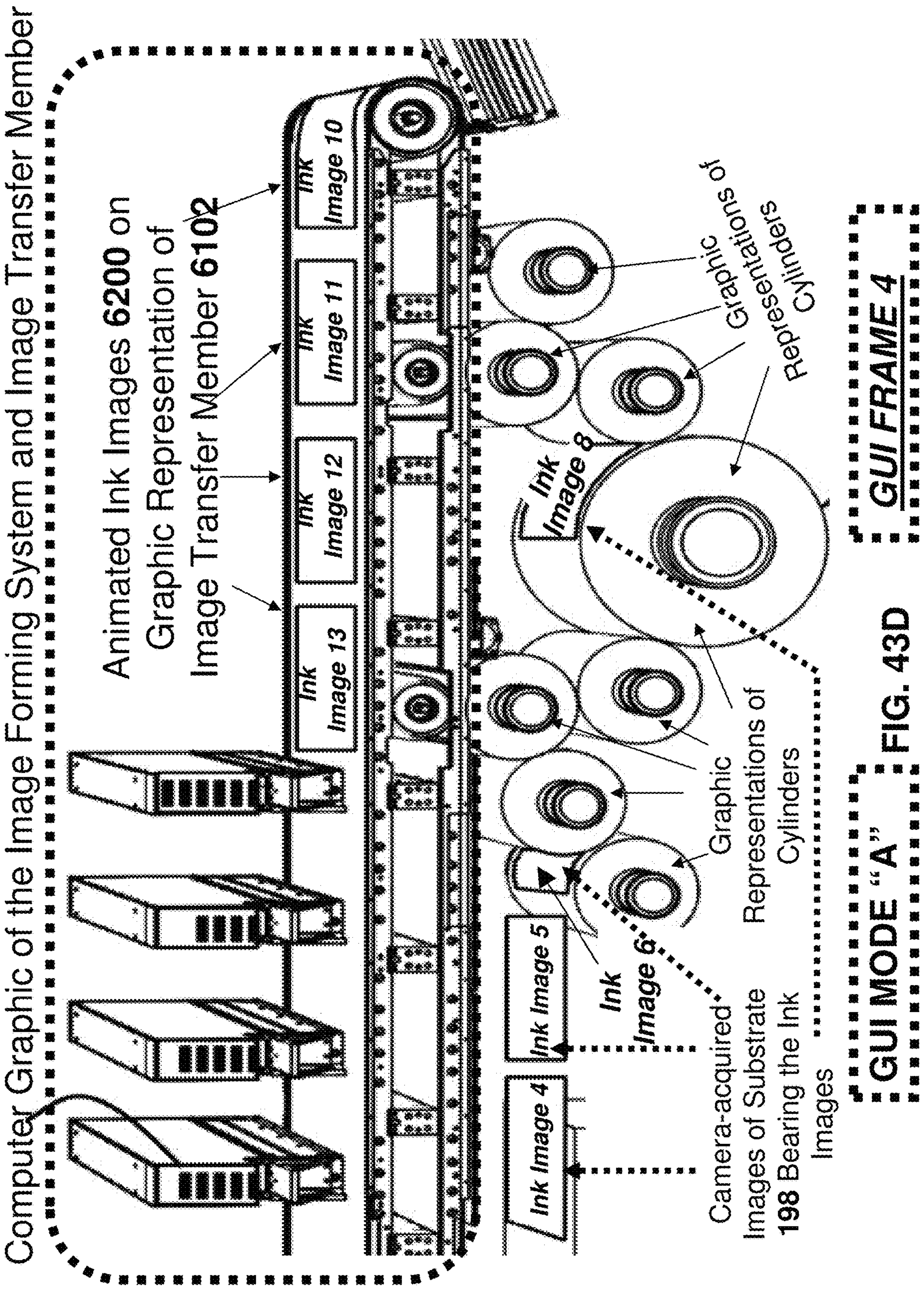

FIGS. 43A-43D are a plurality of frames illustrating the movement of virtual ink images along the graphic representation of the intermediate transfer member 6102 and in the video stream windows previously illustrated as 6889 in FIGS. 41-42 according to one example. In FIG. 43A, ink image 5 is a photograph of real-world substrate bearing a real-world ink image as it moves through the corresponding field of view, previously illustrated as 6989B in FIGS. 41-42. Thus, in FIG. 43A ink image 5 is acquired by camera 6993B and as part of video stream 6889B is displayed as indicated in FIG. 43A.

The upper part of the GUI 6960 of FIGS. 43A-43D includes: (i) a computer graphic of the image forming system and of virtual ink images (i.e. either taken from database or acquired by camera 6983) in motion (i.e. by computer animation) away from virtual print bars 6302 (i.e. a graphical representation thereof) and towards virtual image transfer location 6958. The lower part of GUI 6960 of FIGS. 43A-43D includes multiple video streams 6889 superimposed upon a graphical representation of the substrate handling system (i.e. including various cylinders). The video streams are superimposed in a manner such that the location of the video streams 6889 on display screen 6970 relative to the graphical representation of the substrate handling system corresponds to its real-world counterpart.

FIGS. 43A-43D describe the time-progression of the machine-oriented GUI 6960. In GUI frame 1 (FIG. 43A), ink images 7-10 are on the upper run of intermediate transfer member 6102. Ink image 7 which is on the upper run of intermediate transfer member 6102 at an earlier time represented by FIG. 43A eventually appears at a later time on a substrate (FIG. 43C corresponding to GUI frame '3') as the ink image being displayed in machine-oriented GUI 6960 as part of video stream 6889B.

One salient feature of the examples of FIGS. 41A-43D is that the speed at which ink image representations of the graphical animations move along a surface of the intermediate transfer member 6102 is appropriate for, and matches, the video stream frame rate 6989. Thus, in some embodiments, in order to provide this 'synchronization feature,' the real-world rotation speed of the real-world transfer member is estimated and/or detected.

In some embodiments, the displayed graphical animation is provided so that a rate at which virtual ink images move along the surface of the virtual intermediate transfer member dependents upon a rate of rotation speed (e.g. measured or estimated rotation speed) of the physical intermediate transfer member. For example, when the physical intermediate transfer member is detected to rotate at a higher rate, the virtual ink images move (i.e. in the animation) along the surface of the virtual intermediate transfer member at a higher rate. When the physical intermediate transfer member is detected to rotate at a lower rate, the virtual ink images move along the surface of the virtual intermediate transfer member at a lower rate.

Not wishing to be bound by theory, it is believed that when a video feed and/or image animation is superimposed upon a background image or illustration of a printing system (i.e. to 'augment' the virtual reality representation with real-world image or video), the overall effect may be to provide an intuitive, non-burdensome representation or visualization of printing system operation. For example, the use of a computer graphic when representing a subsystem (rather than a photograph of the subsystem) may provide a representation of the subsystem (e.g. 6500 or 6100) that includes only relevant details (i.e. relevant for visualizing operation or servicing of the printing system subsystem) rather than overloading the user with irrelevant visual details. It is believed that this 'hybrid interface' gives the user a sense of the 'important aspects' of the current operation of the printing system while minimizing or avoiding information overload.

Thus, displaying subsystems using computer graphics in near photo realistic manner allows the user to instantly realize where certain operations within the printing system occur and may provide an 'x-ray' view of the internals of the printing system. In the event of an error, the operator will be able to instantly visually locate/identify the location within the printing system that the error occurred so as to take remedial steps.

In this sense, users may monitor operation of a printing system, or even a large number of simultaneously operating printing systems in a manner that minimizes user fatigue and maximizes the 'feel' or 'intuition' the user develops for the printing system operation. Even if the real internal components are covered by display screen 6970, the GUI gives the user the feeling of being in control of the real machine, reducing fatigue and/or improving user operation of one printing system or a plurality thereof. This may be provided for any purpose—for example, to monitor image quality or an efficiency at which printing systems are operating or how a given print job (or set of images to be printed) is allocated between multiple printing systems.

In some embodiments, the user interface may focus on the 'flow' of images within the printing system. At any given time, multiple ink images residing on the rotating intermediate transfer surface may simultaneously rotate along with the surface of the transfer member 6102 so that one-by-one the images are transferred to a substrate. At any given time, web substrate or substrate sheets may transport multiple ink-images within the substrate transport system 6500 along a path defined by substrate transport system 6500. In some embodiments, the motion of these ink images on substrate or intermediate transfer member 6102 defines the primary operation of the printing system.

In some embodiments, use of graphical animation allows representation of the printing system (or subsystems thereof) where displaying a photographic image (video of) the operating printing system's subsystem is not possible—for example, due to the inability to inexpensively place a camera or due to the fact that difficulties in photographing real-world ink images on dark intermediate transfer member.

In some embodiments, the goal of animated representation of images traveling through the printing system is to create a process-accurate virtual representation of the real-world machine in operation.

In some embodiments, use of the graphical animation allows for a somewhat simplified representation of the printing system (or subsystems thereof) compared to merely displaying a photographic image (or video of) the operating printing system. In some embodiments, it is possible to augment this somewhat simplified representation of the printing system with one or more of:

(A) a video stream of a substrate (or an image taken from database 6900) traveling through the substrate transport system 6500. In one embodiment, motion of the traveling substrate (e.g. the substrate after the ink image is transferred thereto so that the ink image is visible thereon) may be illustrated by animation of a 'still' photographic image of the substrate (e.g. image-bearing substrate) on a display screen. Alternatively or additionally, motion of the substrate may be illustrated by displaying a field of view 6989 within substrate transport system 6500 from a video camera (e.g. 6993) where the substrate (e.g. bearing the ink image) travels within the field of view.

In one example, the user may be able to 'drill down' or 'zoom-in' on one of multiple possible 'field-of-view' windows within substrate transport system 6500 to view the substrate and/or images on the substrate in motion through a selected field-of-view window;

(B) an animation of virtual images on the rotating virtual intermediate transfer member 6102—as noted above, the virtual images may move (i.e. in the animation) at a velocity determined by that the rotational velocity of the physical intermediate transfer member.

Generally speaking, a substrate does not remain flat when traveling through substrate transport system 6500. Generally speaking, intermediate transfer member 6102 is also not flat at all sections of the system—as such, images on the intermediate transfer member or on a substrate traveling through the substrate transport system may be illustrated with some sort of curvature (e.g. while passing upon certain cylinders). This curvature may be computed mathematically to modify an image in image database 6900 to display it at a non-flat curvature or at a curvature differing from that in database 6900. Alternatively, the image may be photographed on substrate or intermediate transfer member 6102 at a first curvature and then displayed (e.g. as part of a computer animation) at a second curvature by subjecting the image to a mathematical 'curvature' transformation function.

(C) a 'print job status' in terms of ink requirements thereof—for example, each print bar 6302 may be configured to deposit on rotating intermediate transfer member 6102 ink of a different respective color. In accordance with the color requirements of a given print job, print bar or image-forming elements 6302 may be shown (i) in a first configuration over intermediate transfer member 6102 when the ink born thereby is a color that is part of a current print job (see the leftmost four print bars of FIG. 33); and (ii) in a second configuration not over intermediate transfer member 6102 when the ink born thereby is a color that is not part of a current print job (see the rightmost four print bars of FIG. 33). In some embodiments, when the current ink color requirements change, it is possible to display a computer animation of one or more print bars from (i) an 'active-color-indicative' position over intermediate transfer member 6102 (see the leftmost four print bars of FIG. 33); to (ii) an 'inactive-color-indicative' position not over intermediate transfer member 6102—e.g. staggered away from the intermediate transfer member as in the rightmost four print bars of FIG. 33).

(D) a graphical animation of ink droplets being deposited on the rotating intermediate transfer member—for example, the user may 'click on' one of the print bars of a particular color in order to see the related ink droplet deposition graphical animation.

Figure 44:
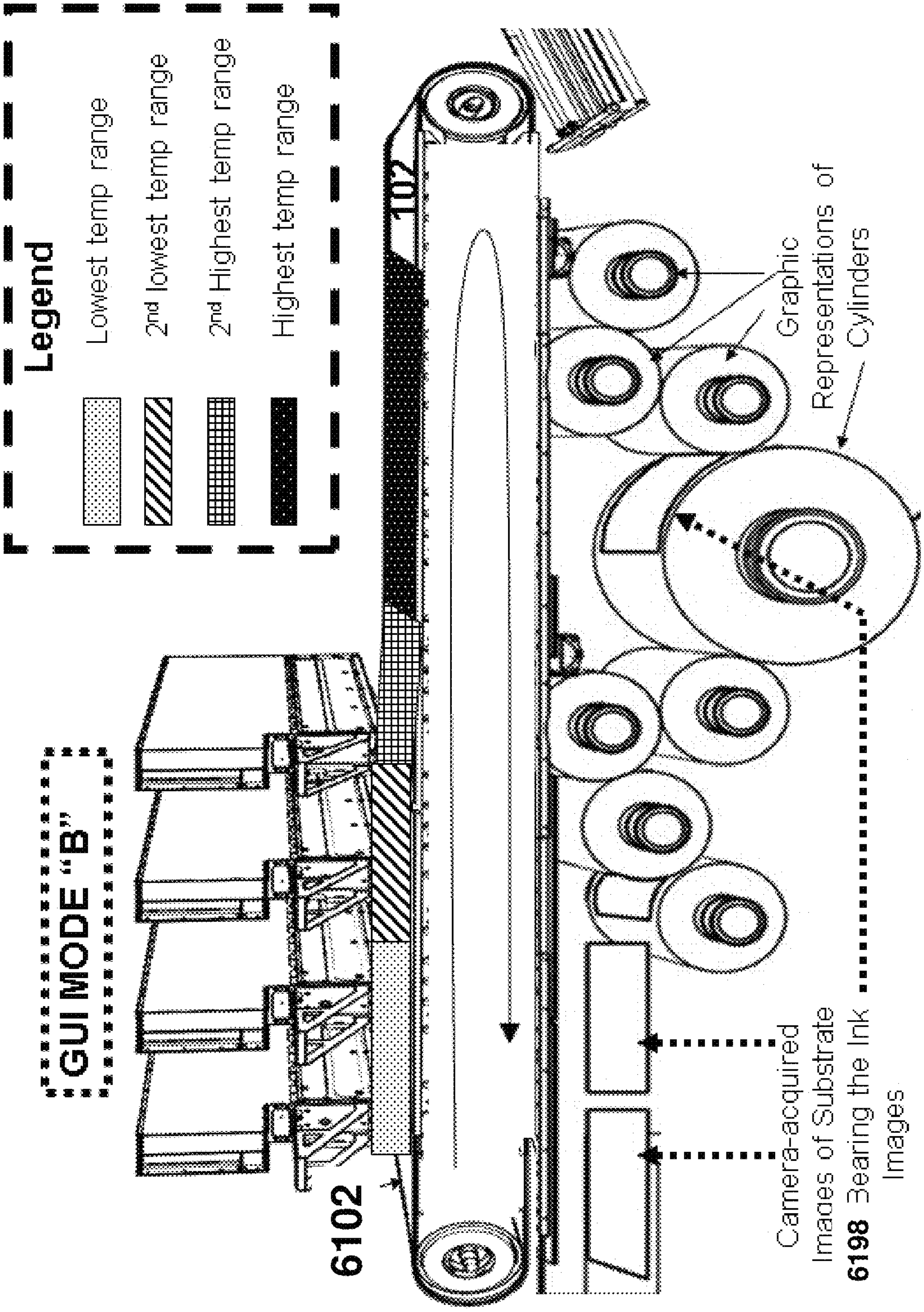

(E) data descriptive of a temperature profile on a surface of intermediate transfer member 6102—the skilled artisan is directed to FIG. 44 which illustrates one exemplary set of sections of the intermediate transfer member 6102 subjected to different temperature ranges. In non-limiting examples, this temperature may be monitored according to a temperature sensor (e.g. an IR-sensor) or computed in accordance with a mathematical model having, as an input, a measurement of the amount of heat provided to an intermediate transfer member 6102 as well as thermal parameters of various items (e.g. the ink, the intermediate transfer member, the substrate, etc).

In some embodiments, it is possible to toggle between view modes—a first view mode corresponding to virtual images (e.g. digital images or photographs of ink images) travelling on a graphical representation of blanket 6102 (see FIGS. 42A-43D) and a second mode corresponding to display of temperature properties of blanket 6102 (see FIG. 44)

In the example of FIG. 43A, there is a slight curvature of ink image 7 on the surface of blanket 6102. In some embodiments, the animation includes subjecting an image (e.g. from a photograph or database) to mathematical transformation so that a curvature thereof matches a local curvature of blanket 6102.

In some embodiments, a 'vital signs feature' is provided. It is possible to sense a distance between a user/operator and the printing system When the sensed distance between the user and the printing system or a component thereof exceeds a threshold distance, 'vital signs data' about the printing machine may be prominently displayed on the display screen—for example, so that the vital signs data may occupy at least 30% or a majority of the display area of the display device (e.g. a 'large' display screen having an area of at least one square meter). The vital signs data may describe one or more operating parameters of the printing system including but not limited to ink requirements of the currently printed job, substrate requirements of the currently printed job, remaining predicted lifetime of the blanket, amount of remaining substrate available to the printing system, amount of ink available to the system, printing speed or any other operating parameter. According to this 'vital signs' example, in response to a user approach towards the printing system or a component thereof (e.g. the user walks closer to the printing system) so that a distance between the user and the printing system (or component thereof) drops below the threshold distance, the graphical animation together with the video streams (e.g. according to any embodiment described herein) may replace the 'vital signs information' on the display screen. In one particular embodiment, when the user is beyond the threshold distance, the size of the displayed vital signs information is relatively large and the size of the displayed animation/video streams is relatively small. In response to a user approach towards the printing system (or component thereof), (i) the size of the displayed vital signs (e.g. the font size) decreases and/or the vital signs cease to be displayed and (ii) the display screen commences display of the graphical animation and the video stream and/or displays them at a larger size than when the distance between the user and the printing system (or component thereof) exceeds the threshold.

Although embodiments have been explained in the context of large display screen 970, it is appreciated that the screen may be of any size or form factor, and may be part of a tablet device or an augmented reality eyewear device. Additionally, the afore-described information relating to the operation of the printing system may be displayed on more than one screen. The information being displayed on each of the different screen may be the same or different. For example, a machine-oriented GUI may be displayed on a large display screen adjacent to the printing system and a time-line based GUI may be displayed on a remote tablet device.

In one example, when a smaller display screen (e.g. tablet device) is brought near the larger display screen (e.g. in a substantially vertical position), this may serve an 'x-ray' or 'magnifying' function so that a portion of the interface displayed on the larger display screen is displayed in a 'magnified manner' on the smaller display screen to 'zoom-in.'

Figure 45A:
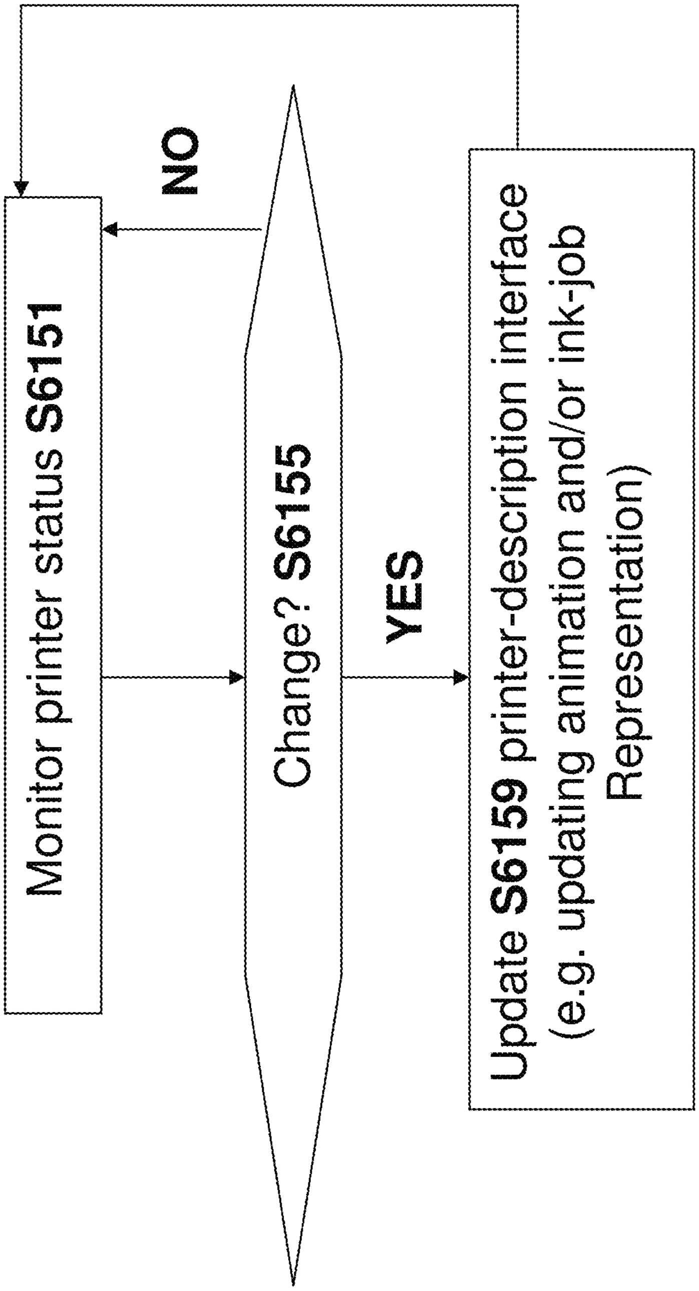
FIGS. 45A and 45B respectively illustrate a flow chart and an apparatus for monitoring operation of a printing system.

As illustrated in FIG. 45A, in some embodiments, a printing system-description interface (e.g. 6960 or 6964) may change in response to changes in the printing system status.

Figure 45B:
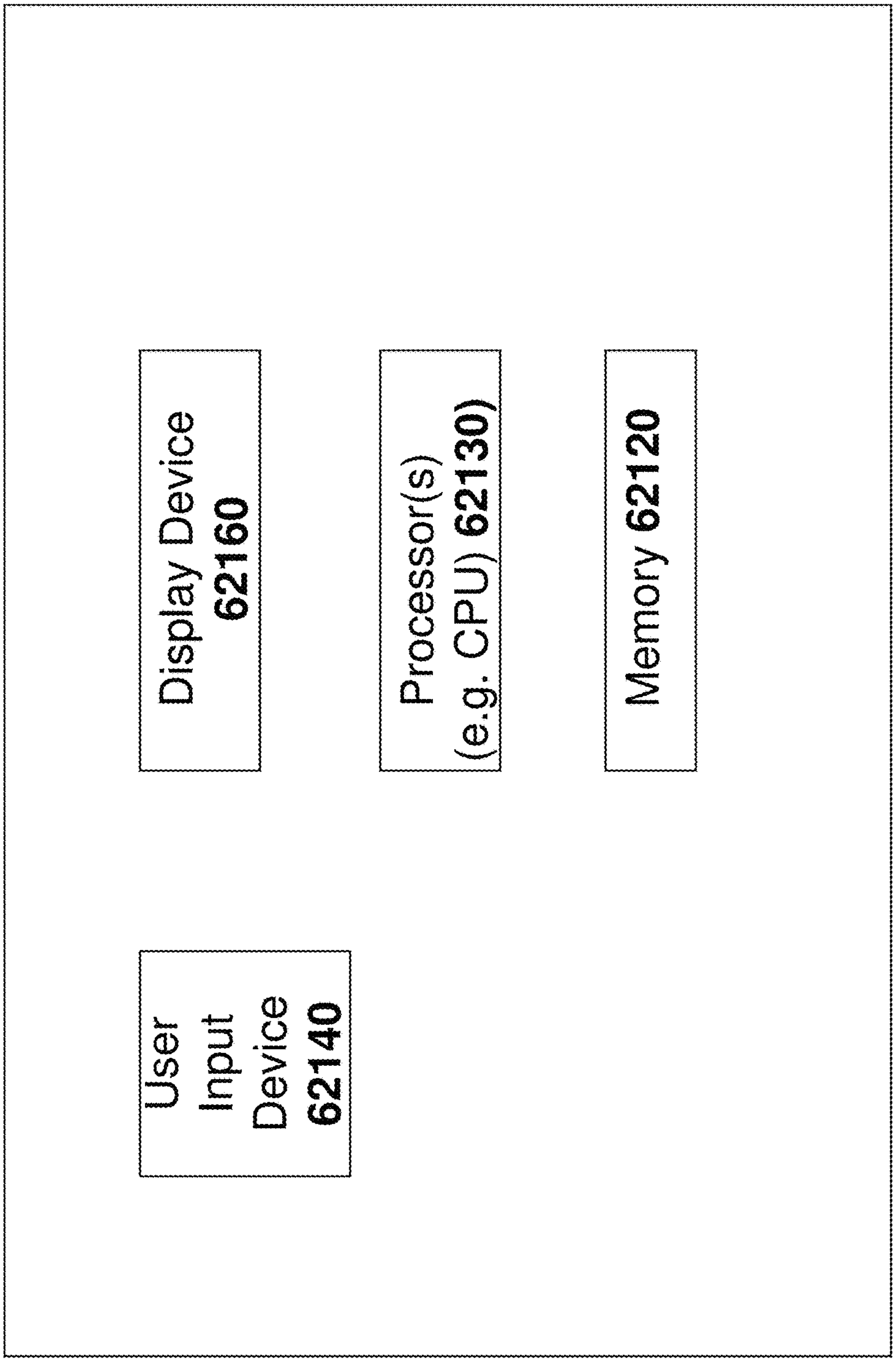

In some embodiments, as illustrated in FIG. 45B, one or more of the following components may be present and may facilitate the provisioning of any printing system-related GUI (e.g. 6960 or 6964): (i) a user input device 62140 (e.g. touch screen or mouse or camera aimed at the user); (ii) a printing system display device 62160 (e.g. a screen of any size or form factor); (iii) processor(s) 62130; and (iv) computer memory 62120.

It is now disclosed a method of visualizing operation of a printing system comprising: (i) a real-world image forming apparatus configured to form ink image(s) on a real-world rotating intermediate transfer member according to contents of an image database 6900, (ii) a real-world substrate handling system 6500 defining a substrate path and interacting with the intermediate transfer member at a real-world image transfer location where the formed ink images located on and rotating with the intermediate transfer member are transferred to a substrate, and (iii) one or more cameras being aimed at a real-world field-of-view within the substrate transport system along the substrate path to acquire video stream(s) of real-world substrate bearing ink image(s) moving through the field-of-view, the method comprising:

a. monitoring operation of the printing system to assess which images are substantially-current images that are currently resident on the rotating intermediate transfer member 6102 or are queued for formation on the rotating intermediate transfer member 6102 in the near future;
b. retrieving digital image representations of a plurality of the substantially-current images from the image database 6900;
c. displaying simultaneously on a display screen: i. a graphical representation of the real-world rotating intermediate transfer member and; ii. a graphical representation of the substrate transport system including the real-world image transfer location;
d. simultaneous with the displaying of step (c), displaying, on the display screen, a graphical animation of the substantially-current database-retrieved image in motion on the surface of the representation of the intermediate transfer member (for example, towards the representation of the real-world image transfer location);
e. simultaneous with the displaying of the graphical animation, displaying the camera-acquired video stream(s) of the real-world substrate bearing ink image (s) moving through the field-of-view, the video stream (s) being displayed at a location on the display screen relative to the graphical representation of the substrate transport system that corresponds to its real-world counterpart.

It is now disclosed a method of visualizing operation of a printing system comprising (i) a real-world image forming apparatus configured to form ink image(s) on a real-world rotating intermediate transfer member according to contents of an image database 6900, (ii) a real-world substrate transport system 6500 defining a substrate path, and interacting with the intermediate transfer member at a real-world image transfer location where the formed ink images located on and rotating with the intermediate transfer member are transferred to substrate, and (iii) one or more cameras being aimed at a real-world field-of-view within the substrate transport system along the substrate path to acquire video stream(s) of real-world substrate bearing ink image(s) moving through the field-of-view, the method comprising:

a. retrieving digital image representations from the image database 6900;
b. displaying simultaneously on a display screen:
   i. a graphical representation of the real-world rotating intermediate transfer member and;
   ii. a graphical representation of the substrate transport system including the real-world image transfer location;
c. simultaneous with the displaying of step (b), displaying, on the display screen, a graphical animation of the database-retrieved images in motion on the surface of the representation of the intermediate transfer member (for example, towards the representation of the real-world image transfer location); and
d. simultaneous with the displaying of the graphical animation, displaying the camera-acquired video stream(s) of the real-world substrate bearing ink image(s) moving through the field-of-view, the video stream(s) being displayed at a location on the display screen relative to the graphical representation of the substrate transport system that corresponds to its real-world counterpart.

In some embodiments, the digital images that i. are retrieved from the image database 6900 in step (a) and ii. animated in step (c), are selected and retrieved from the image database 6900 in accordance with an image print queue of the printing system.

In some embodiments, the digital images that i. are retrieved from the image database 6900 in step (a) and ii. animated in step (c), are selected and retrieved from the image database 6900 in a manner that synchronizes with the video stream ink images residing on the substrate of the video stream.

It is now disclosed a method of visualizing operation of a printing system comprising (i) a real-world image forming apparatus configured to form ink image(s) on a real-world rotating intermediate transfer member according to contents of an image database 6900, (ii) a real-world substrate transport system 6500 defining a substrate path and interacting with the intermediate transfer member at a real-world image transfer location where the formed ink images located on and rotating with the intermediate transfer member are transferred to substrate, and (iii) a first camera being aimed at a real-world field-of-view within the substrate transport system along the substrate path to acquire a video stream of real-world substrate bearing ink image(s) moving through the field-of-view and (iv) a second camera aimed at a surface of the real-world rotating intermediate transfer member to acquire an image of ink images thereon, the method comprising:

a. displaying simultaneously on a display screen:
   i. a graphical representation of the real-world rotating intermediate transfer member and;
   ii. a graphical representation of the substrate transport system including the real-world image transfer location;
b. simultaneous with the displaying of step (a), displaying, on the display screen, a graphical animation of the ink-image acquired by the second camera moving on the surface of the representation of the intermediate transfer member (for example, towards the representation of the real-world image transfer location); and
c. simultaneous with the displaying of the graphical animation, displaying the camera-acquired video stream(s) of the real-world substrate bearing ink image(s) moving through the field-of-view, the video stream(s) being displayed at a location on the display screen relative to the graphical representation of the substrate transport system that corresponds to its real-world counterpart.

In some embodiments, the animation of step (b) is displayed in a manner which synchronizes with the video stream ink images residing on the substrate of the video stream.

In some embodiments, at least one image displayed in the graphical animation is subjected to a curvature-modifying geometric mapping so that the curvature of the image matches a local curvature of the intermediate transfer member.

In some embodiments, a curvature of the animated image changes as it travels between locations on the intermediate transfer member having different surface curvature.

In some embodiments, a view angle (e.g. 3D angle) or elevation or zoom factor of the displayed combination of: i. the graphical representations of the intermediate transfer member and the substrate transport system; and ii. the image animation, is modifiable in accordance with user input.

In some embodiments, an aim angle of a camera aimed at the field of view in the substrate path and/or of a camera aimed at a surface of the real-world rotating intermediate transfer member to acquire an image of ink images thereon is controllable in accordance with user input.

In some embodiments, the user input is acquired via a touch screen or an electronic glove or a gesture-sensing apparatus.

In some embodiments, the graphical representation of the substrate transport system includes a graphical representation of one or more cylinder(s) thereof.

In some embodiments, the displayed cylinder(s) is shown in an animation mode and rotating around its axis.

In some embodiments, a rotation speed of the animated cylinder is determined by (e.g. proportional to) that of its real-world counterpart of the real-world substrate-handling system.

In some embodiments, an additional camera is aimed at and configured to acquire a video feed of substrate sheets traveling away from cylinders of the substrate transport system and towards an output stack, and wherein the video feed of the additional camera is displayed relative to the substrate transport system at a position that corresponds to its real-world counterpart.

In some embodiments, the method of visualizing operation of the printing system further comprises displaying an animation of image-bearing substrate traveling away from cylinders of the substrate transport system and towards an output stack.

In some embodiments, the images of the animation are mirror images of the videoed substrate-residing images that reside on the substrate of the video feed.

It is now disclosed apparatus comprising means for carrying out any method disclosed herein.

It is now disclosed computer readable medium having stored thereon computer readable program code for performing a method disclosed herein.

Figure 46A:
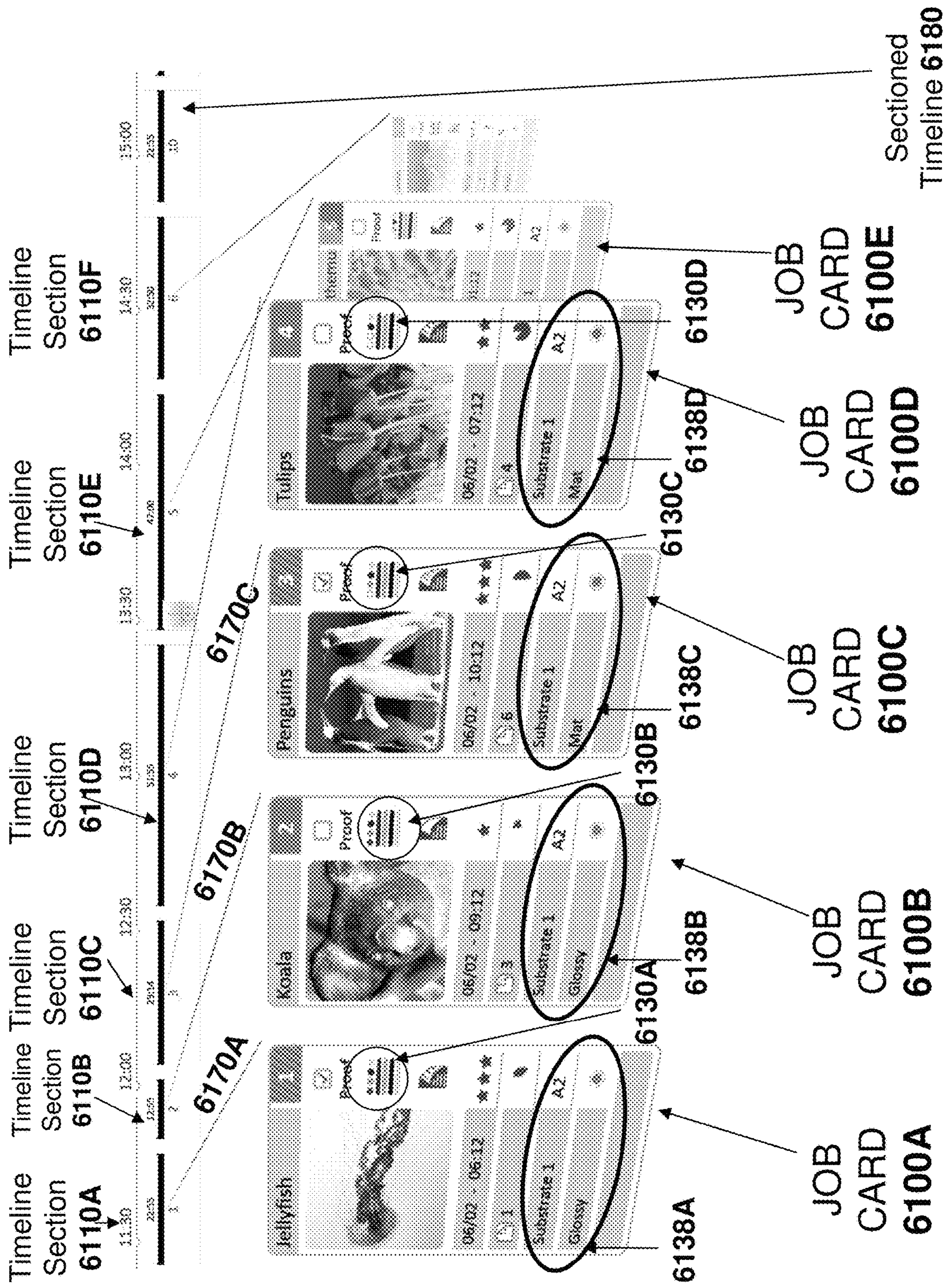
FIGS. 46A-46B illustrate a plurality of job-summary cards that are each visually associated with a different respective timeline section of a sectioned timeline.
Figure 46B:
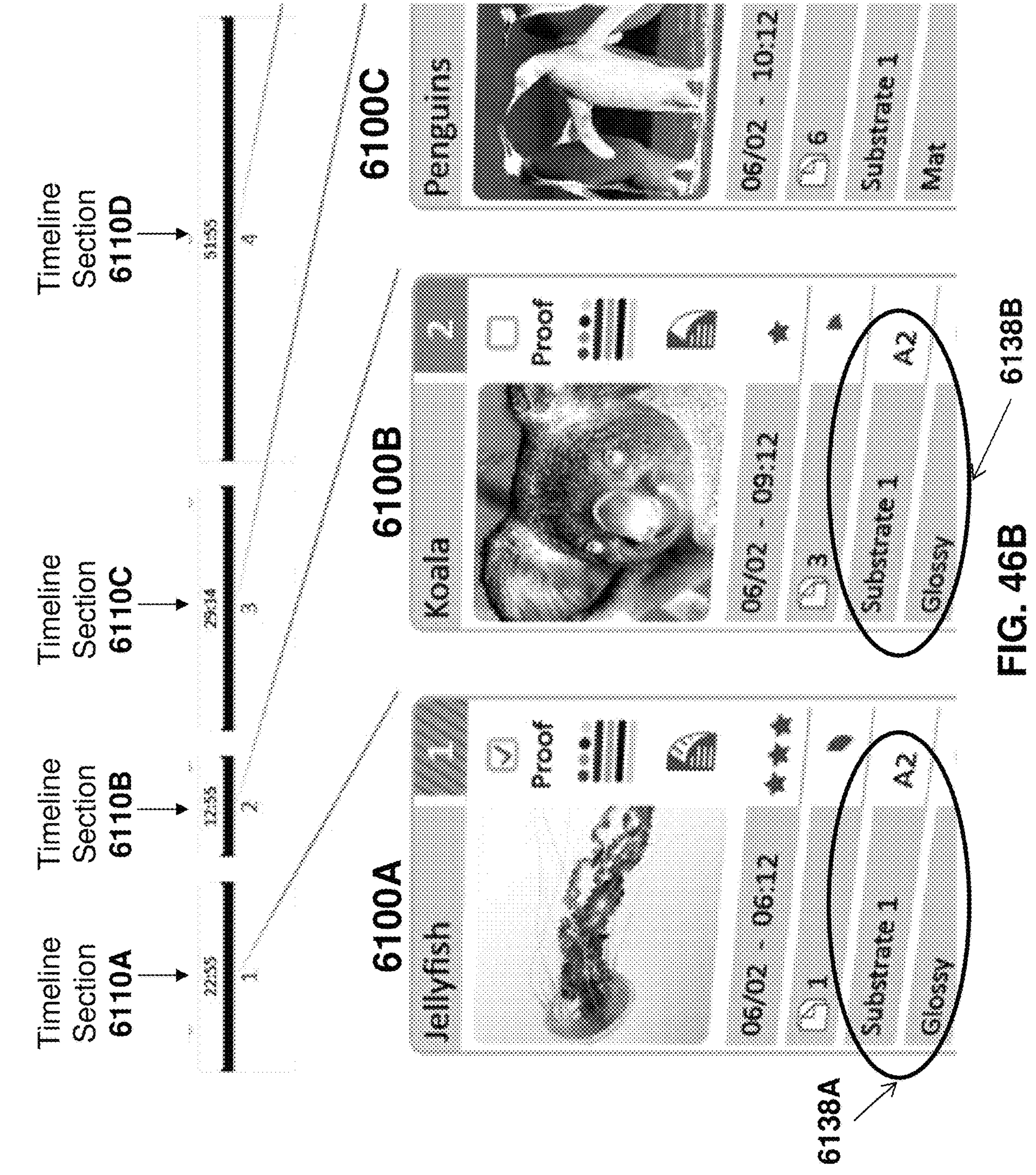

A Discussion of FIGS. 46A-46B

Some embodiments relate to a method, apparatus and computer-readable medium for presenting a user interface describing print-job data—for example, data related to a plurality of queued print jobs that are queued to a set of one or more printing system(s).

In some embodiments, it is possible to compute or receive an estimated job-completion time of each print job (e.g. based on the size of the job, color requirements, desired resolution specifications of the printing system such as speed, etc) and to display a description of this information as a sectioned timeline where a magnitude of a length of each section corresponds to a duration of the estimated job-completion of the corresponding job represented by each section.

Furthermore, information about each print job may also be presented as part of a job-description visual object (or job-information summary object) describing job-specific information.

In some embodiments, it is possible to visually associate each job-description visual objection of a print job with its appropriate section of the time line.

Reference is made to FIGS. 46A-46B which describe a plurality of job-description cards 6100A-6100E. Each job-card 6100 includes respective printer ink-requirements data 6130, substrate-requirements data 6138—i.e. to provide a summary of job-specific data thereof associated with a job corresponding to job-card. An estimated job-completion time of the job associated with job card 6100A is 22:25; an estimated job-completion time of the job associated with job card 6100B is 12:55; etc.

In the example of the 'Jellyfish job' of card 6100A the presented substrate requirements data are 'Substrate 1; A2; Gloss'; in the example of the 'Penguins job' of card 6100C the presented substrate requirements data are 'Substrate 1; A2; Mat.'

Sectioned timeline 6180 is divided into respective sections 6110A, 6110B, etc. where each timeline section 6110 is visually associated (e.g. through association lines 6170A, 6170B, etc) with a respective summary/description 6100A, 6100B, etc. of its respective print job.

The length of each sectioned timeline is presented in accordance with a job-duration (e.g. predicted duration) thereof.

There is no limitation on the type of printing systems the operation of which may be visualized by the methods or apparatus disclosed herein—ink-jet printers, off-set printers, laser printers, digital presses, dot-matrix printers, etc. are all in the scope of the invention.

The user interface (e.g. including the sectioned timeline) may be presented on any display screen—e.g. a screen of a laptop computer, desktop computer, cellphone, tablet device, etc.

In some embodiments, it is possible to control the printing systems using the GUI—for example, to re-order jobs by dragging and dropping timeline sections 6110 or job descriptions/cards 6100. For example, instead of dragging and dropping a job card 6100 to a new location along a line of job cards, it is possible to utilize the timeline 6180. The candidate job card 6100 for which a corresponding job is to take a new place in the print queue may be dragged to a target location on the timeline associated with a different job card other than the candidate job card. This would move the candidate job (i.e. corresponding to the candidate job card) to a different location in the print queue either before or after the job whose job card is associated with the target location.

In some embodiments, a sectioning of timeline 6180 may be dynamic—for example, as the job queue of a printing system changes, the sectioning of the timeline 6180 and/or job information data may be automatically updated accordingly (i.e. in response to the modification of the printer job queue). In some embodiments, the method includes monitoring a job queue of a printer(s) and responsive to changes in the job queue, re-sectioning timeline 6180 (e.g. to change relative lengths of constitutive sections) and displaying the timeline according to the updated section magnitudes.

It is now disclosed a method of providing a print-job user interface comprising:

a. for each print job of a plurality of queued print-jobs representing a job-queue for a printing system that includes a target set of one or more printing devices computing or receiving an estimate job-completion time;
b. displaying to a user on a display-screen a sectioned timeline that is sectioned in accordance to the estimated job completion time, each timeline section of the timeline associated with a different respective print-job and having a respective section length according to a magnitude of the corresponding estimated job-completion time that corresponds to the respective print-job;
c. for each of the queued print-jobs, displaying a respective job-information summary describing a job-specific respective print substrate and/or a job-specific required ink color combination and/or job-specific printing device, wherein each of the job-information-summaries is respectively visually associated with its corresponding timeline section. Alternatively or additionally, in some embodiments related to printing systems comprising a plurality of printing devices, (i) a particular print job may be queued to a specific printing device selected from the plurality of devices and (ii) the job-information summary may include information identifying the specific printing device to which the job is queued.

In some embodiments, this is carried out for a plurality of print-jobs that is substrate heterogeneous—i.e. each job has a different set of substrate requirements.

In some embodiments, this is carried out for a plurality of print-jobs that is heterogeneous for required ink color combinations—i.e. each job has a different set of ink requirement.

In some embodiments, the method of providing a print-job user interface for each print job of the plurality of queued print-jobs representing a job-queue of one or more printing devices further comprises:

d. monitoring changes in the job-queue to detect a change the plurality of print-jobs; and
e. in response to the detected change in the plurality of print-jobs, re-sectioning the sectioned timeline to change relative visual magnitudes of at least two sections thereof.

In some embodiments, the method of providing a print-job user interface for each print job of the plurality of queued print-jobs representing a job-queue of one or more printing devices, further comprising:

f. monitoring changes in the job-queue to detect a change the plurality of print-jobs; and g. in response to the detected change in the plurality of print-jobs, re-sectioning the sectioned timeline to change relative visual magnitudes of at least two sections thereof and updating the job-information summaries.

In some embodiments, the job-queue changes in response to one or more of the target printing devices beginning or completing one of the queued print-jobs—for example, it is possible to monitor the job queues—e.g. on an ongoing basis.

In some embodiments, the job-queue changes in respond to a user command.

In some embodiments, the user command is generated by a user GUI-engaging of a section of the sectioned timeline by an input device (e.g. mouse, joystick, camera-gesture-interface).

In some embodiments, the user command is a drag-and-drop command.

A Discussion of FIGS. 47-52

Figure 47A:
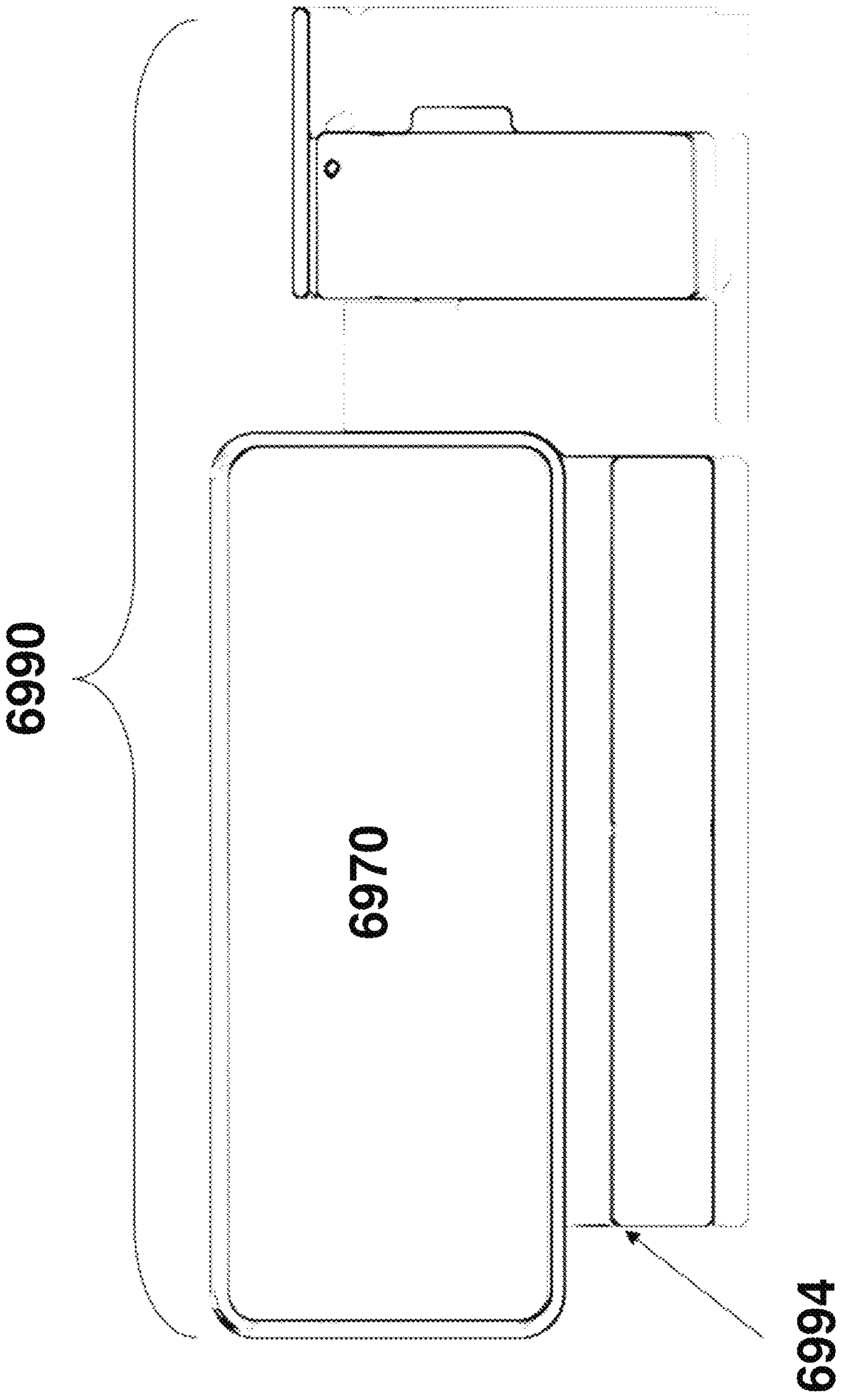
FIGS. 47A-47B illustrate a digital printing system including a mounted display screen.
Figure 47B:
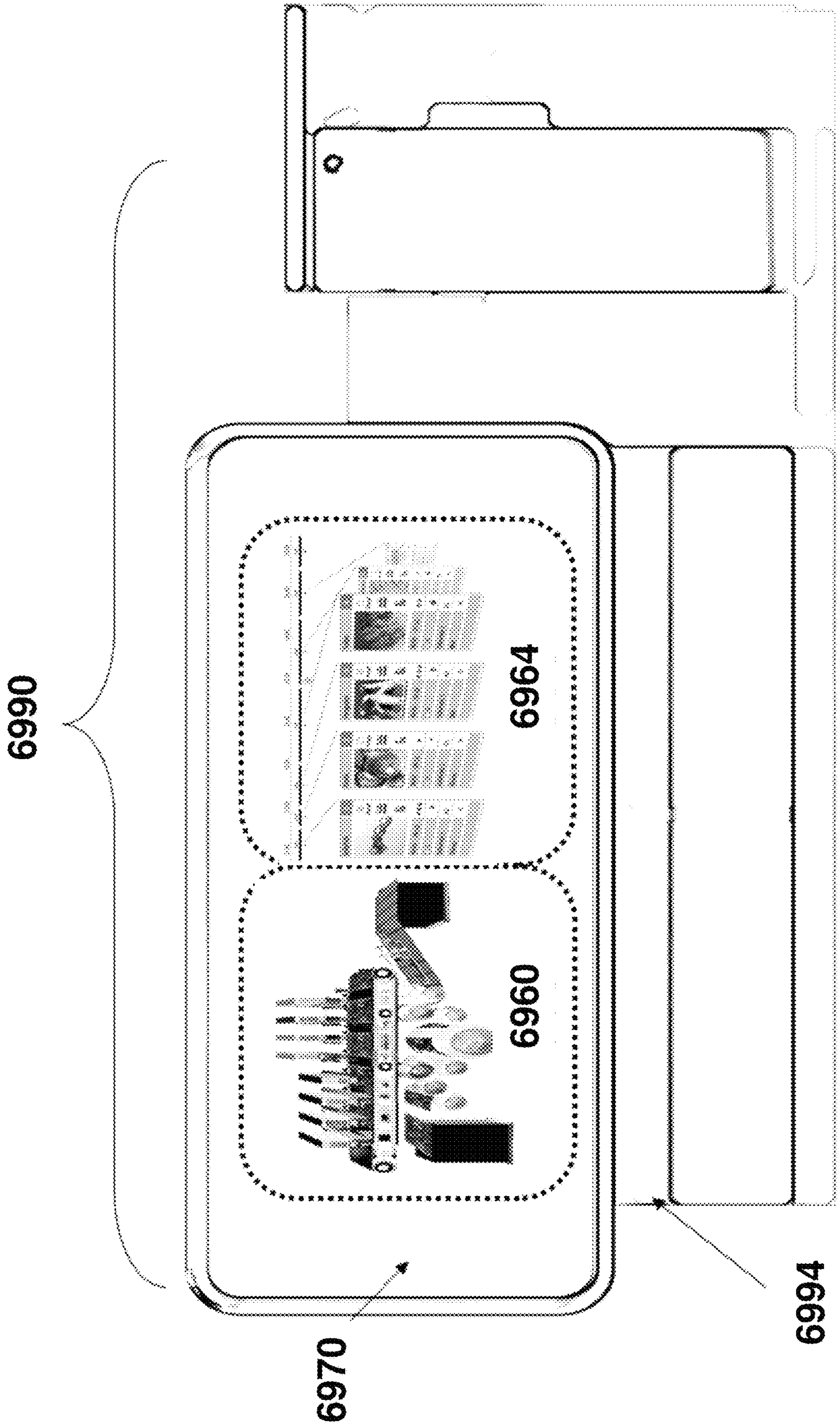

FIGS. 47A-47B illustrate a digital printing system 6990 including a printing system housing 6994 and a display screen 6970 which collectively hide the internal components of printing system 6990.

Embodiments of the present invention relate to a printing system comprising:

a. a rotatable intermediate transfer member;

b. an image forming system for forming ink images on the intermediate transfer member, c. a sheet or web substrate transport system 6500 including at least one impression cylinder that selectively presses a substrate against a region of the intermediate transfer member spaced from the image forming system for ink images to be impressed thereon at an image transfer location 6958; and d. an electronic display screen operative to display information about the operation of the printing system, the display screen being mounted to a housing of the printing system so as to be movable and/or rotatable relative to at least the substrate transport system, the display screen positioned and dimensioned to span at least one of:

i. a majority of the horizontal range of the substrate transport system; and ii. a majority of the horizontal range of the intermediate transfer member, wherein the printing system is arranged so that:

A. when the mounted display screen has a first position/orientation, the display screen obstructs front access to the substrate transport system or to the image transfer location 6958 thereof; and B. translation and/or rotational motion of the mounted display screen 6970 from the first position/orientation to a second position/orientation permits front access to the substrate transport system or to the image transfer location 6958 thereof.

For the present disclosure, a position/orientation is the combination of a position and an orientation. When an object rotates, even if its position does not change its position/orientation does change. When an object translates, even if its orientation does not change its position/orientation does change.

Embodiments of the present invention relate to an indirect printing system comprising a rotatable intermediate transfer member, an image forming system for forming ink images on the intermediate transfer member, and a sheet or web substrate transport system including at least one impression cylinder for enabling the substrate to be pressed against a region of the intermediate transfer member for ink images to be impressed thereon.

In some embodiments, at least significant portions of the substrate transport system and/or the intermediate transfer member are deployed within a device housing—for example, a common housing for both the substrate transport system and the intermediate transfer member. In some embodiments, a display screen is mounted to the device housing—for example, slidably mounted. For example, the display screen may be horizontally or vertically or diagonally slidable.

Embodiments of the present invention relate to apparatus and methods whereby the same electronic display screen provides multiple functionalities: (i) displaying data related to operation of the indirect printing system and (ii) selectively blocking access to the substrate transport system and/or intermediate transfer member. Any display screen technology may be used including but not limited to liquid crystal display (LCD) and light emitting diode (LED) technology.

In some embodiments, the display screen is relatively 'large'—for example, (i) having an horizontal dimension (e.g. width) that spans at least a majority of a horizontal dimension of the intermediate transfer member and/or substrate transport system and/or (ii) having a vertical dimension (e.g. height) that is at least half that of the substrate transport system. Other metrics describing the relatively 'large' display screen are described herein. As will be discussed below, in some embodiments, the size of the display screen may be useful for selectively blocking access to the substrate transport system and/or intermediate transfer member.

When the movable mounted display screen is disposed at a first screen position, the display screen blocks access and/or 'front access' to the substrate transport system. In the first display screen position (i.e. relative to the printer housing), the printing system may operate normally so as to form ink images on the rotating intermediate transfer member which are then transferred to the substrate. At this time, it may be desirable for the display screen to block access to the substrate transport system.

Motion of the display screen from a first to a second screen position (e.g. sliding motion—for example, vertical sliding motion) may be operative to open access to the substrate transport system.

In one non-limiting example, the first screen position is a lower position—for example, when the printer is in normal operating mode. According to this example, the second screen position is an upper position. Upwards motion and/or sliding motion (e.g. upwards sliding motion) of the display screen from the lower to the upper position may be operative to open access to the substrate transport system.

As noted above, in some embodiments, the display screen 6970 is relatively 'large.' In some embodiments, this means that a horizontal dimension of screen 6970 is at least one-half (in some embodiments, at least three-quarters) of (i) a horizontal dimension a cylinder assembly of the substrate transport system and/or (ii) of a horizontal dimension of the intermediate transfer member.

In some embodiments, screen 6970 is disposed so as to span at least a majority (in some embodiments, at least three quarters) of a horizontal range of the intermediate transfer member and/or of a horizontal range of a cylinder assembly of the substrate transport system. For example, a horizontal center of screen 6970 may be proximate to (i) a horizontal center of cylinder assembly of substrate transport system and/or to (ii) a horizontal center of the intermediate transfer member.

In some embodiments, a vertical dimension of screen 6970 is at least one-half (in some embodiments, at least three-quarters) of (i) a vertical dimension of the cylinder assembly of the substrate transport system and/or of (ii) a vertical dimension of the intermediate transfer member; and/or of (iii) a vertical dimension of the combination of the cylinder assembly of the substrate transport system together with the image transfer system (see FIG. 32).

Figure 48A:
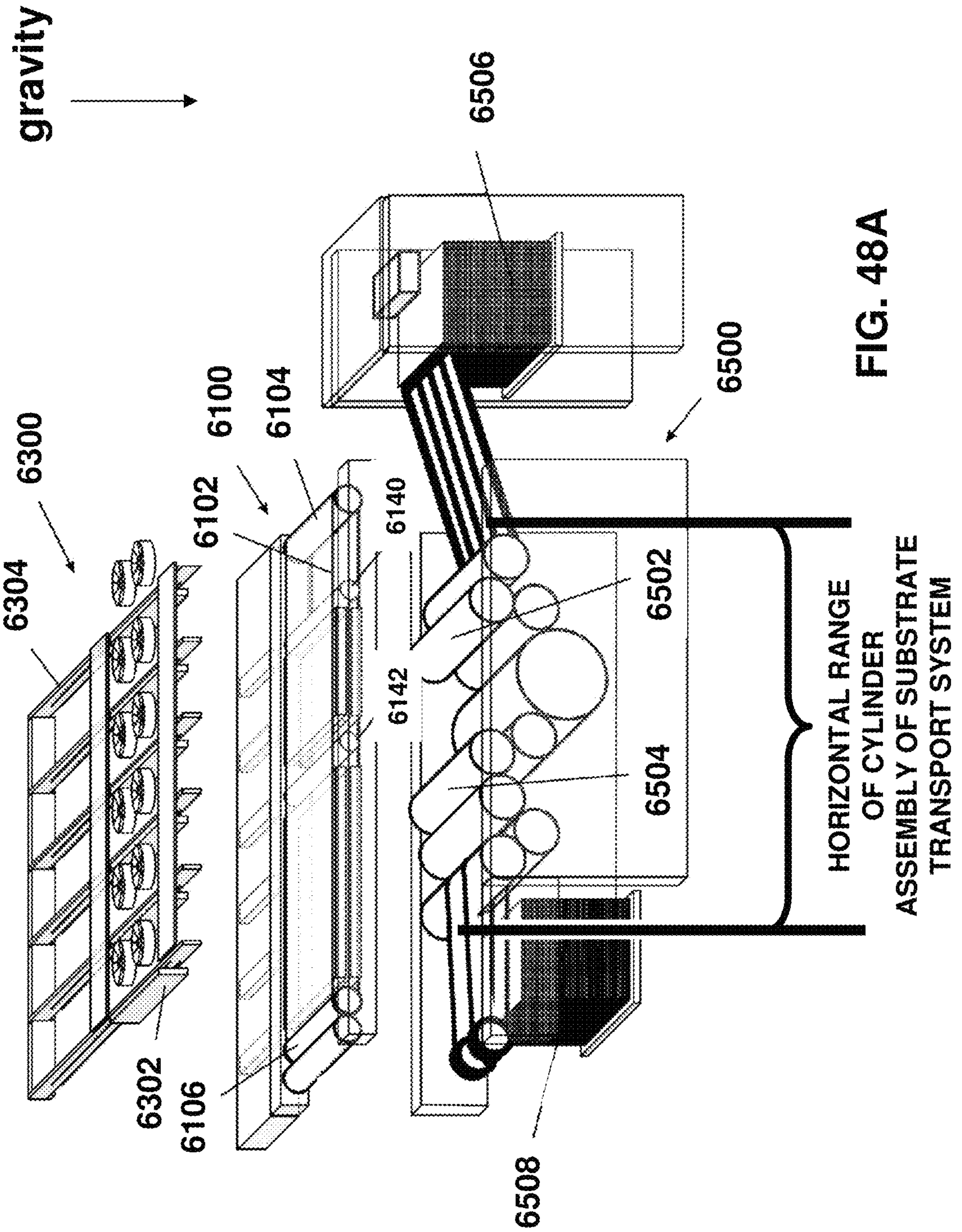
FIGS. 48A-48E and 49A-49B respectively illustrate horizontal and vertical ranges of substrate transport systems and of intermediate transport members in different embodiments.
Figure 49A:
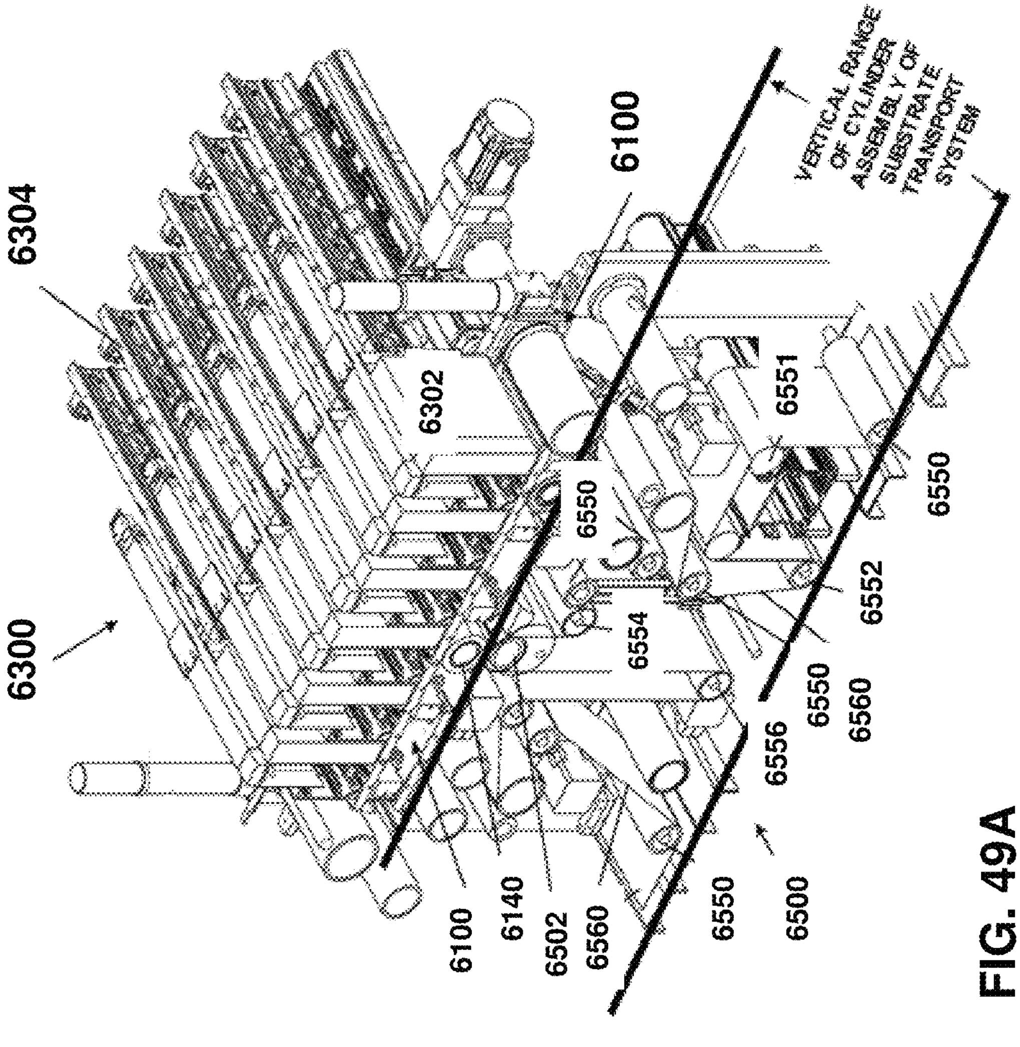
Figure 49B:
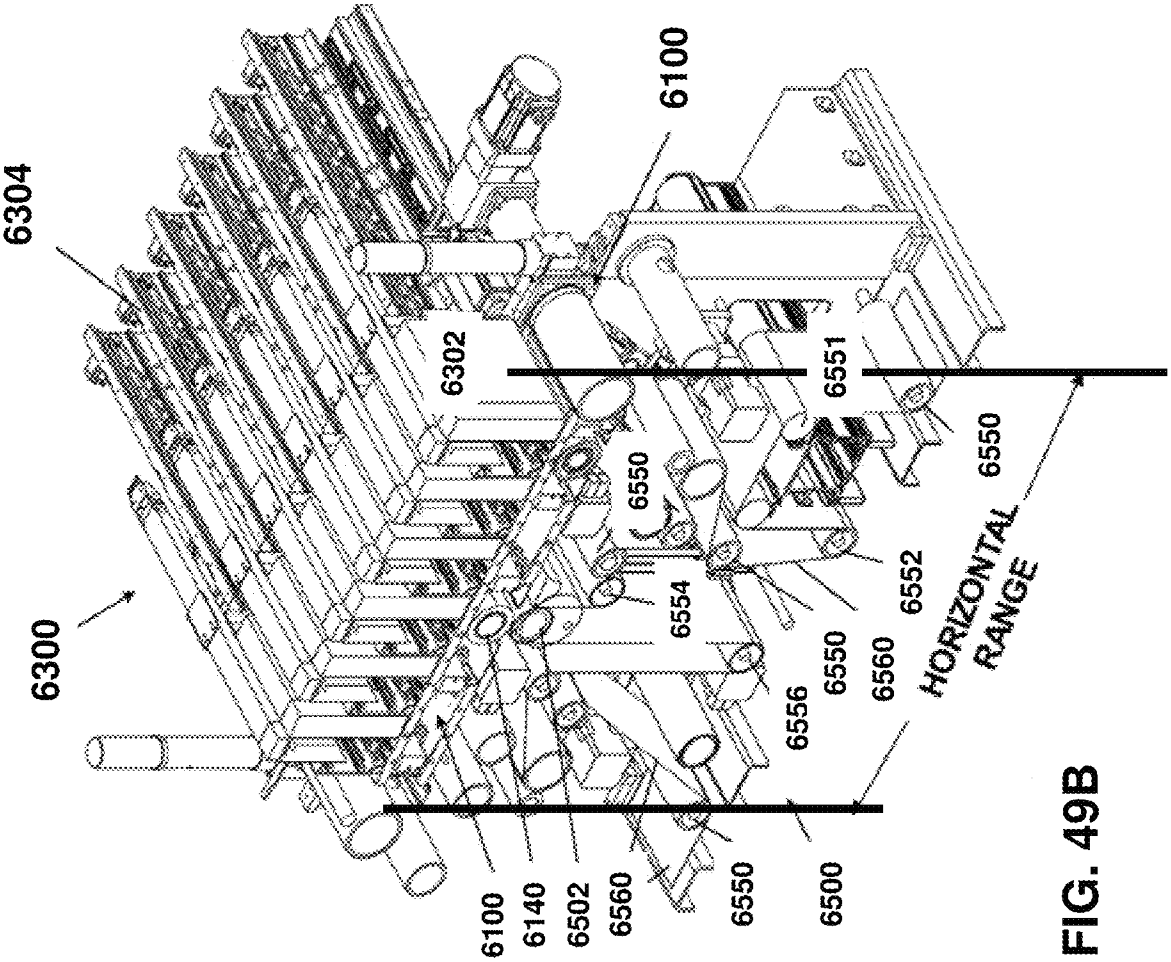

FIGS. 48A and 49B illustrate a horizontal range of the cylinder assembly of the substrate transport system in different embodiments. The length dimension of the horizontal range of the cylinder assembly (or intermediate transfer member) is the 'horizontal dimension' or width thereof.

Figure 48B:
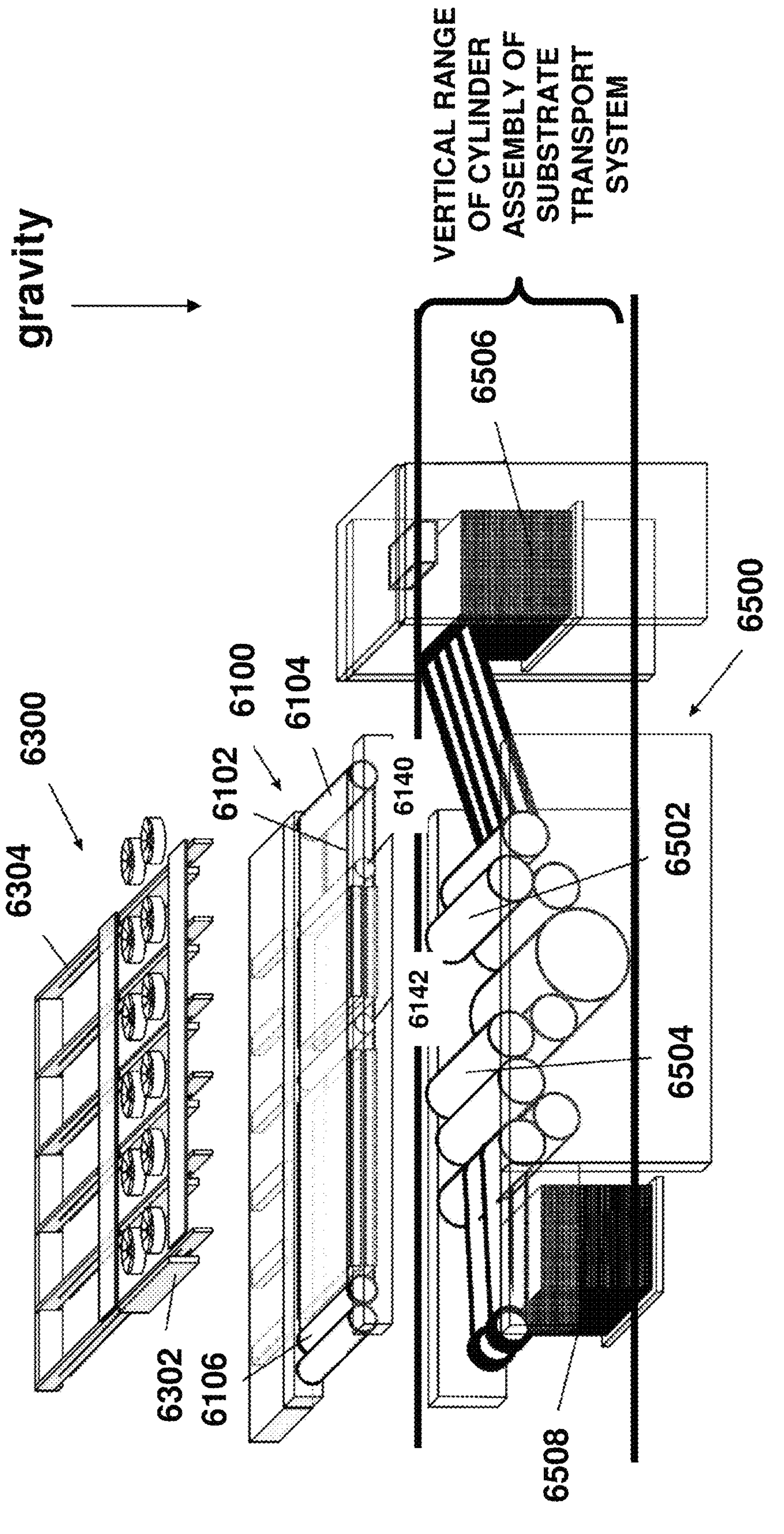
Figure 48C:
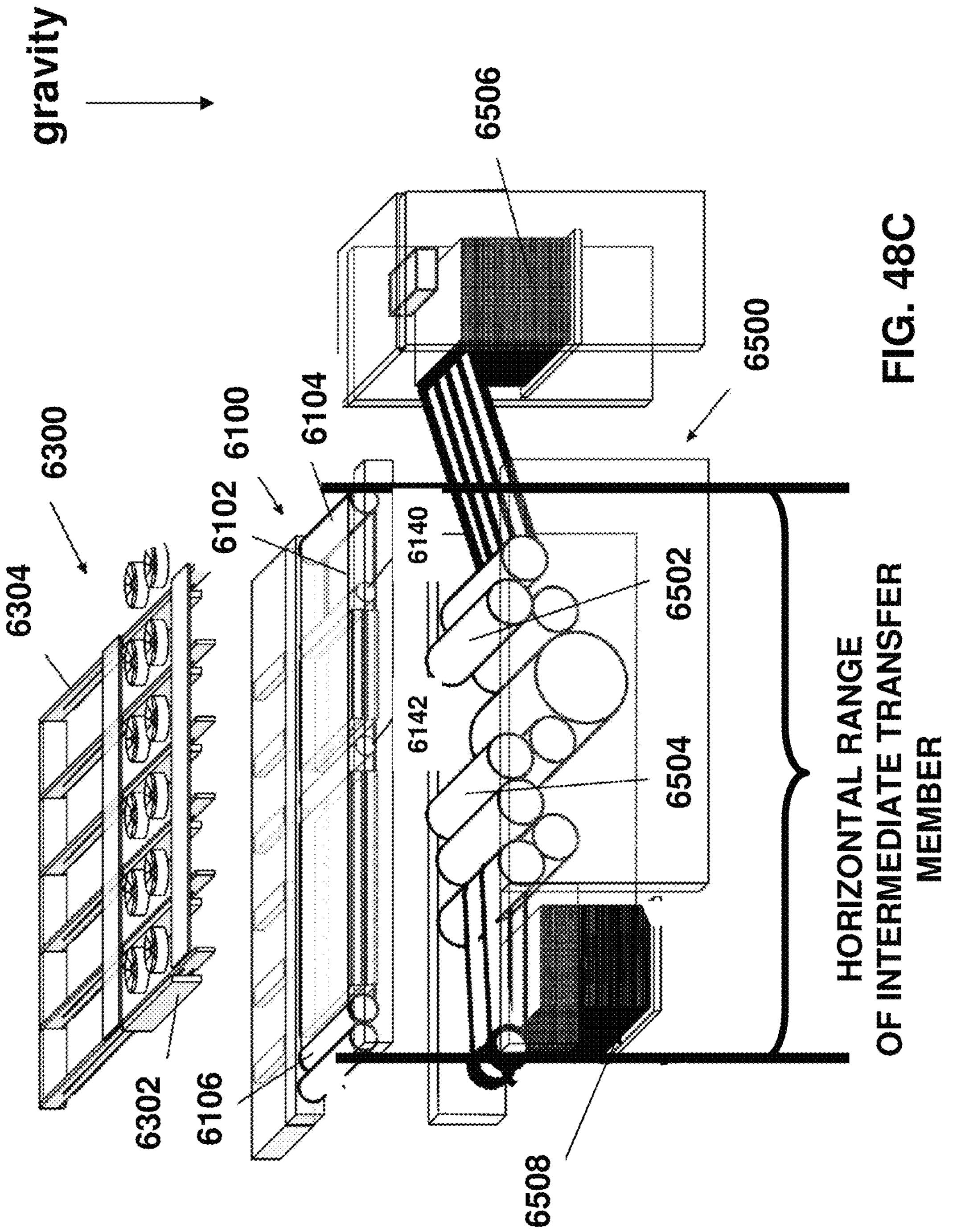
Figure 48D:
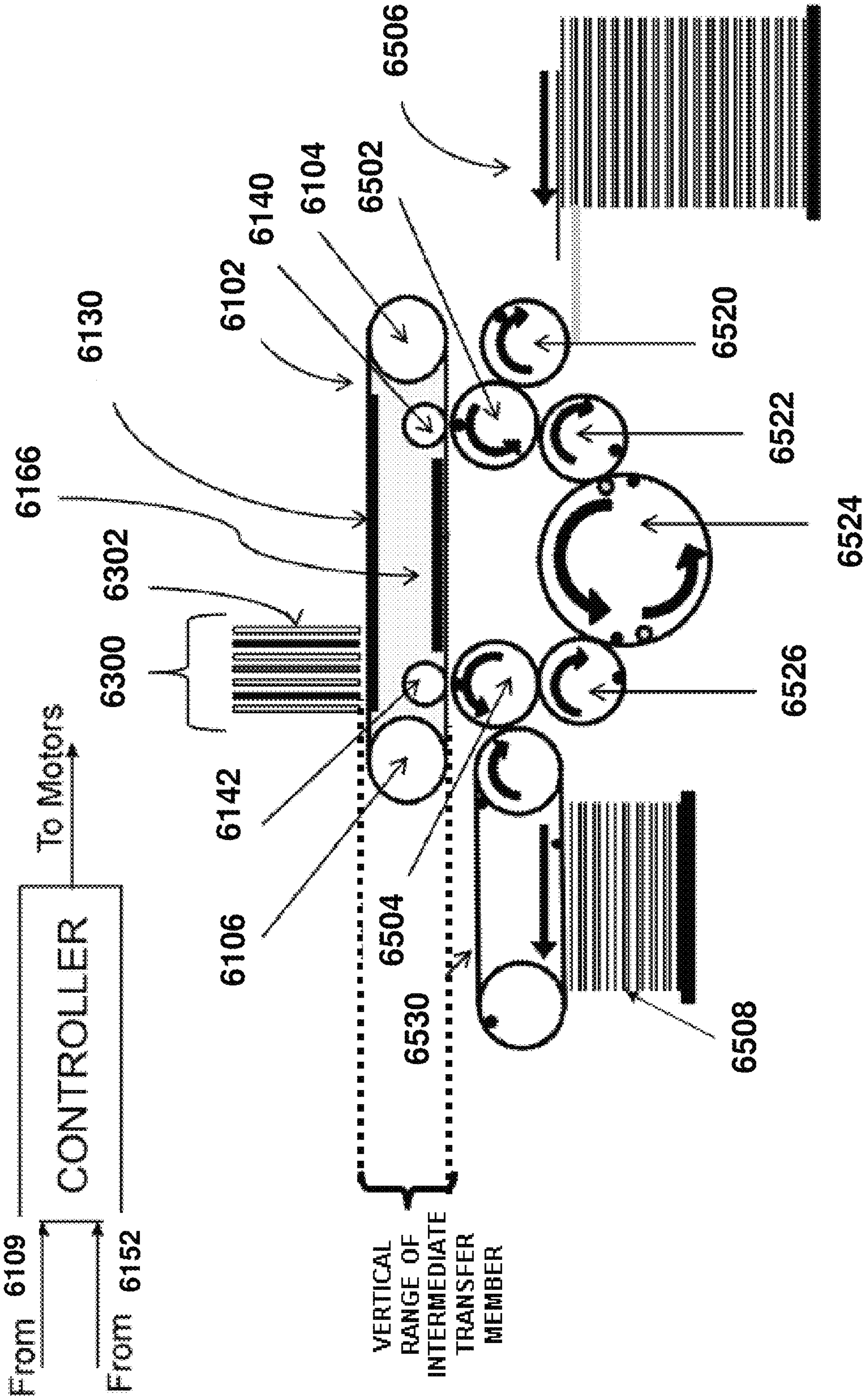
Figure 48E:
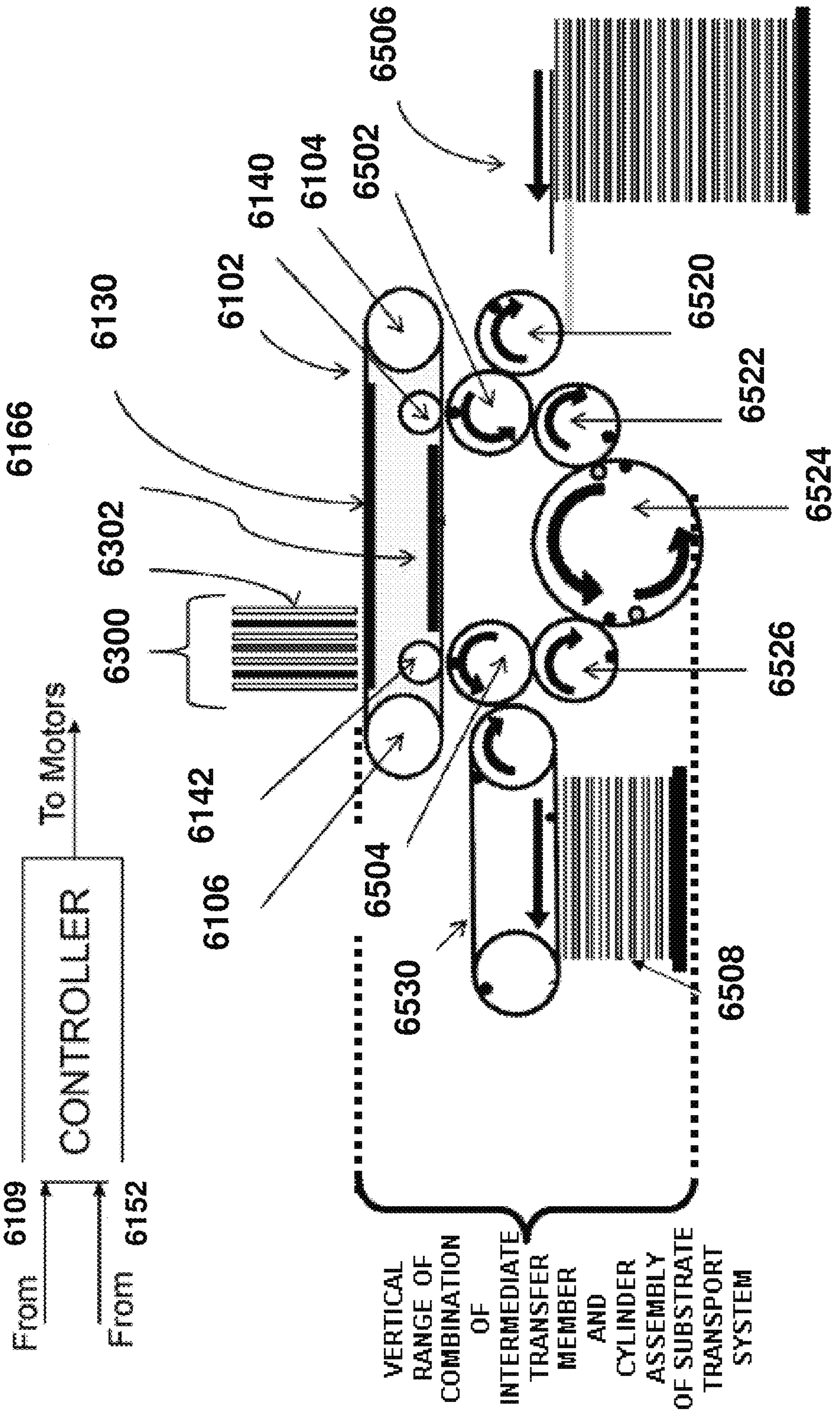

FIG. 48D illustrates a vertical range of the image transport member in one embodiment. FIG. 48E illustrates a vertical range of the combination of the cylinder assembly and the image transport member in one embodiment. FIG. 48B illustrates a vertical range of the cylinder assembly of the substrate transport assembly in one embodiment.

In the preceding paragraphs, the size the display screen was described relative to the substrate transport system and/or the intermediate transfer member. Alternatively or additionally, a horizontal dimension of electronic display screen 6970 is at least 2 meters and/or a vertical dimension of the electronic display screen is at least one meter.

In some embodiments, a width of display screen 6970 exceeds a height thereof. In some embodiments, a ratio between a width of display screen 6970 and a height thereof is at least 1.5 or at least 2 or at least 2.5 and/or at most 4 or at most 3.5 or at most 3. This may be useful for providing a display screen dimensioned to block access to substrate transport system.

In the examples of FIGS. 20 and 22, display screen 6970 is at a 'first position' that blocks front access to substrate transport system 6500 beneath (not visible in the Figures). In the example of FIGS. 20 and 22, the combination of (i) display screen 6970 and (ii) base 6910 portion of the printer housing (i.e. the portion that houses the substrate transport system) blocks access to the substrate transport system.

In contrast, in FIGS. 51A-51B, screen 6970 is elevated relative to the screen's position in FIG. 50 or 52. In particular, a bottom of screen 6970 is above a 'blocking elevation' for blocking access to the substrate transport system.

As shown in FIG. 51A, this allows a user (e.g. someone servicing the printing system) to 'access' (i.e. front access) substrate transport system 6500 (not shown on Figure) since the screen no longer blocks access. As shown in FIG. 51B, it is possible to access the printer via any location selected from a plurality of locations 6912. In the example of FIG. 51B, the locations 6912 are separated by at least 50 cm or at least 1 meter (i.e. a distance between 6912A and 6912B or between 6912C and 6912B is at least 50 cm or at least 1 meter) and/or by a distance equal to at least one-quarter or at least one-half of a circumference of intermediate transfer member 6102 (e.g. where the 'circumference of the intermediate transfer member' may be a circumference of a drum or length of a flexible blanket). In the example of FIG. 51B, all locations 6912 are at the same elevation or height.

Figure 54A:
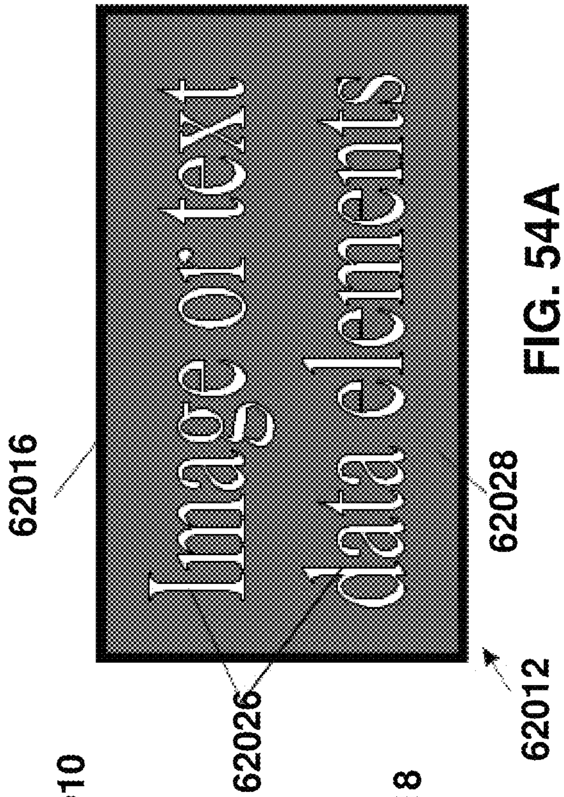
FIGS. 53-55 illustrate features related to a screen providing the illusion of a display system having a front panel with no obvious means of support.
Figure 54B:
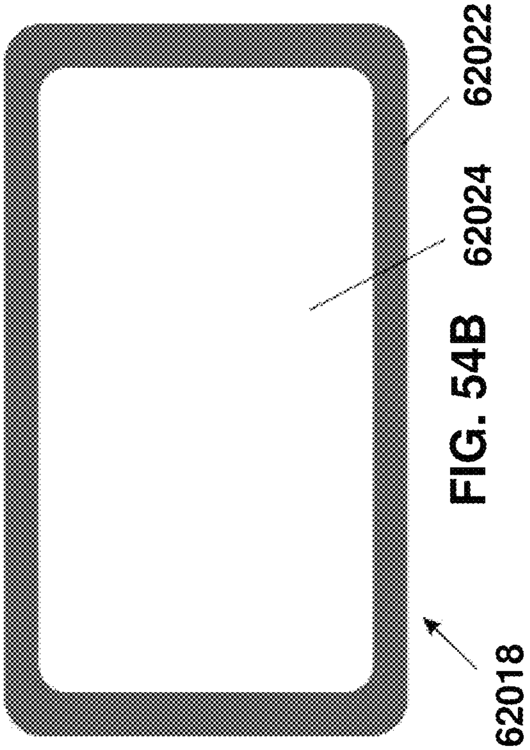
Figure 53:
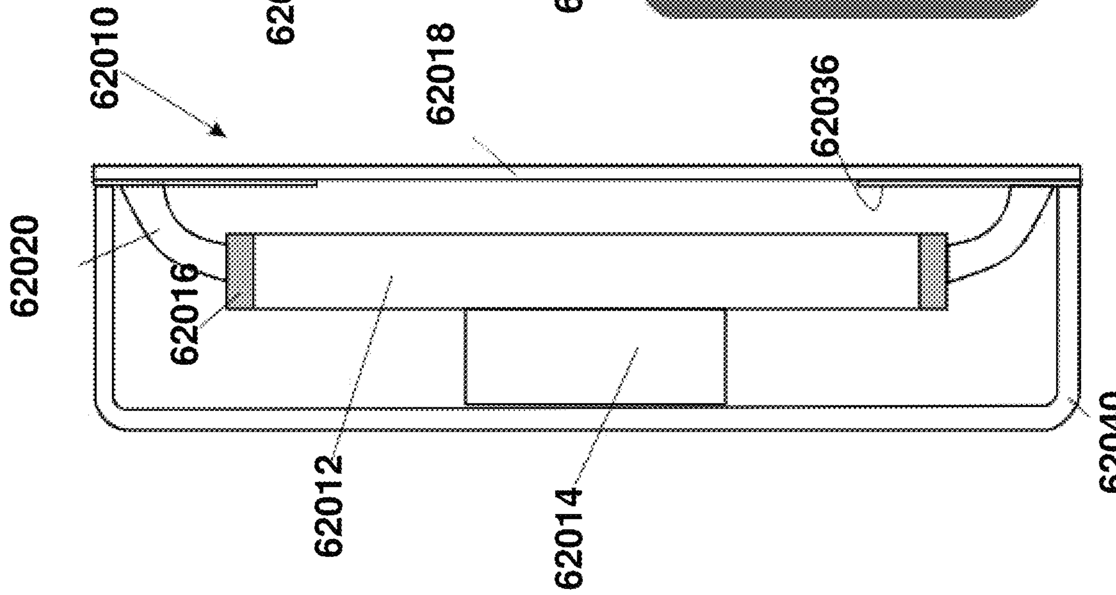
Figure 55:
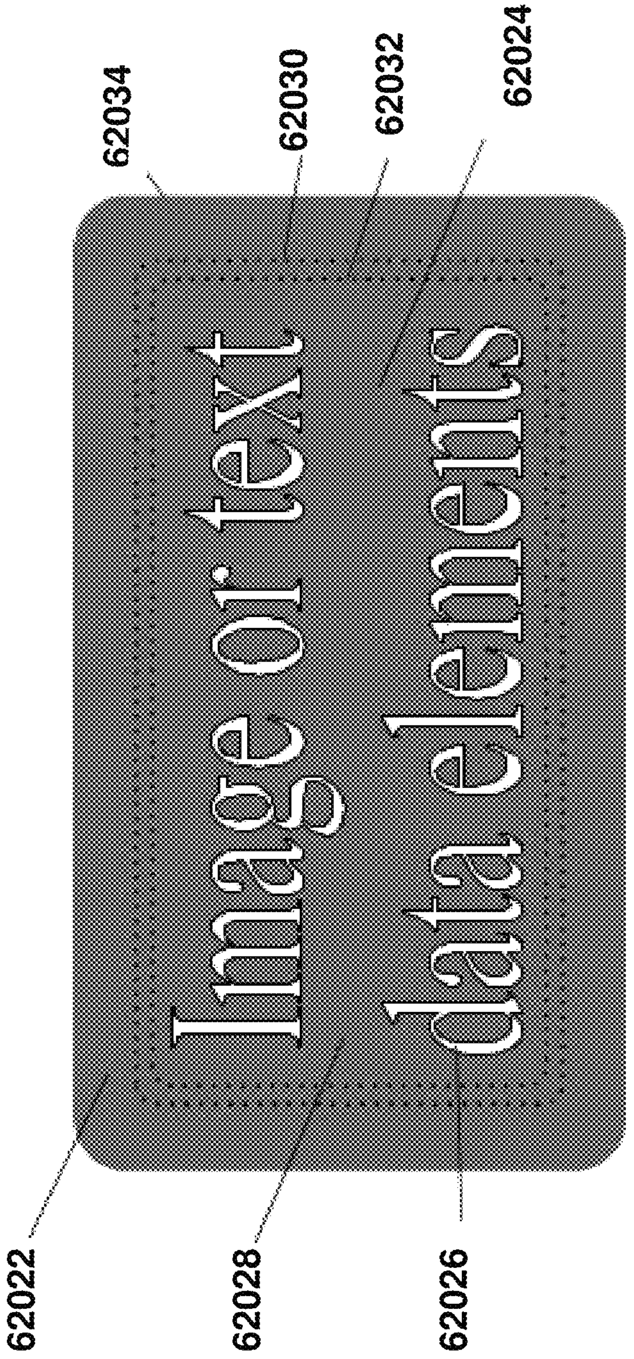

A Discussion of FIGS. 53-55

In one embodiment, the afore-described display 6970 of the printing system may be provided/constructed as illustrated in the cross-section view of FIG. 53. The display system shown in FIG. 53 comprises a display screen 62012 and a control unit 62014. The display screen 62012 may be an LED, LCD, plasma, OLED or projection (both rear and front) display screen, as conventionally used in television sets, and the control unit 62014 may comprise conventional driver circuitry used to send signals to a TV or computer screen. As both these are standard components, they need not be described in detail in the present context.

A large size display screen 62012 needs a bulky and unsightly frame 62016 to support it and if no other steps were to be taken to embellish it, its appearance from the front of the display screen would be as shown in FIG. 54A. Embodiments of the present invention seeks to provide a more attractive appearance and to this end places in front of the display screen a front panel 62018, that is preferably made of glass but may be of another transparent material.

The rear face of the front panel 62018 is bonded to a bracket 62020 which is in turn secured to the support frame 62016 of the display screen 62012. Both the width and the height of the front panel 62018 exceed the corresponding dimensions of the display screen 62012 and the bracket 62020 is attached to the overhanging border of the front panel in order not to obstruct the viewing of the display screen 62012.

To hide the support frame 62016 and the bracket 62020 from view, the front panel 62018 has an opaque border region 62022 that obscures from view the support frame 62016 and the mounting bracket 62020. The remaining central region 62024 of the front panel 62018 remains transparent to allow the image displayed on the screen 62012 to be viewed. The region 62022 that extends around the outer border of the panel 62018 is rendered opaque either by adhering or painting a mask 62036 onto the rear face of the front panel 62018 or by tinting the material of the panel 62018 only around its borders.

The appearance of the display system during normal operation is shown in FIG. 55. The dotted lines 62030 and 62032 are not visually discernible and are used merely represent the outline of different regions of the display. The entire area within the inner dotted line 62032 is the face of the display screen 62012 viewed through the transparent central region 62024 of the front panel. Within this area, there will be displayed information elements in the form of images or text 62026 against a background image 62028, shown as being of a uniform color, though this is not essential.

The entire area 62022 between the outer dotted line 62030 and the edge 62034 is the opaque region around that borders the front panel 62018. In the region between the two dotted lines 62030 and 62032, the opacity of the border 62022 fades gradually and an increasing proportion of the background 62028 can be seen. By arranging for the appearance of the opaque region 62022 to match that of the background image 62028, the illusion is achieved of the image extending to the very edge of the front panel 62018, with no obvious structure appearing to be supporting the front panel 62018.

The display system shown in FIG. 53 has an outer casing 62040 to enclose the display screen 62012, the support frame 62016, the control unit 62014 and the bracket 62020. The rim of the outer casing 62040 may, as shown, surrounding around the rear surface of the front panel 62018 so as not to be visible at all when the display system is viewed from the front of the panel 62018, but alternatively it may be designed to form a thin bezel surrounding the front panel 62018.

The display system is intended to be part of the human interface of a digital printer and is used to convey instructions to the printer. For this purpose, it is possible to construct the front panel 62012 as a touch screen by providing transparent electrodes on one of its surfaces or any other means known in the art. The display system is also used by the control system of the printer to display status information or to display a visual simulation or live video of the internal operation of the printer, for the purpose of fault diagnosis.

As the images displayed on the screen are always generated within the apparatus, the control system of the apparatus may readily be programmed to ensure that the image background always matches the appearance of the opaque region 62022 bordering the front panel 62018. Exact matching of the background color 62028 to the border region 62022 may if necessary be performed during a calibration procedure of the control system.

In further embodiments not illustrated in the figures, the printed sheets may be subjected to one or more finishing steps either before being delivered to the output stack (inline finishing) or subsequent to such output delivery (offline finishing) or in combination when two or more finishing steps are performed. Such finishing steps include, but are not limited to laminating, gluing, sheeting, folding, glittering, foiling, protective and decorative coating, cutting, trimming, punching, embossing, debossing, perforating, creasing, stitching and binding of the printed sheets and two or more may be combined. As the finishing steps may be performed using suitable conventional equipment, or at least similar principles, their integration in the process and of the respective finishing stations in the systems of the invention will be clear to the person skilled in the art without the need for more detailed description. In such embodiments, the display screen of the present disclosure may optionally further monitor the operation of such stations.

Independently of the optional presence of inline finishing stations, in some embodiments the housing of the printing system may encompass a monitoring station.

The display system, apparatus and method of monitoring operation of a printing system as disclosed herein are suitable for all printing systems. In some embodiments, each of the aforesaid aspects of the invention is particularly suitable for printing systems comprising an intermediate transfer member. Non-limiting examples of such printing systems were described by the present Applicant in co-pending patent applications published as WO 2013/132418, WO 2013/132419 and WO 2013/132420. The contents of all of the above mentioned applications of the Applicant are incorporated by reference as if fully set forth herein.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

In the description and claims of the present disclosure, each of the verbs, 'comprise' 'include' and 'have', and conjugates thereof, are used to indicate that the object or objects of the verb are not necessarily a complete listing of members, components, elements or parts of the subject or subjects of the verb. As used herein, the singular form 'a', 'an' and 'the' include plural references unless the context clearly dictates otherwise. For example, the term 'an image transfer station' or 'at least one image transfer station' may include a plurality of transfer stations.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

In the description and claims of the present disclosure, each of the verbs, "comprise" "include" and "have", and conjugates thereof, are used to indicate that the object or objects of the verb are not necessarily a complete listing of members, components, elements or parts of the subject or subjects of the verb. As used herein, the singular form "a", "an" and "the" include plural references unless the context clearly dictates otherwise. For example, the term "a marking" or "at least one marking" may include a plurality of markings.

What is claimed is:

1. A method of operating a printing system comprising: (i) an intermediate transfer member (ITM) comprising a flexible belt; (ii) an image forming station; (iii) an impression station; and (iv) upstream and downstream rollers arranged upstream and downstream of the image forming station to define an upper run of the ITM passing through the image forming station and a lower run of the ITM passing through the impression station, the method comprising:

at the image forming station, forming ink images upon a surface of the ITM as the ITM moves;

at the impression station, periodically engaging an impression cylinder to the moving ITM to transfer the ink images from the moving ITM to substrate passing between the ITM and the impression cylinder, wherein the periodic engagements induce mechanical vibrations within slack portions in the lower run of the belt; and applying torque to the belt by the upstream and downstream rollers in a manner maintains the upper run taut so as to substantially isolate the upper run from the mechanical vibrations in the lower run.

2. The method of claim 1, wherein a significantly stronger torque is applied to the downstream roller than to the upstream roller.

3. The method of claim 2 wherein impression cylinder is operated to rotate, and the motion of the ITM is regulated such that:

i. at some times, the ITM moves with the same surface velocity as that of the rotating impression cylinder; and ii. at other times, a surface velocity of the ITM is increased or decreased so as to:

A. prevent a pre-determined section of the intermediate transfer member from being aligned with the impression cylinder during periods of engagement; and/or B. improve a synchronization between a pre-determined section of the intermediate transfer member and a pre-determined location of the impression cylinder.

4. The method of claim 1 wherein impression cylinder is operated to rotate, and the motion of the ITM is regulated such that:

i. at some times, the ITM moves with the same surface velocity as that of the rotating impression cylinder; and
ii. at other times, a surface velocity of the ITM is increased or decreased so as to:
A. prevent a pre-determined section of the intermediate transfer member from being aligned with the impression cylinder during periods of engagement; and/or
B. improve a synchronization between a pre-determined section of the intermediate transfer member and a pre-determined location of the impression cylinder.

5. The method of claim 4, wherein the pre-determined section of the intermediate transfer member is a blanket seam.

6. The method of claim 4, wherein the pre-determined section of the impression cylinder is a gap in the impression cylinder accommodating a substrate gripper.

7. The method of claim 4, wherein (i) at least one of the upstream and downstream rollers is a driver roller; and (ii) the ITM is accelerated or decelerated by increasing or decreasing a rotational speed of one or more of the driver rollers during the periods of disengagement.

8. The method of claim 4, wherein the printing system is further operated to monitor a phase difference between (i) a moving locator-point affixed to the moving ITM; and (ii) a phase of the rotating impression cylinder, and wherein the surface velocity of the ITM increases or decreases during periods of disengagement in response to the results of the phase difference monitoring.

9. The method of claim 8, wherein the locator-point corresponds to a location of a marker on the intermediate transfer member or to a lateral formation thereof.

10. The method of claim 1, wherein the printing system is further operated such that:
i. a circumference length of the ITM varies in time; and
ii. a circumference length of the ITM is regulated to a set-point length equal to an integral multiple of a circumference of the impression cylinder.

* * * * *